US012061755B1

(12) United States Patent
Chao et al.

(10) Patent No.: US 12,061,755 B1
(45) Date of Patent: Aug. 13, 2024

(54) USER INTERFACE FOR DISPLAYING AND MANAGING WIDGETS

(71) Applicant: Apple Inc., Cupertino, CA (US)

(72) Inventors: Edward Chao, Palo Alto, CA (US); Gregory M. Apodaca, San Francisco, CA (US); Gary I. Butcher, Cupertino, CA (US); Taylor G. Carrigan, San Francisco, CA (US); Kevin W. Chen, Cupertino, CA (US); Christopher P. Foss, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/373,190

(22) Filed: Sep. 26, 2023

Related U.S. Application Data

(60) Provisional application No. 63/470,442, filed on Jun. 1, 2023, provisional application No. 63/464,521, filed on May 5, 2023, provisional application No. 63/463,065, filed on Apr. 30, 2023.

(51) Int. Cl.
*G06F 3/0362* (2013.01)
*G06F 3/02* (2006.01)
*G06F 3/0481* (2022.01)
*G06F 3/04847* (2022.01)
*G06F 3/0485* (2022.01)
*G06F 3/0487* (2013.01)

(52) U.S. Cl.
CPC .............. *G06F 3/0362* (2013.01); *G06F 3/02* (2013.01); *G06F 3/0481* (2013.01); *G06F 3/04847* (2013.01); *G06F 3/0485* (2013.01); *G06F 3/0487* (2013.01)

(58) Field of Classification Search
CPC ........ G06F 3/0362; G06F 3/02; G06F 3/0481; G06F 3/04847; G06F 3/0485; G06F 3/0487
See application file for complete search history.

(56) References Cited

U.S. PATENT DOCUMENTS

2020/0316469 A1* 10/2020 Lei .................. A63F 13/426
2020/0319793 A1* 10/2020 Yokoyama ............ G06F 3/016
2020/0319849 A1* 10/2020 Chan ................. G06F 3/04886

* cited by examiner

*Primary Examiner* — Sejoon Ahn
(74) *Attorney, Agent, or Firm* — DLA Piper LLP (US)

(57) ABSTRACT

The present disclosure generally relates to displaying widgets, managing widgets, and navigating user interfaces.

36 Claims, 41 Drawing Sheets

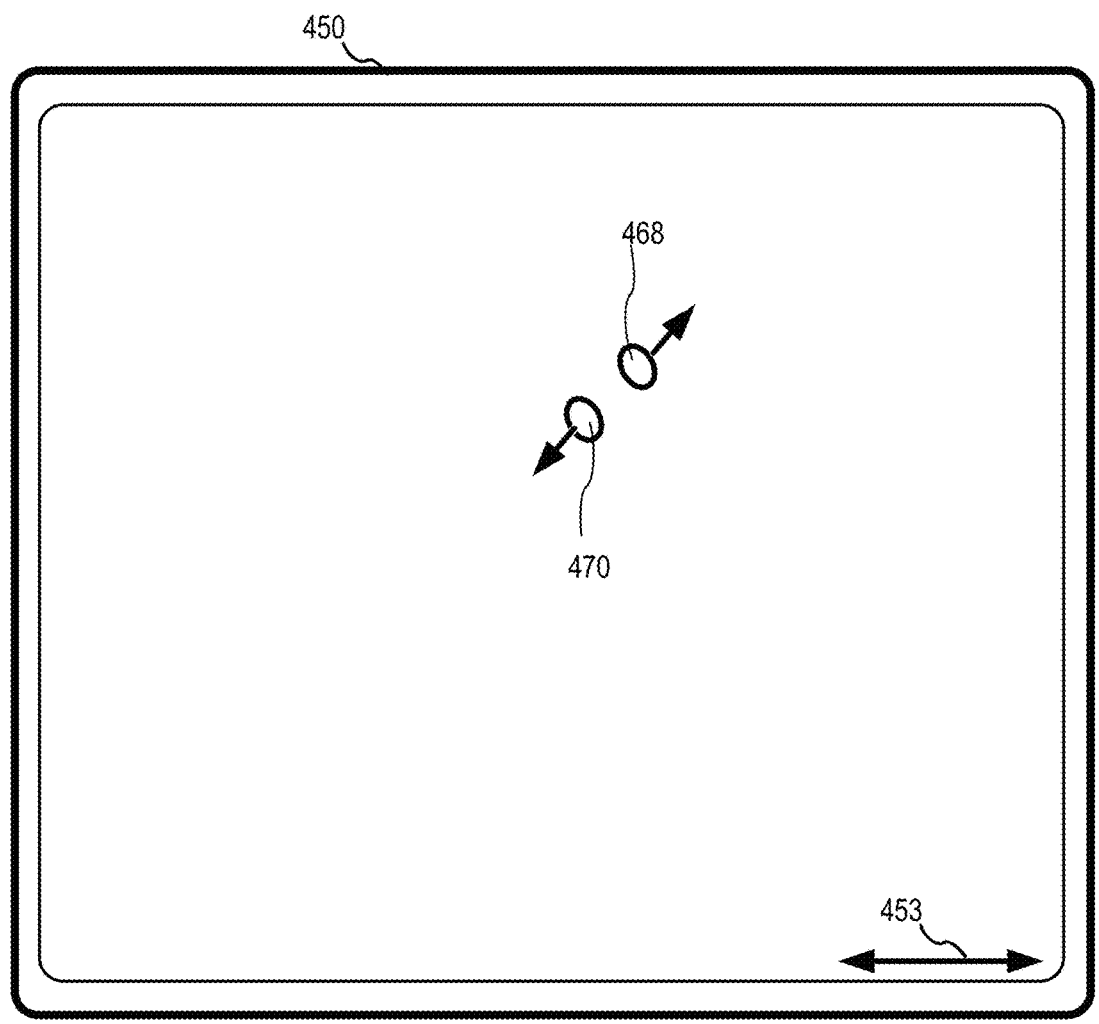
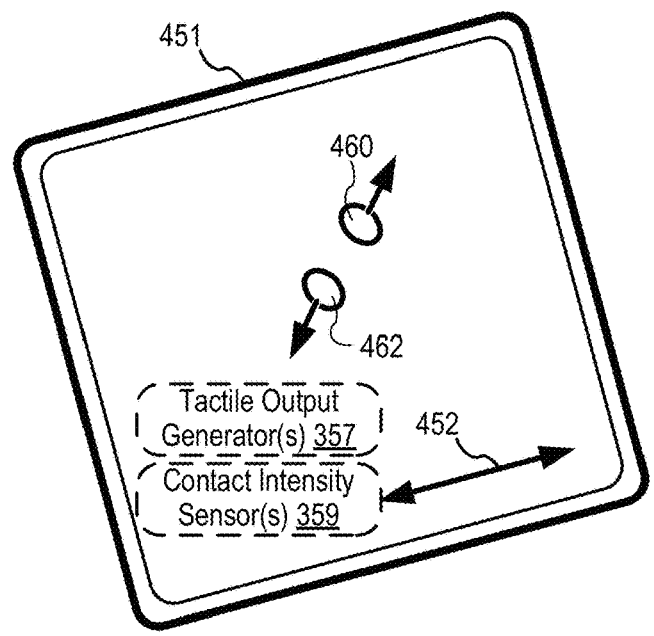
*FIG. 4B*

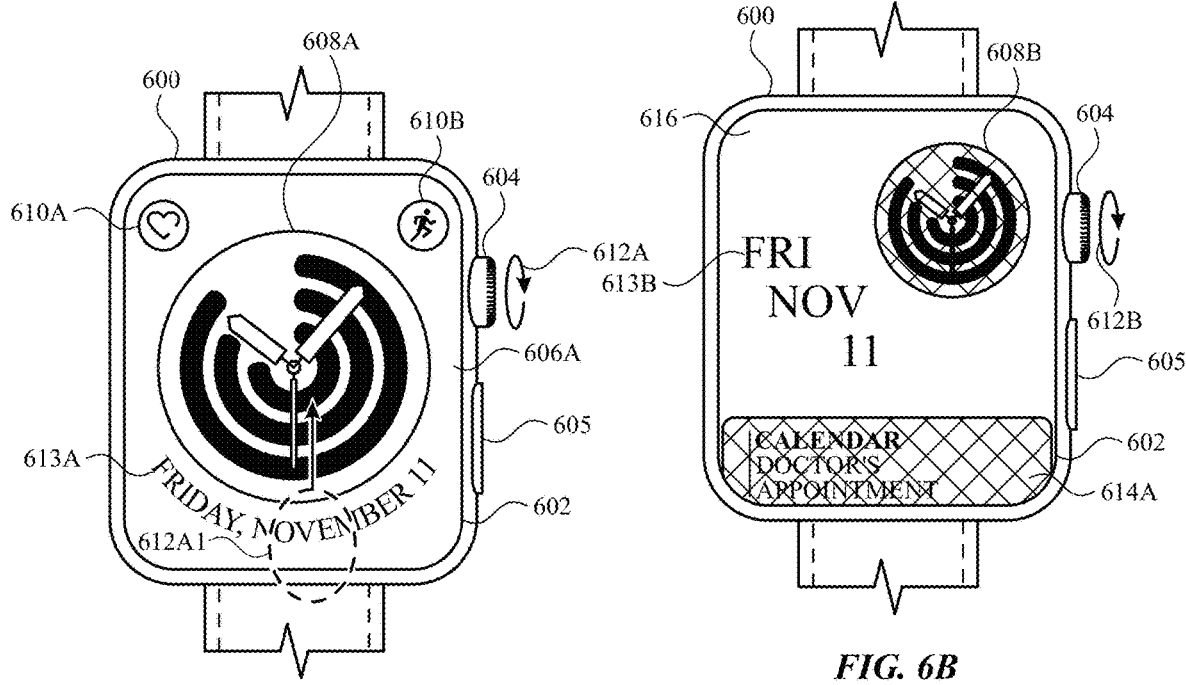
FIG. 6A
FIG. 6B
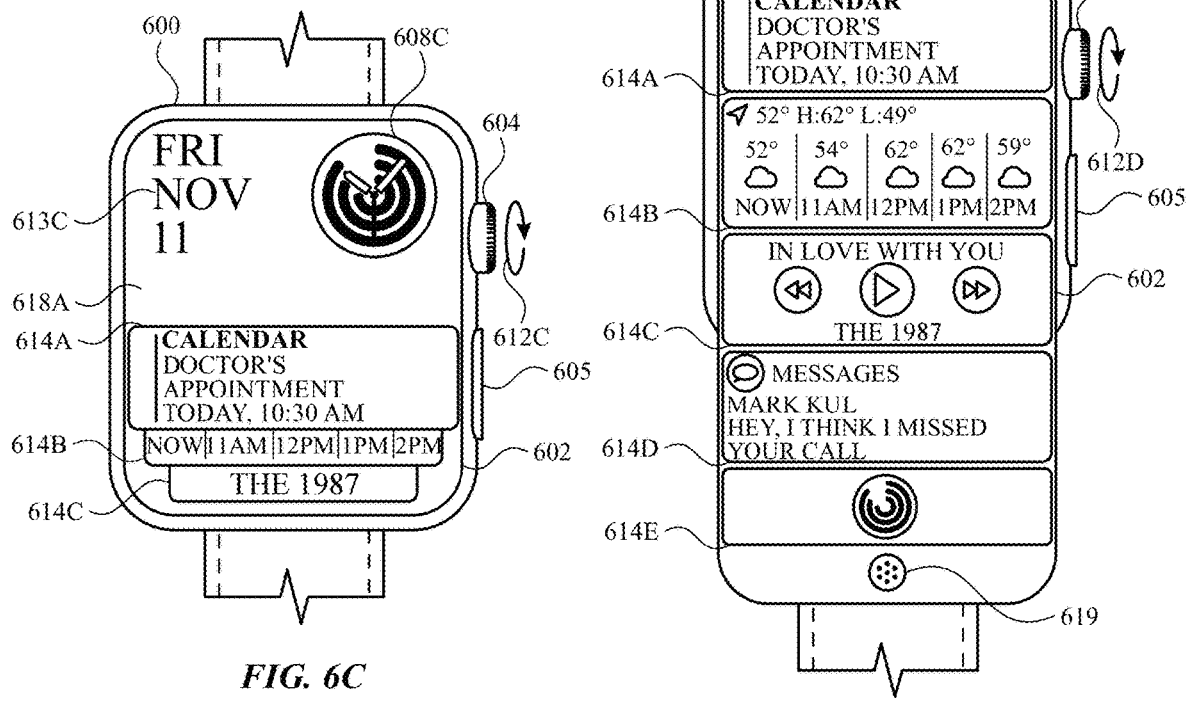
FIG. 6C
FIG. 6D

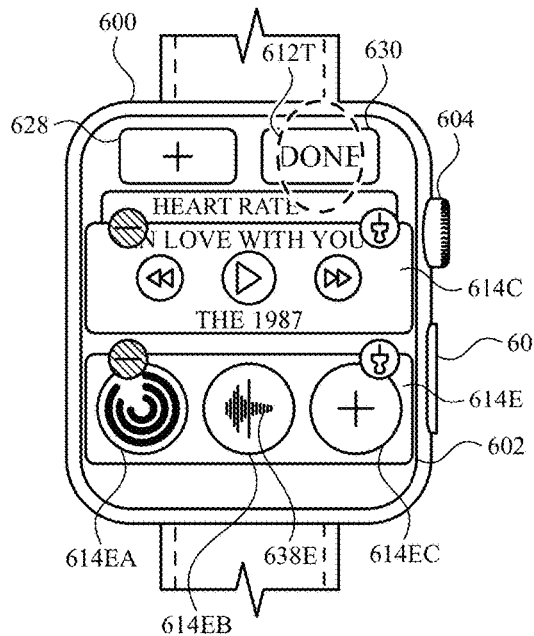
*FIG. 6U*
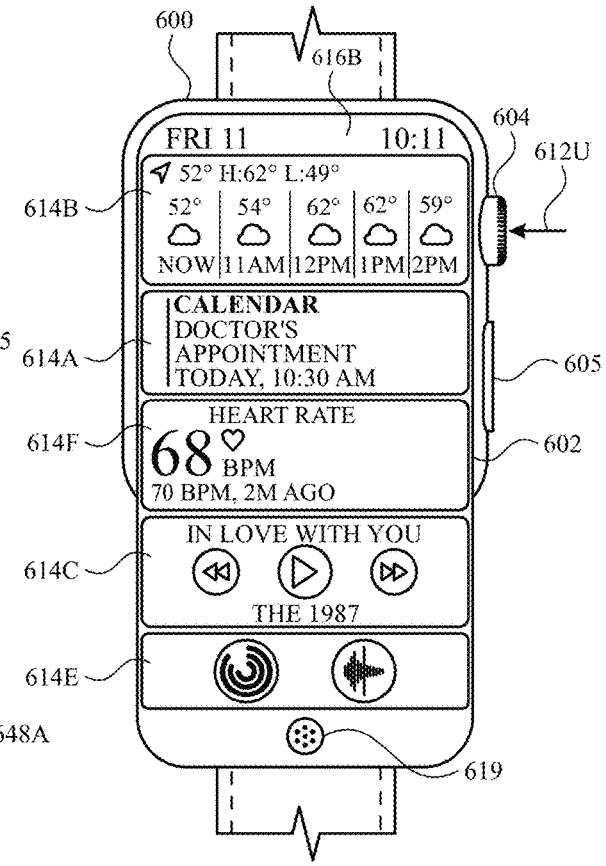
*FIG. 6V*
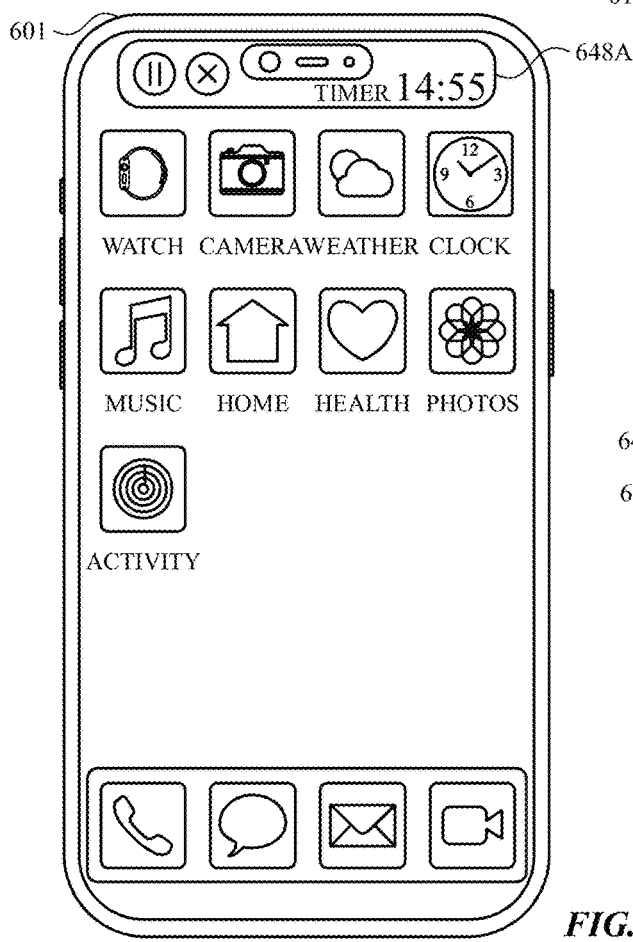
*FIG. 6W*
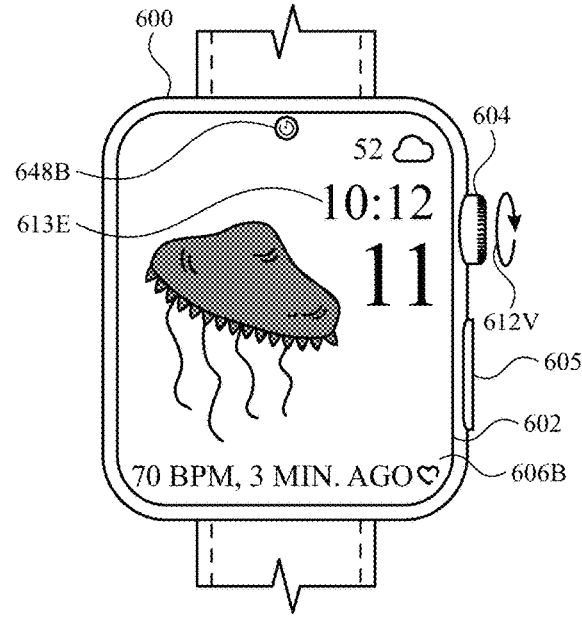

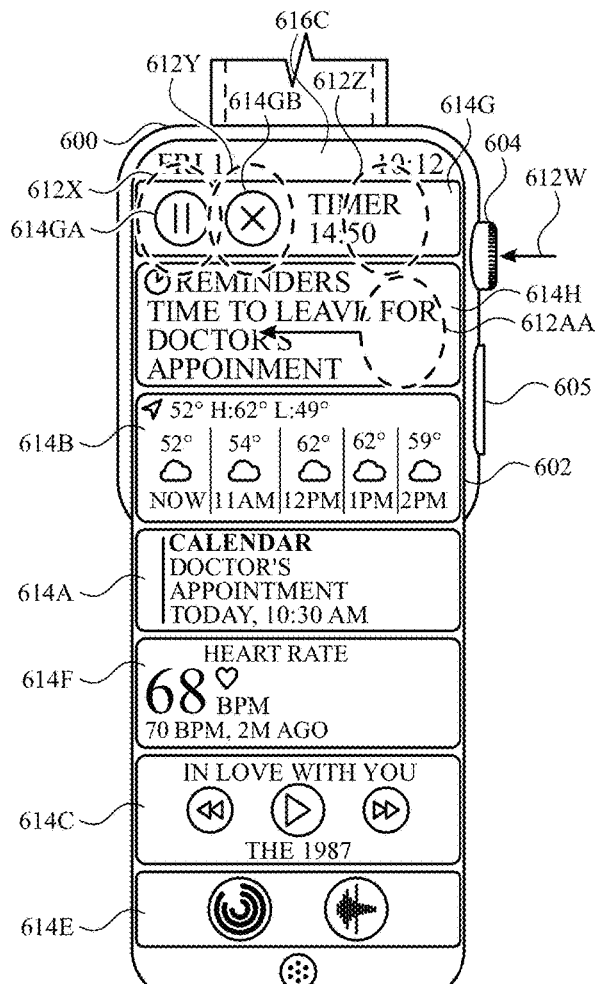
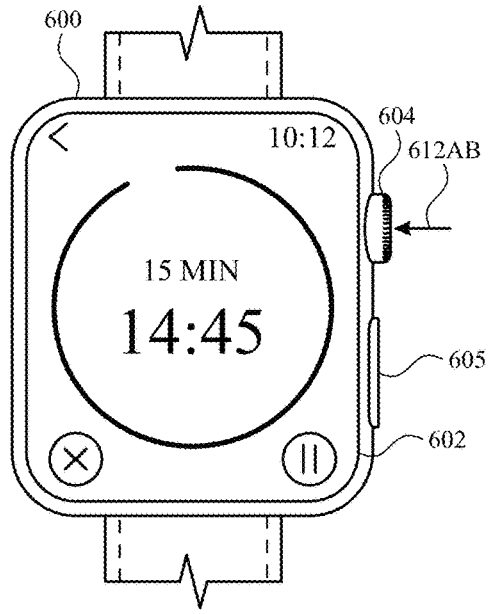
FIG. 6Y
FIG. 6X
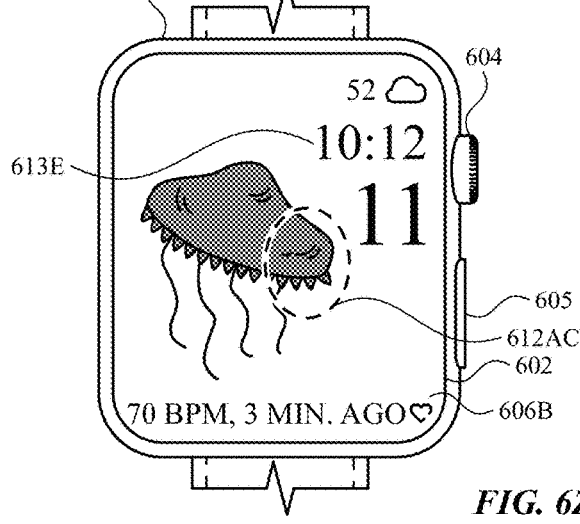
FIG. 6Z
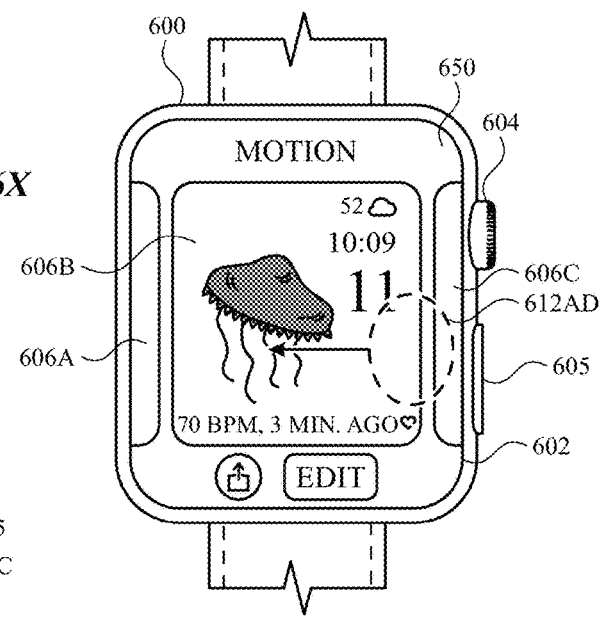
FIG. 6AA

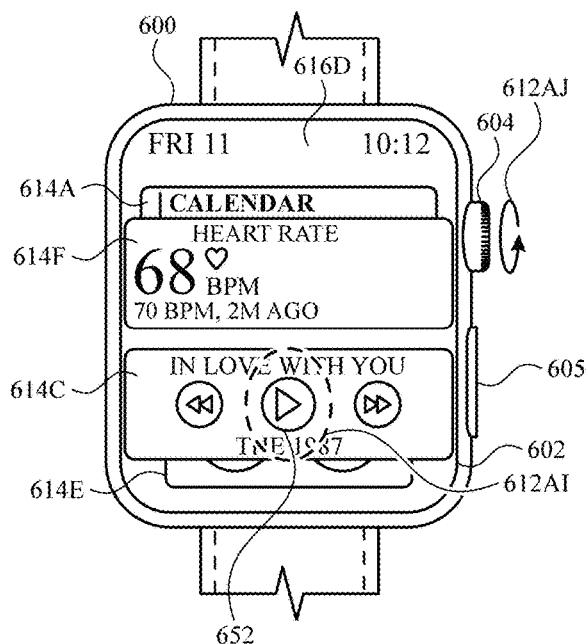
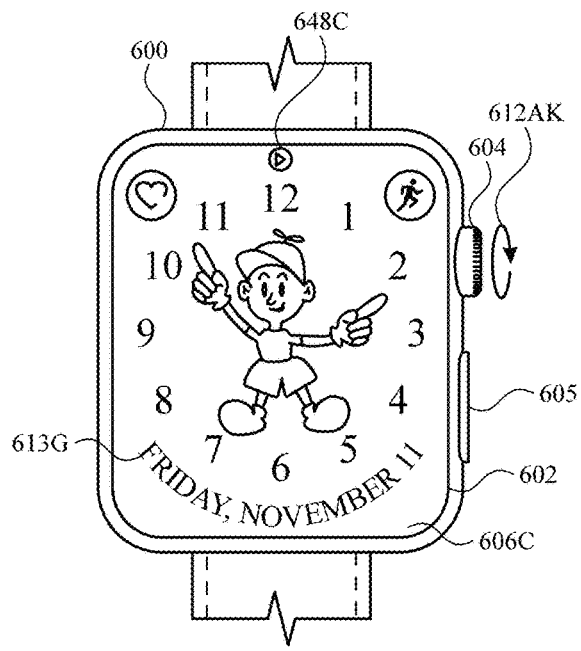
*FIG. 6AF*  *FIG. 6AG*
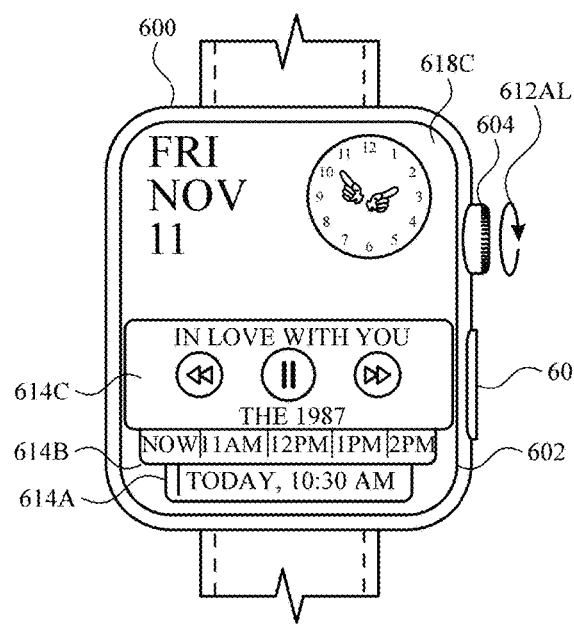
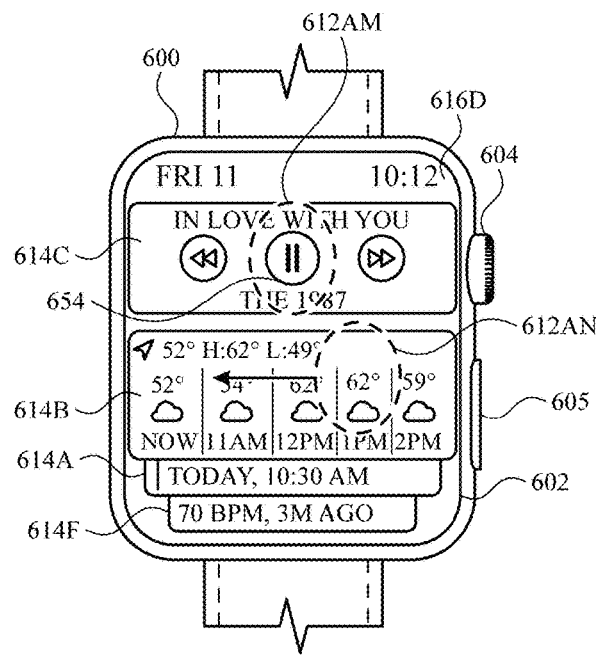
*FIG. 6AH*  *FIG. 6AI*

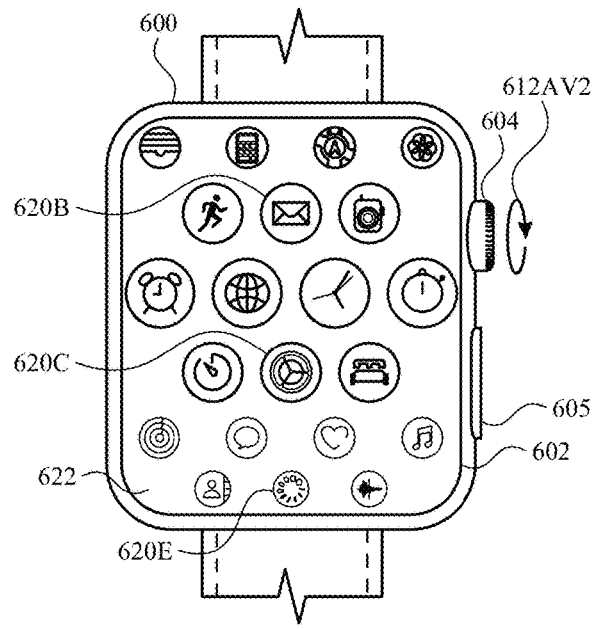
*FIG. 6AQ1*
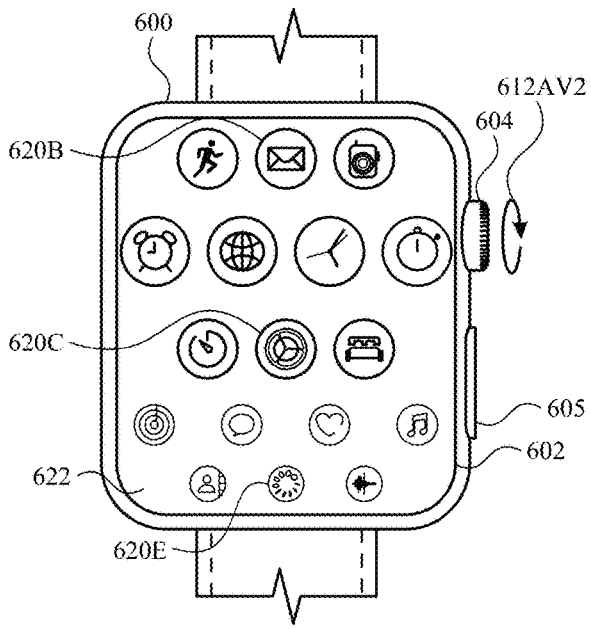
*FIG. 6AQ2*
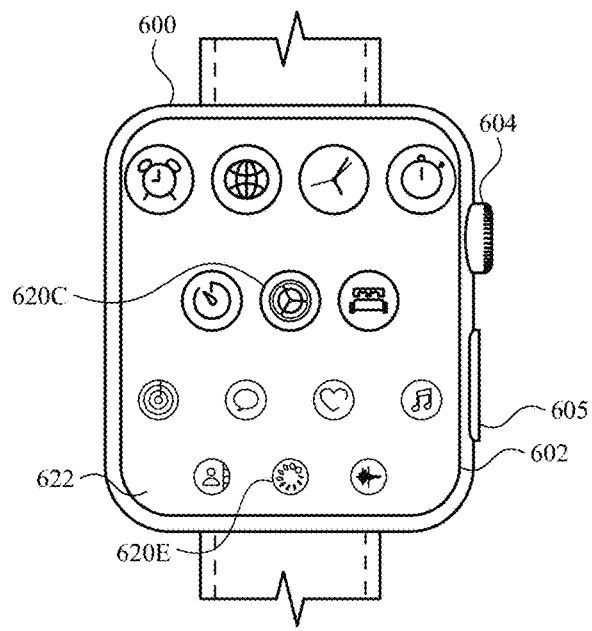
*FIG. 6AQ3*

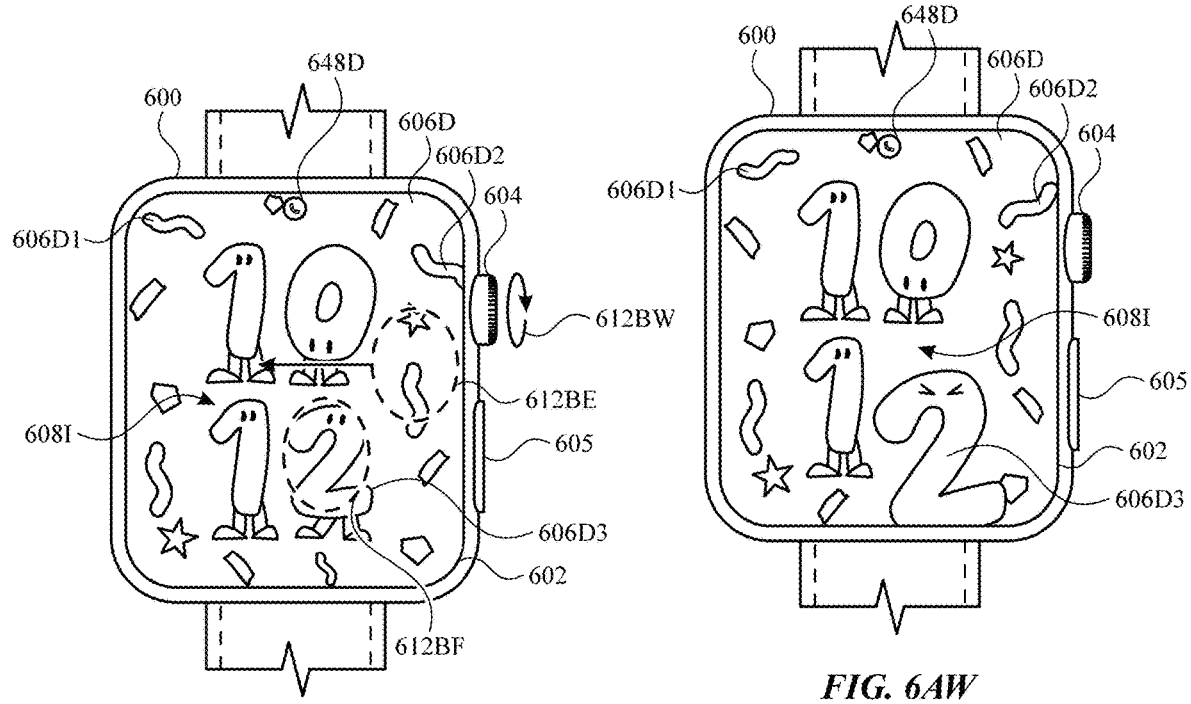
FIG. 6AV
FIG. 6AW
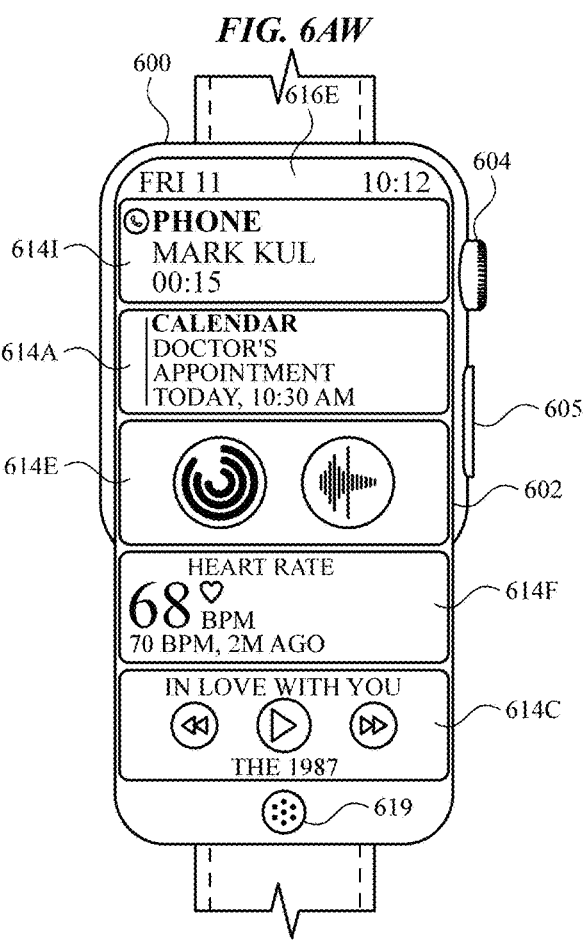
FIG. 6AX
FIG. 6AY

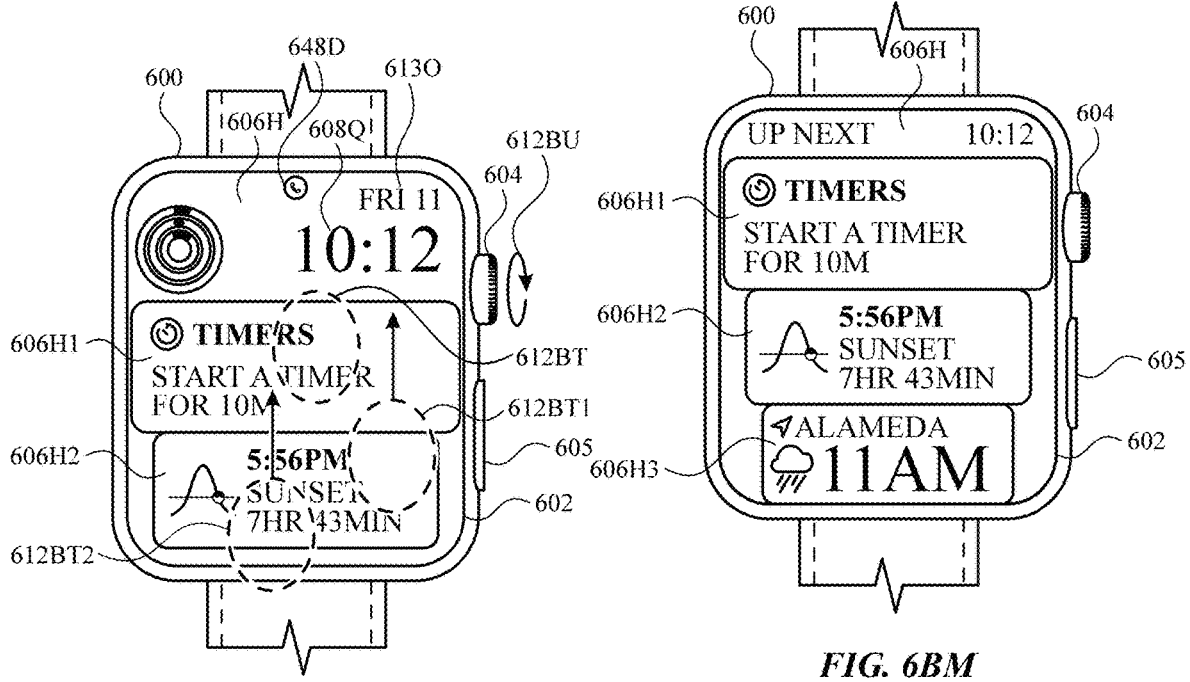
FIG. 6BL
FIG. 6BM
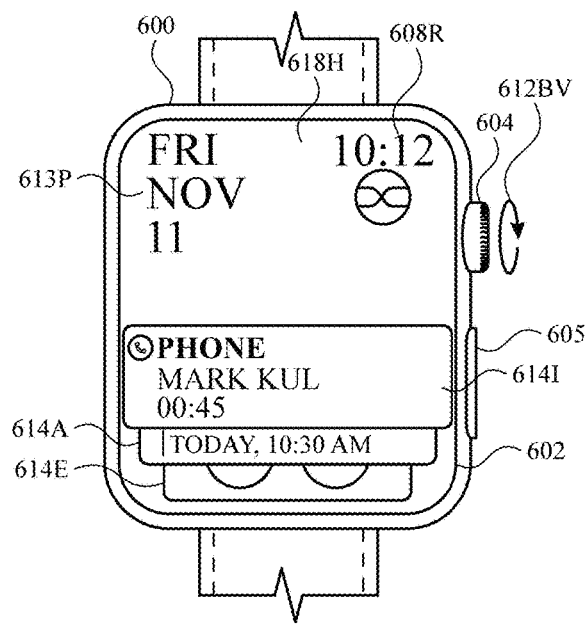
FIG. 6BN
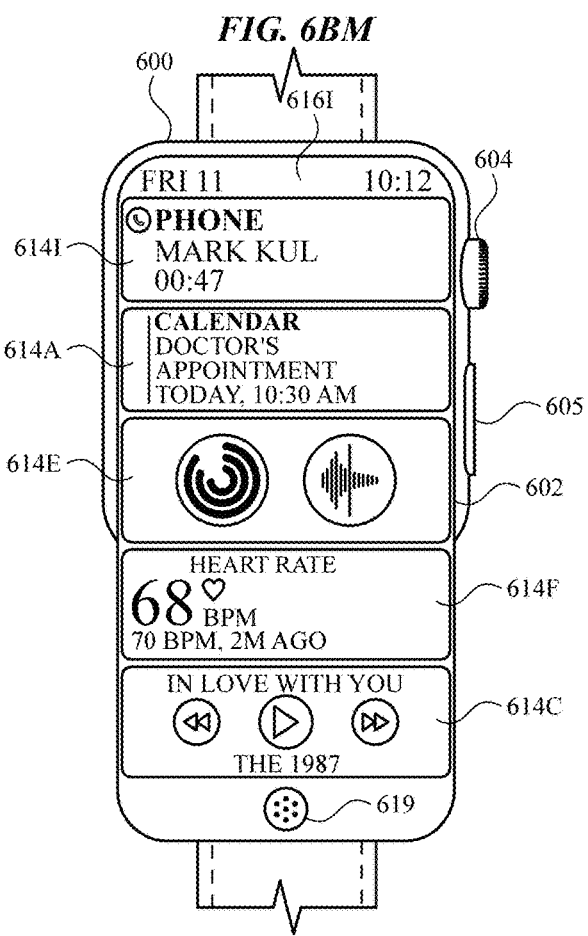
FIG. 6BO

900

While displaying, via the display generation component, a time user interface: detect, via the rotatable input mechanism, a rotational input.
902

In response to detecting the rotational input:

In accordance with a determination that a respective type of input was detected by the computer system within a time threshold of detect the rotational input, perform a first operation corresponding to the time user interface.
904

In accordance with a determination that the respective type of input was not detected within the time threshold of detecting the rotational input, perform a second operation, different from the first operation, that includes displaying, via the display generation component, a system user interface.
906

*FIG. 9*

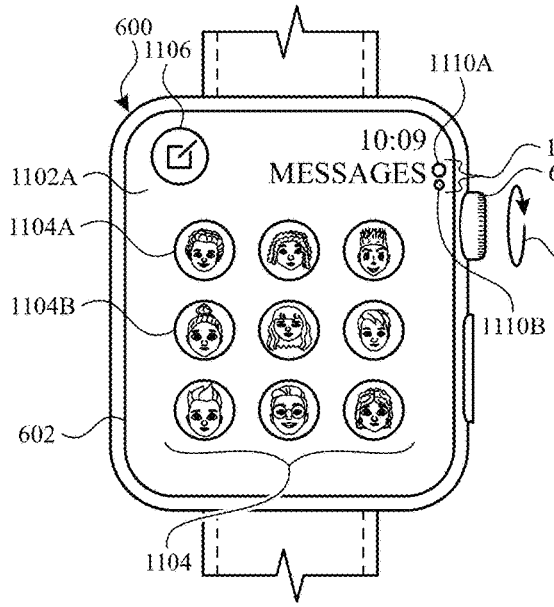 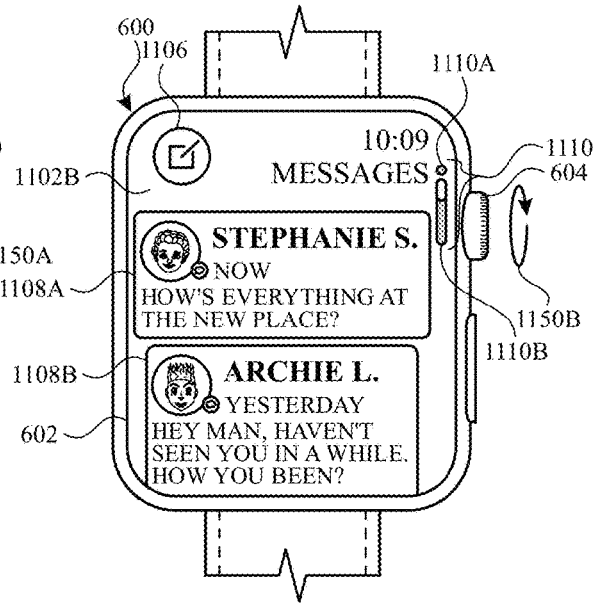
*FIG. 11A* *FIG. 11B*
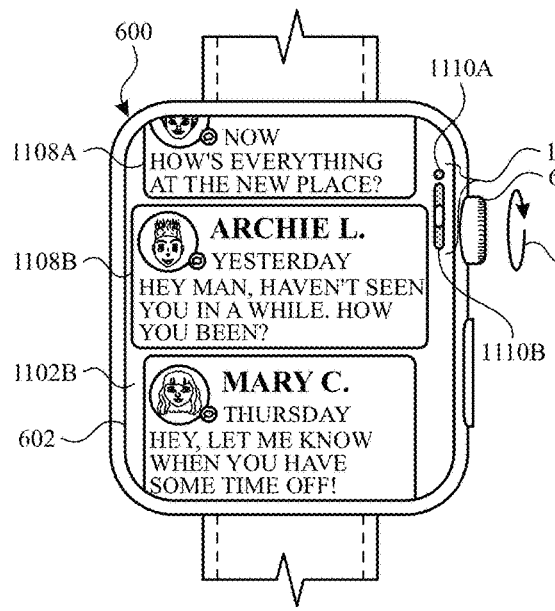 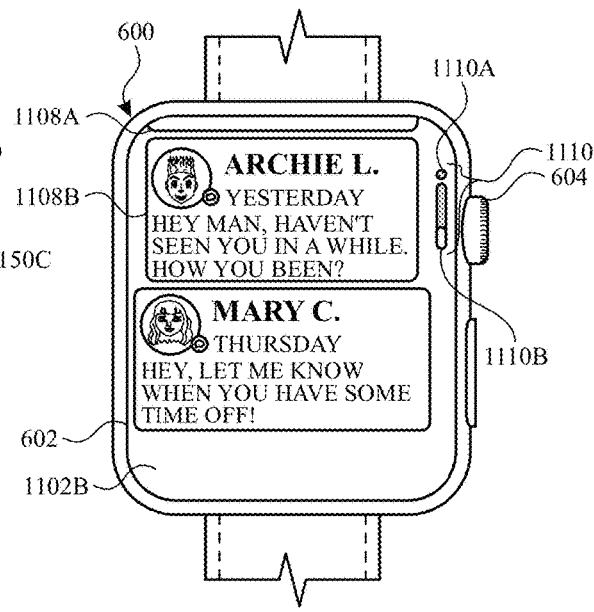
*FIG. 11C* *FIG. 11D*

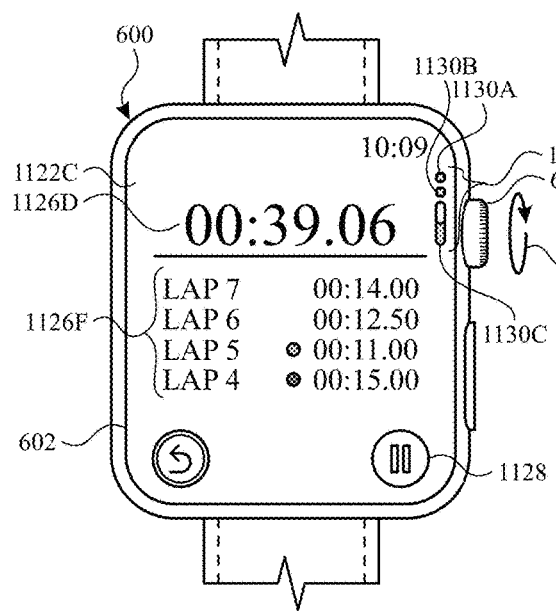
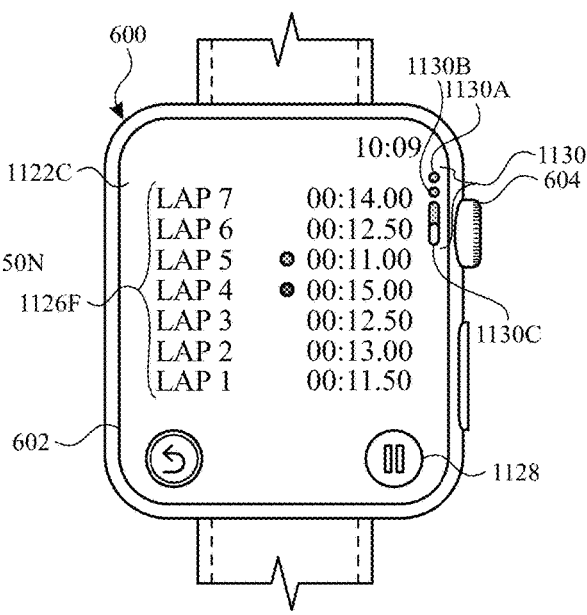
FIG. 11U  FIG. 11V

1200 ↘

1202
Displaying, via the display generation component, a first page of a plurality of pages.

1204
While displaying the first page of the plurality of pages, detecting, via the rotatable input mechanism, a first rotational.

1206
In response to detecting the first rotational input, replacing display, via the display generation component, of the first page of the plurality of pages with a second page of the plurality of pages without scrolling the first page of the plurality of pages, wherein the second page is displayed at a first scroll position.

1208
While displaying the second page at the first scroll position, detecting, via the rotatable input mechanism, a second rotational input.

1210
In response to detecting the second rotational input, scrolling, via the display generation component, the second page of the plurality of pages from the first scroll position to a second scroll position that is different from the first scroll position.

1302
Displaying, via the display generation component, a first view of an application that includes a plurality of user interface objects, including a first user interface object displayed at a first location and with a first size and a second user interface object displayed at a second location and with a second size, wherein: the first user interface object includes first information that updates over time based on changing data associated with the application; the second user interface object includes second information that updates over time based on changing data associated with the application; and the second information is different from the first information.

1304
While displaying the first view with the first user interface object displayed at the first location and with the first size and the second user interface object displayed at the second location and with the second size, receiving a request to transition from the first view to a second view that is different from the first view.

1306
In response to receiving the request to transition from the first view to the second view, displaying, via the display generation component, the second view, including:

1308
Shifting the first user interface object relative to one or more user interface objects of the plurality of user interface objects including the second user interface object.

1310
Resizing the first user interface object relative to one or more user interface objects of the plurality of user interface objects including the second user interface object, wherein after shifting and resizing the first user interface object, the first user interface object includes the first information, and the second user interface object includes the second information.

*FIG. 13*

1500 

1502
While displaying, via the display generation component, a respective user interface, detecting, via the rotatable input mechanism, a first rotational input.

1504
In response to detecting the first rotational input:

1506
In accordance with a determination that the respective user interface is a user interface of a first application, performing a first operation that advances through a first set of data based on a direction and/or magnitude of the first rotational input, while maintaining a consistent view of the user interface of the first application.

1508
In accordance with a determination that the respective user interface is a user interface of a second application, performing a second operation, different from the first operation, that advances through a second set of data, that is different from the first set of data based on a direction and/or magnitude of the first rotational input, while maintaining a consistent view of the user interface of the second application.

*FIG. 15*

USER INTERFACE FOR DISPLAYING AND MANAGING WIDGETS

CROSS-REFERENCE TO RELATED APPLICATIONS

This application claims the benefit of U.S. Provisional Patent Application Ser. No. 63/463,065, entitled "WIDGET USER INTERFACE," filed Apr. 30, 2023, U.S. Patent Application Ser. No. 63/464,521, entitled "USER INTERFACE FOR DISPLAYING AND MANAGING WIDGETS," filed May 5, 2023, and U.S. Patent Application Ser. No. 63/470,442, entitled "USER INTERFACE FOR DISPLAYING AND MANAGING WIDGETS," filed Jun. 1, 2023, each of which is hereby incorporated by reference in its entirety.

FIELD

The present disclosure relates generally to computer user interfaces, and more specifically to techniques for displaying and managing widgets.

BACKGROUND

Widgets are graphical elements or user interface components used to display information or enable user interaction with an application. Widgets improve a user interface by making the user interface more user-friendly and intuitive. By providing a visual representation of various functions and/or features of an application(s), widgets make it easier for a user to navigate the user interface and the available application(s). Widgets also help to save time and increase productivity by providing quick and easy access to commonly used functions, data, and/or applications.

BRIEF SUMMARY

Some techniques for displaying and managing widgets using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying and managing widgets. Such methods and interfaces optionally complement or replace other methods for displaying and managing widgets. Such methods and interfaces reduce the cognitive burden on a user and produce a more efficient human-machine interface. For battery-operated computing devices, such methods and interfaces conserve power and increase the time between battery charges. Additionally, such methods and interfaces allow for quick access to relevant information and, as a result, reduce the number of unnecessary/redundant inputs needed to access the relevant information.

In accordance with some embodiments, a method is described. The method is performed at a computer system that is in communication with a display generation component and one or more input devices. The method comprises: displaying, via the display generation component, a first wake screen user interface; while displaying the first wake screen user interface, detecting, via the one or more input devices, a first input of a first type; in response to detecting the first input, displaying, via the display generation component, a set of widgets; subsequent to displaying the first wake screen user interface, displaying, via the display generation component, a second wake screen user interface that is different from the first wake screen user interface; while displaying the second wake screen user interface, detecting, via the one or more input devices, a second input of the first type; and in response to detecting the second input, displaying, via the display generation component, the set of widgets.

In accordance with some embodiments, a non-transitory computer-readable storage medium is described. The non-transitory computer-readable storage medium stores one or more programs configured to be executed by one or more processors of a computer system that is configured to communicate with a display generation component and one or more input devices, the one or more programs including instructions for: displaying, via the display generation component, a first wake screen user interface; while displaying the first wake screen user interface, detecting, via the one or more input devices, a first input of a first type; in response to detecting the first input, displaying, via the display generation component, a set of widgets; subsequent to displaying the first wake screen user interface, displaying, via the display generation component, a second wake screen user interface that is different from the first wake screen user interface; while displaying the second wake screen user interface, detecting, via the one or more input devices, a second input of the first type; and in response to detecting the second input, displaying, via the display generation component, the set of widgets.

In accordance with some embodiments, a transitory computer-readable storage medium is described. The transitory computer-readable storage medium stores one or more programs configured to be executed by one or more processors of a computer system that is configured to communicate with a display generation component and one or more input devices, the one or more programs including instructions for: displaying, via the display generation component, a first wake screen user interface; while displaying the first wake screen user interface, detecting, via the one or more input devices, a first input of a first type; in response to detecting the first input, displaying, via the display generation component, a set of widgets; subsequent to displaying the first wake screen user interface, displaying, via the display generation component, a second wake screen user interface that is different from the first wake screen user interface; while displaying the second wake screen user interface, detecting, via the one or more input devices, a second input of the first type; and in response to detecting the second input, displaying, via the display generation component, the set of widgets.

In accordance with some embodiments, a computer system that is configured to communicate with a display generation component and one or more input devices is described. The computer system includes one or more processors and memory storing one or more programs configured to be executed by the one or more processors. The one or more programs including instructions for: displaying, via the display generation component, a first wake screen user interface; while displaying the first wake screen user interface, detecting, via the one or more input devices, a first input of a first type; in response to detecting the first input, displaying, via the display generation component, a set of widgets; subsequent to displaying the first wake screen user interface, displaying, via the display generation component, a second wake screen user interface that is different from the first wake screen user interface; while displaying the second wake screen user interface, detecting, via the one or more input devices, a second input of the first type; and in response to detecting the second input, displaying, via the display generation component, the set of widgets.

In some embodiments, a computer system that configured to communicate with a display generation component and one or more input devices is described. The computer system includes: means for displaying, via the display generation component, a first wake screen user interface; means for, while displaying the first wake screen user interface, detecting, via the one or more input devices, a first input of a first type; means for, in response to detecting the first input, displaying, via the display generation component, a set of widgets; means for, subsequent to displaying the first wake screen user interface, displaying, via the display generation component, a second wake screen user interface that is different from the first wake screen user interface; means for, while displaying the second wake screen user interface, detecting, via the one or more input devices, a second input of the first type; and means for, in response to detecting the second input, displaying, via the display generation component, the set of widgets.

In some embodiments, a computer program product, comprising one or more programs configured to be executed by one or more processors of a computer system that is in communication with a display generation component and one or more input devices is described. The one or more programs including instructions for: displaying, via the display generation component, a first wake screen user interface; while displaying the first wake screen user interface, detecting, via the one or more input devices, a first input of a first type; in response to detecting the first input, displaying, via the display generation component, a set of widgets; subsequent to displaying the first wake screen user interface, displaying, via the display generation component, a second wake screen user interface that is different from the first wake screen user interface; while displaying the second wake screen user interface, detecting, via the one or more input devices, a second input of the first type; and in response to detecting the second input, displaying, via the display generation component, the set of widgets.

In accordance with some embodiments, a method is described. The method is performed at a computer system that is in communication with a display generation component and a rotatable input mechanism. The method comprises: displaying, via the display generation component, a time user interface; while displaying the time user interface, detecting, via the rotatable input mechanism, a first rotational input with a respective magnitude; and in response to detecting the first rotational input: in accordance with a determination that the respective magnitude of the first rotational input is a first magnitude, displaying, via the display generation component a set of one or more widgets; and in accordance with a determination that the respective magnitude of the first rotational input is a second magnitude that is different from the first magnitude, displaying, via the display generation component, an application launcher user interface that includes one or more graphical objects for launching one or more applications.

In accordance with some embodiments, a non-transitory computer-readable storage medium is described. The non-transitory computer-readable storage medium stores one or more programs configured to be executed by one or more processors of a computer system that is configured to communicate with a display generation component and a rotatable input mechanism, the one or more programs including instructions for: displaying, via the display generation component, a time user interface while displaying the time user interface, detecting, via the rotatable input mechanism, a first rotational input with a respective magnitude; and in response to detecting the first rotational input: in accordance with a determination that the respective magnitude of the first rotational input is a first magnitude, displaying, via the display generation component a set of one or more widgets; and in accordance with a determination that the respective magnitude of the first rotational input is a second magnitude that is different from the first magnitude, displaying, via the display generation component, an application launcher user interface that includes one or more graphical objects for launching one or more applications.

In accordance with some embodiments, a transitory computer-readable storage medium is described. The transitory computer-readable storage medium stores one or more programs configured to be executed by one or more processors of a computer system that is configured to communicate with a display generation component and a rotatable input mechanism, the one or more programs including instructions for: displaying, via the display generation component, a time user interface while displaying the time user interface, detecting, via the rotatable input mechanism, a first rotational input with a respective magnitude; and in response to detecting the first rotational input: in accordance with a determination that the respective magnitude of the first rotational input is a first magnitude, displaying, via the display generation component a set of one or more widgets; and in accordance with a determination that the respective magnitude of the first rotational input is a second magnitude that is different from the first magnitude, displaying, via the display generation component, an application launcher user interface that includes one or more graphical objects for launching one or more applications.

In accordance with some embodiments, a computer system that is configured to communicate with a display generation component and a rotatable input mechanism is described. The computer system includes one or more processors and memory storing one or more programs configured to be executed by the one or more processors. The one or more programs including instructions for: displaying, via the display generation component, a time user interface; while displaying the time user interface, detecting, via the rotatable input mechanism, a first rotational input with a respective magnitude; and in response to detecting the first rotational input: in accordance with a determination that the respective magnitude of the first rotational input is a first magnitude, displaying, via the display generation component a set of one or more widgets; and in accordance with a determination that the respective magnitude of the first rotational input is a second magnitude that is different from the first magnitude, displaying, via the display generation component, an application launcher user interface that includes one or more graphical objects for launching one or more applications.

In some embodiments, a computer system that configured to communicate with a display generation component and a rotatable input mechanism is described. The computer system includes: means for displaying, via the display generation component, a time user interface; means for, while displaying the time user interface, detecting, via the rotatable input mechanism, a first rotational input with a respective magnitude; and means for, in response to detecting the first rotational input: in accordance with a determination that the respective magnitude of the first rotational input is a first magnitude, displaying, via the display generation component a set of one or more widgets; and in accordance with a determination that the respective magnitude of the first rotational input is a second magnitude that is different from the first magnitude, displaying, via the display generation component, an application launcher user interface that includes one or more graphical objects for launching one or more applications.

In some embodiments, a computer program product, comprising one or more programs configured to be executed by one or more processors of a computer system that is in communication with a display generation component and a rotatable input mechanism is described. The one or more programs including instructions for: displaying, via the display generation component, a time user interface; while displaying the time user interface, detecting, via the rotatable input mechanism, a first rotational input with a respective magnitude; and in response to detecting the first rotational input: in accordance with a determination that the respective magnitude of the first rotational input is a first magnitude, displaying, via the display generation component a set of one or more widgets; and in accordance with a determination that the respective magnitude of the first rotational input is a second magnitude that is different from the first magnitude, displaying, via the display generation component, an application launcher user interface that includes one or more graphical objects for launching one or more applications.

In accordance with some embodiments, a method is described. The method is performed at a computer system that is in communication with a display generation component and a rotatable input mechanism. The method comprises: while displaying, via the display generation component, a time user interface: detecting, via the rotatable input mechanism, a rotational input; and in response to detecting the rotational input: in accordance with a determination that a respective type of input was detected by the computer system within a time threshold of detecting the rotational input, performing a first operation corresponding to the time user interface; and in accordance with a determination that the respective type of input was not detected within the time threshold of detecting the rotational input, performing a second operation, different from the first operation, that includes displaying, via the display generation component, a system user interface.

In accordance with some embodiments, a non-transitory computer-readable storage medium is described. The non-transitory computer-readable storage medium stores one or more programs configured to be executed by one or more processors of a computer system that is configured to communicate with a display generation component and a rotatable input mechanism, the one or more programs including instructions for: while displaying, via the display generation component, a time user interface: detecting, via the rotatable input mechanism, a rotational input; and in response to detecting the rotational input: in accordance with a determination that a respective type of input was detected by the computer system within a time threshold of detecting the rotational input, performing a first operation corresponding to the time user interface; and in accordance with a determination that the respective type of input was not detected within the time threshold of detecting the rotational input, performing a second operation, different from the first operation, that includes displaying, via the display generation component, a system user interface.

In accordance with some embodiments, a transitory computer-readable storage medium is described. The transitory computer-readable storage medium stores one or more programs configured to be executed by one or more processors of a computer system that is configured to communicate with a display generation component and a rotatable input mechanism, the one or more programs including instructions for: while displaying, via the display generation component, a time user interface: detecting, via the rotatable input mechanism, a rotational input; and in response to detecting the rotational input: in accordance with a determination that a respective type of input was detected by the computer system within a time threshold of detecting the rotational input, performing a first operation corresponding to the time user interface; and in accordance with a determination that the respective type of input was not detected within the time threshold of detecting the rotational input, performing a second operation, different from the first operation, that includes displaying, via the display generation component, a system user interface.

In accordance with some embodiments, a computer system that is configured to communicate with a display generation component and a rotatable input mechanism is described. The computer system includes one or more processors and memory storing one or more programs configured to be executed by the one or more processors. The one or more programs including instructions for: while displaying, via the display generation component, a time user interface: detecting, via the rotatable input mechanism, a rotational input; and in response to detecting the rotational input: in accordance with a determination that a respective type of input was detected by the computer system within a time threshold of detecting the rotational input, performing a first operation corresponding to the time user interface; and in accordance with a determination that the respective type of input was not detected within the time threshold of detecting the rotational input, performing a second operation, different from the first operation, that includes displaying, via the display generation component, a system user interface.

In some embodiments, a computer system that configured to communicate with a display generation component and a rotatable input mechanism is described. The computer system includes: means for, while displaying, via the display generation component, a time user interface: detecting, via the rotatable input mechanism, a rotational input; and means for, in response to detecting the rotational input: in accordance with a determination that a respective type of input was detected by the computer system within a time threshold of detecting the rotational input, performing a first operation corresponding to the time user interface; and in accordance with a determination that the respective type of input was not detected within the time threshold of detecting the rotational input, performing a second operation, different from the first operation, that includes displaying, via the display generation component, a system user interface.

In some embodiments, a computer program product, comprising one or more programs configured to be executed by one or more processors of a computer system that is in communication with a display generation component and a rotatable input mechanism is described. The one or more programs including instructions for: while displaying, via the display generation component, a time user interface: detecting, via the rotatable input mechanism, a rotational input; and in response to detecting the rotational input: in accordance with a determination that a respective type of input was detected by the computer system within a time threshold of detecting the rotational input, performing a first operation corresponding to the time user interface; and in accordance with a determination that the respective type of input was not detected within the time threshold of detecting the rotational input, performing a second operation, different from the first operation, that includes displaying, via the display generation component, a system user interface.

In accordance with some embodiments, a method is described. The method is performed at a computer system that is in communication with a display generation component and one or more input devices. The method comprises: displaying, via the display generation component, a respective user interface; while displaying the respective user interface, detecting, via the one or more input devices, a first input of a first type; and in response to detecting the first input while displaying the respective user interface, displaying, via the display generation component, a set of widgets, including one or more contextually selected widgets, wherein displaying the set of widgets includes: in accordance with a determination that a first widget was selected to be included in the set of widgets, displaying the first widget in the set of widgets along with the one or more contextually selected widgets; and in accordance with a determination that a second widget was selected to be included in the set of widgets, displaying the second widget in the set of widgets along with the one or more contextually selected widgets.

In accordance with some embodiments, a non-transitory computer-readable storage medium is described. The non-transitory computer-readable storage medium stores one or more programs configured to be executed by one or more processors of a computer system that is configured to communicate with a display generation component and one or more input devices, the one or more programs including instructions for: displaying, via the display generation component, a respective user interface; while displaying the respective user interface, detecting, via the one or more input devices, a first input of a first type; and in response to detecting the first input while displaying the respective user interface, displaying, via the display generation component, a set of widgets, including one or more contextually selected widgets, wherein displaying the set of widgets includes: in accordance with a determination that a first widget was selected to be included in the set of widgets, displaying the first widget in the set of widgets along with the one or more contextually selected widgets; and in accordance with a determination that a second widget was selected to be included in the set of widgets, displaying the second widget in the set of widgets along with the one or more contextually selected widgets.

In accordance with some embodiments, a transitory computer-readable storage medium is described. The transitory computer-readable storage medium stores one or more programs configured to be executed by one or more processors of a computer system that is configured to communicate with a display generation component and one or more input devices, the one or more programs including instructions for: displaying, via the display generation component, a respective user interface; while displaying the respective user interface, detecting, via the one or more input devices, a first input of a first type; and in response to detecting the first input while displaying the respective user interface, displaying, via the display generation component, a set of widgets, including one or more contextually selected widgets, wherein displaying the set of widgets includes: in accordance with a determination that a first widget was selected to be included in the set of widgets, displaying the first widget in the set of widgets along with the one or more contextually selected widgets; and in accordance with a determination that a second widget was selected to be included in the set of widgets, displaying the second widget in the set of widgets along with the one or more contextually selected widgets.

In accordance with some embodiments, a computer system that is configured to communicate with a display generation component and one or more input devices is described. The computer system includes one or more processors and memory storing one or more programs configured to be executed by the one or more processors. The one or more programs including instructions for: displaying, via the display generation component, a respective user interface; while displaying the respective user interface, detecting, via the one or more input devices, a first input of a first type; and in response to detecting the first input while displaying the respective user interface, displaying, via the display generation component, a set of widgets, including one or more contextually selected widgets, wherein displaying the set of widgets includes: in accordance with a determination that a first widget was selected to be included in the set of widgets, displaying the first widget in the set of widgets along with the one or more contextually selected widgets; and in accordance with a determination that a second widget was selected to be included in the set of widgets, displaying the second widget in the set of widgets along with the one or more contextually selected widgets.

In some embodiments, a computer system that configured to communicate with a display generation component and one or more input devices is described. The computer system includes: means for displaying, via the display generation component, a respective user interface; means for, while displaying the respective user interface, detecting, via the one or more input devices, a first input of a first type; and means for, in response to detecting the first input while displaying the respective user interface, displaying, via the display generation component, a set of widgets, including one or more contextually selected widgets, wherein displaying the set of widgets includes: means for, in accordance with a determination that a first widget was selected to be included in the set of widgets, displaying the first widget in the set of widgets along with the one or more contextually selected widgets; and means for, in accordance with a determination that a second widget was selected to be included in the set of widgets, displaying the second widget in the set of widgets along with the one or more contextually selected widgets.

In some embodiments, a computer program product, comprising one or more programs configured to be executed by one or more processors of a computer system that is in communication with a display generation component and one or more input devices is described. The one or more programs including instructions for: displaying, via the display generation component, a respective user interface; while displaying the respective user interface, detecting, via the one or more input devices, a first input of a first type; and in response to detecting the first input while displaying the respective user interface, displaying, via the display generation component, a set of widgets, including one or more contextually selected widgets, wherein displaying the set of widgets includes: in accordance with a determination that a first widget was selected to be included in the set of widgets, displaying the first widget in the set of widgets along with the one or more contextually selected widgets; and in accordance with a determination that a second widget was selected to be included in the set of widgets, displaying the second widget in the set of widgets along with the one or more contextually selected widgets.

In accordance with some embodiments, a method is described. The method comprises: at a computer system that is in communication with a display generation component and a rotatable input mechanism: displaying, via the display generation component, a first page of a plurality of pages; while displaying the first page of the plurality of pages, detecting, via the rotatable input mechanism, a first rotational input; in response to detecting the first rotational input, replacing display, via the display generation component, of the first page of the plurality of pages with a second page of the plurality of pages without scrolling the first page of the plurality of pages, wherein the second page is displayed at a first scroll position; while displaying the second page at the first scroll position, detecting, via the rotatable input mechanism, a second rotational input; and in response to detecting the second rotational input, scrolling, via the display generation component, the second page of the plurality of pages from the first scroll position to a second scroll position that is different from the first scroll position.

In accordance with some embodiments, a non-transitory computer-readable storage medium is described. The non-transitory computer-readable storage medium stores one or more programs configured to be executed by one or more processors of a computer system that is in communication with a display generation component and a rotatable input mechanism, the one or more programs including instructions for: displaying, via the display generation component, a first page of a plurality of pages; while displaying the first page of the plurality of pages, detecting, via the rotatable input mechanism, a first rotational input; in response to detecting the first rotational input, replacing display, via the display generation component, of the first page of the plurality of pages with a second page of the plurality of pages without scrolling the first page of the plurality of pages, wherein the second page is displayed at a first scroll position; while displaying the second page at the first scroll position, detecting, via the rotatable input mechanism, a second rotational input; and in response to detecting the second rotational input, scrolling, via the display generation component, the second page of the plurality of pages from the first scroll position to a second scroll position that is different from the first scroll position.

In accordance with some embodiments, a transitory computer-readable storage medium is described. The transitory computer-readable storage medium stores one or more programs configured to be executed by one or more processors of a computer system that is in communication with a display generation component and a rotatable input mechanism, the one or more programs including instructions for: displaying, via the display generation component, a first page of a plurality of pages; while displaying the first page of the plurality of pages, detecting, via the rotatable input mechanism, a first rotational input; in response to detecting the first rotational input, replacing display, via the display generation component, of the first page of the plurality of pages with a second page of the plurality of pages without scrolling the first page of the plurality of pages, wherein the second page is displayed at a first scroll position; while displaying the second page at the first scroll position, detecting, via the rotatable input mechanism, a second rotational input; and in response to detecting the second rotational input, scrolling, via the display generation component, the second page of the plurality of pages from the first scroll position to a second scroll position that is different from the first scroll position.

In accordance with some embodiments, a computer system is described. The computer system is configured to communicate with a display generation component and a rotatable input mechanism. The computer system comprises: one or more processors; and memory storing one or more programs configured to be executed by the one or more processors, the one or more programs including instructions for: displaying, via the display generation component, a first page of a plurality of pages; while displaying the first page of the plurality of pages, detecting, via the rotatable input mechanism, a first rotational input; in response to detecting the first rotational input, replacing display, via the display generation component, of the first page of the plurality of pages with a second page of the plurality of pages without scrolling the first page of the plurality of pages, wherein the second page is displayed at a first scroll position; while displaying the second page at the first scroll position, detecting, via the rotatable input mechanism, a second rotational input; and in response to detecting the second rotational input, scrolling, via the display generation component, the second page of the plurality of pages from the first scroll position to a second scroll position that is different from the first scroll position.

In accordance with some embodiments, a computer system is described. The computer system is configured to communicate with a display generation component and a rotatable input mechanism. The computer system comprises: means for displaying, via the display generation component, a first page of a plurality of pages; means, while displaying the first page of the plurality of pages, for detecting, via the rotatable input mechanism, a first rotational input; means, responsive to detecting the first rotational input, for replacing display, via the display generation component, of the first page of the plurality of pages with a second page of the plurality of pages without scrolling the first page of the plurality of pages, wherein the second page is displayed at a first scroll position; means, while displaying the second page at the first scroll position, for detecting, via the rotatable input mechanism, a second rotational input; and means, responsive to detecting the second rotational input, for scrolling, via the display generation component, the second page of the plurality of pages from the first scroll position to a second scroll position that is different from the first scroll position.

In accordance with some embodiments, a computer program product is described. The computer program product comprises one or more programs configured to be executed by one or more processors of a computer system that is in communication with a display generation component and a rotatable input mechanism, the one or more programs including instructions for: displaying, via the display generation component, a first page of a plurality of pages; while displaying the first page of the plurality of pages, detecting, via the rotatable input mechanism, a first rotational input; in response to detecting the first rotational input, replacing display, via the display generation component, of the first page of the plurality of pages with a second page of the plurality of pages without scrolling the first page of the plurality of pages, wherein the second page is displayed at a first scroll position; while displaying the second page at the first scroll position, detecting, via the rotatable input mechanism, a second rotational input; and in response to detecting the second rotational input, scrolling, via the display generation component, the second page of the plurality of pages from the first scroll position to a second scroll position that is different from the first scroll position.

In accordance with some embodiments, a method is described. The method comprises: at a computer system that is in communication with a display generation component:

displaying, via the display generation component, a first view of an application that includes a plurality of user interface objects, including a first user interface object displayed at a first location and with a first size and a second user interface object displayed at a second location and with a second size, wherein: the first user interface object includes first information that updates over time based on changing data associated with the application; the second user interface object includes second information that updates over time based on changing data associated with the application; and the second information is different from the first information; while displaying the first view with the first user interface object displayed at the first location and with the first size and the second user interface object displayed at the second location and with the second size, receiving a request to transition from the first view to a second view that is different from the first view; and in response to receiving the request to transition from the first view to the second view, displaying, via the display generation component, the second view, including: shifting the first user interface object relative to one or more user interface objects of the plurality of user interface objects including the second user interface object; and resizing the first user interface object relative to one or more user interface objects of the plurality of user interface objects including the second user interface object, wherein after shifting and resizing the first user interface object, the first user interface object includes the first information, and the second user interface object includes the second information.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a first view of an application that includes a plurality of user interface objects, including a first user interface object displayed at a first location and with a first size and a second user interface object displayed at a second location and with a second size, wherein: the first user interface object includes first information that updates over time based on changing data associated with the application; the second user interface object includes second information that updates over time based on changing data associated with the application; and the second information is different from the first information; while displaying the first view with the first user interface object displayed at the first location and with the first size and the second user interface object displayed at the second location and with the second size, receiving a request to transition from the first view to a second view that is different from the first view; and in response to receiving the request to transition from the first view to the second view, displaying, via the display generation component, the second view, including: shifting the first user interface object relative to one or more user interface objects of the plurality of user interface objects including the second user interface object; and resizing the first user interface object relative to one or more user interface objects of the plurality of user interface objects including the second user interface object, wherein after shifting and resizing the first user interface object, the first user interface object includes the first information, and the second user interface object includes the second information.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a first view of an application that includes a plurality of user interface objects, including a first user interface object displayed at a first location and with a first size and a second user interface object displayed at a second location and with a second size, wherein: the first user interface object includes first information that updates over time based on changing data associated with the application; the second user interface object includes second information that updates over time based on changing data associated with the application; and the second information is different from the first information; while displaying the first view with the first user interface object displayed at the first location and with the first size and the second user interface object displayed at the second location and with the second size, receiving a request to transition from the first view to a second view that is different from the first view; and in response to receiving the request to transition from the first view to the second view, displaying, via the display generation component, the second view, including: shifting the first user interface object relative to one or more user interface objects of the plurality of user interface objects including the second user interface object; and resizing the first user interface object relative to one or more user interface objects of the plurality of user interface objects including the second user interface object, wherein after shifting and resizing the first user interface object, the first user interface object includes the first information, and the second user interface object includes the second information.

In accordance with some embodiments, a computer system is described. The computer system is configured to communicate with a display generation component. The computer system comprises: one or more processors; and memory storing one or more programs configured to be executed by the one or more processors, the one or more programs including instructions for: displaying, via the display generation component, a first view of an application that includes a plurality of user interface objects, including a first user interface object displayed at a first location and with a first size and a second user interface object displayed at a second location and with a second size, wherein: the first user interface object includes first information that updates over time based on changing data associated with the application; the second user interface object includes second information that updates over time based on changing data associated with the application; and the second information is different from the first information; while displaying the first view with the first user interface object displayed at the first location and with the first size and the second user interface object displayed at the second location and with the second size, receiving a request to transition from the first view to a second view that is different from the first view; and in response to receiving the request to transition from the first view to the second view, displaying, via the display generation component, the second view, including: shifting the first user interface object relative to one or more user interface objects of the plurality of user interface objects including the second user interface object; and resizing the first user interface object relative to one or more user interface objects of the plurality of user interface objects including the second user interface object, wherein after shifting and resizing the first user interface object, the first user interface object includes the first information, and the second user interface object includes the second information.

In accordance with some embodiments, a computer system is described. The computer system is configured to communicate with a display generation component. The computer system comprises: means for displaying, via the display generation component, a first view of an application that includes a plurality of user interface objects, including a first user interface object displayed at a first location and with a first size and a second user interface object displayed at a second location and with a second size, wherein: the first user interface object includes first information that updates over time based on changing data associated with the application; the second user interface object includes second information that updates over time based on changing data associated with the application; and the second information is different from the first information; means, while displaying the first view with the first user interface object displayed at the first location and with the first size and the second user interface object displayed at the second location and with the second size, for receiving a request to transition from the first view to a second view that is different from the first view; and means, responsive to receiving the request to transition from the first view to the second view, for displaying, via the display generation component, the second view, including: shifting the first user interface object relative to one or more user interface objects of the plurality of user interface objects including the second user interface object; and resizing the first user interface object relative to one or more user interface objects of the plurality of user interface objects including the second user interface object, wherein after shifting and resizing the first user interface object, the first user interface object includes the first information, and the second user interface object includes the second information.

In accordance with some embodiments, a computer program product is described. The computer program product comprises one or more programs configured to be executed by one or more processors of a computer system that is in communication with a display generation component, the one or more programs including instructions for: displaying, via the display generation component, a first view of an application that includes a plurality of user interface objects, including a first user interface object displayed at a first location and with a first size and a second user interface object displayed at a second location and with a second size, wherein: the first user interface object includes first information that updates over time based on changing data associated with the application; the second user interface object includes second information that updates over time based on changing data associated with the application; and the second information is different from the first information; while displaying the first view with the first user interface object displayed at the first location and with the first size and the second user interface object displayed at the second location and with the second size, receiving a request to transition from the first view to a second view that is different from the first view; and in response to receiving the request to transition from the first view to the second view, displaying, via the display generation component, the second view, including: shifting the first user interface object relative to one or more user interface objects of the plurality of user interface objects including the second user interface object; and resizing the first user interface object relative to one or more user interface objects of the plurality of user interface objects including the second user interface object, wherein after shifting and resizing the first user interface object, the first user interface object includes the first information, and the second user interface object includes the second information.

In accordance with some embodiments, a method is described. The method comprises: at a computer system that is in communication with a display generation component and a rotatable input mechanism: while displaying, via the display generation component, a respective user interface, detecting, via the rotatable input mechanism, a first rotational input; and in response to detecting the first rotational input: in accordance with a determination that the respective user interface is a user interface of a first application, performing a first operation that advances through a first set of data based on a direction and/or magnitude of the first rotational input, while maintaining a consistent view of the user interface of the first application; and in accordance with a determination that the respective user interface is a user interface of a second application, performing a second operation, different from the first operation, that advances through a second set of data, that is different from the first set of data based on a direction and/or magnitude of the first rotational input, while maintaining a consistent view of the user interface of the second application.

In accordance with some embodiments, a non-transitory computer-readable storage medium is described. The non-transitory computer-readable storage medium stores one or more programs configured to be executed by one or more processors of a computer system that is in communication with a display generation component and a rotatable input mechanism, the one or more programs including instructions for: while displaying, via the display generation component, a respective user interface, detecting, via the rotatable input mechanism, a first rotational input; and in response to detecting the first rotational input: in accordance with a determination that the respective user interface is a user interface of a first application, performing a first operation that advances through a first set of data based on a direction and/or magnitude of the first rotational input, while maintaining a consistent view of the user interface of the first application; and in accordance with a determination that the respective user interface is a user interface of a second application, performing a second operation, different from the first operation, that advances through a second set of data, that is different from the first set of data based on a direction and/or magnitude of the first rotational input, while maintaining a consistent view of the user interface of the second application.

In accordance with some embodiments, a transitory computer-readable storage medium is described. The transitory computer-readable storage medium stores one or more programs configured to be executed by one or more processors of a computer system that is in communication with a display generation component and a rotatable input mechanism, the one or more programs including instructions for: while displaying, via the display generation component, a respective user interface, detecting, via the rotatable input mechanism, a first rotational input; and in response to detecting the first rotational input: in accordance with a determination that the respective user interface is a user interface of a first application, performing a first operation that advances through a first set of data based on a direction and/or magnitude of the first rotational input, while maintaining a consistent view of the user interface of the first application; and in accordance with a determination that the respective user interface is a user interface of a second application, performing a second operation, different from the first operation, that advances through a second set of data, that is different from the first set of data based on a direction and/or magnitude of the first rotational input, while maintaining a consistent view of the user interface of the second application.

In accordance with some embodiments, a computer system is described. The computer system is configured to communicate with a display generation component and a rotatable input mechanism. The computer system comprises: one or more processors; and memory storing one or more programs configured to be executed by the one or more processors, the one or more programs including instructions for: while displaying, via the display generation component, a respective user interface, detecting, via the rotatable input mechanism, a first rotational input; and in response to detecting the first rotational input: in accordance with a determination that the respective user interface is a user interface of a first application, performing a first operation that advances through a first set of data based on a direction and/or magnitude of the first rotational input, while maintaining a consistent view of the user interface of the first application; and in accordance with a determination that the respective user interface is a user interface of a second application, performing a second operation, different from the first operation, that advances through a second set of data, that is different from the first set of data based on a direction and/or magnitude of the first rotational input, while maintaining a consistent view of the user interface of the second application.

In accordance with some embodiments, a computer system is described. The computer system is configured to communicate with a display generation component and a rotatable input mechanism. The computer system comprises: means, while displaying, via the display generation component, a respective user interface, for detecting, via the rotatable input mechanism, a first rotational input; and means, responsive to detecting the first rotational input, for: in accordance with a determination that the respective user interface is a user interface of a first application, performing a first operation that advances through a first set of data based on a direction and/or magnitude of the first rotational input, while maintaining a consistent view of the user interface of the first application; and in accordance with a determination that the respective user interface is a user interface of a second application, performing a second operation, different from the first operation, that advances through a second set of data, that is different from the first set of data based on a direction and/or magnitude of the first rotational input, while maintaining a consistent view of the user interface of the second application.

In accordance with some embodiments, a computer program product is described. The computer program product comprises one or more programs configured to be executed by one or more processors of a computer system that is in communication with a display generation component and a rotatable input mechanism, the one or more programs including instructions for: while displaying, via the display generation component, a respective user interface, detecting, via the rotatable input mechanism, a first rotational input; and in response to detecting the first rotational input: in accordance with a determination that the respective user interface is a user interface of a first application, performing a first operation that advances through a first set of data based on a direction and/or magnitude of the first rotational input, while maintaining a consistent view of the user interface of the first application; and in accordance with a determination that the respective user interface is a user interface of a second application, performing a second operation, different from the first operation, that advances through a second set of data, that is different from the first set of data based on a direction and/or magnitude of the first rotational input, while maintaining a consistent view of the user interface of the second application.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying and managing widgets, thereby increasing the effectiveness, efficiency, and user satisfaction with such devices. Such methods and interfaces may complement or replace other methods for displaying and managing widgets.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 9 is a flow diagram of a method for interacting with various time interfaces.

FIG. 12 is a flow diagram of a method for navigating among different pages, in accordance with some embodiments.

FIG. 13 is a flow diagram of a method for navigating among different views, in accordance with some embodiments.

FIG. 15 is a flow diagram for a method of navigating through data, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying and managing widgets. In particular, there is a need for the computer system to provide access to relevant widgets directly from a watch face; to display relevant widgets based on predetermined criteria, and to allow for the modification of the widget(s). Such techniques can reduce the cognitive burden on a user who displaying and managing widgets, thereby enhancing productivity. Further, such techniques can reduce processor and battery power otherwise wasted on redundant user inputs.

Figure 6A:
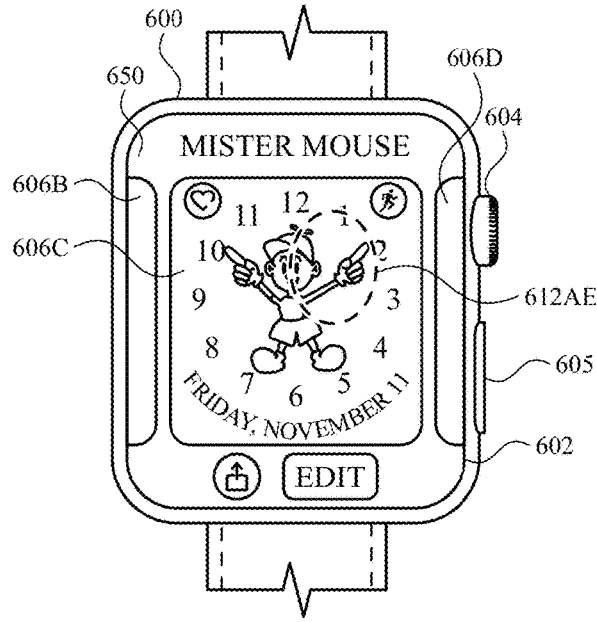
Figure 6A:
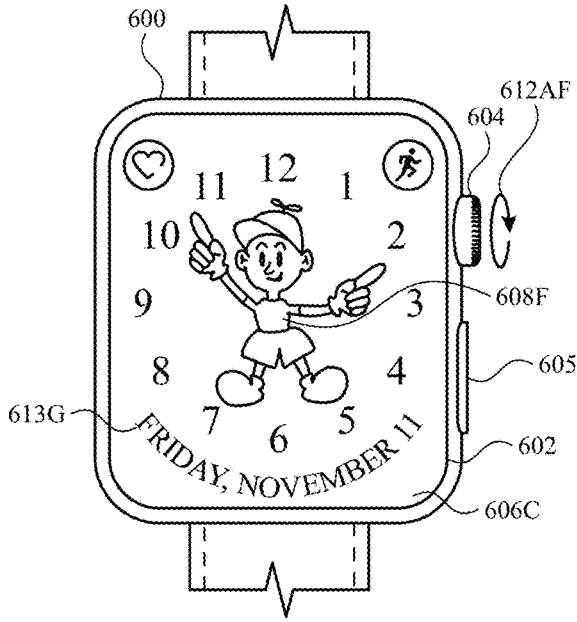
Figure 6A:
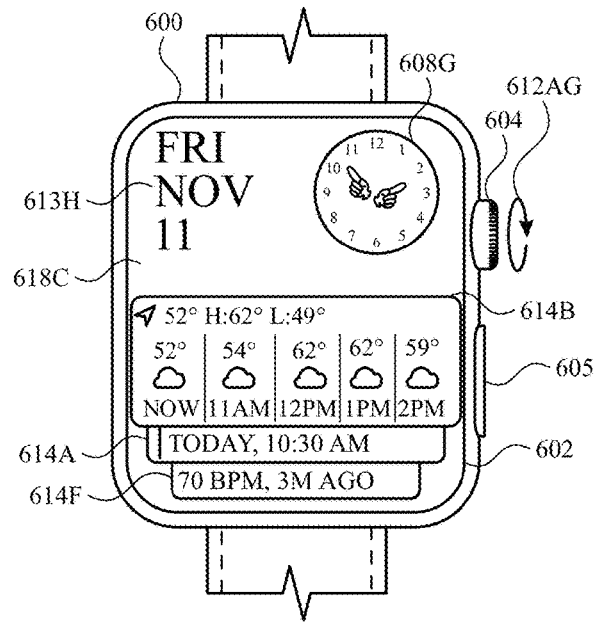
Figure 6A:
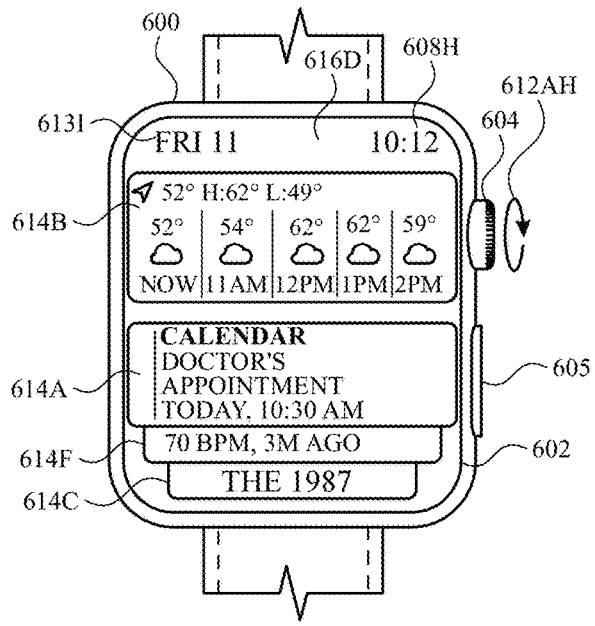
Figure 6A:
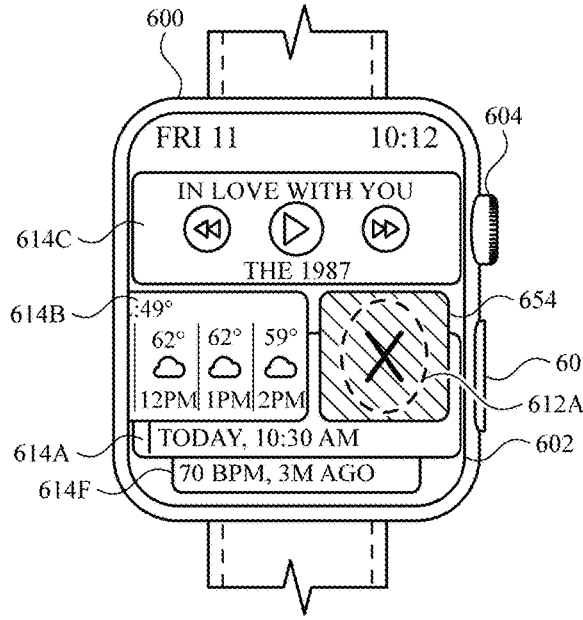
Figure 6A:
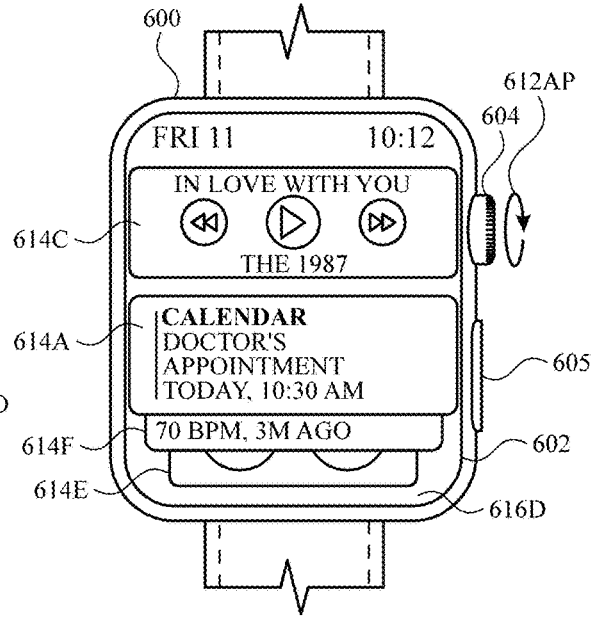
Figure 6A:
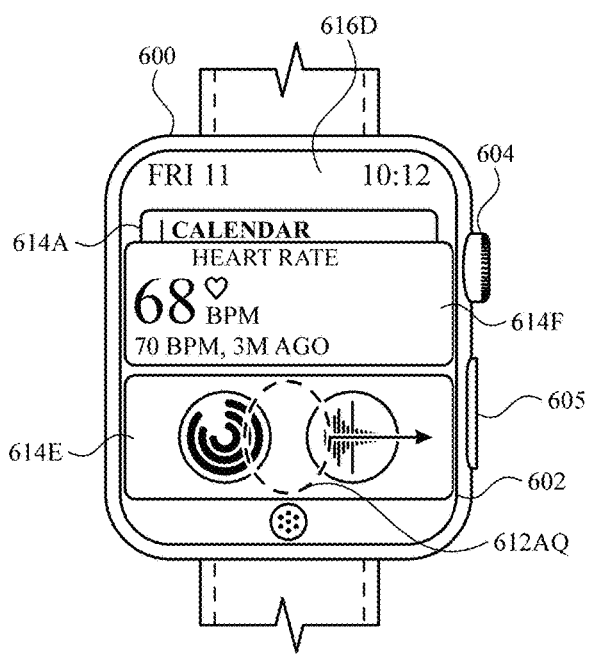
Figure 6A:
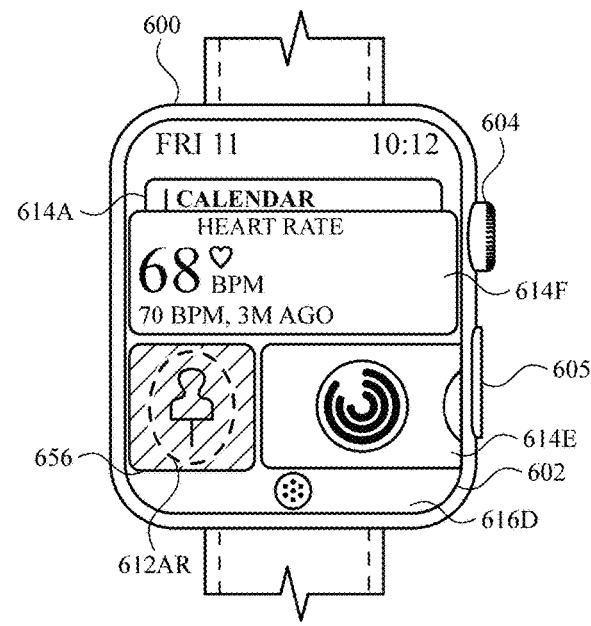
Figure 6A:
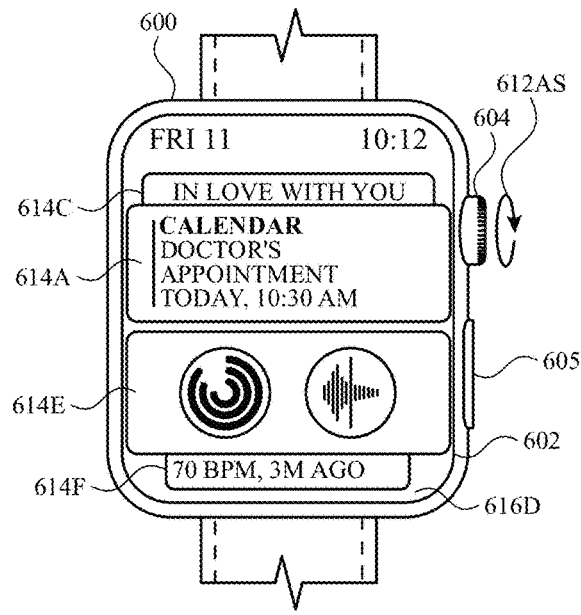
Figure 6A:
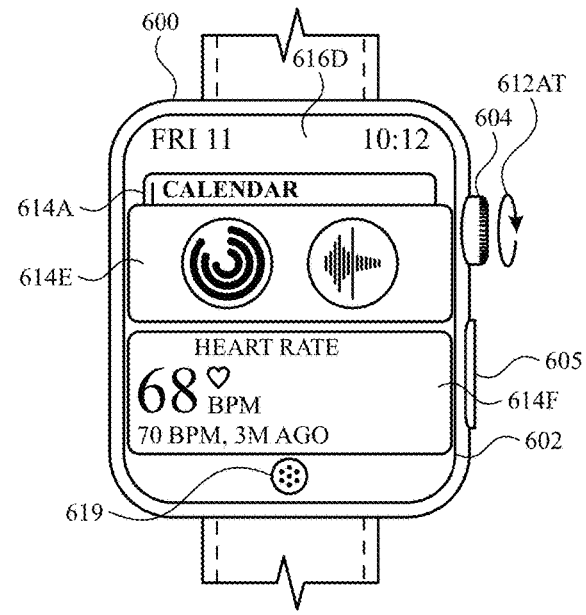
Figure 6A:
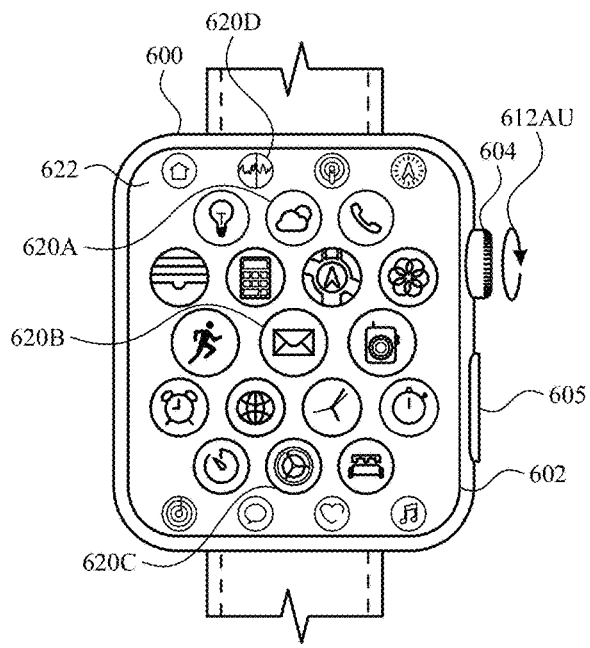
Figure 6A:
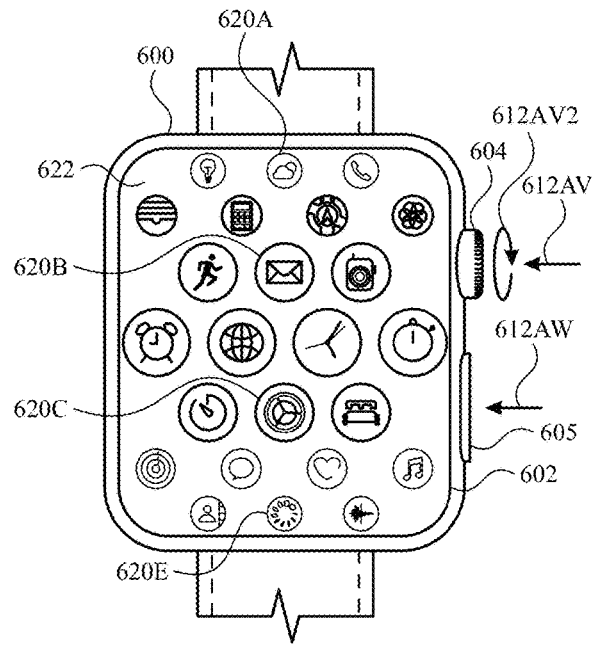
Figure 6A:
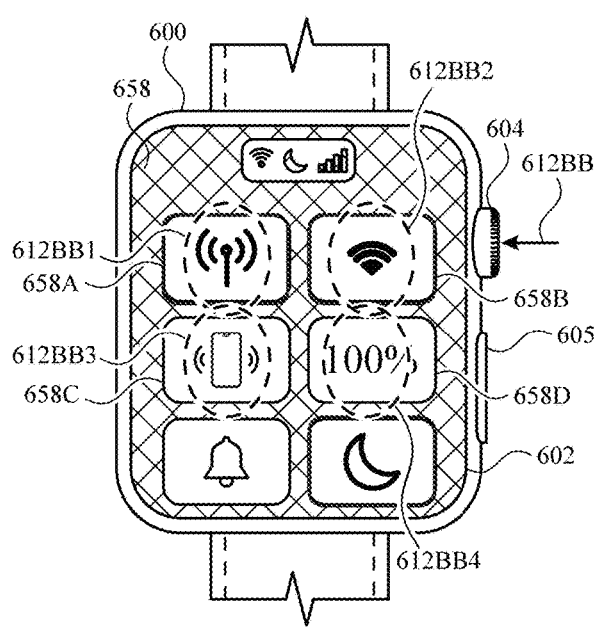
Figure 6A:
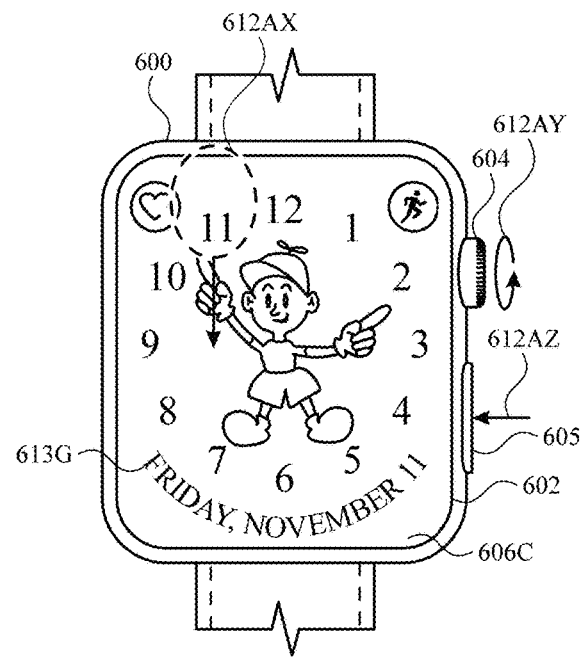
Figure 6A:
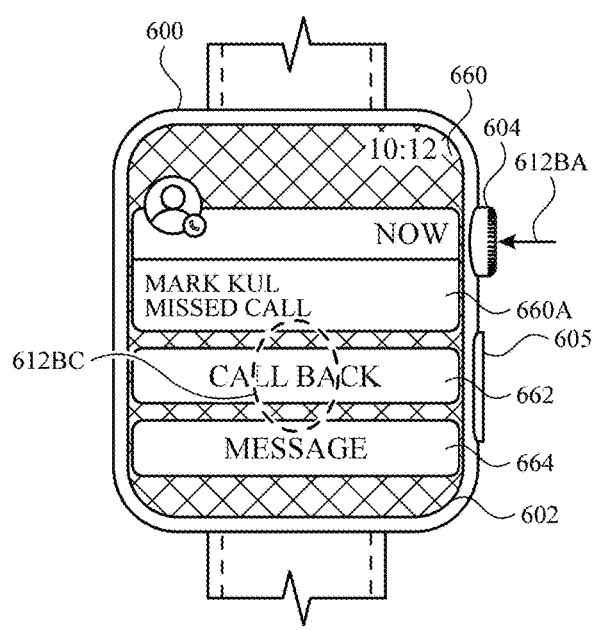
Figure 6A:
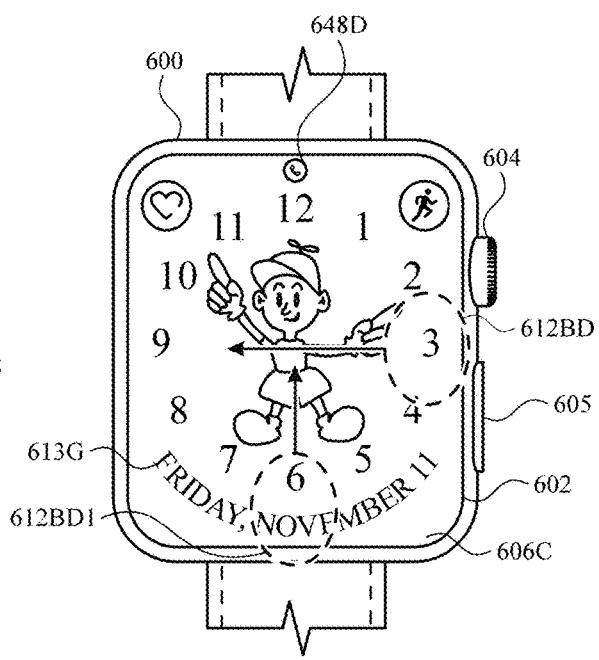
Figure 6A:
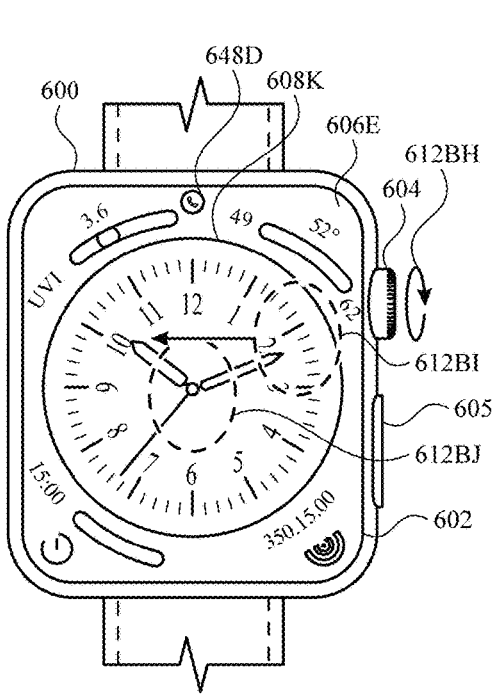
Figure 6B:
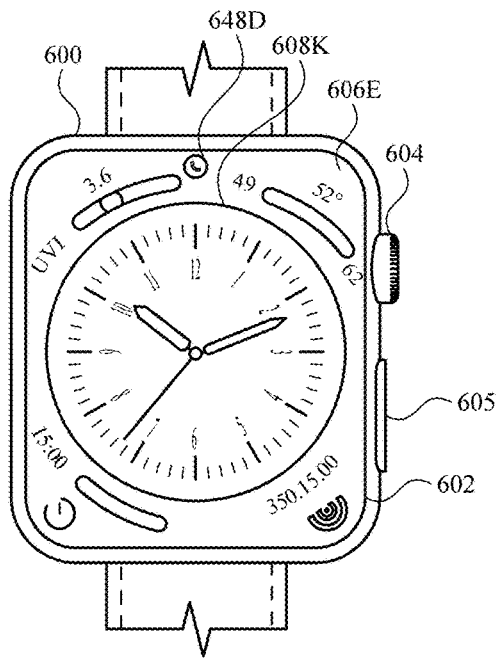
Figure 6B:
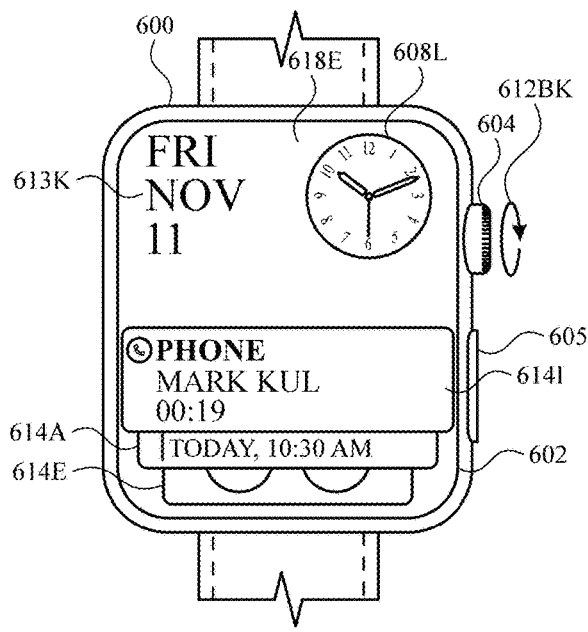
Figure 6B:
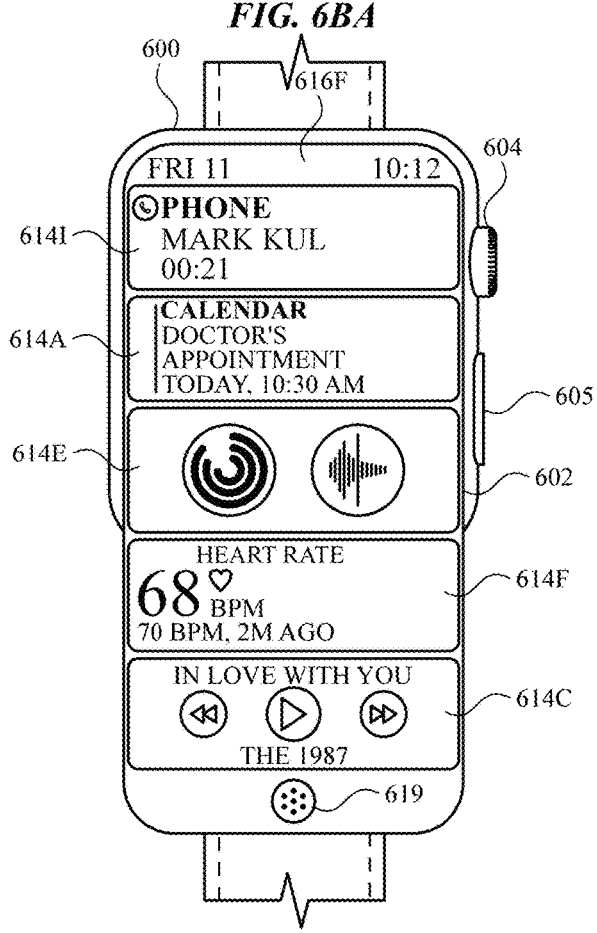
Figure 6B:
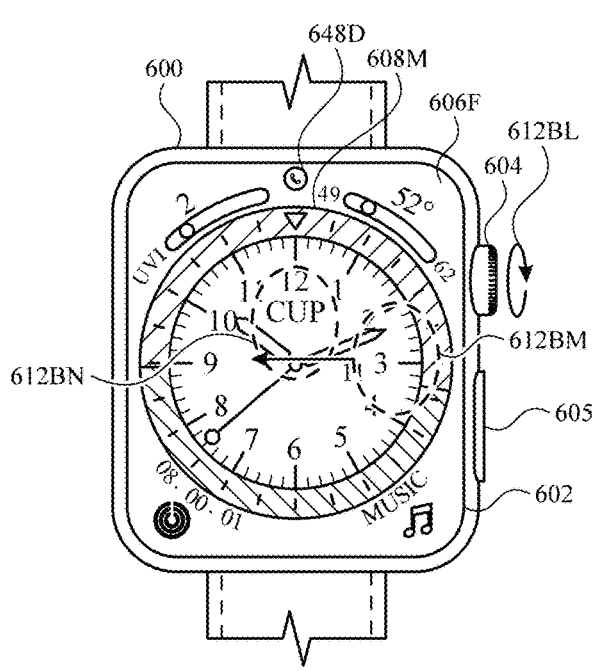
Figure 6B:
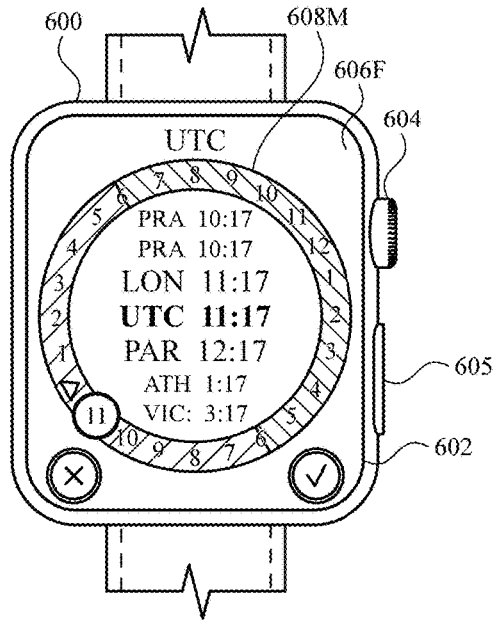
Figure 6B:
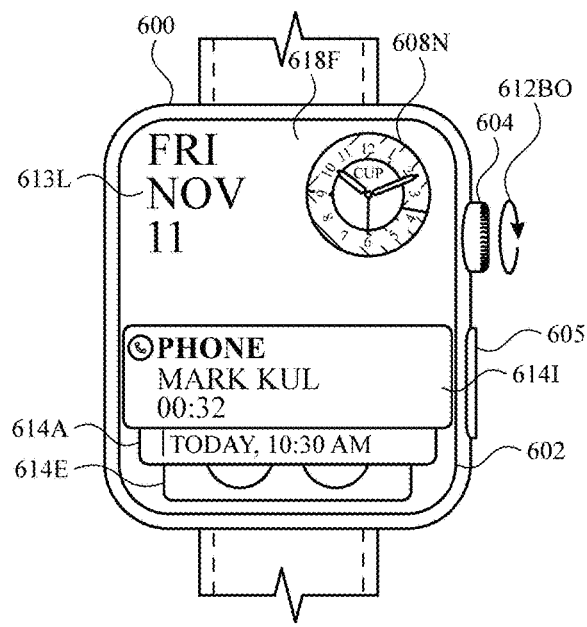
Figure 6B:
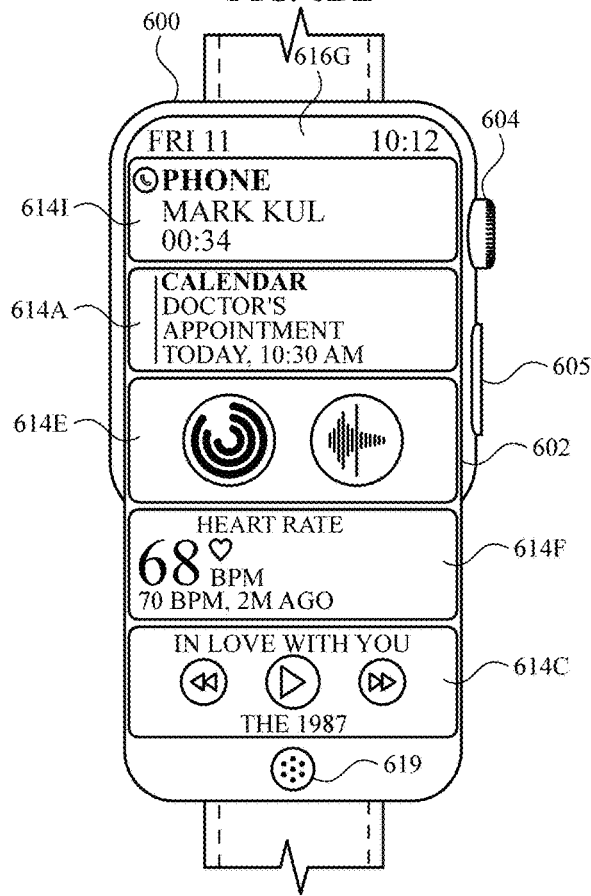
Figure 6B:
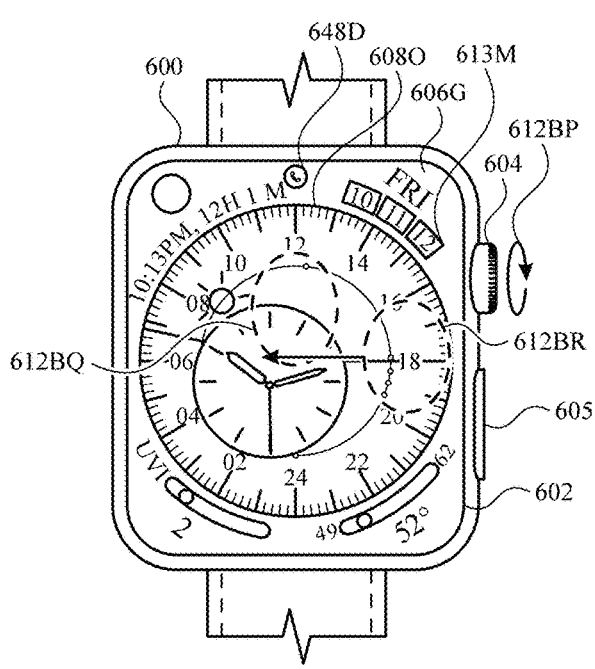
Figure 6B:
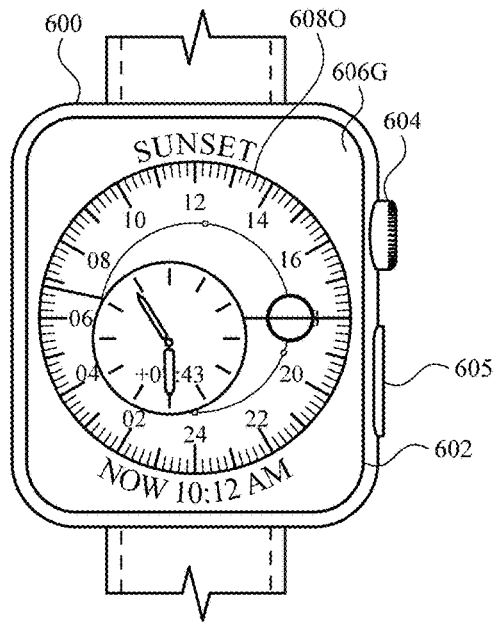
Figure 6B:
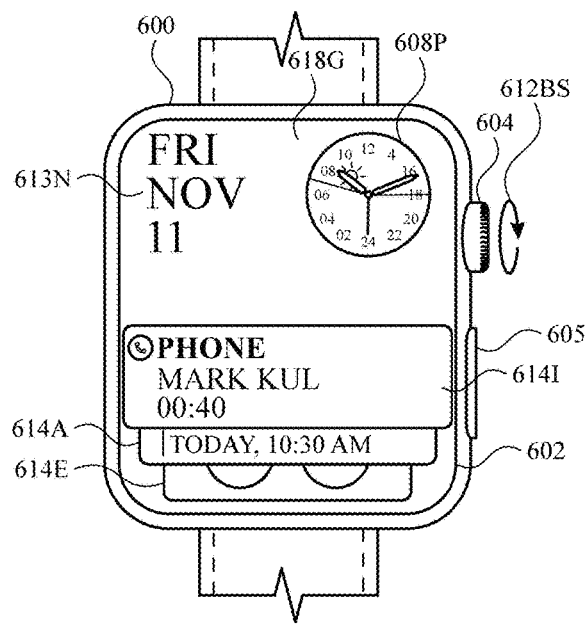
Figure 6B:
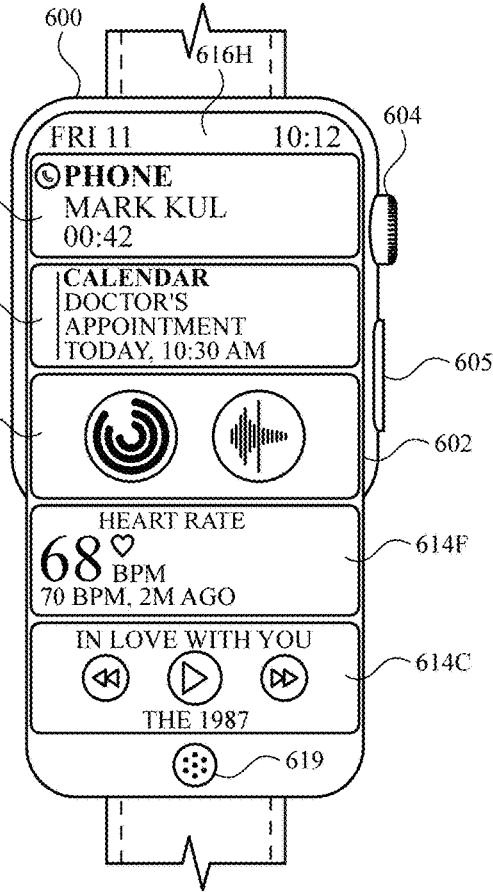
Figure 7:
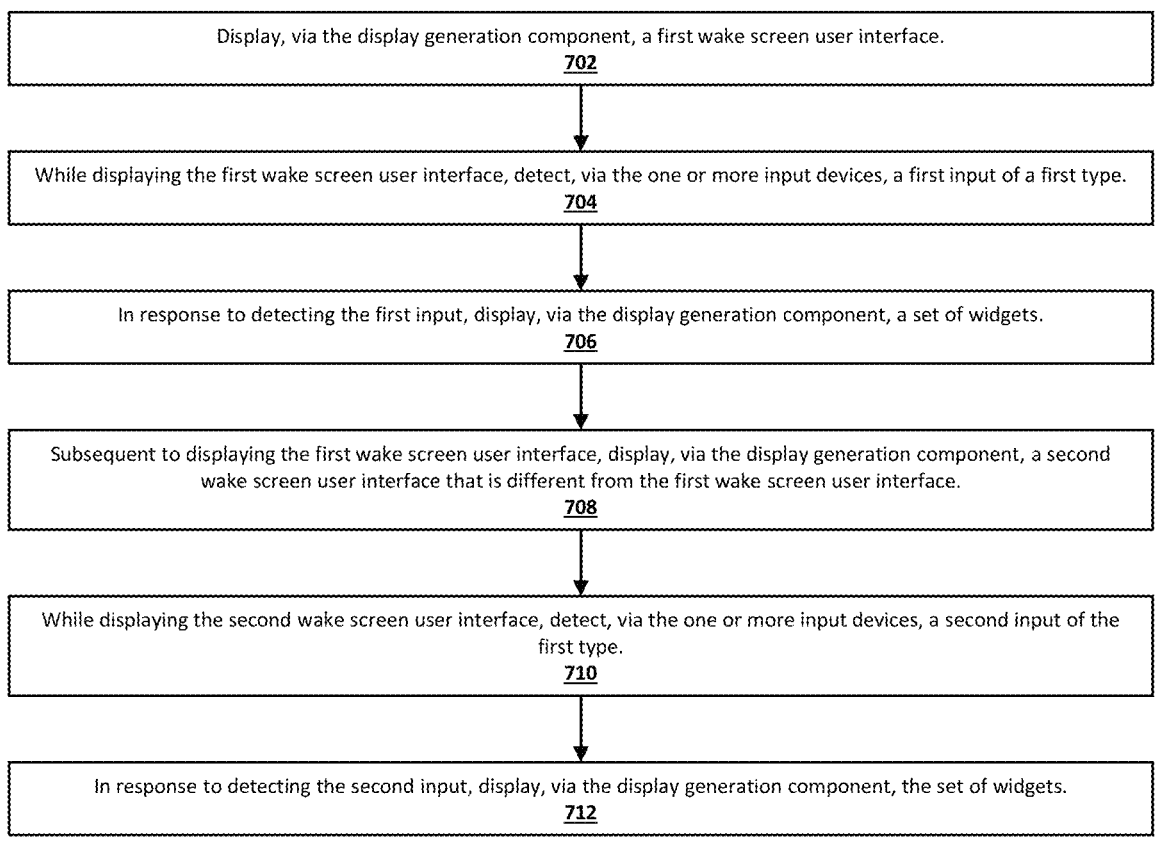
FIG. 7 is a flow diagram of a method for displaying the same set of widgets from different interfaces.
Figure 8:
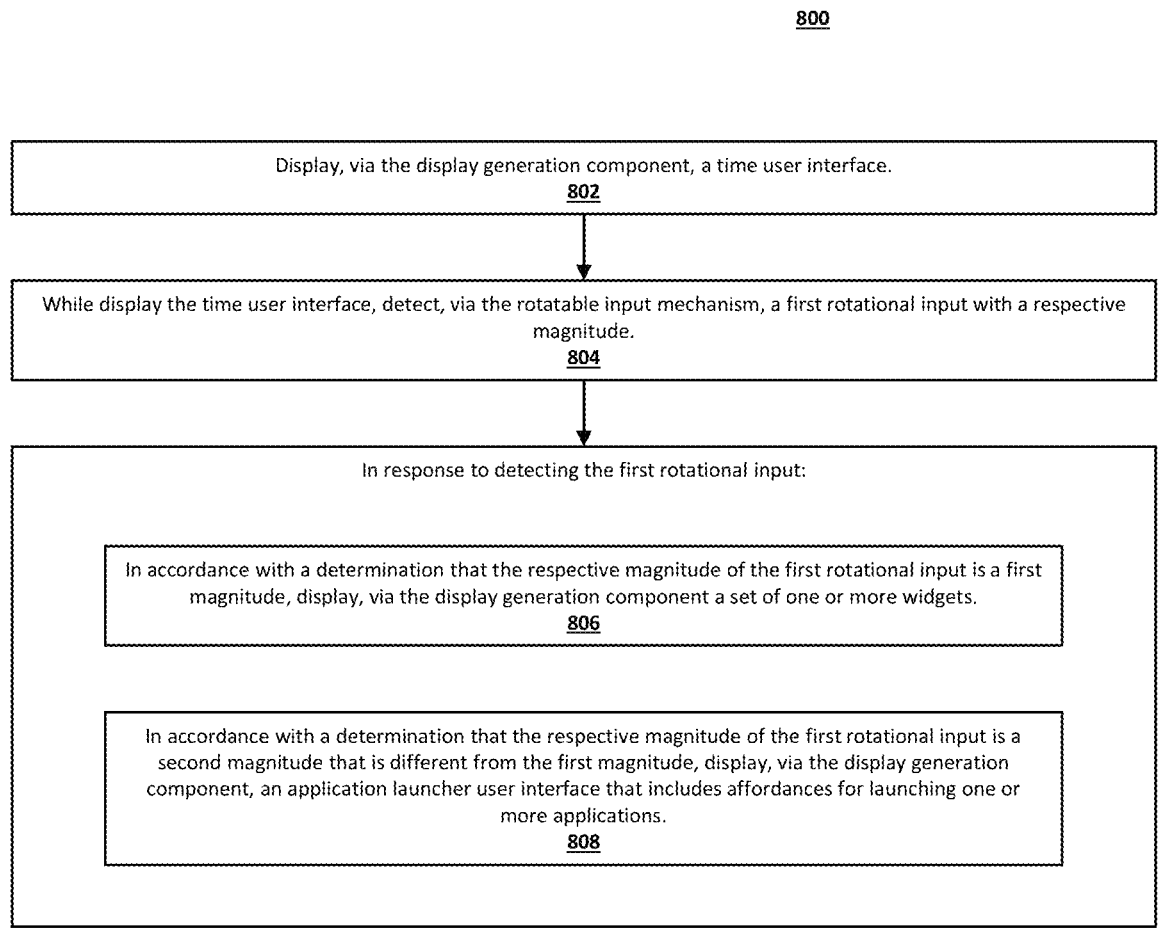
FIG. 8 is a flow diagram of a method for displaying an application launch interface and/or a set of widgets.
Figure 10:
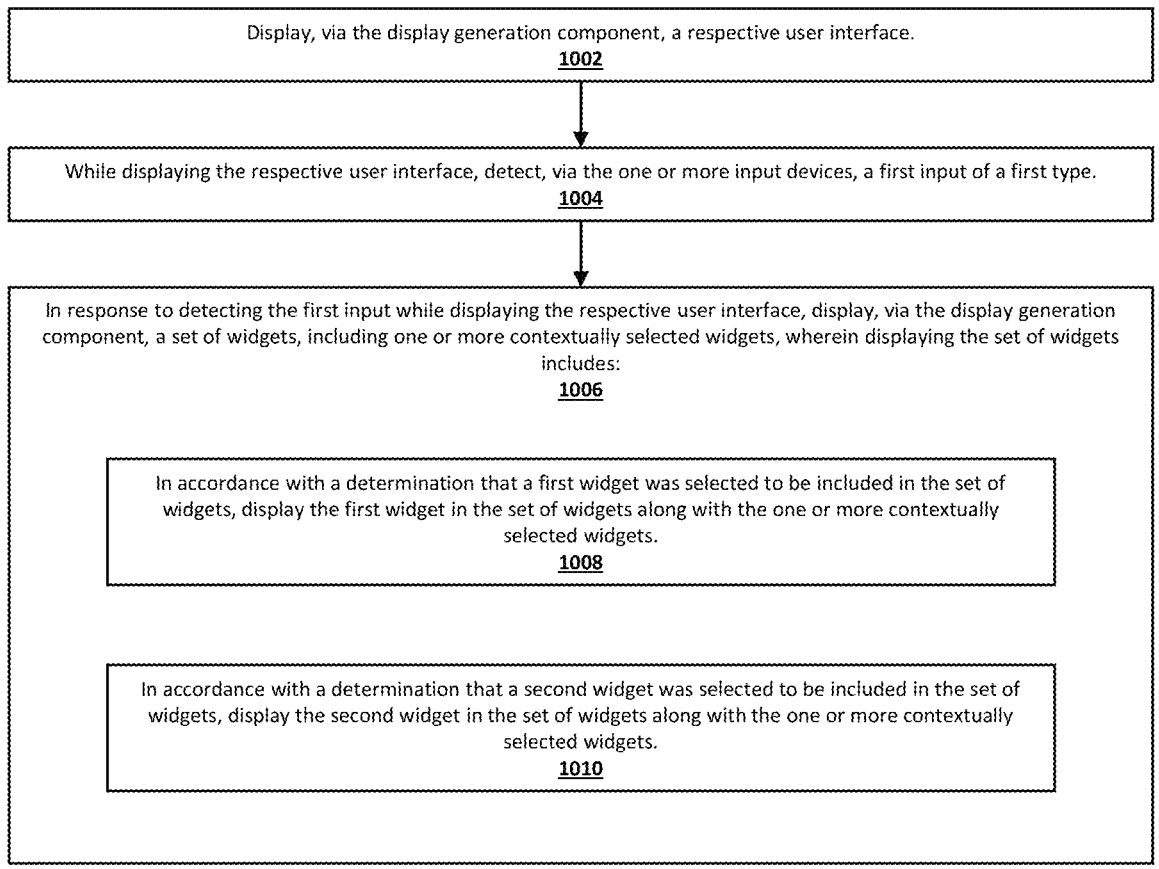
FIG. 10 is a flow diagram of a method for determining which widgets to display.

Below, FIGS. 1A-1B, 2, 3, 4A-4B, and 5A-5B provide a description of exemplary devices for performing the techniques for managing event notifications. FIGS. 6A-6BO illustrate exemplary user interfaces for managing event notifications. FIG. 7 is a flow diagram illustrating methods of displaying widgets from different wake screens. FIG. 8 is a flow diagram illustrating methods of displaying widgets and/or application launch icons. FIG. 9 is a flow diagram illustrating methods of displaying widgets and/or performing an operation on a time interface. FIG. 10 is a flow diagram illustrating methods of determining which widgets to display. The user interfaces in FIGS. 6A-6BO are used to illustrate the processes described below, including the processes in FIGS. 7-10. FIGS. 11A-11V illustrate exemplary user interfaces for navigating user interfaces. FIG. 12 is a flow diagram of a method for navigating among different pages, in accordance with some embodiments. FIG. 13 is a flow diagram of a method for navigating among different views, in accordance with some embodiments. The user interfaces in FIGS. 11A-11V are used to illustrate the processes described below, including the processes in FIGS. 12-13. FIGS. 14A-14H illustrate exemplary user interfaces for navigating through data. FIG. 15 is a flow diagram for a method of navigating through data, in accordance with some embodiments. The user interfaces in FIGS. 14A-14H are used to illustrate the processes described below, including the processes in FIG. 15.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
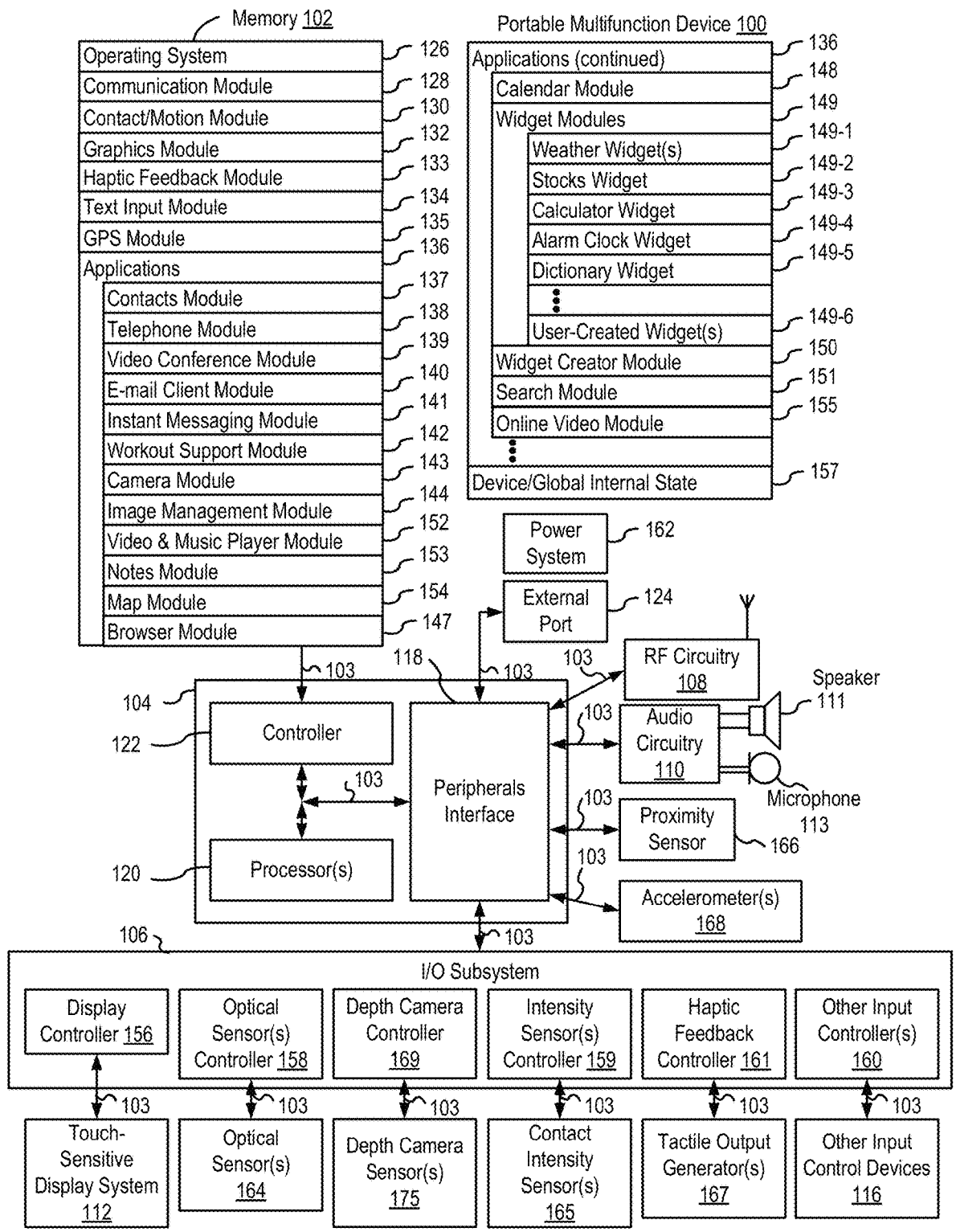
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.1 lac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
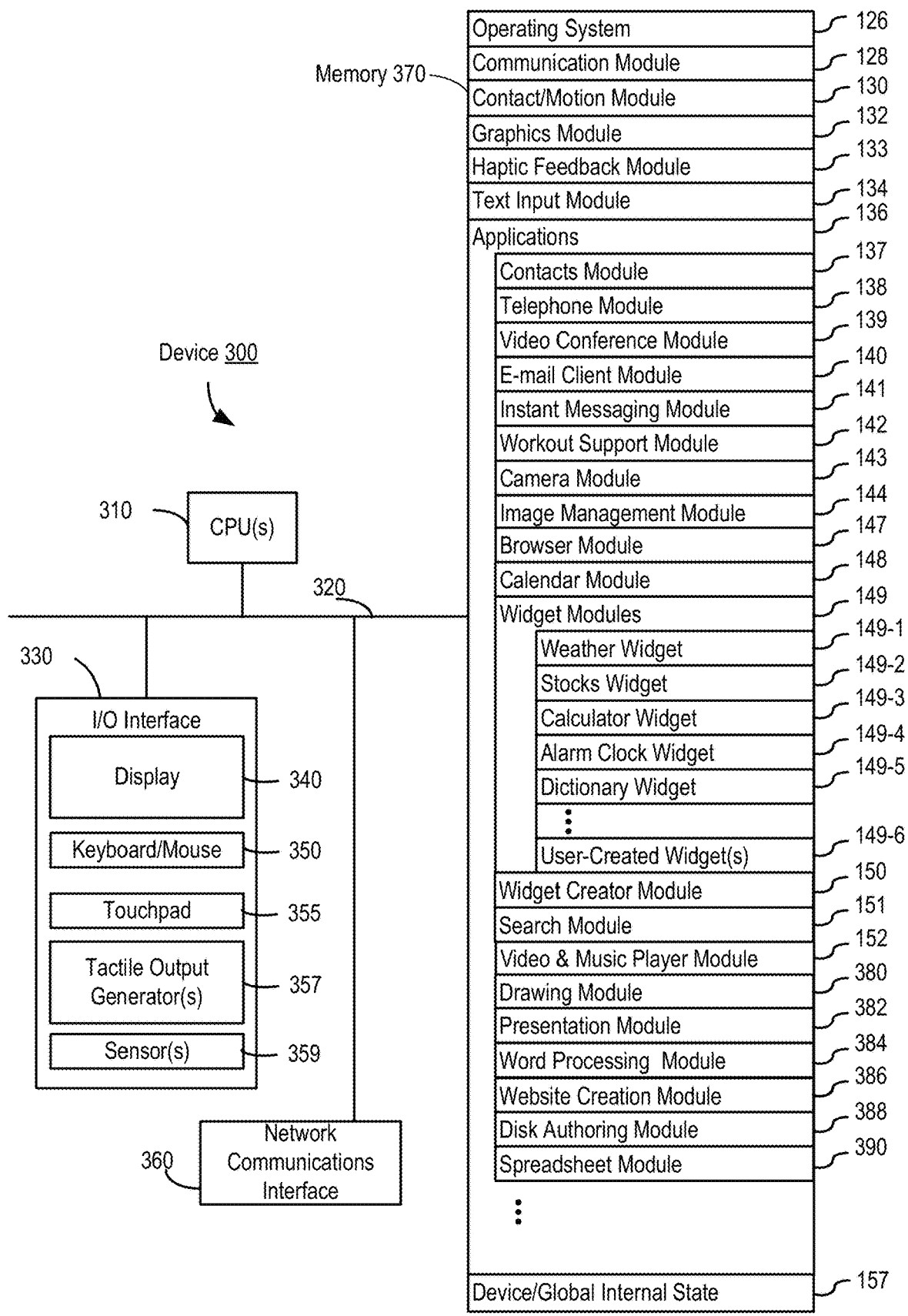
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;

Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
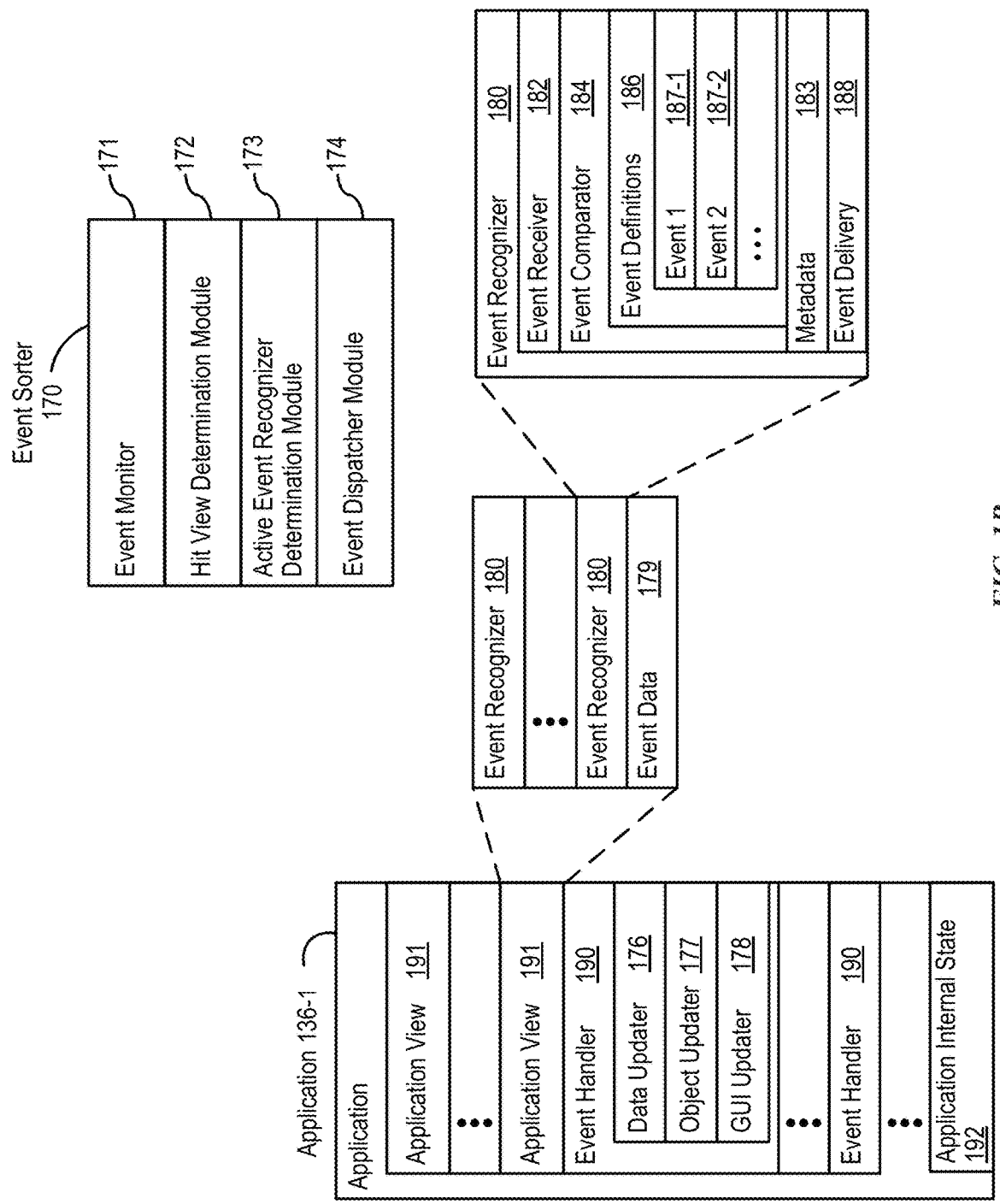
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
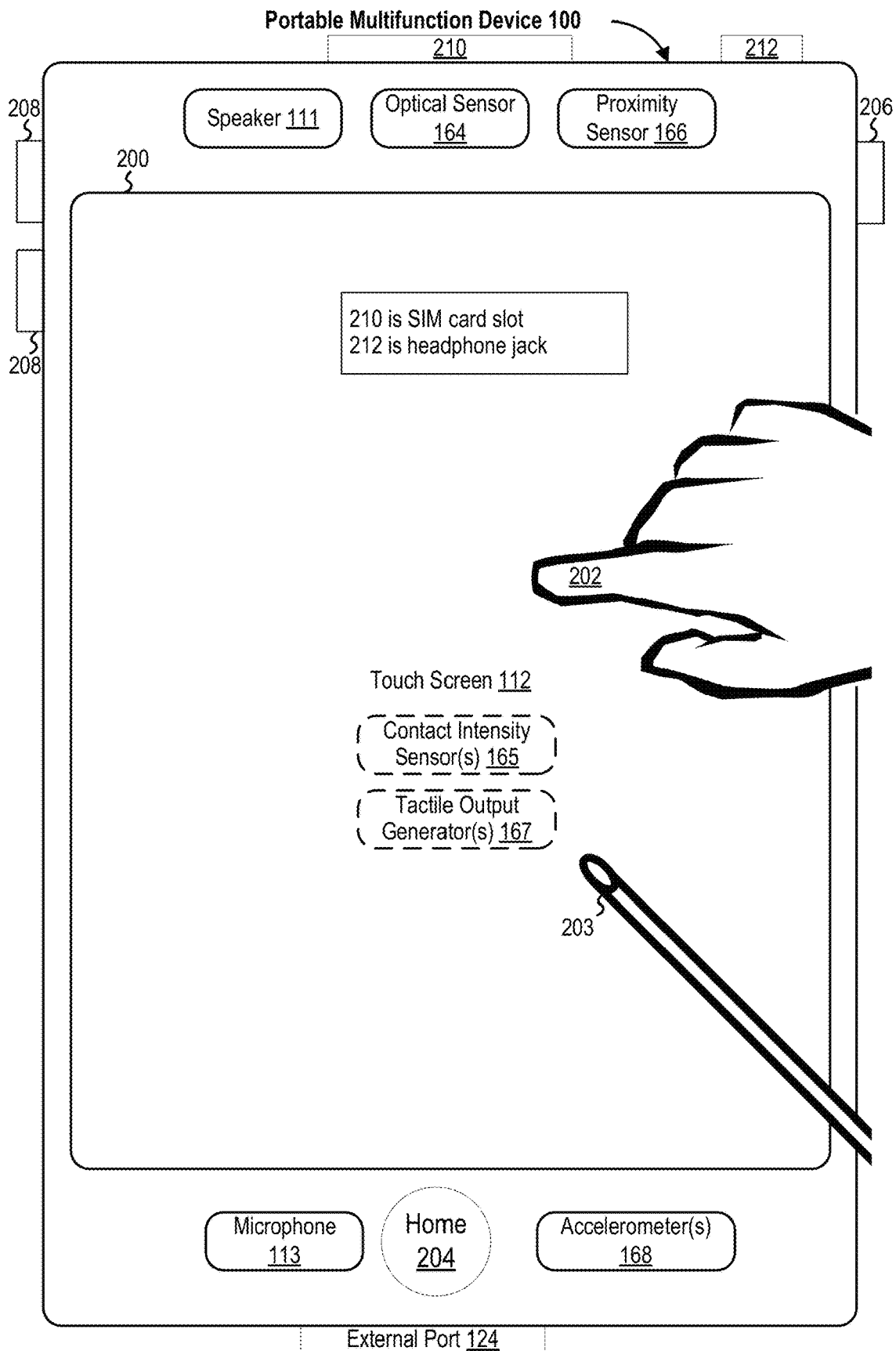
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
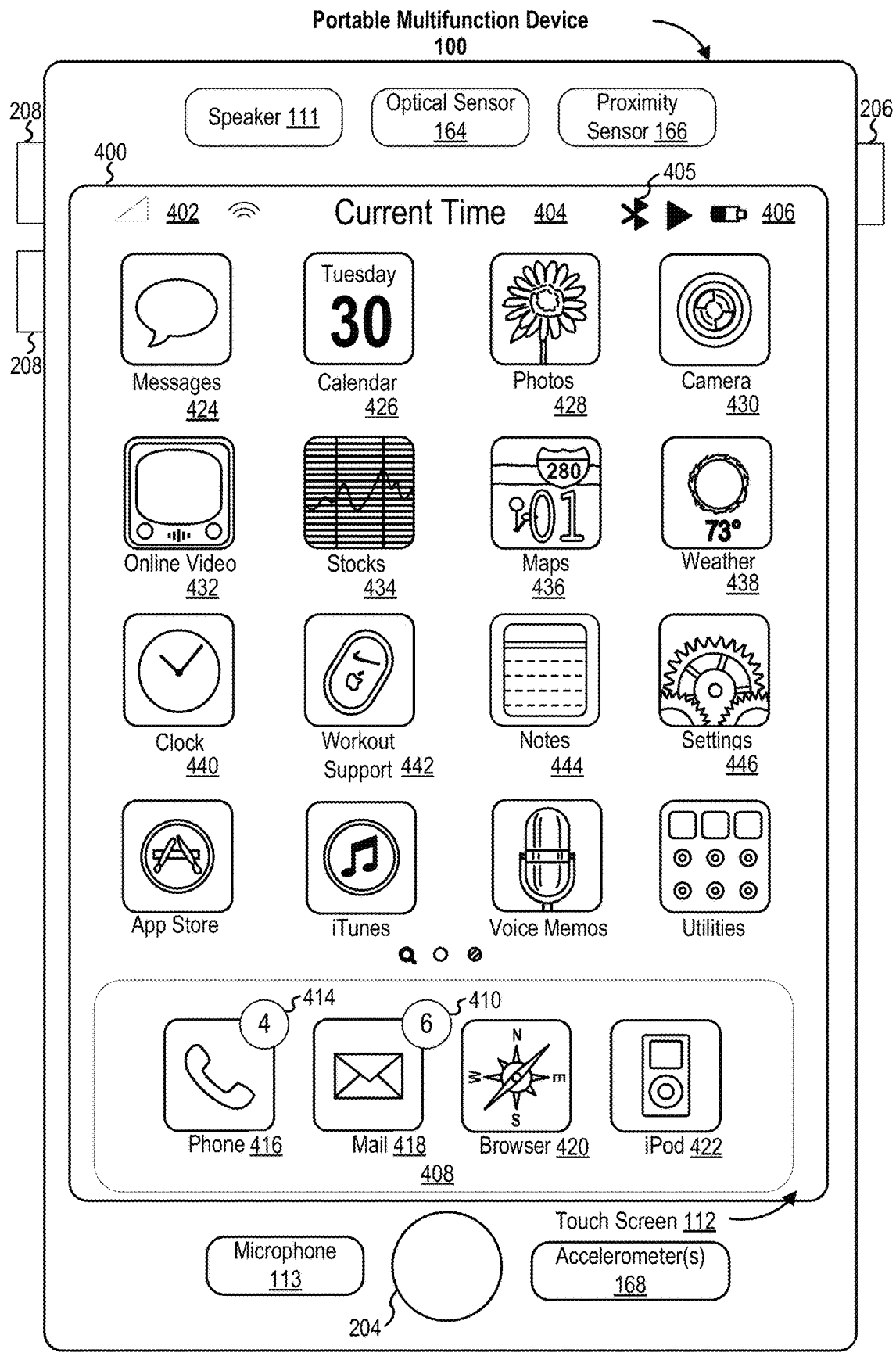
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
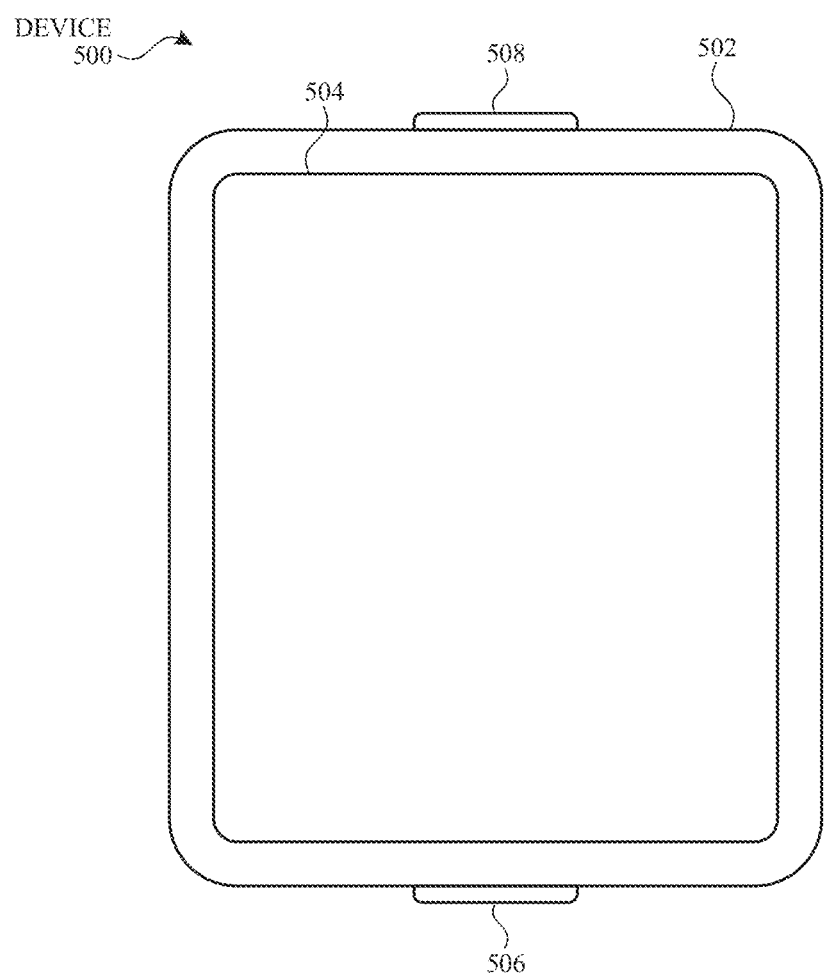
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
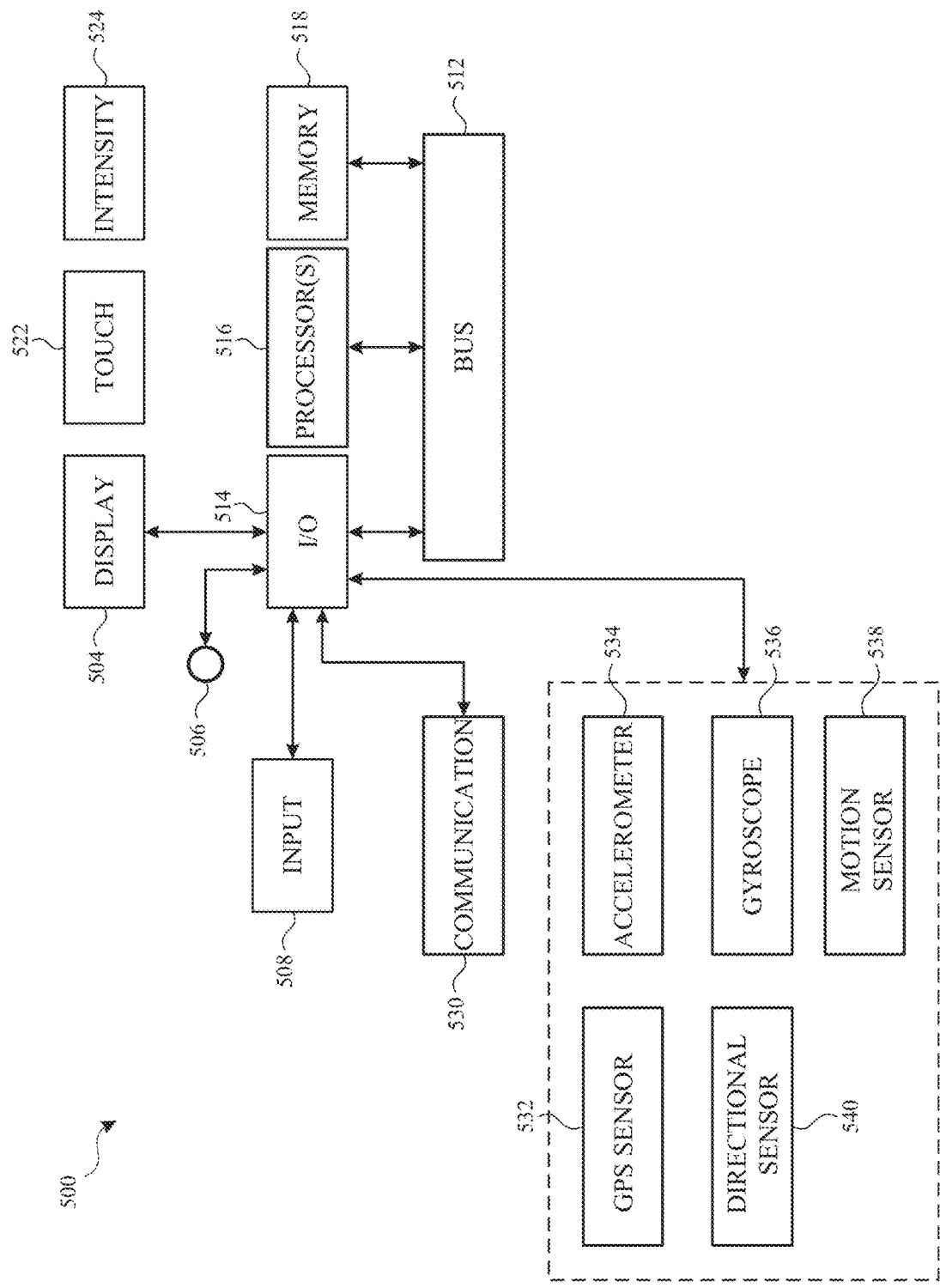
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700-1000, 1200-1300, and 1500 (FIGS. 7-10, 12-13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or

500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6BO illustrate exemplary user interfaces for displaying and editing widgets, in accordance with some embodiments. The user interfaces in these figures are used to illustrate the processes described below, including the processes in FIGS. 7-10.

FIG. 6A depicts computer system 600 with display 602, crown 604, and button 605. Computer system 600 displays watch face 606A that includes representation of time 608A and complications 610A and 610B. Watch face 606A includes representation of time 608A as an analog representation of the current time and includes a representation of a user's fitness activities in the background of the analog representation. Watch face 606A further includes representation of current day 613A. In some embodiments, computer system 600 detects an input on complication 610A and displays an application that corresponds to complication 610A. In some embodiments, computer system 600 detects an input on complication 610B and displays a different application that corresponds to complication 610B. In FIG. 6A, computer system 600 detects rotational input 612A for transitioning to a widget interface and computer system 600 also detects input 612A1 for transitioning to the widget interface.

In FIG. 6B, in response to detecting rotational input 612A, computer system 600 displays animated transitional interface 616 while transitioning to widget user interface 618A in FIG. 6C. Computer system 600 also displays animated transitional interface 616 while transitioning to widget user interface 618A in FIG. 6C in response to detecting swipe input 612A1 that starts at a respective edge of display 602. In some embodiments, computer system 600 displays animated transitional interface 616 while transitioning to widget user interface 618A in FIG. 6C in response to detecting swipe input 612A1 that starts away from the respective edge (e.g., non-edge portion) of display 602. In some embodiments, computer system 600 continues to detect swipe input 612A1 in FIG. 6B while displaying animated transitional interface 616. Animated transitional interface 616 includes representations of graphical elements that were displayed on watch face 606A in FIG. 6A. Animated transitional interface 616 includes representation of time 608B that is a smaller version of representation of time 608A displayed in FIG. 6A. Computer system 600 further displays representation of time 608B with a translucency that is different from the translucency of representation of time 608A. In some embodiments, representation of time 608B is displayed with the same level of translucency as representation of time 608A. Computer system 600 further displays representation of current day 613B that includes a textual representation of the current date in the same typeface as the representation of current day 613A in FIG. 6A. Animated transitional interface 616 further includes widget 614A that is partially displayed and is partially translucent. In some embodiments, computer system 600 displays widget 614A as fully opaque while it is displayed in animated transitional interface 616. In some embodiments, various graphical elements (e.g., 608B, 612B, and/or 614A) displayed in animated transitional interface 616 animatedly move on the animated transitional interface 616 as computer system 600 continues to detect rotational input. In some embodiments, widget 614A animatedly slides onto display 602 as computer system 600 detects rotational input 612A in FIG. 6A. In some embodiments, representation of time 608B animatedly becomes smaller (or larger) and/or changes position as computer system 600 detects rotational input 612A in FIG. 6A. In FIG. 6B, computer system 600 continues to detect rotational input 612B for transitioning to a widget interface. In some embodiments, in response to computer system 600 detecting completion (e.g., termination and/or break) of swipe gesture 612A1 or rotational input 612A before a threshold amount (e.g., a quarter, half, and or/less than whole) of animated transitional interface 616 is displayed, computer system 600 ceases to display animated transitional interface 616 and redisplays the previously displayed watch face 606A. In some embodiments, in response to computer system 600 detecting a magnitude (e.g., velocity, displacement, and/or distance) of swipe gesture 612A1 or rotational input 612A being below a threshold amount of magnitude, computer system 600 displays a portion of animated transitional interface 616 without displaying widget user interface 618A in FIG. 6C. In some embodiments, in response to computer system 600 detecting a magnitude (e.g., velocity, displacement, and/or distance) of swipe gesture 612A1 or rotational input 612A being below a threshold amount of magnitude, computer system 600 ceases to display animated transitional interface 616 and redisplays the previously displayed watch face 606A.

In FIG. 6C, in response to detecting rotational input 612B, computer system 600 displays widget user interface 618A. In some embodiments, computer system 600 displays widget user interface 618A in response to detecting rotational input 612A, without detecting rotational input 612B. Widget user interface 618A includes representation of time 608C that is a smaller version of representation of time 608A displayed in FIG. 6A. In some embodiments, representation of time 608C is a smaller version of representation of time 608B displayed in FIG. 6B. Computer system 600 further displays representation of current day 613C that includes a representation of the current date in the same typeface as representation of current day 613A in FIG. 6A. Widget user interface 618A further includes widgets 614A, 614B, and 614C. Computer system 600 display widgets 614A, 614B, and 614C in a stack such that widget 614A is fully visible, widget 614B is under widget 614A and is partially visible, and widget 614C is under widgets 614A and 614B and is partially visible. In some embodiments, computer system 600 displays the respective widgets from the set of widgets with a consistent (e.g., same and/uniform) size. In some embodiments, computer system 600 varies the size(s) (e.g., horizontal and/or vertical) of the respective widget(s) (e.g., one and/or a plurality of widgets within the set of widgets are displayed with different sizes) in the set of widgets based on predetermined criteria (e.g., frequency of access, widget status (e.g., pinned and/or unpinned), context criteria (e.g. time, location, battery health, and/or notification from an application corresponding to computer system 600), and/or user selected preference).

In FIG. 6C, widget 614A is as contextual widget selected for inclusion in the set of widgets by computer system 600. Widgets 614B and 614C are non-contextual widgets (e.g., user selected) that were not selected (e.g., automatically) by computer system 600. In some embodiments, computer system 600 selects widget 614A to be included in the set of widgets, because data (e.g., calendar data) corresponding to widget 614A meets a predetermined criteria (e.g., calendar appointment is today). In some embodiments, widget 614A is a non-contextual widget. In some embodiments, widget 614A was added to the set of widgets via user input (e.g., not a contextual widget selected by computer system 600). In some embodiments, widgets 614C and 614C are contextual widgets. In some embodiments, contextual widgets are added to a set of widgets automatically (e.g., without user input) based on a predetermined criteria (e.g., location of the computer system 600, current time, network connectivity status, status of ongoing live session, and/or battery charge). In some embodiments, computer system 600 changes a status of a non-contextual widget in the set of widgets to a contextual widget based on a predetermined criteria (e.g., location of the computer system 600, current time, network connectivity status, status of ongoing live session, and/or battery charge). In some embodiments, changing a non-contextual widget to a contextual widget causes the order of the respective widget to change within the set of widgets. In some embodiments, computer system 600 changes a contextual widget in the set of widgets to a non-contextual widget (e.g., via a pinning process and/or other user input). In some embodiments, changing a contextual widget to a non-contextual widget causes the order of the respective widget to change within the set of widgets. In some embodiments, computer system 600 detects a selection input corresponding to widget 614A and in response to detecting the selection input, computer system 600 displays a respective application (e.g., a calendar application), which corresponds to widget 614A. In FIG. 6C, computer system 600 detects rotational input 612C for scrolling the widget interface.

In FIG. 6D, in response to detecting rotational input 612C, computer system 600 displays scroll widget user interface 616A. Scroll widget interface 616A includes widgets 614A, 614B, and 614C. In some embodiments, computer system 600 displays, in scroll widget user interface 616A, a respective set of widgets that were displayed in FIG. 6C, but the respective set of widgets are no longer displayed as a stack. Moreover, at least widget 614A and widget 614B are fully visible on display 602 and widget 614C is at least partially displayed on display 602. Scroll widget user interface 616A further includes graphical object 619 that indicates the end of the set of widgets. In some embodiments, computer system 600 detects a scroll input, and in response to detecting the scroll input, widgets 614A and 614B are scrolled off display 602 and widgets 614D and 614E are scrolled on to display 602. In FIG. 6D, computer system 600 detects rotational input 612D to scroll the respective set of widgets. In some embodiments, computer system 600 detects a rotational input (e.g., a continuous rotation that includes 612A, 612B, and 612C) and, in response, transitions among the user interfaces illustrated in FIGS. 6A-6D.

Figure 6E:
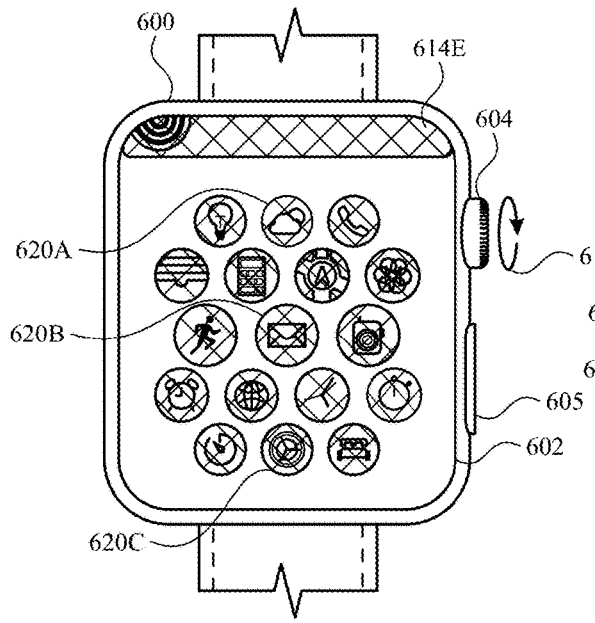
FIGS. 6A-6BO illustrate exemplary user interfaces for displaying and/or managing widgets.

In FIG. 6E, in response to detecting rotational input 612D, computer system 600 displays widget 614E scrolling off display 602 and computer system 600 changes the translucence of widget 614E as widget 614E scrolls off display 602. Moreover, in FIG. 6E, computer system 600 displays an animated transition of graphical object 619 in FIG. 6D into a respective set of application icons that include application icons 620A, 620B, and 620C. Computer system 600 gradually changes the translucence of application icons 620A, 620B, and 620C as computer system 600 continues to detect rotational input 612D. In some embodiments, computer system 600 displays the respective set of application icons at an increasingly larger size as computer system 600 continues to detect rotational input 612D. In FIG. 6E, computer system 600 continues to detect rotational input 612E.

Figure 6F:
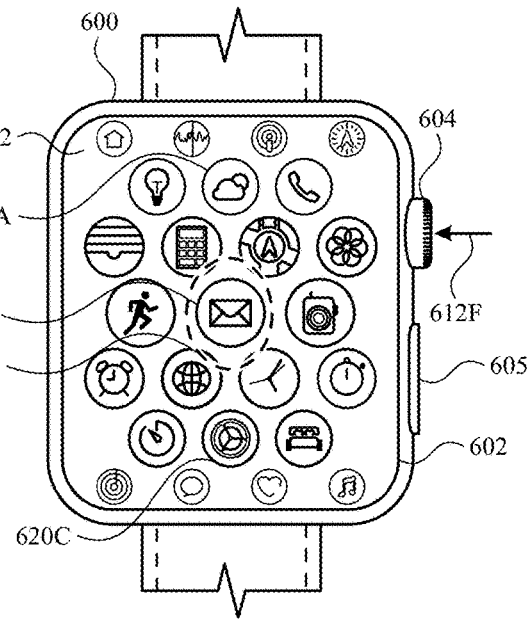

In FIG. 6F, in response to continuing to detect rotational input 612E, computer system 600 displays app launcher interface 622. App launcher interface 622 includes application icons 620A, 620B, and 620C. In some embodiments, computer system 600 detects a respective input 612F1 to select application icon 620B (e.g., an application icon corresponding to the mail application). In response to detecting the respective input 612F1, computer system 600 displays the mail application corresponding application icon 620B. In some embodiments, computer system 600 detects an additional respective input to select one of application icons 620A and 620C, and in response to detecting the respective input, computer system 600 displays a respective application corresponding the selected one of application icons 620A, and 620C. In FIG. 6F, computer system 600 displays application icon 620B at a larger size than application icons 620A and 620C, because application icon 620B is located in a substantially central position on display 602. In some embodiments, computer system 600 displays a respective set of application icons closer to an edge of display 602 at a smaller size than application icons further away from the edge of display 602. In some embodiments, computer system 600 displays each application icon in the same row of application icons at a substantially same size. In some embodiments, computer system 600 displays each application icon in the same row of application icons at different sizes. In some embodiments, computer system 600 displays a first respective set of application icons closest to a first edge (e.g., left, right, top, or) bottom of display 602 at a smaller size than a second respective set of application icons closest to a second (e.g., opposite) edge of display 602. In FIG. 6F, computer system 600 detects depress input 612F for displaying the last displayed watch face (e.g., watch face 606A in FIG. 6A). In some embodiments, computer system 600 detects a rotational input (e.g., a continuous rotation that includes 612A-612E) and, in response, transitions among the user interfaces illustrated in FIGS. 6A-6F. In some embodiments, app launcher interface 622 is scrollable in a first axis (e.g., horizontal and/or vertical) and not scrollable in a second axis (e.g., horizontal and/or vertical) different from the first axis.

Figure 6G:
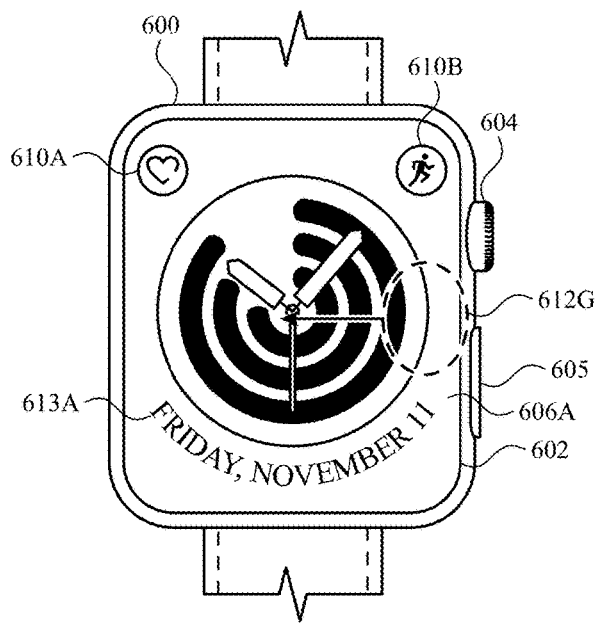

In FIG. 6G, in response to detecting swipe input 612G, computer system 600 changes the currently selected watch face 606A to the next watch face (e.g., different from the presently displayed watch face) in a list of watch faces. In some embodiments, computer system 600 determines which watch face to display (e.g., change to) based on a direction (e.g., left/right and/or up/down) of swipe input 612G. In some embodiments, computer system 600 changes the watch face in response to detecting a tap input, long press input, hand gesture, and/or air gesture.

Figure 6H:
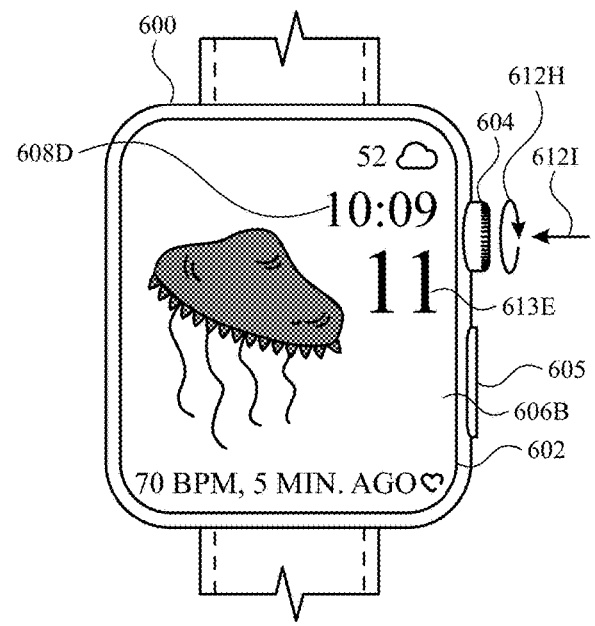

In FIG. 6H, computer system 600 displays watch face 606B in response to detecting swipe input 612G in FIG. 6G. Watch face 606B includes representation of current day 613E. FIG. 6H further depicts rotational input 612E and input (e.g., depression of crown 604) 612I. In response to detecting input 612I, computer system 600 displays app launcher interface 622, as shown in FIG. 6F. In response to detecting rotational input 612H, computer system 600 displays widget user interface 618B as shown in FIG. 6F.

Figure 6I:
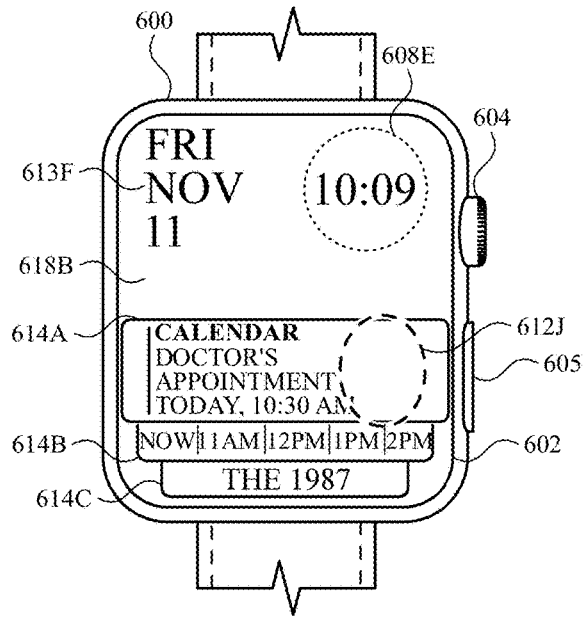

In FIG. 6I, in response to detecting input 612H, computer system 600 displays widget user interface 618B that includes representation of time 608E that is a based on (e.g., visually and/or contextually) representation of time 608D displayed in FIG. 6H. In some embodiments, representation of time 608E is a smaller version of representation of time 608D displayed in FIG. 6H. Computer system 600 further displays representation of current day 613F that includes a representation of the current date in the same typeface as representation of current day 613E in FIG. 6H. In FIG. 6I, computer system 600 detects long press input 612J (e.g., a touch and hold for more than a threshold duration of time) for entering an editing mode for the respective set of widgets. In some embodiments, computer system 600 enters the editing mode in response to detecting a tap input, swipe input, hand gesture, and/or air gesture.

Figure 6J:
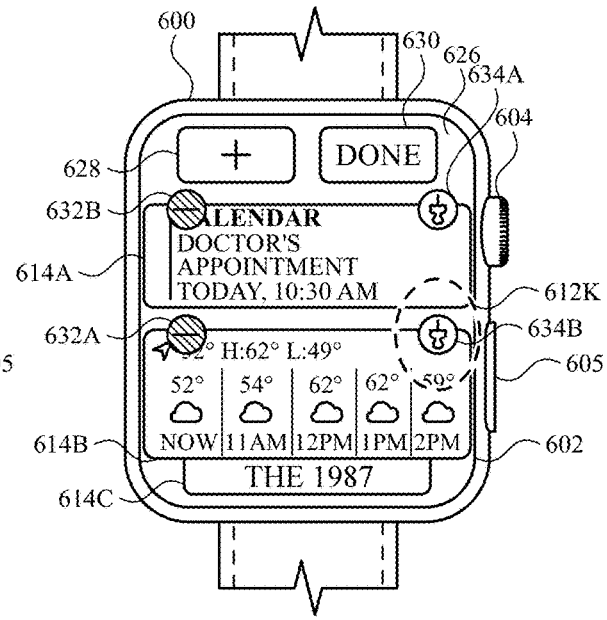

In FIG. 6J, in response to detecting long press input 612J, computer system 600 displays widget editing interface 626. Widget editing interface 626 includes add graphical object 628 for adding additional widgets to the set of widgets (e.g., list of widgets, stack of widget, and/or collection of widgets). Widget editing interface 626 also includes done (e.g., "DONE") graphical object 630, that when activated (e.g., selected and/or acted upon), initiates a process for saving changes to editing interface 626 and returning to (e.g., displaying) the respective interface that was displayed just prior to receiving input 612J in FIG. 6I. In some embodiments, done (e.g., "DONE") graphical object 630, when activated, initiates a process for saving changes to editing interface 626 and returning to (e.g., displaying) a respective watch face user interface (e.g., 606A or 606B).

Furthermore, widget editing interface 626 includes delete graphical objects 632A and 632B for deleting a respective widget corresponding to graphical objects 632A and 632B. Widget editing interface includes pin graphical objects 634A and 634B for pinning a respective widget corresponding to respective pin graphical objects 634A and 634B to the top of the set of widgets. Because pin graphical objects 634A and 634B are in the unpinned state, and hence widgets 614A and 614B are in the unpinned state, respectively, computer system 600 displays pin graphical objects 634A and 634B with a first visual appearance (e.g., with a representation of a pin pointing up, with the graphical object being unfilled and/or shaded/not shaded, and/or with a graphical representation (e.g., icon and/or symbol) that indicates the respective widget is in the unpinned state). In FIG. 6J, computer system 600 detects input 612K (e.g., tap and/or long-press) directed to pin graphical objects 634B. In response to detecting input 612K, computer system 600 changes the state of widget 614B from the unpinned state to the pinned state.

Figure 6K:
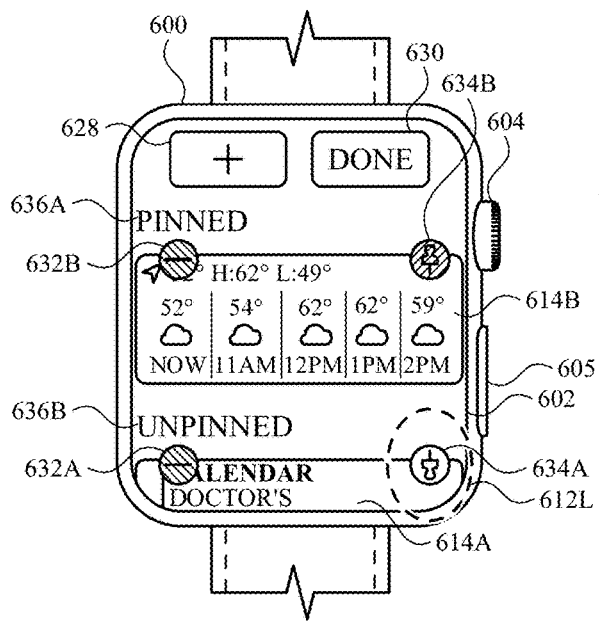

In FIG. 6K, in response to detecting input 612K, computer system 600 displays widget 614B in the pinned state. Because widget 614B is in the pinned state, computer system 600 displays corresponding pin graphical objects 634B with a different visual appearance (e.g., different icon/symbol, different shading, and/or different position of the icon/symbol) than in FIG. 6J when widget 614B was in the unpinned state. Because the pin state of widget 614A did not change, computer system 600 displays corresponding pin graphical objects 634A with the same visual appearance (e.g., same icon/symbol, same shading, and/or same position of the icon/symbol) as in FIG. 6J when widget 614A was in the unpinned state. Furthermore, computer system 600 display respective pinned widgets (e.g., widget 614B) under pinned (e.g., "PINNED") graphical object 636A and displays respective unpinned widgets (e.g., widget 614A) under unpinned (e.g., "UNPINNED") graphical object 636B. In some embodiments, in response to a change in a respective pin state for a respective widget (e.g., widget 614B), computer system 600 displays the respective pinned widget (e.g., 614B) at a top of the widget regardless of the pin state of other widgets. In some embodiments, computer system 600 does not display pinned (e.g., "PINNED") graphical object 636A and unpinned (e.g., "UNPINNED") graphical object 636B, and computer system 600 displays respective widgets in the pinned state above/below respective widgets in the unpinned state (e.g., respective widgets in the pinned state are displayed at the top or the bottom of the widget list). In FIG. 6K, computer system 600 detects input 612L (e.g., tap and/or long-press) directed to pin graphical objects 634A. In response to detecting input 612L, computer system 600 changes the state of widget 614A from the unpinned state to the pinned state.

Figure 6L:
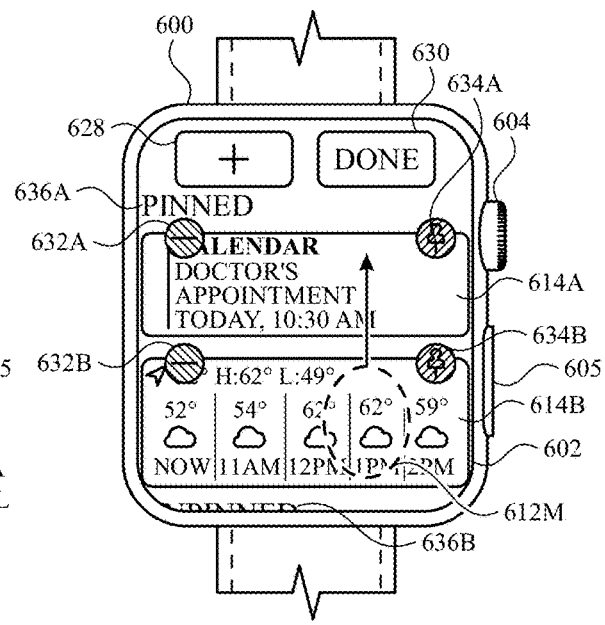

In FIG. 6L, in response to detecting input 612L, computer system 600 displays widget 614A in the pinned state. Because widget 614A is in the pinned state, computer system 600 displays corresponding pin graphical objects 634A with a different visual appearance (e.g., different icon/symbol, different shading, and/or different position of the icon/symbol) than in FIG. 6J and FIG. 6K when widget 614A was in the unpinned state. Furthermore, computer system 600 display respective pinned widgets (e.g., widget 614A and widget 614B) under pinned (e.g., "PINNED") graphical object 636A and displays respective widgets in the unpinned state under unpinned (e.g., "UNPINNED") graphical object 636B. In some embodiments, while the respective widgets in the unpinned state are not displayed (e.g., not visible or partially visible), computer system 600 detects a scroll input (e.g., rotational and/or swipe). In response to detecting the scroll input, computer system scrolls widget editing interface 626 to display respective widgets in the unpinned state under unpinned (e.g., "UNPINNED") graphical object 636B. Furthermore, computer system 600 displays widget 614A above widget 614B (e.g., based on the recency of the pin status change). Computer system 600 displays the most recently pinned widget 614A above other (e.g., all other) pinned widgets 614B. In some embodiments, computer system 600 displays the most recently pinned widget 614A below other pinned widgets 614B (e.g., below a plurality of other pinned widgets, or below all other pinned widgets), but above respective widgets in the unpinned state. In FIG. 6L, computer system 600 detects a drag input 612M to rearrange the list of displayed widgets.

Figure 6M:
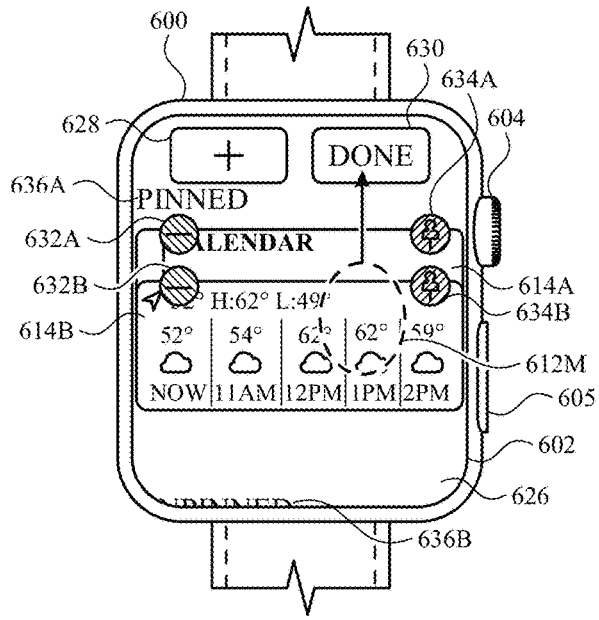

In FIG. 6M, in response to detecting drag input 612M, computer system 600 displays widget 614B being repositioned (e.g., dragged) on display 602. The position of widget 614B corresponds to the movement of input 612M such that as the position of input 612M changes (e.g., while a user is dragging their finger), the position of widget 614B on display 602 changes to correspond movement of input 612M. While widget 614B is being repositioned, widget 614B is displayed above (e.g., on top of and/or covering) widget 614A. In some embodiments, while widget 614B is being repositioned, widget 614B is displayed below (e.g., under and/or hidden by) widget 614A.

Figure 6N:
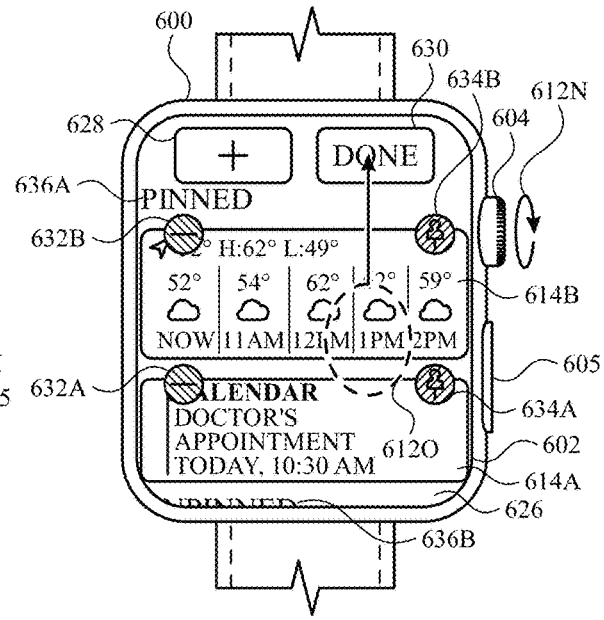

In FIG. 6N, in response to detecting that widget 614B is positioned (e.g., dragged and/or moved) at a location on display 602 that is above or at least half-way past (e.g., a predetermined amount past) widget 614A and in response to detecting completion (e.g., liftoff) of drag input 612M, computer system 600 displays the sets of widgets in a different order than the order in FIG. 6L and displays widget 614B above widget 614A. In FIG. 6L, in response to detecting swipe input 612O and/or rotational input 612N, via crown 604, computer system 600 initiates scrolling the set of widgets.

Figure 6O:
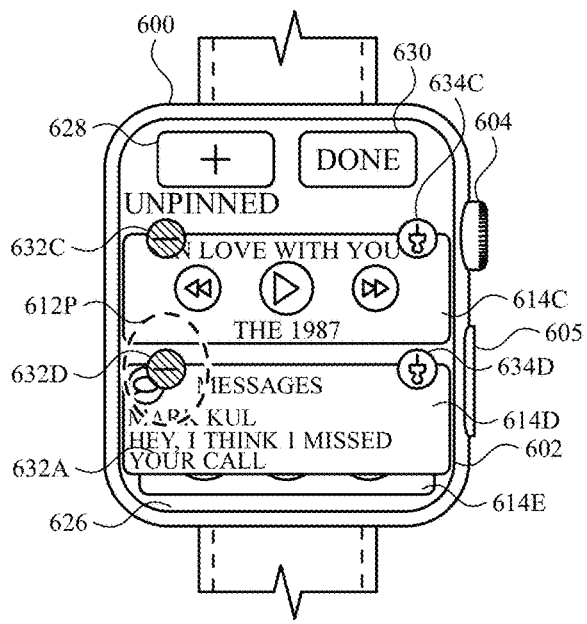

In FIG. 6O, in response to detecting swipe input 612O and/or rotational input 612N, computer system 600 scrolls pined widget 614A and 614B off display 602 and scrolls unpinned widgets 614C and 614D onto display 602. Computer system 600 continues to display (e.g., does not move and/or scroll) add graphical object 628 and done graphical object 630 at the same location on display 602. In some embodiments, in response to detecting swipe input 612O and/or rotational input 612N, computer system 600 scrolls add graphical object 628 and done graphical object 630 off display 602.

In FIG. 6O, widgets 614A and 614B include delete graphical objects 632C and 632D, respectively, for deleting the respective widget from the set of widgets. Widgets 614A and 614B include pin graphical objects 634C and 634D, respectively, for changing the pin status of the respective widget. Because not enough space is available to fully display widget 614E, computer system 600 displays a portion (e.g., less that whole) of widget 614E under widget 614D to provide an indication that additional widgets are present in the set of widgets. In some embodiments, computer system 600 detects additional swipe input and/or rotational input to fully display widget 614E. In FIG. 6O, computer system 600 detects input 612P (e.g., tap or long press) directed to delete graphical object 632D that corresponds to widget 614D to initiate a process to delete widget 614D from the set of widgets.

Figure 6P:
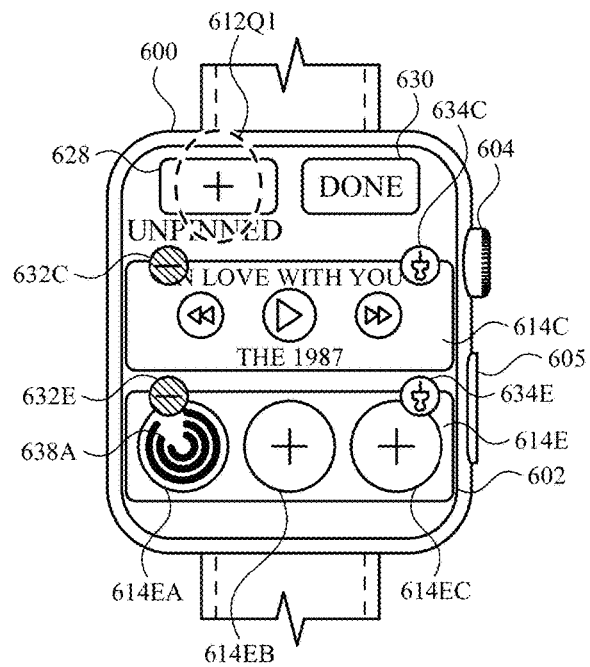

In FIG. 6P, in response to input 612P, computer system 600 ceases to display (e.g., deletes from the set of widgets) widget 614D and displays widget 614E in its place. Widget 614E is a multi-complication widget that includes three complication spaces 614EA, 614EB, and 614EC. Computer system 600 displays an icon (e.g., graphical representation and/or symbol) corresponding to complication 638A within complication space 614EA. Because no complication is currently chosen (e.g., selected and/or picked) for complications spaces 614EB and 614EC, computer system 600 displays an icon/symbol (e.g., "+") to indicated that a respective complication can be added to complication space 614EB and/or 614EC. In some embodiments, multi-complication widget (e.g., 614E) includes more/less than three complication spaces for complications. In FIG. 6P, computer system 600 detects input 612Q1 corresponding to (e.g., directed to) add graphical object 628D for adding a widget to the set of widgets.

Figure 6Q:
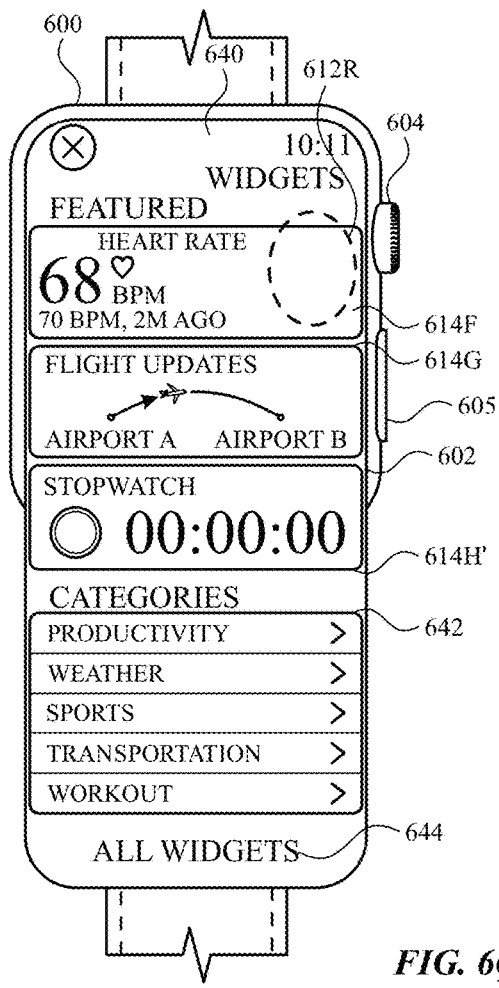

In FIG. 6Q, in response to detecting input 612Q1, computer system 600 displays widget selection interface 640. Widget selection interface 640 includes featured widgets section that includes widget 614F, 614G, and 614H'. In some embodiments, computer system 600 determines which widget(s) to display and/or the widget order in the featured section based on a set of one or more predetermined criteria (e.g., frequency of usage, recency of installation of a corresponding application, and/or environmental factors). In some embodiments, computer system 600 determines which widgets to display and/or the widget order in the featured section based on frequency of usage of an application corresponding to the respective widget. For example, a widget corresponding to an application that is most frequently used will be displayed at the top of the list. In some embodiments, computer system 600 determines which widgets to display and/or the widget order in the featured section based on environmental factors (e.g., time of day, location, weather, time of year, and/or noise level) of computer system 600. For example, a widget corresponding to an alarm may be displayed at the top of the list in the evening. As another example, computer system 600 will display a widget corresponding to a flight status toward the top of the list in accordance with a determination that a present location of computer system 600 corresponds to an airport location. In some embodiments, the featured widgets portion of the widget selection interface 640 does not include the "FEATURED" label/icon or another icon/label to designate the featured portion of widget selection interface 640. In some embodiments, the featured widgets portion of the widget selection interface 640 includes a label, icon, and or symbol to indicate that the selected widgets are featured (e.g., predetermined based on criteria).

Widget selection interface 640 further includes categories menu 642 and all widgets graphical object 644. In some embodiment, computer system 600 displays a predetermined number of widgets within the featured section and the remaining widgets for adding/selection can be accessed either via categories menu 642 and/or all widgets graphical object 644. In some embodiments, categories menu 642 includes multiple (e.g., two, three, five, or ten) different categories corresponding to various widget categories. In some embodiment, in response to computer system 600 detecting an input to select (e.g., directed to), one of the widget categories in categories menu 642, computer system 600 displays the respective selectable widgets within the selected widget category. In some embodiment, in response to computer system 600 detecting an input to select (e.g., directed to) all widgets graphical object 644, computer system 600 displays a scrollable list of all respective selectable widgets that can be added to the set of widgets. In some embodiments, all respective selectable widgets include featured widgets 614F, 614G, and 614H'. In FIG. 6Q, computer system 600 detects input 612R (e.g., tap and/or long press) directed widget 614F.

Figure 6R:
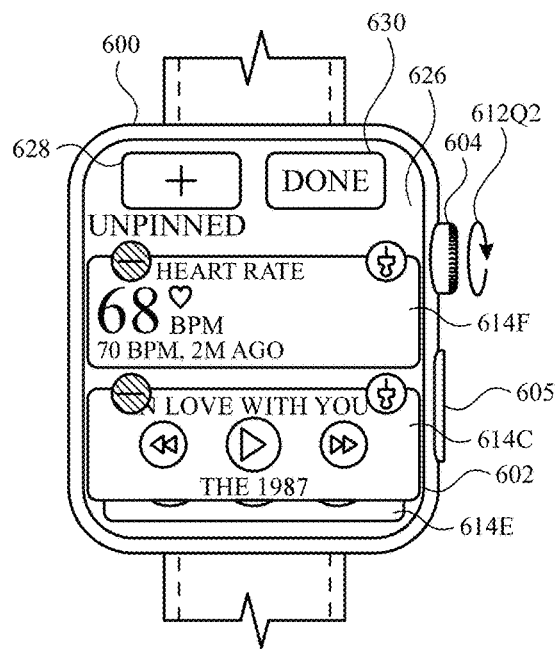

In FIG. 6R, in response to detecting input 612R, computer system 600 displays (e.g., redisplays) widget editing interface 626. Because widget 614F was selected in FIG. 6Q, computer system 600 displays widget 614F at the top of the unpinned portion of widget editing interface 626 and computer system 600 displays widget 614C below widget 614F. In some embodiments, computer system 600 displays added widgets at the bottom (e.g., end of the list) of the unpinned portion of widget editing interface 626. In FIG. 6R, computer system 600 detects clockwise rotational input 612Q2.

Figure 6S:
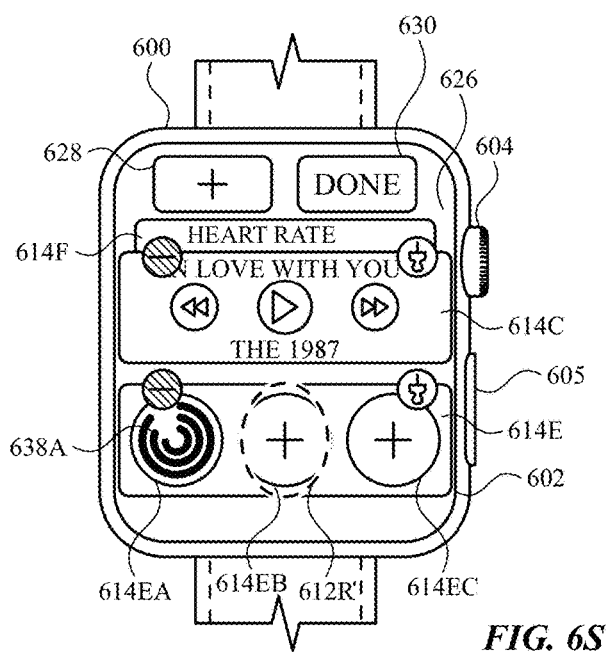

In FIG. 6S, in response to detecting clockwise rotational input 612Q2, computer system 600 scrolls the set of widgets in widget editing interface 626 and displays widget 614E at the end of the set of widgets in widget editing interface 626. In some embodiments, the widgets scroll in the direction of the input. In FIG. 6S, computer system 600 detects input 612R' (e.g., tap and/or long press) directed to (e.g., corresponding to) complication space 614EB for adding a complication to complication space 614EB.

Figure 6T:
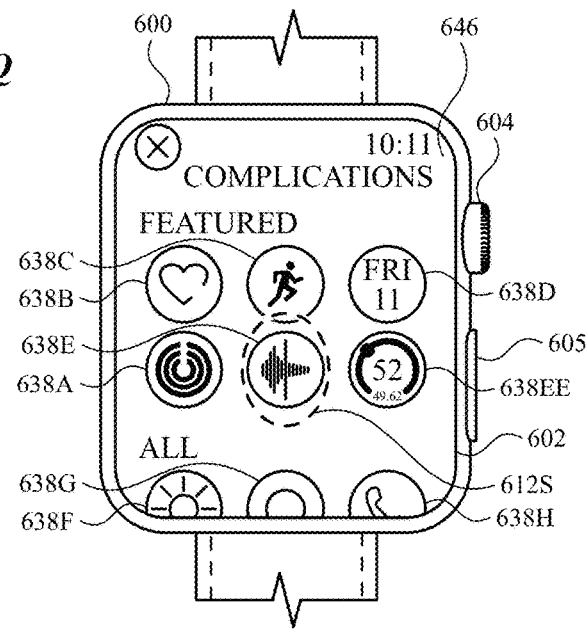

In FIG. 6T, in response to detecting input 612R, computer system 600 displays complication selection interface 646. Complication selection interface 646 includes featured complication section that includes complications 638A, 638B, 638C, 638D, 638E, and/or 638EE. In some embodiments, computer system 600 determines which complication(s) to display and/or the complication order in the featured section based on a set of one or more predetermined criteria (e.g., frequency of usage, recency of installation of a corresponding application, and/or environmental factors). In some embodiments, computer system 600 determines which complication(s) to display and/or the complication(s) order in the featured section based on frequency of usage of an application corresponding to the respective complication. For example, a complication corresponding to an application that is most frequently used will be displayed at the top of the list. In some embodiments, computer system 600 determines which complication(s) to display and/or the complication(s) order in the featured section based on environmental factors (e.g., time of day, location, weather, time of year, and/or noise level) of computer system 600. For example, a complication corresponding to an alarm may be displayed at the top of the list in the evening as that is time when computer system 600 determines the alarm application is regularly accessed. As another example, computer system 600 displays a complication corresponding to a fitness status toward the top of the list in accordance with a determination that a user of computer system 600 is currently engaged in a workout or was recently engaged in a workout. In some embodiments, the featured complication portion of the complication selection interface 646 does not include the "FEATURED" label/icon or another icon/label to designate the featured portion of complication selection interface 646. In some embodiments, the featured complication portion of the complication selection interface 646 includes a label, icon, and or symbol to indicate that the selected complications(s) are featured (e.g., predetermined based on criteria).

Complication selection interface 646 further includes complication that are not featured complications, complications 638F, 638G, and/or 638H. In some embodiments, computer system 600 detects a rotational input and/or a swipe input to scroll the list of complications and to display additional complications under the "ALL" complications category. In some embodiments, complication selection interface 646 further includes an all-complication graphical object, that when selected, initiates the display of all (e.g., a scrollable user interface that includes all) available complications. In FIG. 6T, computer system 600 detects input 612S (e.g., tap and/or long press) for selecting complication 638E.

In FIG. 6U, in response to detecting input 612S, computer system 600 displays (e.g., redisplays) widget editing interface 626. Because complication 638E was selected in FIG. 6T, computer system 600 displays complication 638E in complication space 614EB. In FIG. 6U, computer system 600 detects input 612T (e.g., tap and/or long press) directed to done graphical object 630.

In FIG. 6V, in response to detecting input 612T, computer system 600 saves the edits and/or changes to the set of widgets that were made in FIGS. 6J-6U and displays scroll widget user interface 616B. Because the widgets in the set of widgets have been edited (e.g., changed) (as depicted in FIGS. 6J-6U), the respective widgets displayed in scroll widget user interface 616B are different and/or in different order from the respective widgets displayed in scroll widget user interface 616A in FIG. 6D. Because widgets 614B and 614A were pinned, computer system 600 displays widgets 614B and 614A at the top of widget user interface 616B. The widgets that were not pinned, widget 614F, widget 614C and widget 614E, are displayed under pinned widgets 614B and 614A. FIG. 6V illustrates all the widgets in scroll widget user interface 616B, but computer system 600 displays widgets 614B, 614A, and 614F on display 602. In some embodiments, in response to detecting an additional swipe input or rotational input while displaying the top portion of widget user interface 616B, computer system 600 scrolls widget user interface 616B to display widgets 614C, 614E, and graphical object 619. In FIG. 6V, computer system 600 detects depress input 612U (e.g., a press on the crown or rotatable input mechanism).

In FIG. 6W, in response to detecting depress input 612U, computer system 600 displays watch face 606B that includes representation of current day 613E. Unlike in FIG. 6H, watch face 606B in FIG. 6W includes notification graphical object 648B. Notification graphical object 648B corresponds to notification graphical object 648A. Notification graphical object 648B indicates that an active live session activity is ongoing. Both notification graphical object 648A and 648B correspond an active live session application (e.g., an active timer, an active sport score, and/or an active ridesharing session) that was initiated on computer system 601. In some embodiments, both notification graphical object 648A and 648B correspond an active live session application (e.g., an active timer, an active sport score, and/or an active ridesharing session) that was initiated on computer system 600. Computer system 601 and computer system 600 are in communication (e.g., paired either physically or wirelessly) such that data (e.g., notification and/or live session information) from computer system 601 is synchronized (e.g., sent to and/or transmitted periodically or in real-time) with computer system 600. In some embodiments, computer system 601 does not display (e.g., does not include) notification graphical object 648A. In FIG. 6W, computer system 600 detects rotational input 612V that initiates a process of displaying a set of widgets.

In FIG. 6X, in response to detecting rotational input 612V, computer system 600 display scroll widget user interface 616C. In some embodiments, computer system 600 displays a widget user interface (e.g., 618A in FIGS. 6C and 618B in FIG. 6I) prior to displaying scroll widget user interface 616C. Scroll widget user interface 616C includes widget 614G that corresponds to notification graphical object 648A and 648B in FIG. 6W. Widget 614G includes activatable graphical objects 614GA and 614GB for interacting with widget 614G and the corresponding application. Because widget 614G corresponds to an active live session, computer system 600 displays widget 614G at the top of scroll widget user interface 616C. Additionally, because the start of a calendar appointment (e.g., as displayed in widget 614A) is within a threshold amount of time, computer system 600 displays widget 614H as a contextual reminder. In FIG. 6X, computer system 600 continues to display widgets 614B, 614A, 614F, 614C, and 614E in the same order they were displayed in FIG. 6V, but in FIG. 6X widgets 614B, 614A, 614F, 614C, and 614E are displayed under widgets 614G and 614H due to widget 614G corresponding to an active live session and widget 614H corresponding to a contextual reminder. In some embodiments, computer system 600 displays widgets associated with elevated priority data (e.g., live sessions, reminder, and/or alerts) higher in position within the set of widgets as compared to widgets that correspond to non-elevated priority data (e.g., pinned and/or unpinned widgets).

In some embodiments, in response to detecting swipe input 612AA, computer system 600 ceases to display widget 614H in scroll widget user interface 616C and the respective widgets below widget 614H shifts (e.g., up and/or down), accordingly. In some embodiments, any widget can be removed/deleted from the set of widgets with a swipe input. In some embodiments, certain type of widgets (e.g., contextual and/or a predetermined type) can be removed/deleted from the set of widgets with a swipe input (and, optionally, other widgets cannot be removed/deleted with a swipe input).

In FIG. 6X, computer system 600 detects input 612X corresponding to pause graphical object 614GA. In response to detecting input 612X, computer system 600 initiates a process of pausing the live activity session. In some embodiments, the live activity session pauses at computer system 600, but not does pause at computer system 601 in FIG. 6W, and vice versa. In some embodiments, the live activity session pauses at both computer system 600 and at computer system 601. In FIG. 6X, computer system 600 also detects input 612Y corresponding to stop/cancel graphical object 614 GB, input 612Z (e.g., tap or long press) corresponding to widget 614G, and depress input 612W.

In response to computer system 600 detecting input 612Y, computer system 600 initiates a process of stopping the live activity session (e.g., timer). In some embodiments, in response to computer system 600 detecting input 612Y, the live activity session stops at computer system 600, but not does stop at computer system 601 in FIG. 6W, and vice versa. In some embodiments, computer system 600 initiates the process of stopping the live activity session at both computer system 600 and at computer system 600 in response to detecting input 612Y.

In FIG. 6Y, in response to detecting input 612Z, computer system 600 displays an application (e.g., timer application) corresponding to widget 614G in FIG. 6X. In some embodiments, the application corresponding to widget 614G includes graphical objects for interacting with the application. In FIG. 6Y, computer system 600 detects a depress input 612AB that initiates a process of displaying a respective watch face (e.g., the last displayed watch face).

In FIG. 6Z, in response to detecting input 612W in FIG. 6X and/or detecting input 612AB in FIG. 6Y, computer system 600 displays watch face 606B that includes representation of current day 613E. Unlike in FIG. 6W, watch face 606B in FIG. 6Z does not include notification graphical object 648B as depicted in FIG. 6W. Computer system 600 ceased displaying notification graphical object 648B because the live activity session (e.g., timer) in FIG. 6X was stopped, in response to detecting input 612Y. In FIG. 6Z, computer system 600 detects input 612AC (e.g., long press and/or multi-tap) that initiates a process for displaying watch face selection user interface.

In FIG. 6AA, in response to detecting input 612AC, computer system 600 displays watch face selection user interface 650. Watch face selection user interface 650 includes a smaller representation of watch face 606B and a partial representation of watch face 606A and a partial representation of watch face 606C. In some embodiments, watch face 606A and/or watch face 606C are fully displayed on watch face selection user interface 650 concurrently with representation of watch face 606B. In FIG. 6AA, computer system 600 detects swipe input 612AD to initiate a process of selecting a different watch face.

In FIG. 6AB, in response to detecting swipe input 612AD, computer system 600 horizontally shifts the selectable watch faces displayed in watch face selection user interface 650. Because the watch faces have shifted, a representation of watch face 606C is fully displayed in the middle of display 602 and a partial representation of watch face 606B and a partial representation of watch face 606D are displayed to the left and right of the representation of watch face 606C, respectively. In FIG. 6AB, computer system 600 detects input 612AE (e.g., tap or long press) to select watch face 606C.

In FIG. 6AC, in response to detecting input 612AE, computer system 600 displays a full version (e.g., larger version than was displayed in FIG. 6AB) of watch face 606C. Watch face 606C includes representation of time 608F. Representation of time 608F is depicted as a character (e.g., animated character and/or cartoon character) and parts of the character are used to depict time. For example, the hands of the characters correspond to an hour hand and a minute hand of a clock. Watch face 606C further includes representation of current day 613G. In FIG. 6AC, computer system detects a rotational (e.g., clockwise) input 612AF to display a set of widgets.

In FIG. 6AD, in response to detecting rotational input 612AF, computer system 600 displays widget user interface 618C. In some embodiments, computer system 600 displays a transition user interface before displaying widget user interface 618C. Widget user interface 618C includes representation of time 608G that is a smaller version of representation of time 608F displayed in FIG. 6AC. In some embodiments, all aspects (e.g., visual properties (e.g., color, font, character, numeral type, tic mark type, and/or digital/analog) and/or features) of representation of time 608F are included in representation of time 608G. In some embodiments, less than all aspects (e.g., visual properties (e.g., color, font, character, numeral type, tic mark type, and/or digital/analog) and/or features) of representation of time 608F are included in representation of time 608G. Computer system 600 further displays representation of current day 613H that includes a representation of the current date in the same typeface as representation of current day 613G in FIG. 6AC. In some embodiments, computer system 600 does not display representation of current day 613H in widget user interface 618C. Widget user interface 618C further includes widgets 614B, 614A, and 614F. Widgets 614B and 614A correspond to the widgets that were pinned in FIGS. 6J and 6K. Widget 614F corresponds to the widget that was selected in FIG. 6Q.

Computer system 600 display widgets 614B, 614A, and 614F in a stack such that widget 614B is fully visible, widget 614A is under widget 614B and is partially visible, and widget 614F is under widgets 614B and 614A and is partially visible. In some embodiments, computer system 600 detects a selection input corresponding to widget 614B and in response to detecting the selection input, computer system 600 display a weather application, which corresponds to widget 614B. In FIG. 6AG, computer system 600 detects rotational input 612AG for scrolling the widget interface.

In FIG. 6AE, in response to detecting rotational input 612AG, computer system 600 displays scroll widget user interface 616D. Scroll widget interface 616D includes widgets 614B, 614A, 614F, and 614C. Scroll widget interface 616D includes full representations of widgets 614B and 614A and partial representations of widgets 614F and 614C. Computer system 600 displays, in scroll widget user interface 616D, widgets 614A, 614F, and 614C in a stack such that widget 614A is fully visible, widget 614F is partially covered (e.g., partially displayed, obscured, and/or masked) by widget 614A and widget 614C is covered (e.g., partially displayed, obscured, and/or masked) by widget 614A and 614F. Computer system 600 further displays representation of current day 613I that includes representation of the current date in the same typeface as representation of current day 613H in FIG. 6AD. In some embodiments, computer system 600 further displays representation of current day 613I that does not include a representation of the current date in the same typeface as representation of current day 613H in FIG. 6AD. Computer system 600 further displays representation of time 608H that includes a visual property (e.g., color, font, character, numeral type, tic mark type, and/or digital/analog) of representation of time 608F displayed in FIG. 6AC. In some embodiments, all aspects (e.g., visual properties (e.g., color, font, character, numeral type, tic mark type, and/or digital/analog) and/or features) of representation of time 608F are included in representation of time 608H. In some embodiments, less than all aspects (e.g., visual properties (e.g., color, font, character, numeral type, tic mark type, and/or digital/analog) and/or features) of representation of time 608F are included in representation of time 608H. In FIG. 6AE, computer system 600 detects rotational input 612AH to scroll the respective set of widgets.

In FIG. 6AF, in response to detecting rotational input 612AH, computer system 600 initiates scrolling widget 614B off display 602 and scrolling widget 614E on to display 602. Widgets that are at the top (e.g., widget 614A) and bottom (e.g., widget 614E) of widget user interface 616D are partially displayed. Widgets that are in the middle (e.g., widgets 614F and 614C) of widget user interface 616D are fully displayed. Computer system 600 detects input 612AI (e.g., tap or long press) corresponding to (e.g., directed to) graphical object 652 associated with widget 614C. In response to detecting input 612AI, computer system 600 initiates playback of audio data associated with widget 614C. Computer system 600 detects counterclockwise rotational input 612AJ (e.g., an input opposite direction of rotational input 612AF in FIG. 6AC) for initiating the display of a respective watch face (e.g., last displayed watch face).

In FIG. 6AG, in response to detecting counterclockwise rotational input 612AJ, computer system displays watch face 606C that includes representation of current day 613G. Unlike in FIG. 6AC, watch face 606C in FIG. 6AG includes notification graphical object 648C. Notification graphical object 648C indicates that an active live session activity is ongoing (e.g., as a result of computer system 600 detecting selection of graphical object 652 in FIG. 6AF). Notification graphical object 648C corresponds to an active live session application (e.g., a music application playing music) corresponding to widget 614C in FIG. 6AF. In some embodiments, computer system 600 does not display notification graphical object 648C in watch face 606C. In FIG. 6AG, computer system 600 detects clockwise rotational input 612AK that initiates a process of displaying a set of widgets.

In FIG. 6AH, in response to detecting clockwise rotational input 612AK, computer system 600 displays widget user interface 618C. However, because widget 614C is actively associated with a live session (e.g., music is playing), widget user interface 618C includes widget 614C at the top of the set of widgets (e.g., as compared to widget 614C being displayed lower in the list when it is not actively associated with a live session in FIG. 6AF). In some embodiments, a respective widget corresponding to a live session is displayed at the top of the set of widgets. In some embodiments, a respective widget corresponding to a live session is displayed below respective pinned widgets (e.g., 614B and 614A) in the set of widgets and above respective unpinned widgets (614F and 614E) in the set of widgets. In FIG. 6AH, computer system 600 detects rotational input 612AL.

In FIG. 6AI, in response to detecting rotational input 612AL, computer system 600 displays scroll widget user interface 616D. Scroll widget interface 616D includes widgets 614C, 614B, 614A, and 614F. Scroll widget interface 616D includes full representations of widgets 614C and 614B and partial representations of widgets 614A and 614F. Because widget 614C corresponds to an active live session (e.g., playing music), computer system 600 displays widget 614C at the top of scroll widget user interface 616D. In FIG. 6AI, computer system 600 detects selection input 612AM (e.g., tap or long press) corresponding to (e.g., directed to) graphical object 654 for pausing audio output. In some embodiments, in response to detecting selection input 612AM, computer system 600 ceases to display (e.g., immediately ceases to display) widget 614C at the top of the set of widgets and displays widget 614C in the position widget 614C was displayed prior the initiation of the live session (e.g., via input 612AI in FIG. 6AF). In some embodiments, in response to detecting input 612AM, computer system 600 continues to display widget 614C at the top of the set of widgets. In some embodiments, in response to detecting selection input 612AM, computer system 600 continues to display widget 614C at the top of the set of widgets until the order of the set of widgets is refreshed (e.g., for example when a watch face is displayed and/or the widgets are scrolled out of view and then scrolled back into to view). In FIG. 6AI, computer system 600 further detects swipe input 612AN corresponding to (e.g., directed to) widget 614B for initiating a process of deleting widget 614B directly from scroll widget interface 616D (e.g., without displaying widget editing interface 626 in FIGS. 6J-6U).

In FIG. 6AJ, in response to detecting swipe input 612AN, computer system 600 displays delete graphical object 654 and ceases to display at least a portion of widget 614B. In some embodiments, in response to swipe input 612AN, computer system 600 ceases to display widget 614B and displays in its place delete graphical object 654. In some embodiments, in response to swipe input 612AN, computer system 600 deletes (e.g., removes from set of widgets) without displaying graphical object 654 and/or detecting additional inputs. In FIG. 6AJ, computer system 600 detects input 612AO (e.g., tap and/or long press) to delete widget 614B.

In FIG. 6AK, in response to detecting input 612AO, computer system 600 displays scroll widget user interface 616D without displaying widget 614B. In FIG. 6AK, widget 614A is displayed in the position widget 614B was displayed in FIG. 6AJ (e.g., prior to deletion). Computer system 600 shifts widgets 614F and 614E higher in the set of widgets, because widget 614B was deleted. In FIG. 6AK, computer system 600 further detects clockwise rotational input 612AP to scroll the respective widget in widget user interface 616D.

In FIG. 6AL, in response to detecting rotational input 612AP, computer system 600 scrolls the set of widgets in scroll widget user interface 616D to the end of the set of widgets. In FIG. 6AL, computer system 600 further detects swipe input 612AQ corresponding to (e.g., directed to) widget 614E for initiating a process to change the pin status of widget 614E directly from scroll widget interface 616D (e.g., without displaying widget editing interface 626 in FIGS. 6J-6U).

In FIG. 6AM, in response to detecting swipe input 612AQ, computer system 600 displays pin graphical object 656 and ceases to display at least a portion of widget 614E. In some embodiments, in response to swipe input 612AQ, computer system 600 ceases to display widget 614F and display in its place pin graphical object 656. In some embodiments, in response to swipe input 612AQ, computer system 600 changes the pin status (e.g., anchors a position of a widget and/or changes a position of a widget) of a respective widget (e.g., widget 614E) without displaying graphical object 656 and/or detecting additional inputs. In FIG. 6AM, computer system 600 detects input 612AR (e.g., tap and/or long press) to change the pin status of widget 614E.

In FIG. 6AN, in response to detecting input 612AR, computer system 600 changes the pin status of widget 614E and displays widget 614E as the lowest pinned widget (e.g., after widget 614A that was previously pinned in FIG. 6K). Computer system 600 displays widget 614E higher in the set of widgets than widget 614F, because widget 614F is in the unpinned widget status. In some embodiments, in response to detecting input 612AR, computer system 600 changes the pin status of widget 614E and displays widget 614E as the highest pinned widget (e.g., before widget 614A that was previously pinned in FIG. 6K). Computer system 600 displays widgets in the pinned status under widgets that correspond to respective active live sessions or widgets that corresponds to respective recently active live sessions (e.g., widget 614C) (e.g., before a refresh of the order of the set of widgets). In FIG. 6AN, computer system 600 detects clockwise rotational input 612AS to scroll the set of widgets.

In FIG. 6AO, in response to detecting clockwise rotational input 612AS, computer system 600 scrolls the set of widgets and displays the end of the set of widgets in scroll widget user interface 616D. Scroll widget user interface 616D further includes graphical object 619 that indicates that end of the set of widgets. Computer system 600 does not display additional widgets (e.g., partially or fully) under widget 614F because the displayed set of widgets is at the end. In FIG. 6AO, computer system 600 detects clockwise rotational input 612AT to initiate the display of all applications.

In FIG. 6AP, in response to continuing to detect rotational input 612AT, computer system 600 displays app launcher interface 622. App launcher interface 622 includes application icons 620A, 620B, 620C, and 620D. In some embodiments, computer system 600 detects a respective input to select to one of application icons 620A, 620B, 620C, and 620D, and in response to detecting the respective input, computer system 600 displays a respective application corresponding the selected one of application icons 620A, 620B, 620C, and 620D. In FIG. 6F, computer system 600 displays application icon 620B at a larger size than application icons 620A, 620C, and 620D, because application icon 620B is located in a central or substantially central position on display 602. In some embodiments, computer system 600 displays a respective set of application icons closer to an edge of display 602 at a smaller size than application icons further away from the edge of display 602. In some embodiments, computer system 600 displays each application icon in the same row of application cions at a substantially same size. In some embodiments, computer system 600 displays each application icon in the same row of application icons at different sizes. In some embodiments, computer system 600 displays a first respective set of application icons closest to a first edge of display 602 at a smaller size than a second respective set of application icons closest to a second (e.g., opposite) edge of display 602. In FIG. 6AP, computer system 600 detects clockwise rotational input 612AU for scrolling the respective application icons in the app launcher interface 622.

In FIG. 6AQ, in response to detecting rotational input 612AU, computer system 600 scrolls the respective application icons in the app launcher interface 622. As a result of scrolling, application icon 620D is scrolled off display 602 and application icon 620E is scrolled onto display 602. Also, because the position of applications icons 620A, 620B, and 620C changes, computer system 600 updates the size of the respective displayed application icons such that application icon 620B is displayed smaller than in FIG. 6AP and application icon 620C is displayed larger than in FIG. 6AP. In FIG. 6AQ, computer system 600 detects depress input 612AV on crown 604, press input 612AW (e.g., physical, tactile, and/or capacitive) on button 605, and rotational input 612AV2.

In FIG. 6AQ1, in response to detecting rotational input 612AV2 in FIG. 6AQ, computer system 600 initiates a process to scroll the respective application icons in app launcher interface 622. However, because computer system 600 determines that the displayed respective application icons are at a terminus (e.g., end and/or beginning) of the scrollable list of app launcher interface 622, computer system 600 changes (e.g., increases and/or decreases) the space (e.g., vertical and/or horizontal) between the respective displayed application icons to indicate the terminus of the scrollable list. In some embodiments, changing the space (e.g., vertical and/or horizontal) between the respective displayed application icons includes changing the size (e.g., bigger and or smaller) of the respective displayed application icons (e.g., 620B, 620C and/or 620E). In some embodiments, changing the space (e.g., vertical and/or horizontal) between the respective displayed application icons includes changing the shape of the respective displayed application icons (e.g., 620B, 620C and/or 620E). In some embodi-ments, changing the space (e.g., vertical and/or horizontal) between the respective displayed application icons includes maintaining at least one application icon (e.g., 620E) at the same (e.g., fixed and/or predetermined) location. In some embodiments, changing the space (e.g., vertical and/or horizontal) between the respective displayed application icons includes changing a respective position on display 602 of multiple application icons (e.g., 620C and 620E). In FIG. 6AQ1, computer system 600 continues to detect rotational input 612AV2.

In FIG. 6AQ2, in response to continuing to detect rotational input 612AV2 in FIG. AQ1, computer system 600 further changes (e.g., increases and/or decreases) the space (e.g., vertical and/or horizontal) between the respective displayed application icons to indicate the terminus of the scrollable list of app launcher interface 622. In FIG. 6AQ2, computer system 600 continues to detect rotational input 612AV2.

In FIG. 6AQ3, in response to continuing to detect rotational input 612AV2 in FIG. AQ2, computer system 600 further changes (e.g., increases and/or decreases) the space (e.g., vertical and/or horizontal) between the respective displayed application icons to indicate the end of the scrollable list. Further, in FIG. 6AQ3, computer system 600 ceases to detect rotational input 612AV2. In response to computer system 600 ceasing to detect rotational input 612AV2, computer system shifts (e.g., moves) the respective application icons (e.g., 620C) back to their respective position as depicted in FIG. 6Q. In some embodiments, shifting the respective application icons (e.g., 620C) back to their respective position as depicted in FIG. 6Q includes not shifting at least on application icon (e.g., 620E). In some embodiments, shifting the respective application icons (e.g., 620C) back to their respective position as depicted in FIG. 6Q includes shifting multiple application icons. In some embodiments, shifting the respective application icons (e.g., 620C) back to their respective position as depicted in FIG. 6Q includes changes the size and or shape of at least on application icon.

In FIG. 6AR, in response to detecting press input 612AW, computer system 600 displays settings user interface 658. Setting user interface 658 includes settings graphical objects 658A-658D. In some embodiments, in response to detecting input (e.g., 612BB1, 612BB2, 612BB3, and/or 612BB4) corresponding to (e.g., directed to) one of graphical objects 658A-658D, computer system 600 initiates a process to modify a respective computer system 600 setting corresponding to the respective graphical object. For example, in response to detecting an input (e.g., 612BB1) to select graphical object 658A, computer system 600 toggles the cellular connectivity property (e.g., setting) for computer system 600. In FIG. 6AR, computer system 600 detects depress input 612BB for displaying a respective watch face (e.g., last displayed watch face). In some embodiments, settings user interface 658 can be displayed in response to a press input at a hardware button for a plurality of different user interfaces (e.g., the same press input of the hardware button will cause the device to display the settings user interface when: the press input is detected while a first application is displayed; the press input is detected while a second application different from the first application is displayed; the press input is detected while a first system user interface such as a time user interface, a notification user interface, or a multitasking user interface is displayed; and/or the press input is detected while a second system user interface different from the first system user interface is displayed. In some embodiments, the hardware button can be used to cause the device to perform other operations (e.g., initiating a process for contacting an emergency contact, initiating a process for placing an emergency call, initiating a process for turning off a power of the device, and/or displaying a user interface that includes one or more options for performing one or more of these operations) in response to a first different input directed to the hardware button (e.g., a long press input that includes a press that has a duration above a respective duration time threshold, where a press input that is not a long press input ends before the respective duration time threshold has been met such as 0.1, 0.2, 0.5, 1, 2, 3, 4, or 5 seconds). In some embodiments, the hardware button can be used to cause the device to perform other operations (e.g., initiating a process for providing a secure credential or making a payment) in response to a second different input (e.g., a multiple press input that includes two or more presses of the hardware button that occur within a time threshold of each other such as 0.01, 0.05, 0.1, 0.2, 0.5, or 1 second).

In FIG. 6AS, in response to detecting depress input 612BB on crown 604, computer system 600 displays watch face 606C and ceases to display settings user interface 658. In FIG. 6AS, while the watch face 606C is displayed, computer system 600 detects a swipe input 612AX that starts at a respective edge (e.g., top, bottom, left, and/or right) of display 602, a counterclockwise rotational input 612AY, and press input 612AZ (e.g., physical, tactile, and/or capacitive) on button 605. In response to detecting press input 612AZ, computer system 600 displays settings user interface 658 as depicted in FIG. 6AR.

In FIG. 6AT, in response to detecting swipe input 612AX (e.g., downward swipe), computer system 600 displays notification interface 660. Notification interface 660 includes notification 660A from a respective application (e.g., phone application). Computer system 600 also displays notification interface 660 of FIG. 6AT in response to computer system 600 detecting depress input 612AV on crown 604 in FIG. 6AQ. Notification 660A includes graphical object 662 and graphical object 664 for interacting with (e.g., responding to and/or answering) notification 660A. In some embodiments, computer system 600 concurrently displays multiple notifications corresponding to multiple respective applications in notification interface 660. In FIG. 6AT, computer system 600 detects input 612BC corresponding to (e.g., directed to) graphical object 662 for initiating a phone call. In FIG. 6AT, computer system 600 detects depress input 612BA for displaying a respective watch face (e.g., last displayed watch face).

FIG. 6AU, in response to detecting depress input 612BA on crown 604, computer system 600 displays watch face 606C and ceases to display notification interface 660. In some embodiments, computer system 600 initiates the process of displaying watch face 606C in FIG. 6AU and ceases to display notification interface 660 in response to detecting input 612BC in FIG. 6AT (e.g., without detecting depress input 612BA). Because computer system 600 detects a live session activity (e.g., a phone call, active ride share, and/or timer) in progress, computer system 600 displays watch face 606C with notification graphical object 648D that indicates (e.g., via text, symbol, icon, and/or image) that a phone call session is in progress. In FIG. 6AU, computer system 600 detects swipe input 612BD that starts at a respective edge (e.g., bottom, top, left, or right) of display 602 for initiating a process to switch the displayed watch face on display 602 and computer system 600 also detects swipe input 612BD1 that starts at a respective edge (e.g., bottom, top, left, or right) of display 602 to initiate displaying widget user interface 618C in FIG. 6AD. In some embodiments, computer system 600 detects a swipe input away from the respective edge (e.g., bottom, top, left, or right) (e.g., non-edge portion of display 602) of display 602 for initiating a process to switch the displayed watch face on display 602.

In FIG. 6AV, in response to detecting swipe input 612BD, computer system 600 displays a different watch face 606D (e.g., the next respective watch face in from a set of watch faces) that includes representation of time 608I. Watch face 606D includes notification graphical object 648D that indicates (e.g., via text, symbol, icon, and/or image) that a phone call session is in progress. Watch face 606D also includes various graphical objects including 606D1, 606D2, and 606D3. While watch face 606D is displayed, computer system 600 detects input 612BF corresponding to graphical object 606D3 (e.g., a numeral indicating the current minute as part of representation of time 608I). While watch face 606D is displayed, computer system 600 also detects a rotational input 612BW (e.g., clockwise or counterclockwise) and swipe input 612BE (e.g., left or right swipe).

In FIG. 6AW, in response to detecting input 612BF corresponding to graphical object 606D3, computer system 600 changes a visual property of graphical object 606D3 (e.g., changes size, animates, changes position, changes orientation, and/or changes color). Additionally, in response to detecting rotational input 612BW and in accordance with a determination that rotational input 612BW was detected within a threshold of time (e.g., 0.4 seconds, 1 second, or 2 seconds) after detecting input 612BF, computer system 600 displays graphical object 606D2 and graphical object 606D3 with a different visual property (e.g., position, orientation, color, animation, and/or size).

In FIG. 6AX, in response to detecting rotational input 612BW and in accordance with a determination that rotational input 612BW was not detected within a threshold of time (e.g., 0.4 seconds, 1 second, or 2 seconds) after detecting input 612BF, computer system 600 displays widget user interface 618D. Widget user interface 618D includes representation of time 608J that is a smaller version of representation of time 608I displayed in FIG. 6AV. In some embodiments, all aspects (e.g., visual properties (e.g., color, font, character, numeral type, tic mark type, and/or digital/analog) and/or features) of representation of time 608I are included in representation of time 608J. In some embodiments, less than all aspects (e.g., visual properties (e.g., color, font, character, numeral type, tic mark type, and/or digital/analog) and/or features) of representation of time 608I are included in representation of time 608J.

Computer system 600 further displays representation of current day 613J that includes a representation of the current date with a default typeface as watch face 606D does not include a representation of current day. Widget user interface 618D further includes widgets 614I, 614A, and 614E. Computer system 600 displays widget 614I as the top widget, because widget 614I corresponds to a live session activity (e.g., a phone call or other real-time communication session) in progress. Computer system 600 display widgets 614I, 614A, and 614E in a stack such that widget 614I is fully visible, widget 614A is under widget 614I and is partially visible, and widget 614E is under widgets 614I and 614A and is partially visible. In some embodiments, computer system 600 detects a selection input corresponding to widget 614I and in response to detecting the selection input, computer system 600 display a phone application, which corresponds to widget 614I. In FIG. 6AX, computer system 600 detects rotational input 612BG for scrolling the widget interface.

In FIG. 6AY, in response to detecting rotational input 612BG, computer system 600 displays scroll widget user interface 616E. Scroll widget interface 616E includes widgets 614I, 614A, 614E, 614F, and 614C. Computer system 600 displays widget 614I at the top of the set of widgets (e.g., above widgets with pinned/unpinned status), because widget 614I corresponds to a live session activity (e.g., a phone call) in progress. Computer system 600 displays widgets that are in the pinned status (e.g., widgets 614A and 614E) above widgets that in the unpinned status (e.g., widgets 614F and 614C). Moreover, at least widget 614I and widget 614A are fully displayed (e.g., visible and/or perceivable) on display 602 and widget 614E is at least partially displayed (e.g., visible and/or perceivable) on display 602. Scroll widget user interface 616E further includes graphical object 619 that indicates that end of the set of widgets. In some embodiments, computer system 600 detects a scroll input, and in response to detecting the scroll input, widgets 614I and 614A are scrolled off display 602 and widgets 614C and 614F are scrolled on to display 602. In some embodiments, computer system 600 detects a scroll input, and in response to detecting the scroll input, computer system 600 initiates displaying an app launcher interface (e.g., app launcher interface 622 in FIGS. 6E-6F).

In FIG. 6AZ, in response to detecting swipe input 612BE, computer system 600 displays a different watch face 606E (e.g., the next respective watch face in from a set of watch faces) that includes representation of time 608K. Watch face 606E includes notification graphical object 648D that indicates (e.g., via text, symbol, icon, and/or image) that a phone call session is in progress. While watch face 606E is displayed, computer system 600 detects input 612BJ. While watch face 606E is displayed, computer system 600 also detects a rotational input 612BH (e.g., clockwise or counterclockwise) and swipe input 612BI (e.g., left or right swipe).

In FIG. 6BA, in response to detecting rotational input 612BH and in accordance with a determination that rotational input 612BH was detected within a threshold of time (e.g., 0.4 seconds, 1 second, or 2 seconds) after detecting input 612BJ, computer system 600 displays representation of time 608K with a different visual property (e.g., position, orientation, color, animation, size, and/or appearance of the numerals (e.g., taller, shorter, and/or wider)).

In FIG. 6BB, in response to detecting rotational input 612BH and in accordance with a determination that rotational input 612BH was not detected within a threshold of time (e.g., 0.4 seconds, 1 second, or 2 seconds) after detecting input 612BJ, computer system 600 displays widget user interface 618E. Widget user interface 618E includes representation of time 608L that is a smaller version of representation of time 608K displayed in FIG. 6AZ. In some embodiments, all aspects (e.g., visual properties (e.g., color, font, character, numeral type, tic mark type, and/or digital/analog) and/or features) of representation of time 608K are included in representation of time 608L. In some embodiments, less than all aspects (e.g., visual properties (e.g., color, font, character, numeral type, tic mark type, and/or digital/analog) and/or features) of representation of time 608K are included in representation of time 608L.

Computer system 600 further displays representation of current day 613K that includes a representation of the current date in a default typeface as watch face 606E does not include a representation of current day. Widget user interface 618E further includes widgets 614I, 614A, and 614E. Computer system 600 displays widget 614I as the top widget, because widget 614I corresponds to a live session activity (e.g., a phone call) in progress. Computer system 600 display widgets 614I, 614A, and 614E in a stack such that widget 614I is fully visible, widget 614A is under widget 614I and is partially visible, and widget 614E is under widgets 614I and 614A and is partially visible. In some embodiments, computer system 600 detects a selection input corresponding to widget 614I and in response to detecting the selection input, computer system 600 display a phone application, which corresponds to widget 614I. In FIG. 6BB, computer system 600 detects rotational input 612BK for scrolling the widget interface.

In FIG. 6BC, in response to detecting rotational input 612BK, computer system 600 displays scroll widget user interface 616F. Scroll widget interface 616F includes widgets 614I, 614A, 614E, 614F, and 614C. Computer system 600 displays widget 614I at the top of the set of widgets (e.g., above widgets with pinned/unpinned status), because widget 614I corresponds to a live session activity (e.g., a phone call) in progress. Computer system 600 displays widgets that are in the pinned status (e.g., widgets 614A and 614E) above widgets that in the unpinned status (e.g., widgets 614F and 614C). Moreover, at least widget 614I and widget 614A are fully displayed (e.g., visible and/or perceivable) on display 602 and widget 614E is at least partially displayed (e.g., visible and/or perceivable) on display 602. Scroll widget user interface 616F further includes graphical object 619 that indicates that end of the set of widgets. In some embodiments, computer system 600 detects a scroll input, and in response to detecting the scroll input, widgets 614I and 614A are scrolled off display 602 and widgets 614C and 614F are scrolled on to display 602. In some embodiments, computer system 600 detects a scroll input, and in response to detecting the scroll input, computer system 600 initiates displaying an app launcher interface (e.g., app launcher interface 622 in FIGS. 6E-6F).

In FIG. 6BD, in response to detecting swipe input 612BI, computer system 600 displays a different watch face 606F (e.g., the next respective watch face in from a set of watch faces) that includes representation of time 608M. Watch face 606F includes notification graphical object 648D that indicates (e.g., via text, symbol, icon, and/or image) that a phone call session is in progress. While watch face 606F is displayed, computer system 600 detects input 612BN. While watch face 606F is displayed, computer system 600 also detects rotational input 612BL (e.g., clockwise or counterclockwise) and swipe input 612BI (e.g., left or right swipe).

In FIG. 6BE, in response to detecting rotational input 612BL and in accordance with a determination that rotational input 612BL was detected within a threshold of time (e.g., 0.4 seconds, 1 second, or 2 seconds) after detecting input 612BN, computer system 600 displays representation of time 608M with a different visual property (e.g., position, orientation, color, animation, size, and/or appearance of the numerals (e.g., taller, shorter, and/or wider)) and different functionality (e.g., computer system 600 displays a scrollable list of selectable graphical objects corresponding to different time zones). In some embodiments, in response to detecting a continuation of input rotational input 612BL, computer system 600 scrolls the lists of graphical objects corresponding to different time zones displayed in representation of time 608M.

In FIG. 6BF, in response to detecting rotational input 612BL and in accordance with a determination that rotational input 612BL was not detected within a threshold of time (e.g., 0.4 seconds, 1 second, or 2 seconds) after detecting input 612BN, computer system 600 displays widget user interface 618F. Widget user interface 618F includes representation of time 608N that is a smaller version of representation of time 608M depicted in FIG. 6BD. In some embodiments, all aspects (e.g., visual properties (e.g., color, font, character, numeral type, tic mark type, and/or digital/analog) and/or features) of representation of time 608M are included in representation of time 608N. In some embodiments, less than all aspects (e.g., visual properties (e.g., color, font, character, numeral type, tic mark type, and/or digital/analog) and/or features) of representation of time 608M are included in representation of time 608N.

Computer system 600 further displays representation of current day 613L that includes a representation of the current date in a default typeface as watch face 606BF does not include a representation of current day. Widget user interface 618F further includes widgets 614I, 614A, and 614E. Computer system 600 displays widget 614I as the top widget, because widget 614I corresponds to a live session activity (e.g., a phone call) in progress. Computer system 600 display widgets 614I, 614A, and 614E in a stack such that widget 614I is fully visible, widget 614A is under widget 614I and is partially visible, and widget 614E is under widgets 614I and 614A and is partially visible. In some embodiments, computer system 600 detects a selection input corresponding to widget 614I and in response to detecting the selection input, computer system 600 display a phone application, which corresponds to widget 614I. In FIG. 6BF, computer system 600 detects rotational input 612BO for initiating scrolling the widgets.

In FIG. 6BG, in response to detecting rotational input 612BO, computer system 600 displays scroll widget user interface 616G. Scroll widget interface 616G includes widgets 614I, 614A, 614E, 614F, and 614C. Computer system 600 displays widget 614I at the top of the set of widgets (e.g., above widgets with pinned/unpinned status), because widget 614I corresponds to a live session activity (e.g., a phone call) in progress. Computer system 600 displays widgets that are in the pinned status (e.g., widgets 614A and 614E) above widgets that in the unpinned status (e.g., widgets 614F and 614C). Moreover, at least widget 614I and widget 614A are fully displayed (e.g., visible and/or perceivable) on display 602 and widget 614E is at least partially displayed (e.g., visible and/or perceivable) on display 602. Scroll widget user interface 616G further includes graphical object 619 that indicates that end of the set of widgets. In some embodiments, computer system 600 detects a scroll input, and in response to detecting the scroll input, widgets 614I and 614A are scrolled off display 602 and widgets 614C and 614F are scrolled on to display 602. In some embodiments, computer system 600 detects a scroll input, and in response to detecting the scroll input, computer system 600 initiates displaying an app launcher interface (e.g., app launcher interface 622 in FIGS. 6E-6F).

In FIG. 6BH, in response to detecting swipe input 612BM, computer system 600 displays a different watch face 606G (e.g., the next respective watch face in from a set of watch faces) that includes representation of time 608O. Watch face 606G includes notification graphical object 648D that indicates (e.g., via text, symbol, icon, and/or image) that a phone call session is in progress. While watch face 606G is displayed, computer system 600 detects input 612BQ (e.g., tap or swipe). While watch face 606G is displayed, computer system 600 also detects rotational input 612BP (e.g., clockwise or counterclockwise) and swipe input 612BR (e.g., left or right swipe).

In FIG. 6BI, in response to detecting rotational input 612BP and in accordance with a determination that rotational input 612BP was detected within a threshold of time (e.g., 0.4 seconds, 1 second, or 2 seconds) after detecting input 612BQ, computer system 600 displays representation of time 608O with a different visual property (e.g., position, orientation, color, animation, size, and/or appearance of the numerals (e.g., taller, shorter, and/or wider)) and different functionality (e.g., computer system 600 displays a sun's position in the sky at a future time). In some embodiments, in response to detecting a continuation of rotational input 612BP, computer system 600 continues to preview/change within representation of time 608O the sun's future position in the sky.

In FIG. 6BJ, in response to detecting rotational input 612BP and in accordance with a determination that rotational input 612BP was not detected within a threshold of time (e.g., 0.4 seconds, 1 second, or 2 seconds) after detecting input 612BQ, computer system 600 displays widget user interface 618G. Widget user interface 618G includes representation of time 608P that is a smaller version of representation of time 608O depicted in FIG. 6BH. In some embodiments, all aspects (e.g., visual properties (e.g., color, font, character, numeral type, tic mark type, and/or digital/analog) and/or features) of representation of time 608O are included in representation of time 608P. In some embodiments, less than all aspects (e.g., visual properties (e.g., color, font, character, numeral type, tic mark type, and/or digital/analog), functionality, and/or features) of representation of time 608O are included in representation of time 608P.

Computer system 600 further displays representation of current day 613N that includes a representation of the current date with the same (e.g., substantially and/or largely similar) typeface as representation of current day 613M depicted watch face 606G. Widget user interface 618G further includes widgets 614I, 614A, and 614E. Computer system 600 displays widget 614I as the top widget, because widget 614I corresponds to a live session activity (e.g., a phone call) in progress. Computer system 600 display widgets 614I, 614A, and 614E in a stack such that widget 614I is fully visible, widget 614A is under widget 614I and is partially visible, and widget 614E is under widgets 614I and 614A and is partially visible. In some embodiments, computer system 600 detects a selection input corresponding to widget 614I and in response to detecting the selection input, computer system 600 display a phone application, which corresponds to widget 614I. In FIG. 6BJ, computer system 600 detects rotational input 612BS for initiating scrolling the respective widgets.

In FIG. 6BK, in response to detecting rotational input 612BS, computer system 600 displays scroll widget user interface 616H. Scroll widget interface 616H includes widgets 614I, 614A, 614E, 614F, and 614C. Computer system 600 displays widget 614I at the top of the set of widgets (e.g., above widgets with pinned/unpinned status), because widget 614I corresponds to a live session activity (e.g., a phone call) in progress. Computer system 600 displays widgets that are in the pinned status (e.g., widgets 614A and 614E) above widgets that in the unpinned status (e.g., widgets 614F and 614C). Moreover, at least widget 614I and widget 614A are fully displayed (e.g., visible and/or perceivable) on display 602 and widget 614E is at least partially displayed (e.g., visible and/or perceivable) on display 602. Scroll widget user interface 616H further includes graphical object 619 that indicates that end of the set of widgets. In some embodiments, computer system 600 detects a scroll input, and in response to detecting the scroll input, widgets 614I and 614A are scrolled off display 602 and widgets 614C and 614F are scrolled on to display 602. In some embodiments, computer system 600 detects a scroll input, and in response to detecting the scroll input, computer system 600 initiates displaying an app launcher interface (e.g., app launcher interface 622 in FIGS. 6E-6F).

In FIG. 6BL, in response to detecting swipe input 612BR, computer system 600 displays a different watch face 606H (e.g., the next respective watch face in from a set of watch faces) that includes representation of time 608Q. Watch face 606H includes notification graphical object 648D that indicates (e.g., via text, symbol, icon, and/or image) that a phone call session is in progress. Watch face 606H further includes information platter 606H1 and information platter 606H2. While watch face 606H is displayed, computer system 600 detects input 612BT (e.g., tap or swipe). While watch face 606H is displayed, computer system 600 also detects rotational input 612BU (e.g., clockwise or counterclockwise). While watch face 606H is displayed, computer system 600 also detects swipe (e.g., upward) input 612BT1 and swipe input (e.g., upward) 612BT2.

In FIG. 6BM, in response to detecting rotational input 612BU and in accordance with a determination that rotational input 612BU was detected within a threshold of time (e.g., 0.4 seconds, 1 second, or 2 seconds) after detecting input 612BT, computer system 600 initiates scrolling information platter 606H1, information platter 606H2, and displaying information platter 606H3, which was not displayed prior to detecting rotational input 612BU, on watch face 606H. In some embodiments, in response to detecting a continuation of rotational input 612BU, computer system 600 continues to scroll the respective informational platters on watch face 606H.

In FIG. 6BM, in response to detecting swipe input 612BT1 that starts at away from a respective edge (e.g., non-edge portion) of display 602, computer system 600 initiates scrolling information platter 606H1, information platter 606H2, and displaying information platter 606H3, which was not displayed prior to detecting swipe input 612BT1, on watch face 606H. In some embodiments, computer system 600 initiates scrolling information platter 606H1, information platter 606H2, and displaying information platter 606H3, on watch face 606H irrespective of detecting input 612BT1 (e.g., not based on detecting input 612BT). In some embodiments, in response to detecting a continuation of swipe input 612BT1, computer system 600 continues to scroll the respective informational platters on watch face 606H.

In FIG. 6BN, in response to detecting rotational input 612BU and in accordance with a determination that rotational input 612BU was not detected within a threshold of time (e.g., 0.4 seconds, 1 second, or 2 seconds) after detecting input 612BT, computer system 600 displays widget user interface 618H. Computer system 600 also displays widget user interface 618H in response to detecting swipe input 612BT2 in FIG. 6BL that starts at a respective edge of display 602. In some embodiments, computer system 600 displays widget user interface 618H in response to detecting swipe input 612BT2 in FIG. 6BL irrespective of detecting input 612BT2 (e.g., not based on detecting input 612BT). Widget user interface 618H includes representation of time 608R that is a smaller version of representation of time 608Q depicted in FIG. 6BL. In some embodiments, all aspects (e.g., visual properties (e.g., color, font, character, numeral type, tic mark type, and/or digital/analog) and/or features) of representation of time 608Q are included in representation of time 608R. In some embodiments, less than all aspects (e.g., visual properties (e.g., color, font, character, numeral type, tic mark type, and/or digital/analog), functionality, and/or features) of representation of time 608Q are included in representation of time 608R.

Computer system 600 further displays representation of current day 613P that includes a representation of the current date with the same (e.g., substantially and/or largely similar) typeface as representation of current day 613O depicted in watch face 606H. Widget user interface 618H further includes widgets 614I, 614A, and 614E. Computer system 600 displays widget 614I as the top widget, because widget 614I corresponds to a live session activity (e.g., a phone call) in progress. Computer system 600 display widgets 614I, 614A, and 614E in a stack such that widget 614I is fully visible, widget 614A is under widget 614I and is partially visible, and widget 614E is under widgets 614I and 614A and is partially visible. In some embodiments, computer system 600 detects a selection input corresponding to widget 614I and in response to detecting the selection input, computer system 600 display a phone application, which corresponds to widget 614I. In FIG. 6BN, computer system 600 detects rotational input 612BV for initiating scrolling the respective widgets.

In FIG. 6BO, in response to detecting rotational input 612BV, computer system 600 displays scroll widget user interface 616I. Scroll widget interface 616I includes widgets 614I, 614A, 614E, 614F, and 614C. Computer system 600 displays widget 614I at the top of the set of widgets (e.g., above widgets with pinned/unpinned status), because widget 614I corresponds to a live session activity (e.g., a phone call) in progress. Computer system 600 displays widgets that are in the pinned status (e.g., widgets 614A and 614E) above widgets that in the unpinned status (e.g., widgets 614F and 614C). Moreover, at least widget 614I and widget 614A are fully displayed (e.g., visible and/or perceivable) on display 602 and widget 614E is at least partially displayed (e.g., visible and/or perceivable) on display 602. Scroll widget user interface 616I further includes graphical object 619 that indicates that end of the set of widgets. In some embodiments, computer system 600 detects a scroll input, and in response to detecting the scroll input, widgets 614I and 614A are scrolled off display 602 and widgets 614C and 614F are scrolled on to display 602. In some embodiments, computer system 600 detects a scroll input, and in response to detecting the scroll input, computer system 600 initiates displaying an app launcher interface (e.g., app launcher interface 622 in FIGS. 6E-6F).

FIG. 7 is a flow diagram illustrating a method for 700 using a computer system in accordance with some embodiments. Method 700 is performed at a computer system (e.g., 100, 300, 500 and/or 600) (e.g., a smart phone, a smart watch, a laptop, a desktop computer, TV, and/or a tablet) that is in communication with a display generation component (e.g., 602) (e.g., a display controller, a touch-sensitive display system, and/or a display (e.g., integrated and/or connected)) and one or more input devices (e.g., rotatable input mechanism 604 and/or touch sensitive portion of display 602) (e.g., a touch-sensitive surface, a touchscreen, a button, a rotatable input device, a rotatable and depressible input device, and/or a microphone). Some operations in method 700 are, optionally, combined, the orders of some operations are, optionally, changed, and some operations are, optionally, omitted.

In some embodiments, the electronic device (e.g., 600) is a computer system. The computer system is optionally in communication (e.g., wired communication and/or wireless communication) with a display generation component (e.g., 602) and with one or more input devices (e.g., touch-sensitive portion of display 602 and/or rotatable input mechanism 604). The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for displaying and editing widgets. The method reduces the cognitive burden on a user for displaying and editing widgets, thereby creating a more efficient human-machine interface. For battery-operated computing devices, enabling a user to display and edit various widgets faster and more efficiently conserves power and increases the time between battery charges.

The computer system (e.g., 600) displays (702), via the display generation component (e.g., 602), a first wake screen user interface (e.g., 606A) (e.g., a first watch face and/or a first lock screen). In some embodiments, the wake screen user interface is an initially displayed screen of the computer system when the computer system transitions from a low power state (e.g., an off state, a sleeping state, a low power mode, a battery saver mode, and/or an eco-mode) to a higher power state (e.g., an active state, an on state, and/or a normal (non-low power) mode). While displaying the first wake screen user interface (e.g., 606A-606H), the computer system detects (704), via the one or more input devices (e.g., rotatable input mechanism 604 and/or touch sensitive portion of display 602), a first input (e.g., 612A) (e.g., touch input(s), rotational input(s), press input(s), swipe input(s), an input using a mouse/cursor, and/or air gesture(s)) of a first type input (e.g., clockwise rotational input 612A) (e.g., a swipe input, a clockwise rotational input, a tap input, using a mouse/cursor, and/or air gesture(s)). In response to detecting the first input, computer system displays (706), via the display generation component (e.g., 602), a set of widgets (e.g., widgets 614A, 614B and/or 614C). In some embodiments, the set of widgets includes a widget that includes a user interface element that includes content and/or information from a respective application (e.g., a first widget of the set of widgets displays information from a first application (e.g., with or without displaying information from a second application) and a second widget of the set of widgets displays information from the second application (without displaying information from the first application)). In some embodiments, the set of widgets includes a widget that includes information that is updated over time in response to the computer system receiving updated or additional information from a respective application. In some embodiments, in response to detecting selection (e.g., via a touch input, rotational input, press input, swipe input, an input using a mouse/cursor, and/or air gestures) of a widget of the set of widgets, the computer system displays a user interface of a respective application associated with (e.g., corresponding to) the selected widget (e.g., an application from which received information is displayed by the selected widget). In some embodiments, the size, position, appearance, and/or content displayed by a widget is user-configured and/or user configurable (e.g., via user input). In some embodiments, the set of widgets is a representation of a set of two or more widgets through which the computer system can scroll (e.g., in response to receiving a user scroll input and/or rotation of the rotatable input mechanism). In some embodiments, the set of widgets includes content from a subset (e.g., one, two, and/or less than all) of widgets at a time (e.g., the set of widgets displays content from a single widget of available widgets without displaying content from any other available widgets while optionally displaying at least a portion of a second widget). In some embodiments, the set of widgets is arranged in a sequence, and in response to input (e.g., user input and/or system input), the computer system changes the sequence in which the set of widgets are arranged based on the input (e.g., changes which widget is on top or first in the sequence). In some embodiments, the widget is a graphical object that allows a user to interact with an application or website. In some embodiments, a widget represents a specific function or piece of information. In some embodiments, a widget includes a combination of at least one graphical object (e.g., button and/or icon) that, when activated, perform an action, and a graphical object (e.g., text box and/or notification) that includes information. In some embodiments, a widget corresponds to a complication displayed in a watch face and/or lock screen. Subsequent to displaying the first wake screen user interface (e.g., 606A), computer system (e.g., 600) displays (708), via the display generation component, a second wake screen user interface (e.g., 606B in FIG. 6H) (e.g., a second watch face and/or a second lock screen) that is different from the first wake screen user interface (e.g., 606A in FIG. 6A). In some embodiments, the second wake screen user interface is displayed in response to the computer system detecting a user input. In some embodiments, the second wake screen user interface is displayed automatically (e.g., without user input). In some embodiments, the second wake screen user interface is displayed in response to detecting a set of one or more user inputs while displaying the first wake screen user interface. In some embodiments, while displaying the first wake screen user interface, the computer system detects a swipe input in a direction (e.g., left, right, up, down, diagonal, and/or another direction), and in response to detecting the swipe input, the computer system ceases to display the first wake screen user interface and displays the second wake screen user interface. In some embodiments, while displaying the first wake screen user interface, the computer system detects an input (e.g., long press double tap, touch input, rotational input, swipe input, an input using a mouse/cursor, and/or air gesture(s)) and in response to detecting the input, the computer system displays a wake screen user interface selection interface to change the respective wake screen interface. In some embodiments, the wake screen user interface selection interface includes a plurality of wake screen user interfaces including the second wake screen user interface. In some embodiments, a user can scroll/traverse the plurality of wake screen user interfaces and can select one of the plurality of wake screen user interfaces to replace the displayed the first wake screen user interface. In some embodiments, in accordance with a determination that the user selected (e.g., via a touch input, rotational input, press input, swipe input, an input using a mouse/cursor, and/or air gestures)) the second wake screen user interfaces, the computer system ceases to display the wake screen user interface selection interface and displays the second wake screen user interface as the displayed wake screen. While displaying the second wake screen user interface (e.g., 606B in FIG. 6H), computer system 600 detects (710), via the one or more input devices (e.g., rotatable input mechanism 604), a second input of the first type (e.g., clockwise rotational input 612H) (e.g., a swipe input, a clockwise rotational input, and/or a tap input). In some embodiments, the first input and the second input are both swipe inputs (e.g., in the same direction and/or that originate from the same side of a touch-sensitive surface). In some embodiments, the first input and the second input are both rotational inputs (e.g., in the same direction and/or with the same magnitude) detected at or directed to a rotational input mechanism. In response to detecting the second input (e.g., 612H), computer system displays (712), via the display generation component, the set of widgets (e.g., widgets 614A, 614B, and/or 614C in FIG. 6I). Providing the same set of widgets from different wake screen user interfaces (e.g., watch faces) allows a user to access an operation quickly and easily from a respective wake screen user interface and, as a result, reduces the number of inputs needed to perform the operation.

In some embodiments, the one or more input devices includes a rotatable input mechanism (e.g., 604) (e.g., a rotatable and depressible input mechanism and/or an input device that rotates around an axis) and wherein the first type of input is a rotational input (e.g., 612A and/or 612B) received via the rotatable input mechanism (e.g., 604). In some embodiments, the first input is a first rotational input, via the rotatable input mechanism, in a first direction (e.g., clockwise or counterclockwise), and wherein the second input is a second rotational input via the rotatable input mechanism in a second direction (e.g., same as first direction or different from first direction). Displaying the set of widgets in response to a rotational input provides the user with more control of the computer system by helping the user to perform more precise inputs.

In some embodiments, the first type of input is a first swipe input (e.g., swipe gesture 612A1 in FIG. 6A, swipe gesture 612BD1 in FIG. 6AU, or swipe gesture 612BT2 in FIG. 6BL) (e.g., including a touch component and/or an air gesture component) received via the one or more input devices (e.g., touch-sensitive portion of 602). In some embodiments, the first swipe input is in a direction (e.g., horizontal (e.g., left or right), substantially horizontal (e.g., left or right), vertical (e.g., up or down), substantially vertical (e.g., up or down), diagonal, or substantially diagonal). Displaying the set of widgets in response to a swipe input provides the user with more control of the computer system by helping the user to perform more precise inputs.

In some embodiments, while displaying the first wake screen user interface (e.g., 606A, 606C, or 606H), computer system (e.g., 600) detects, via the one or more input devices (e.g., touch-sensitive portion of 602), a second swipe input (e.g., 612A1 in FIG. 6A, 612AX in FIG. 6AS, 612BD in FIG. 6AU, 612BD1 in FIG. 6AU, or 612BT2 in FIG. 6BL) (e.g., horizontal (e.g., left or right), substantially horizontal (e.g., left or right), vertical (e.g., up or down), substantially vertical (e.g., up or down), diagonal or substantially diagonal). In some embodiments, in response to detecting the second swipe input and in accordance with a determination that the second swipe input is in a first direction (e.g., horizontal (e.g., left or right), substantially horizontal (e.g., left or right), vertical (e.g., up or down), substantially vertical (e.g., up or down), diagonal or substantially diagonal), computer system (e.g., 600) displays, via the display generation component (e.g., 602), the set of widgets (e.g., (widgets 614A, 614B, and/or 614C in FIG. 6C) and/or (widgets 614I, 614A and 614E in FIG. 6BN)). In some embodiments, in response to detecting the second swipe input and in accordance with a determination that the second swipe input is in a second direction different from (e.g., opposite and/or perpendicular to) the first direction, computer system (e.g., 600) displays, via the display generation component, a first user interface that does not include the set of widgets (e.g., different watch face 606D in response to 612BD or notification interface 660 in FIG. 6AT in response to 612AX). In some embodiments, the second swipe input is different from the first swipe input. In some embodiments, the second swipe input is the same as the first swipe input. In some embodiments, in accordance with a determination that the second direction corresponds to a substantially downward direction, displaying, via the display generation component, a set of one more received notifications (e.g., message(s), email(s), system notification(s), reminder(s), and/or alert(s)). In some embodiments, the notifications are received from an application on the computer system. In some embodiments, a notification from the set of one or more notifications corresponds to a widget from the set of one or more widgets. In some embodiments, none of the notifications from the set of one or more notifications correspond any of the widgets in the set of one or more widgets. In some embodiments, activation of (e.g., touch input (e.g., tap input or long press), an input using a mouse/cursor, and/or air gesture on/directed to) a respective notification displays a user interface of an application corresponding to the respective notification. In some embodiments, in accordance with a determination that the second direction corresponds to a substantially horizontal direction (e.g., left or right), displaying, via the display generation component, a different wake screen user interface (e.g., a wake screen user interface that is different from the first and/or second wake screen user interface). In some embodiments, the set of widgets are displayed in response to detecting the first input and in accordance with a determination that the first swipe input is in a first direction (e.g., horizontal (e.g., left or right), substantially horizontal (e.g., left or right), vertical (e.g., up or down), substantially vertical (e.g., up or down), diagonal or substantially diagonal). In some embodiments. in response to detecting the first input and in accordance with a determination that the first swipe input is in a second direction different from (e.g., opposite and/or perpendicular to) the first direction, the computer system displays, via the display generation component, a first user interface that does not include the set of widgets. Changing wake screen user interfaces from one to another in response to a first swipe input provides the user with a quick and easy way to change the wake screens, and, as a result, reduces the number of inputs needed to perform an operation. Displaying a user interface with notifications (e.g., different from the application launcher user interface and does not include the set of one or more widget) in response to a swipe input while displaying the time user interface provides for a quick and easy way to display notifications and, as a result, reduces the number of inputs needed to perform an operation and provides the user with visual feedback of received notifications.

In some embodiments, the display generation component includes a display device (e.g., 602) and wherein the first swipe input (e.g., swipe gesture 612A1 in FIG. 6A, swipe gesture 612BD1 in FIG. 6AU, or swipe gesture 612BT2 in FIG. 6BL) starts at an edge (e.g., border, boundary, and/or margin) of the display device (e.g., an edge portion of 602). In some embodiments, the edge corresponds to one of the bottom, top, left, or right edges of the display device. In some embodiments, the second swipe input starts the edge of the display device. Performing an operation in response to starting a swipe gesture from edge region provides for a quick and precise way to control the displayed content and, as a result, reduces the number of inputs needed to perform an operation like switching watch faces or displaying notifications.

In some embodiments, while displaying the first wake screen user interface (e.g., watch face 606A, watch face 606C, or watch face 606H), computer system (e.g., 600) detects, via the one or more input devices, a third swipe input (e.g., 612A1 in FIG. 6A, 612AX in FIG. 6AS, 612BD in FIG. 6AU. 612BD1 in FIG. 6AU, or 612BT1 in FIG. 6BL) (e.g., horizontal (e.g., left or right), substantially horizontal (e.g., left or right), vertical (e.g., up or down), substantially vertical (e.g., up or down), diagonal or substantially diagonal). In some embodiments, in response to detecting the third swipe input and in accordance with a determination that the third swipe input starts at a first edge (e.g., a respective edge of 602) (e.g., border, boundary, and/or margin) (e.g., bottom, top, left, or right) (e.g., of a display device of the display generation component), computer system (e.g., 600) displays, via the display generation component (e.g., 602), the set of widgets (e.g., (widgets 614A, 614B, and/or 614C in FIG. 6C) and/or (widgets 614I, 614A and 614E in FIG. 6BN)). In some embodiments, in response to detecting the third swipe input and in accordance with a determination that the third swipe input starts at a second edge (e.g., border, boundary, and/or margin) (e.g., of a display device of the display generation component), different from (e.g., opposite and/or perpendicular to) the first edge, computer system (e.g., 600) displays, via the display generation component (e.g., 602), a second user interface that does not include the set of widgets (e.g., different watch face 606D in response to 612BD or notification interface 660 in FIG. 6AT in response to 612AX). In some embodiments, the third swipe input is different from the first and/or second swipe input(s). In some embodiments, the second swipe input is the same as the first and/or second swipe input(s). In some embodiments, the first user interface is the same as the second user interface. In some embodiments, the first user interface is different from the second user interface. In some embodiments, in accordance with a determination that the second edge corresponds to top edge, the computer system displays, via the display generation component, a set of one more received notifications (e.g., message(s), email(s), system notification(s), reminder(s), and/or alert(s)). In some embodiments, the notifications are received from an application on the computer system. In some embodiments, a notification from the set of one or more notifications corresponds to a widget from the set of one or more widgets. In some embodiments, none of the notifications from the set of one or more notifications correspond any of the widgets in the set of one or more widgets. In some embodiments, activation of (e.g., touch input (e.g., tap input or long press), an input using a mouse/cursor, and/or air gesture on/directed to) a respective notification displays a user interface of an application corresponding to the respective notification. In some embodiments, in accordance with a determination that the second edge (e.g., of a display device of the display generation component) corresponds to either a left edge or the right edge, the computer system displays, via the display generation component, a different wake screen user interface (e.g., a wake screen user interface that is different from the first and/or second wake screen user interface). In some embodiments, the set of widgets are displayed in response to detecting the first input and in accordance with a determination that the first swipe input starts at a first edge (e.g., bottom, top, left, or right) (e.g., of a display device of the display generation component). In some embodiments, in response to detecting the first input and in accordance with a determination that the first swipe input starts at a second edge (e.g., of a display device of the display generation component), different from (e.g., opposite and/or perpendicular to) the first edge, the computer system displays, via the display generation component, a second user interface that does not include the set of widgets. Changing wake screen user interfaces from one to another in response to a first swipe input provides the user with a quick and easy way to change the wake screens, and, as a result, reduces the number of inputs needed to perform an operation. Displaying a user interface with notifications (e.g., different from the application launcher user interface and does not include the set of one or more widget) in response to a swipe input while displaying the time user interface provides for a quick and easy way to display notifications and, as a result, reduces the number of inputs needed to perform an operation and provides the user with visual feedback of received notifications.

In some embodiments, while displaying the first wake screen user interface (e.g., watch face 606A, watch face 606C, or watch face 606H), computer system (e.g., 600) detects, via the one or more input devices (e.g., touch-sensitive portion of 602), a fourth swipe input (e.g., 612BT1) (e.g., different from the first swipe input, second swipe input, and third swipe input), wherein the fourth swipe input starts at a (e.g., is initiated at and/or first portion of the swipe input is at) non-edge region (e.g., away from an edge (e.g., border, boundary, and/or margin)) of the display device (e.g., 602). In some embodiments, in response to detecting the fourth swipe input (e.g., 612BT1), computer system (e.g., 600) performs an operation (e.g., scrolling content displayed in watch face 606H in FIG. 6BL and FIG. 6BM) different from a respective operation performed (e.g., changing a watch face and/or displaying a notification user interface) when the first swipe input (e.g., 612BT2 or 612AX) starts at a respective edge (e.g., border, boundary, and/or margin) (e.g., top, bottom, left, or right) of the display device. In some embodiments, performing an operation different from a respective operation includes scrolling content displayed in the first wake screen. In some embodiments, performing the different operation includes changing the displayed content and not displaying the set of widgets. In some embodiments, performing the different operation includes changing the displayed content and displaying the set of widgets after a predetermined threshold (e.g., duration and/or magnitude). Performing a different operation in response to starting a swipe gesture from the non-edge region provides for a quick and easy way to control the displayed content and, as a result, reduces the number of inputs needed to perform an operation.

In some embodiments, in response to detecting the first input (e.g., 612A and/or 612B), computer system (e.g., 600) displays, via the display generation component (e.g., 602), a first system user interface (e.g., 618H) that includes one or more visual elements (e.g., a representation of a clock 608C and/or representation of a current day(e.g., date) 613C) (e.g., font, color, animation style (e.g., character appearance and/or character animation) of a clock/time element, and/or visual style of clock/time element (e.g., numeral type, tic mark type, and/or digital vs analog)) that are based on the first wake screen user interface (e.g., 606A) (e.g., based on visual elements of the first wake screen user interface) (e.g., and not based on the second wake screen user interface). In some embodiments, the set of widgets is displayed concurrently with the system user interface. In some embodiments, the set of widgets is displayed as part of the system user interface. In some embodiments, in response to detecting the second input (e.g., 612H), the computer system (e.g., 600) displays, via the display generation component (e.g., 602), a second system user interface (e.g., 618B) (e.g., different from the first system user interface) that includes one or more visual elements (e.g., a representation of a clock 608E and/or representation of a current day 613E) (e.g., font, color, animation style (e.g., character appearance, character animation) of a clock/time element, and/or visual style of clock/time element (e.g., numeral type, tic mark type, and/or digital vs analog)) that are based on the second wake screen user interface (e.g., based on visual elements of the second wake screen user interface) (e.g., and not based on the visual elements of the first wake screen user interface). In some embodiments, the set of widgets is displayed concurrently with the second system user interface. In some embodiments, the set of widgets is displayed as part of the second system user interface. In some embodiments, a visual indication of time (e.g., 608C) of the first system user interface (e.g., 618A) is based on the visual appearance of a visual indication of time (e.g., 608A) of the first wake screen user interface (e.g., 606A). In some embodiments, a visual indication of time of the second system user interface (e.g., 608E) is based on the visual appearance of a visual indication of time of the second wake screen user interface (e.g., 606B). In some embodiments, in response to detecting the first input (e.g., 612C and/or 612H), the computer system (e.g., 600) displays, via the display generation component, the first system user interface (e.g., 618A and/or 616A) that includes one or more visual elements (e.g., elements within 613C and/or elements within 608C) with a first visual characteristic (e.g., typeface, color, animation style (e.g., character appearance, and/or character animation) of a clock/time element (e.g., an element of 608, an element of 608D, an element of 606A, an element of 606B, and/or an element of 608C), visual style of clock/time element (e.g., an element of 608, an element of 608D, an element of 606A, an element of 606B, and/or an element of 608C) (e.g., numeral type, tic mark type, and/or digital vs analog)), wherein the system user interface (e.g., 618A) includes the set of widgets (e.g., 614A-614C), wherein a first value (e.g., font type, color type, animation type, character properties (e.g., hands, face, body, and/or clothes)) of the first visual characteristic (e.g., typeface, color, animation style (e.g., character appearance, and/or character animation) of a clock/time element (e.g., an element of 608, an element of 608D, an element of 606A, an element of 606B, and/or an element of 608C), visual style of clock/time element (e.g., numeral type, tic mark type, and/or digital vs analog)) of the system user interface (e.g., 618A) corresponds to the first value of first visual characteristic (e.g., typeface, color, animation style (e.g., character appearance and/or character animation) of a clock/time element, visual style of clock/time element (e.g., numeral type, tic mark type, and/or digital vs analog)) of the first wake screen user interface (e.g., 606A and/or 606B). In some embodiments, in response to detecting the second input (e.g., 612H), the computer system displays, via the display generation component the system user interface (e.g., 618H) with the first visual characteristic (e.g., typeface, color, animation style (e.g., character appearance, character animation) of a clock/time element (e.g., an element of 608, an element of 608D, an element of 606A, an element of 606B, and/or an element of 608C), and/or visual style of clock/time element (e.g., an element of 608, an element of 608D, an element of 606A, an element of 606B, and/or an element of 608C) (e.g., numeral type, tic mark type, and/or digital vs analog)), wherein the system user interface includes the set of widgets (e.g., 614A-614C), wherein a second value (e.g., font type, color type, animation type, and/or character properties (e.g., hands, face, body, and/or clothes)) of the first visual characteristic of the system user interface (e.g., 618B) corresponds the second value of the first visual characteristic of the second wake screen user interface (e.g., 606A and/or 606B). In some embodiments, the first value (e.g., the typeface of 613A and/or 608A) and second value (e.g., the typeface of 613C and/or 608C) of the visual characteristics are the same. In some embodiments, the first value and second value of the visual characteristics are different. In some embodiments, each visual characteristic can include multiple distinct values (e.g., multiple fonts, multiple colors, and/or multiple animation styles). In some embodiments, the system user interface concurrently displays the set of widgets (e.g., 614A-614C) and a first set of one or more system user interface objects (e.g., 608C) (e.g., a representation of the date and/or a representation of the time). In some embodiments, a respective visual characteristic can be a combination of visual characteristics (e.g., typeface, color, animation style (e.g., character appearance and/or character animation) of a clock/time element, and/or visual style of clock/time element (e.g., numeral type, tic mark type, and/or digital vs analog)). Updating the system user interface to reflect an appearance of the wake screen user interface provides the user with feedback about the current state of system user interface and provides visual feedback to the user indicating which wake user interface screen would be displayed in response to an additional input (e.g., touch input, rotational input, press input, swipe input, an input using a mouse/cursor, and/or air gestures).

In some embodiments, a typeface (e.g., typeface corresponding to 608C, 613C, 608E 613F, 613D, and 608D1) (e.g., font, type, style, and/or lettering) of the one or more visual elements (e.g., 608C, 613C, 608E and/or 613F) of a respective system user interface (e.g., 618A, 618B, 616A, and/or 616C) (e.g., the first system user interface and/or the second system user interface) is based on a typeface (e.g., typeface corresponding to 608A, 613A, 608D, and/or 613R) (e.g., font, type, style, and/or lettering) of a respective wake user interface (e.g., 606A and/or 606B) (e.g., first wake screen user interface and/or second wake screen user interface).

In some embodiments, a typeface (e.g., font, type, style, and/or lettering) of the one or more visual elements of a respective system user interface (e.g., the first system user interface and/or the second system user interface) is based on typeface of a graphical object displayed within the respective wake user interface). In some embodiments, the first visual characteristic of the one or more visual elements of a respective system user interface corresponds to a font type. In some embodiments, the font is one of a serif, sans serif, script, handwritten, decorative. In some embodiments, a value of the typeface (e.g., type of font, specific type, specific style, and/or specific lettering) of the one or more visual elements of the respective system user interface (e.g., the first system user interface and/or the second system user interface) corresponds to a value of the typeface (e.g., type of font, specific style, and/or specific lettering) of the respective wake user interface. In some embodiments, in accordance with a determination that a value of the typeface of the respective wake user interface corresponds to a first value, displaying the one or more visual elements of the respective system user interface with the typeface with the first value. In some embodiments, in accordance with a determination that the value of the typeface of the respective wake user interface corresponds to a second value, different from the first value, displaying the one or more visual elements of the respective system user interface with the typeface with the second value (e.g., without displaying the one or more visual elements of the respective system user interface with the typeface with the first value). Updating a font of a system user interface to reflect a font of the wake screen user interface provides the user with feedback about the current state of system user interface and provides visual feedback to the user indicating which wake screen user interface would be displayed in response to an additional input (e.g., touch input, rotational input, press input, swipe input, an input using a mouse/cursor, and/or air gestures).

In some embodiments, a color (e.g., of text and/or other visual object) of the one or more visual elements (e.g., to 608C, 613C, 608E and/or 613F) of a respective system user interface (e.g., 618A and/or 618B) (e.g., the first system user interface and/or the second system user interface) is based on a color (e.g., of text and/or other visual element) of a respective wake user interface (e.g., 606A and/or 606B) (e.g., first wake screen user interface and/or second wake screen user interface). In some embodiments, a color (e.g., of text and/or other visual object) of the one or more visual elements of a respective system user interface (e.g., the first system user interface and/or the second system user interface) is based on a color (e.g., of text and/or other visual element) of a graphical object displayed within a respective wake user interface (e.g., first wake screen user interface and/or second wake screen user interface). In some embodiments, a value of the color (e.g., shading, hue, translucency amount, and/or color gradient) of the one or more visual elements of the respective system user interface (e.g., the first system user interface and/or the second system user interface) corresponds to a value of the color of the respective wake user interface. In some embodiments, in accordance with a determination that a value of the color of the respective wake user interface corresponds to a first value, displaying the one or more visual elements of the respective system user interface with the color with the first value. In some embodiments, in accordance with a determination that the value of the color of the respective wake user interface corresponds to a second value, different from the first value, displaying the one or more visual elements of the respective system user interface with the color with the second value (e.g., without displaying the one or more visual elements of the respective system user interface with the color with the first value). Updating a color of a system user interface to reflect a color of the wake screen user interface provides the user with feedback about the current state of system user interface and provides visual feedback to the user indicating which wake screen user interface would be displayed in response to an additional input (e.g., touch input, rotational input, press input, swipe input, an input using a mouse/cursor, and/or air gestures).

In some embodiments, the one or more visual elements (e.g., the clock hands displayed as part of 608G and/or animated numerals in 608J) of a respective system user interface (e.g., 618A, 618B, 618C, and/or 618D) (e.g., the first system user interface and/or the second system user interface) includes an animated character (e.g., the clock hands displayed as part of 608G and/or animated numerals in 608J) (e.g., multiple animated characters) that is based on (e.g., same as) an animated character (e.g., character in 608F and/or characters in 608I) (e.g., multiple animated characters) of a respective wake user interface (e.g., 606C and/or 606D) (e.g., first wake screen user interface and/or second wake screen user interface). In some embodiments, the first visual characteristic of the one or more visual elements corresponds to a first representation of a first character. In some embodiments, the first representation of the first character includes and/or omits portions of a second representation of the first character (e.g., displayed on the watch face). In some embodiments, the first representation of the first character is smaller or bigger than the second representation of the first character. In some embodiments, the third visual characteristic corresponds to a third representation of a second character (e.g., stationary character, and/or animated character), and the fourth visual characteristic corresponds to a fourth representation of the second character. In some embodiments, a characteristic (e.g., value, format, animation behavior, style, and/or layout) of the animated character of the one or more visual elements of the respective system user interface (e.g., the first system user interface and/or the second system user interface) corresponds to a characteristic of the animated character of the respective wake user interface. In some embodiments, in accordance with a determination that a characteristic of the animated character of the respective wake user interface corresponds to a first characteristic, displaying the one or more visual elements of the respective system user interface with the animated character with the first characteristic. In some embodiments, in accordance with a determination that the characteristic of the animated character of respective wake user interface corresponds to a second characteristic, different from the first characteristic, displaying the one or more visual elements of the respective system user interface with the animated character with the second characteristic (e.g., without displaying the one or more visual elements of the respective system user interface with the animated character with the first characteristic). Updating an animated character of a system user interface to reflect an animated character of the wake screen user interface provides the user with feedback about the current state of system user interface and provides visual feedback to the user indicating which wake screen user interface would be displayed in response to an additional input (e.g., touch input, rotational input, press input, swipe input, an input using a mouse/cursor, and/or air gestures).

In some embodiments, the one or more visual elements (e.g., the numbering of 608L, analog style 608C, digital style of 608E, and/or fitness information (e.g., non-clock information) as part of 608C) of a respective system user interface (e.g., 618E, 618A, and/or 618B) (e.g., the first system user interface and/or the second system user interface) includes a style (e.g., numeral type, tic mark type, and/or digital vs analog) of indicating time that is based on (e.g., same as) a style of indicating time of a respective wake user interface (e.g., 606E, 606A, and/or 606B) (e.g., first wake screen user interface and/or second wake screen user interface). In some embodiments, the first wake screen user interface (e.g., 606A and/or 606B) includes a first time graphical object (e.g., 608A, 613C, 613E, and/or 608C) (e.g., a representation of the date, and/or a representation of the time) with a first visual style (e.g., numeral type, tic mark type, and/or digital vs analog), wherein the second wake screen user interface (e.g., 606A and/or 606B) includes a second time graphical object (e.g., 608A, 608D, 613A, and/or 613E) (e.g., a representation of the date, and/or a representation of the time) with a second visual style (e.g., numeral type, tic mark type, and/or digital vs analog), wherein the system user interface (e.g., 618A, 618B, and/or 616A) includes a third time graphical object (e.g., 608C, 613C, 608E, 613F, 613D and/or 608D1) (e.g., a representation of the date, and/or a representation of the time), wherein first value of the first visual characteristic of the first wake screen user interface (e.g., 606A and/or 606B) corresponds to the first visual style(e.g., numeral type, tic mark type, and/or digital vs analog), and wherein second value of the first visual characteristic of the second wake screen user interface (e.g., 606A and/or 606B) corresponds to the second visual style (e.g., numeral type, tic mark type, and/or digital vs analog). In some embodiments, a characteristic (e.g., value, format, and/or layout) of the style (e.g., numeral type, tic mark type, and/or digital vs analog) of indicating time (e.g., 608C, 613C, 608E, 613F, 613D and/or 608D1) of the one or more visual elements of the respective system user interface (e.g., 618A, 618B, and/or 616A) (e.g., the first system user interface and/or the second system user interface) corresponds to a characteristic of the style (e.g., numeral type, tic mark type, and/or digital vs analog) of indicating time (e.g., 608A, 613A, 608D, and/or 613E) of the respective wake user interface (e.g., 606A and/or 606B). In some embodiments, in accordance with a determination that a characteristic of the style of indicating time (e.g., 608A, 613A, 608D, and/or 613E) of the respective wake user interface (e.g., 606A and/or 606B) corresponds to a first characteristic, displaying the one or more visual elements of the respective system user interface with the style of indicating time with the first characteristic. In some embodiments, in accordance with a determination that the characteristic of the animated character (e.g., 608F) of respective wake user interface (e.g., 606A, 606B, and/or 606C) corresponds to a second characteristic, different from the first characteristic, displaying the one or more visual elements of the respective system user interface (e.g., 618C) with the style of indicating time with the second characteristic (e.g., without displaying the one or more visual elements of the respective system user interface with the style of indicating time with the first characteristic). Updating a style of a displayed time of a system user interface to reflect a style of a displayed time of the wake screen user interface provides the user with feedback about the current state of system user interface and provides visual feedback to the user indicating which wake screen user interface would be displayed in response to an additional input (e.g., touch input, rotational input, press input, swipe input, an input using a mouse/cursor, and/or air gestures).

In some embodiments, in response to detecting the first input (e.g., 612A), computer system (e.g., 600) displays, via the display generation component (e.g., 602), a system user interface (e.g., 618A), wherein the system user interface includes the set of widgets (e.g., 614A-614C), and wherein displaying the system user interface includes displaying a first transition animation (e.g., as depicted in 616) (e.g., morph, zoom, and/or wipe) from the first wake screen user interface (e.g., 606A) to the system user interface (e.g., 618A), and wherein the first transition animation is at least partially based on the first wake screen user interface (e.g., 608B and/or 613B are displayed during the transition animation). In some embodiments, displaying the set of widgets in response to the second input (e.g., touch input, rotational input, press input, swipe input, an input using a mouse/cursor, and/or air gestures) includes, displaying a second transition animation from second wake screen user interface to the set of widgets, and wherein the second transition animation is at least partially based on the second wake screen user interface and is different from the first transition animation. In some embodiments, the first transition animation is the same as the second transition animation. In some embodiments, the first transition animation includes gradually repositioning a graphical object from a first position within the first wake screen user interface to a second position within the system user interface. In some embodiments, repositioning includes gradually changing the size of the graphical object from a first size to a second size. Displaying different animations when transitioning between different wake user interfaces and a respective system user interface provides the user with feedback about the current state of system user interface and provides visual feedback to the user indicating which wake screen user interface was just displayed and which wake screen user interface would be displayed in response to an additional input (e.g., touch input, rotational input, press input, swipe input, an input using a mouse/cursor, and/or air gestures).

In some embodiments, while displaying the set of widgets (e.g., widgets 614B, 614A, 614F, 614C, and/or 614E in FIG. 6V and/or widgets 614A, 614F, 614F, 614C, and/or 614E in FIG. 6AF) (e.g., after displaying a respective wake user interface), computer system (e.g., 600) detects, via the one or more input devices (e.g., 602 and/or 604), a third input (e.g., counterclockwise rotational input 612AJ in FIG. 6AF and/or depress input 612U in FIG. 6V)(e.g., touch input, rotational input, press input, swipe input, an input using a mouse/cursor, and/or air gestures) of a second type (e.g., counterclockwise rotational input 612AJ in FIG. 6AF and/or depress input 612U in FIG. 6V) (e.g., touch input, rotational input, press input, swipe input, an input using a mouse/cursor, air gesture(s)s, and/or an input that is the reverse of the first type), different from the first type (e.g., clockwise rotational input 612A). In some embodiments, in response to detecting the third input of the second type (e.g., counterclockwise rotational input 612AJ in FIG. 6AF and/or depress input 612U in FIG. 6V), the computer system (e.g., 600) displays a respective wake user interface (e.g., watch face 606C and/or 606B). In some embodiments, the respective wake user interface corresponds to the first wake screen user interface. In some embodiments, the respective wake user interface corresponds to the second wake screen user interface. In some embodiments, the respective wake user interface corresponds to the wake user interface that was displayed when the respective user input was received to display the set of widgets. In some embodiments, the computer system returns to the previously displayed wake user interface when an input is received (while displaying the set of widgets) that is the reverse of the input of the first type. Displaying a respective wake user interface in response to a rotational input in an opposite direction provides for a quick and easy way to return to the respective wake screen user interface and, as a result, reduces the number of inputs needed to perform an operation.

In some embodiments, the set of widgets (e.g., 614A-C) displayed in response to the first input (e.g., 612A) are displayed in an order (e.g., positioning and/or arrangement) that is user-specified (e.g., a user can specify/change order or widgets as depicted via FIGS. 6J-6U). In some embodiments, prior to displaying the second wake screen user interface, computer system detects a set of one or more inputs to reorder the set of widgets from a first order to a second order, different from the first order; and in response to detecting the second input, the computer system displays, via the display generation component, the set of widgets in the second order (that is a user-specified order). Displaying the widgets in a user specified order allows for the user to control where and which widgets are displayed and thus provides improved visual feedback.

In some embodiments, in accordance with a determination that a first set of computer system context criteria (e.g., based on location of the computer system, current time, network connectivity status, and/or battery charge) for a first widget (e.g., 614A and 614H) is met (e.g., widget 614A corresponds to widget displayed based on current day criteria (e.g., appointment today) and/or widget 614H corresponds to a widget displayed based on time (e.g., time to leave for appointment)), the set of widgets includes the first widget. In some embodiments, in accordance with a determination that the set of computer system context criteria (e.g., based on location of the computer system, current time, network connectivity status, and/or battery charge) for the first widget (e.g., widget 614H) is not met (e.g., time criteria for widget 614H is not met because it is not within a threshold amount of time before appointment), the set of widgets does not include the first widget (e.g., widget 614H is not displayed in FIG. 6V). In some embodiments, multiple (e.g., all, two or more) system context criterions (e.g., based on location of the computer system, current time, network connectivity status, and/or battery charge) from the set of computer system context criteria (e.g., based on location of the computer system, current time, network connectivity status, and/or battery charge) for a first widget must be met to include the first widget within the set of widgets. Selecting widgets to display based on a determined device context (e.g., automatically and/or without additional user input) allows for quicker selection of relevant widgets without additional user input by performing an operation when a set of conditions has been met without requiring further inputs.

In some embodiments, in accordance with a determination that a live session (e.g., a graphical user interface object that has status information for an ongoing event that is updated periodically with more current information about the ongoing event such as updated information about a timer, an alarm, a score for a sport event, an ongoing weather event, an ongoing media playback operation, a delivery or transportation event, navigation directions, and/or stocks) is available (e.g., active, started, executing, launched, and/or displayed on the computer system or a companion computer system), the set of widgets includes a second widget (e.g., 614G and/or 614I) that corresponds to the live session. In some embodiments, in accordance with a determination that a live session is not available (e.g., is not active, has not been started, and/or is not executing on the computer system or a companion computer system), the set of widgets does not include the second widget that corresponds to the live session (e.g., widget 614G is not displayed in FIG. 6V and/or widget 614I is not displayed in FIG. 6A-6AS). Automatically including widgets that correspond to live activities allows for quicker selection of relevant widgets without additional user input by performing an operation when a set of conditions has been met without requiring further inputs.

In some embodiments, the live session (e.g., phone session corresponding to widget 614I) is generated based on information from an application (e.g., phone application corresponding to widget 614I) of the computer system (e.g., 600). Automatically including widgets that correspond to live activities from the device allows for quicker selection of relevant widgets without additional user input by performing an operation when a set of conditions has been met without requiring further inputs.

In some embodiments, the live session (e.g., timer session corresponding to widget 614G) is generated based on information from an application (e.g., timer application corresponding to widget 614G) of a companion computer system (e.g., 601) (e.g., smartphone, watch, television, tablet, and/or headphones) that is different from the computer system (e.g., 600). Automatically including widgets that correspond to live activities from a companion device allows for quicker selection of relevant widgets without additional user input or the need for the user to access the companion computer system.

In some embodiments, the set of widgets includes a first subset of widgets (e.g., widgets 614B, 614A, 614F, and 614C in FIG. 6AE) and a second subset of widgets (e.g., widget 614E in FIG. 6AF) different from the first subset of widgets and wherein displaying the set of widgets in response to detecting the second input includes displaying the first subset of widgets of the set of widgets without displaying the second subset of widgets of the set of widgets (e.g., widgets 614B, 614A, 614F, and 614C in FIG. 6AE). In some embodiments, while displaying, via the display generation component (e.g. 602), the first subset of widgets of the set of widgets (e.g., widgets 614B, 614A, 614F, and 614C in FIG. 6AE), computer system (e.g. 600) detects, via the one or more input devices (e.g., touch sensitive portion of 602 and/or 604), a fourth input (e.g., 612AH in FIG. 6AE) (e.g., of the first type, touch input, clockwise/counterclockwise rotational input, press input, swipe input, an input using a mouse/cursor, and/or air gestures). In some embodiments, in response to computer system (e.g., 600) detecting the fourth input (e.g., 612AH in FIG. 6AE), computer system (e.g., 600) displays, via the display generation component, the second subset of widgets of the set of widgets (e.g., widget 614E in FIG. 6AF) (e.g., without displaying the first subset of widgets of the set of widgets) (e.g., by scrolling through widgets of the set of widgets). In some embodiments, the first subset of widgets and the second subset of widgets have no widgets in common. In some embodiments, the first subset of widgets and the second subset of widgets have at least one widget in common. Displaying additional widgets in response to a further navigational input provides the user with a quick and easy way to view additional widgets and, as a result, reduces the number of inputs needed to perform an operation.

In some embodiments, while displaying the set of widgets (e.g., widget 614A, 614E, and/or 614F in FIG. 6AO) (e.g., including the first subset and/or the second subset of widgets), computer system (e.g., 600) detects, via the one or more input devices (e.g., 604), a fifth input (e.g., clockwise rotational input 612AT in FIG. 6AO) (e.g., of the first type, a touch input, clockwise/counterclockwise rotational input, press input, swipe input, an input using a mouse/cursor, and/or air gestures). In some embodiments, in response to detecting the fifth input (e.g., clockwise rotational input 612AT in FIG. 6AO), computer system (e.g., 600) displays, via the display generation component (e.g., 602), a set of application icons (e.g., 620A-620D in FIGS. 6AP and 6AQ) for initiating the display of respective applications. In some embodiments, activation (e.g., tap on and/or selection of) a respective application icon causes displays of application corresponding to the respective application icon. In some embodiments, the set of applications are displayed within an application launcher user interface such as a home screen user interface. Displaying an application launcher user interface in response to a further navigational input provides the user with a quick and easy way to access the application launcher user interface and, as a result, reduces the number of inputs needed to perform an operation.

In some embodiments, the display generation component (e.g., 602) includes a physical property (e.g., a size and/or corner radius of the display generation component). In some embodiments, in accordance with a determination that the physical property of the display generation component (e.g., 602) corresponds to a first physical property value (e.g., a size and/or corner radius of the display generation component), the computer system (e.g., 600) displays the set of widgets (e.g., 614A-614C) with a first layout property (e.g., distance between the set of widgets and the edge of the display, distance between each of the widgets, and/or overlap of each of the widgets). In some embodiments, in accordance with a determination that the physical property of the display generation component (e.g., 602) corresponds to a second physical property value (e.g., a size and/or corner radius of the display generation component) different from the first physical property value, the computer system 600 displays the set of widgets with a second layout property, different from the first layout property (e.g., distance between the set of widgets and the edge of the display, distance between each of the widgets, and/or overlap of each of the widgets). Modifying the layout of the widget user interface based on the dimensions of the displays allows for the widget user interface to be adapted to different screens and displayed with improved visual feedback.

In some embodiments, while displaying the first wake screen user interface (e.g., 606A), computer system 600 detects, via the one or more input devices (e.g., touch sensitive portion of 602), a first set of one or more inputs (e.g., 612G), wherein the first set of one or more inputs includes a swipe input. In some embodiments, in response to detecting the first set of one or more inputs, computer system (e.g., 600) displays, via the display generation component, the second wake screen user interface. In some embodiments, the first set of one or more inputs is a swipe input and/or crown rotation input. Changing wake screen user interfaces from one to another in response to a swipe input provides the user with a quick and easy way to change the wake screens, and, as a result, reduces the number of inputs needed to perform an operation.

In some embodiments, the first set of one or more inputs further includes a touch input (e.g., 612AC) exceeding a predetermined time threshold (e.g., non-zero-time threshold). In some embodiments, the touch input is a long press (e.g., using a mouse/cursor, touch, and/or air gesture). In some embodiments, the first set of one or more inputs is a long press (e.g., on a touch-sensitive surface or a touch-screen) followed by a swipe input (e.g., on the touch-sensitive surface or a touchscreen). In some embodiments, a tap input in an input at a location for a first period of time. A long press input is a sustained input on the (substantially the same) location for a second period of time, wherein the second period of time is longer than the first period of time. Changing wake screen user interfaces from one to another in response to a swipe input provides the user with a quick and easy way to change the wake screens, and, as a result, reduces the number of inputs needed to perform an operation.

In some embodiments, the first wake screen user interface (e.g., 606A) includes a first complication (e.g., 610A and 610B) from a set of complications and wherein the set of widgets includes a widget (e.g., 614E) that includes one or more complications of the set of complications. In some embodiments, a complication refers to any clock/watch face feature other than those used to indicate the hours and minutes of a time (e.g., clock hands or hour/minute. In some embodiments, complications provide different types of information to a user, such as data obtained from an application, and the information conveyed to a user by a complication. In some embodiments, the first complication corresponds to one of the widgets in the set of widgets. In some embodiments, the first complication does not correspond to any of the widget in the set of widgets. Selecting widgets from a set of complications used for watch faces provides the user with a quick and easy way to select which widgets will be included in the set of widgets, as a result, reduces the number of inputs needed to perform an operation.

In some embodiments, the first wake screen user interface (e.g., 606A-606H) is a time user interface. In some embodiments, the time user interface includes a digital or analog representation of a current time that updates as time progresses. In some embodiments, the time user interface includes additional information, such as a present date (e.g., day, month, and/or year). In some embodiments, the second wake screen user interface is a time user interface. Including an indication of the current time in the wake screen user interface reduces the number of inputs needed to check the time as it will be displayed when the wake screen interface is displayed.

In some embodiments, displaying the set of widgets (e.g., 614A-614C) includes displaying the set of widgets as a stack (e.g., at least one widget in the set of widgets at least partially overlaps a second widget in the set of widgets). In some embodiments, displaying the set of widgets as a stack includes displaying the set of widgets with a simulated depth (e.g., using size, blurring, darkening, shadows and/or some other visual cue to indicate that a first widget is higher within the stack than a second widget that is partially obscured by the first widget). Displaying the widgets as a stack allows for more widgets to be displayed at the same time and reflects that additional widgets are available for access and, as a result, improves visual feedback.

Note that details of the processes described above with respect to method 700 (e.g., FIG. 7) are also applicable in an analogous manner to the methods described below. For example, method 800 optionally includes one or more of the characteristics of the various methods described above with reference to method 700. For example, both are used to display widgets. For brevity, these details are not repeated below.

FIG. 8 is a flow diagram illustrating a method for 800 using a computer system in accordance with some embodiments. Method 800 is performed at a computer system (e.g., 100, 300, 500 and/or 600) (e.g., a smart phone, a smart watch, a laptop, a desktop computer, TV, and/or a tablet) that is in communication with a display generation component (e.g., 602) (e.g., a display controller, a touch-sensitive display system, and/or a display (e.g., integrated and/or connected)) and a rotatable input mechanism (e.g., 604) (e.g., watch crown, watch dial, and/or wheel). In some embodiments, the rotatable input mechanism is positioned along an edge (e.g., side, boundary, and/or border) of a housing of the computer system. In some embodiments, an axis of rotation of the rotatable input mechanism is parallel to a surface (e.g., top surface and/or top of the display) of the display generation component. In some embodiments, the rotatable input mechanism rotates around the axis of rotation that is parallel to a surface of the display generation component.

Some operations in method 800 are, optionally, combined, the orders of some operations are, optionally, changed, and some operations are, optionally, omitted.

As described below, method 800 provides an intuitive way for displaying and/or editing widgets. The method reduces the cognitive burden on a user for displaying and editing widgets, thereby creating a more efficient human-machine interface. For battery-operated computing devices, enabling a user to display and edit various widgets faster and more efficiently conserves power and increases the time between battery charges.

Computer system (e.g., 600) displays (802), via the display generation component (e.g., 602), a time user interface (e.g., 606A) (e.g., a watch user interface that includes an indication of a current time, a watch face, and/or a lock screen). While displaying the time user interface (e.g., 606A), computer system (e.g., 600) detects (804), via the rotatable input mechanism (e.g., 604), a first rotational input (e.g., 612A) with a respective magnitude. In response to detecting the first rotational input and in accordance with a determination that the respective magnitude of the first rotational input(e.g., 612A) is a first magnitude (e.g., an amount of rotation that is greater than (e.g., greater than or equal to) a first threshold amount of rotation (e.g., degree(s) and/or angle of rotation between 1 and 360 (e.g., 1, 10, 45, 90, 180, or 360)) and is less than a second threshold amount of rotation (e.g., degree(s) and/or angle of rotation between 2 and 360 (e.g., 2, 10, 45, 90, 180, or 360)), a first rotational speed of the first rotational input that is greater than speed threshold (e.g., zero or any speed above zero), a duration of rotational input greater than a duration threshold (e.g., 0.1, 0.5, 1, 2, or 10 seconds), and/or a velocity of rotational input greater than a velocity threshold), computer system (e.g., 600) displays (806), via the display generation component a set of one or more widgets (e.g., 614A-614C) (e.g., a plurality of widgets, set of widgets, and/or a stack of widgets) (e.g., prior to displaying an application launcher user interface such as a home screen user interface and/or without displaying an application launcher user interface such as a home screen user interface). In some embodiments, the set of one or more widgets includes a widget that includes a user interface element that includes content and/or information from a respective application (e.g., a first widget of the set of one or more widgets displays information from a first application (without displaying information from a second application) and a second widget of the set of one or more widgets includes information from the second application (e.g., with or without displaying information from the first application)). In some embodiments, the one or more widgets includes a widget that includes information that is updated over time in response to the computer system receiving updated or additional information from a respective application. In some embodiments, in response to detecting selection of (e.g., via a tap input on or a non-tap input, an input using a mouse/cursor, touch, and/or air gesture) a widget of the one or more widgets, the computer system displays a user interface of a respective application associated with (e.g., corresponding to) the selected widget (e.g., an application from which received information is displayed by the selected widget). In some embodiments, the size, position, appearance, and/or content displayed by a widget is user-configured and/or user-configurable (e.g., via user input). In some embodiments, the one or more widgets is a stack of widget that represent a set of two or more widgets through which the computer system can scroll (e.g., in response to receiving a user scroll input and/or rotation of the rotatable input mechanism). In some embodiments, the set of one or more widgets includes content from a subset (e.g., one, two, and/or less than all) of widgets of the computer system at a time (e.g., the stack of widgets displays content from a single widget of available widgets without displaying content from any other available widgets while optionally displaying at least a portion of a second widget). In some embodiments, the widgets of the set of one or more widgets are arranged in a sequence, and in response to input (e.g., user input and/or system input), the computer system changes the sequence in which the widgets of the set of one or more widgets are arranged based on the input (e.g., changes which widget is on top or first in the sequence). In response to detecting the first rotational input and in accordance with a determination that the respective magnitude of the first rotational input (e.g., 612A and/or continuation of 612A that includes 612B, 612C, 612D, and/or 612E) is a second magnitude (e.g., (more than the first amount of rotation or less than the first amount of rotation), (higher speed than the first rotational speed) or slower speed than the first rotational speed)), a first rotational speed of the first rotational input that is greater than speed threshold (e.g., zero or any speed above zero), a duration of rotational input greater than a duration threshold (e.g., 0.1, 0.5, 1, 2, or 10 seconds), and/or a velocity of rotational input greater than a velocity threshold) that is different from the first magnitude, computer system (e.g., 600) displays (808), via the display generation component (e.g., 602), an application launcher user interface (e.g., 622) that includes one or more graphical objects (e.g., 620A-620D) (e.g., affordances) for launching one or more applications (e.g., subsequent to displaying the set of one or more widgets or without displaying the one or more widgets). In some embodiments, an application launcher user interface such as a home screen user interface includes a set of one or more graphical objects corresponding to a set of one or more apps, and wherein when a respective graphical object of the set of one or more graphical objects is activated and/or selected (e.g., via an input via a mouse/cursor, touch, and/or air gesture), the computer system displays a user interface of a respective application that corresponds to the respective graphical object. In some embodiments the first rotational input includes an amount of rotation that is based on the degree(s) (e.g., angle and/or gradation) of rotation between 1 and 360 (e.g., 1, 10, 45, 90, 180, or 360) of the rotatable input mechanism relative to the starting position of the rotatable input mechanism. In some embodiments, the amount of rotation is based on the duration of the rotation of the rotatable input mechanism. In some embodiments, the amount of rotation is the combination of angle and duration. In some embodiments, the amount of rotation is based solely on the angle of rotation/or duration of the rotation. In some embodiments, in accordance with a determination that the first magnitude (e.g., magnitude of rotational input 612A) is below a threshold (e.g., the amount of first rotational input is below a threshold and/or the speed of the first rotational input is below threshold), the set of one or more widgets (e.g., 614A, 614B, and/or 614C) are not displayed (e.g., the computer system (e.g., 600) foregoes displaying the set of one or more widgets and/or the wake screen (e.g., 613A) continues to be displayed without displaying the widgets (e.g. 614A-614C) or the application launcher (e.g., 622)). In some embodiments, in accordance with a determination that the first magnitude (e.g., magnitude of rotational input 612A) is below a threshold (e.g., the amount of first rotational input is below a threshold and/or the speed of the first rotational input is below threshold), the set of one or more widgets (e.g., 614A, 614B, and/or 614C) are partially displayed (e.g., widget 614A in FIG. 6B) (e.g., the computer system (e.g., 600) foregoes displaying (e.g., fully displaying) the system user interface (e.g., 618A and/or any one of 618D-618H) and/or at least a portion of the wake screen (e.g., 613A) continues to be displayed without displaying the system user interface (e.g., 618A and/or any one of 618D-618H). In some embodiments, in accordance with a determination that the second magnitude (e.g., magnitude of rotational input 612A and/or magnitude of rotational input 612D) is below a threshold (e.g., the amount of first rotational input (e.g., rotational input 612A and/or rotational input 612D) is below a threshold and/or the speed of the first rotational input (e.g., rotational input 612A and/or rotational input 612D) is below threshold), the application launcher user interface (e.g., 622 in FIG. 6F) is not displayed (e.g., the computer system foregoes displaying application launcher user interface (e.g., 622 in FIG. 6F) and/or the set of one or more widgets continues to be displayed without displaying (e.g., fully displaying) the application launcher user interface). In some embodiments, in accordance with a determination that the second magnitude (e.g., magnitude of rotational input 612A and/or magnitude of rotational input 612D) is below a threshold (e.g., the amount of first rotational input (e.g., rotational input 612A and/or rotational input 612D) is below a threshold and/or the speed of the first rotational input (e.g., rotational input 612A and/or rotational input 612D) is below threshold), the application launcher user interface (e.g., 622 in FIG. 6F) is partially displayed (e.g., application icons (e.g., 620A, 620B, and/or 620C) in FIG. 6E are not displayed, displayed at a size different than (e.g., smaller or larger) application icons (e.g., 620A, 620B, and/or 620C) in FIG. 6F), and/or application icons (e.g., 620A, 620B, and/or 620C) in FIG. 6E are displayed with a different visual style (e.g., color, transparency, hue, and/or brightness) than application icons (e.g., 620A, 620B, and/or 620C) in FIG. 6E), and/or the set of one or more widgets (e.g., widget 614E in FIG. 6E) continues to be displayed without displaying (e.g., fully displaying) the application launcher user interface 622). In some embodiments, in accordance with a determination that the first magnitude (e.g., magnitude of rotational input 612A) is above a first threshold (e.g., the amount of first rotational input is below a threshold and/or the speed of the first rotational input is below threshold) and that the first magnitude (e.g., magnitude of rotational input 612A) is below a second threshold different from the first threshold, maintaining displaying the set of one of more widgets (e.g., widgets in 618A) (e.g., forging to display the application launcher user interface)). Displaying either a set of one or more widgets or an application user interface based on a magnitude of a singular input reduces the number of inputs needed to display either interface as both interfaces can be accessed via one input.

In some embodiments, in response to detecting the first rotational input (e.g., 612A and/or continuation of 612A that includes 612B and/or 612C) and in accordance with the determination that the respective magnitude of the first rotational input (e.g., 612A and/or 612A and/or continuation of 612A that includes 612B and/or 612C) is the second magnitude and prior to displaying the application launcher user interface (e.g., 622), displaying, via the display generation component, the set of one or more widgets (e.g., 614A-614E). In some embodiments, while continuing detecting the first rotational input and prior to displaying the application launcher user interface, scrolling the set of one or more widgets. Displaying the set of one or more widgets before displaying the application launcher user interface allows for the user to see the result of the gradual rotation input and thus provides improved visual feedback.

In some embodiments, the computer system (e.g., 600) is in communication with (e.g., includes and/or in wired/wireless communication with) one or more input devices (e.g., touch sensitive portion of 602 and/or button 605) (e.g., a touch-sensitive surface, a touchscreen, a button, and/or a microphone) and wherein the application launcher user interface (e.g., 622) includes a first set of one or more graphical objects (e.g., 620A-620C) (e.g., icons and/or buttons) corresponding to a set of one or more applications. In some embodiments, computer system (e.g., 600) detects, via the one or more input devices (e.g., 602), an input (e.g., touch input, clockwise/counterclockwise rotational input, press input, swipe input, an input using a mouse/cursor, air gesture(s), and/or tap/depress of a rotatable input mechanism) corresponding to a respective graphical object (e.g., 620A-620C) of the first set of one or more graphical objects. In some embodiments, in response to detecting the input corresponding to the respective graphical object (e.g., 620A-620C) of the first set of one or more graphical objects, displaying, via the display generation component, a user interface for a respective application corresponding to the respective graphical object. Displaying an application launcher user interface with graphical objects for launching applications provides the user with a quick and easy way to launch applications and, as a result, reduces the number of inputs needed to perform an operation.

In some embodiments, while displaying the application launcher user interface (e.g., 622) that includes the first set of one or more graphical objects (e.g., 620A-620D in FIG. 6AP), detecting, via the rotatable input mechanism (e.g., 604), a second rotational input (e.g., 612AU). In some embodiments, in response to detecting the second rotational input (e.g., 612AU), computer system (e.g., 600) scrolls (e.g., up, down, and/or diagonally) the application launcher user interface (e.g., 622), wherein scrolling the application launcher user interface (e.g., 622) includes displaying a second set of one or more graphical objects (e.g., 620E) different from the first set of one or more graphical objects (e.g., 620A-620D in FIG. 6AP). In some embodiments, a first set of one or more graphical objects includes more graphical object than a second set of one or more graphical objects, or vice versa. In some embodiments, while the computer system (e.g., 600) displays the application launcher user interface (e.g., 622) that includes first set of one or more graphical objects (e.g., 620A-620D), the computer system detects a swipe input and/or drag input (e.g., a swipe input and/or drag input via touch sensitive portion of 602); and in response to detecting the drag input or swipe input, the computer system scrolls so that a second set of one or more graphical objects different from the first set of one or more graphical objects (e.g., 620E) is displayed. In some embodiments, scrolling the application launcher user interface (e.g., 622) includes shifting a portion of a first respective graphical object (e.g., 620E not visible in FIG. 6AP) (e.g., a graphical object that is not or only partially visible) into an application launcher user interface (e.g., 622) region from one side and shifting a second respective graphical (e.g., 620D) (e.g., a graphical object that is fully or only partially visible) out of the application launcher user interface region on another (e.g., opposite) side (e.g., 620D is no longer visible in FIG. 6AQ). Scrolling the application launcher user interface provides the user with a quick and easy way to view additional application graphical objects and, as a result, reduces the number of inputs needed to perform an operation.

In some embodiments, while displaying the time user interface (e.g., 606B in FIG. 6H), computer system (e.g., 600) detects, via the rotatable input mechanism (e.g., 604), a first press input (e.g., 612I). In some embodiments, in response to detecting the first press input, computer system (e.g., 600) displays, via the display generation component (e.g., 602), the application launcher user interface (e.g., 622). In some embodiments, the first press input (e.g., 612U) is detected or directed to while not displaying the time user interface (e.g., interface in FIG. 6V) (e.g., a different user interface is displayed), and in response to detecting the first press input (e.g., 612U)while not displaying the time user interface, the computer system (e.g., 600) displays, via the display generation component, the application launcher user interface (e.g., 622) that includes affordances for launching one or more applications (e.g., 620A-620D). In some embodiments, while displaying the application launcher user interface (e.g., 622 in FIG. 6AP) that includes affordances for launching one or more applications (e.g., 620A-620D), the computer system (e.g., 600) detects an input (e.g., tap, double tap, long press, an input using a mouse/cursor, and/or air gesture) corresponding (e.g., directed) to a respective application affordance (e.g., 620A-620D) from the affordances for launching one or more applications, and in response to detecting the input (e.g., an input directed to one of 620A-620D), the computer system displays a respective application corresponding to the respective application affordance. In some embodiments, the first press input (e.g., 612U) via the rotatable input mechanism (e.g., 604) is a press (e.g., depress) input in a first direction, wherein the first direction is parallel to an axis of rotation of the rotatable input mechanism. In some embodiments, the first press input (e.g., 612U) via the rotatable input mechanism (e.g., 604) is a press (e.g., depress and/or activation) input in a first direction, wherein the first direction is perpendicular to a direction of rotation (e.g., clockwise/counterclockwise) of the rotatable input mechanism. Displaying an application launcher user interface in response to a depression of the rotatable input mechanism while displaying any UI provides for a quick and easy way to display the launcher user interface without needing to navigate a multi-level hierarchy of menus and, as a result, reduces the number of inputs needed to perform an operation.

In some embodiments, the first rotational input (e.g., 612A) is in a first direction (e.g., clockwise rotational input 612A) (e.g., clockwise or counterclockwise). In some embodiments, while displaying the time user interface (e.g., 606A and/or 606C), computer system (e.g., 600) detects, via the rotatable input mechanism (e.g., 604), a third rotational input in a direction (e.g., counterclockwise rotational input 612AY) (e.g., clockwise or counterclockwise) that is opposite the first direction. In some embodiments, in response to detecting the third rotational input (e.g., counterclockwise rotational input 612AY), computer system (e.g., 600) displays, via the display generation component (e.g., 602), a first system user interface (e.g., 660 in FIG. 6AT), wherein the first system user interface is different from the application launcher user (e.g., 622) interface and does not include the set of one or more widgets. Displaying a first system user interface (e.g., different from the application launcher user interface and does not include the set of one or more widget) in response to a rotational input in an opposite direction while displaying the time user interface provides for a quick and easy way to display the first system user interface and, as a result, reduces the number of inputs needed to perform an operation.

In some embodiments, the first system user interface (e.g., 660 in FIG. 6AT) includes a set of one more received notifications (e.g., 660A in FIG. 6AT) (e.g., message(s), email(s), system notification(s), reminder(s), and/or alert(s)). In some embodiments, the notifications are received from an application on the computer system. In some embodiments, a notification from the set of one or more notifications corresponds to a widget from the set of one or more widgets. In some embodiments, none of the notifications from the set of one or more notifications correspond any of the widgets in the set of one or more widgets. In some embodiments, activation of (e.g., touch input (e.g., tap input or long press)), an input using a mouse/cursor, and/or air gesture on/directed to) a respective notification displays a user interface of an application corresponding to the respective notification. Displaying a user interface with notifications (e.g., different from the application launcher user interface and does not include the set of one or more widget) in response to a rotational input in an opposite direction while displaying the time user interface provides for a quick and easy way to display notifications and, as a result, reduces the number of inputs needed to perform an operation and provides the user with visual feedback of received notifications.

In some embodiments, while displaying the application launcher user interface (e.g., 622), computer system (e.g., 600) detects, via the rotatable input mechanism (e.g., 604), a second press input (e.g., 612AV) (e.g., a single press or a double press of the crown). In some embodiments, in response to detecting the second press input, computer system (e.g., 600) displays, via the display generation component, the first system user interface (e.g., 660). In some embodiments, in response to detecting a depress gesture on a rotatable input mechanism while displaying the application launcher user interface, the computer system displays the time user interface instead of the first system user interface. Displaying a user interface with notifications in response to a depression of the rotatable input mechanism while displaying an application launcher provides for a quick and easy way to display the user interface with notifications and, as a result, reduces the number of inputs needed to perform an operation.

In some embodiments, the computer system (e.g., 600) includes a physical button (e.g., 605) (e.g., a capacitive button, a mechanical button, and/or a physically detectable button positioned along a body (e.g., housing and/or outer casing) of the computer system). In some embodiments, while displaying the time user interface (e.g., 606C in FIG. 6AS), computer system (e.g., 600) detects, via the physical button (e.g., 605), a third press input (e.g., 612AZ).

In some embodiments, in response to detecting the third press input (e.g., 612AZ), computer system (e.g., 600) displays, via the display generation component (e.g., 602), a second system user interface (e.g., 658), wherein the second system user interface (e.g., 658) is different from the application launcher user interface (e.g., 622), does not include the set of one or more widgets, and is different from the first system user interface (e.g., 660). In some embodiments, the third press input is detected while not displaying the time user interface (e.g., a different user interface is displayed), and in response to detecting the third press input while not displaying the time user interface, the computer system displays, via the display generation component, the second system user interface. Displaying a second system user interface (e.g., different from the application launcher user interface and does not include the set of one or more widget, different from the first system user interface) in response to button press while displaying the time user interface provides for a quick and easy way to display the second system user interface and, as a result, reduces the number of inputs needed to perform an operation.

In some embodiments, the second system user interface (e.g., 658) includes a set of one more graphical objects (e.g., 658A-658D) that, when activated, initiate a process to modify a setting (e.g., a system setting, wireless setting, cellular setting, mode type setting, battery status, airplane mode setting, and/or flashlight mode or brightness setting)

of the computer system (e.g., 600). In some embodiments, while displaying the second system user interface (e.g., 658), computer system (e.g., 600) detects activation (e.g., tap, double tap, long press, and/or air gesture) of a respective graphical object of the set of one or more graphical objects (e.g., any one of 658A-658D). In some embodiments, in response to detecting activation of the respective graphical object (e.g., any one of 658A-658D), computer system (e.g., 600) initiates a process to modify (e.g., modifying) a respective system (e.g., computer system) setting corresponding to the respective graphical object (e.g., one of 658A-658D). In some embodiments, the activation of the respective graphical object of the set of one or more graphical objects includes a set of one or more inputs (e.g., an input directed to one of 658A-658D) In some embodiments, a respective system setting corresponds to a battery status and modifying the respective system setting corresponding to the battery status includes transitioning the computer system into a low-power state from a regular (e.g., normal and/or non-low battery) power state (e.g., an input directed to 658D initiates a process to transition the computer system into a low-power state from a regular power state). In some embodiments, a respective system setting corresponds to a wireless setting and modifying the respective system setting corresponding to the wireless setting includes transitioning the computer system from a first wireless state (e.g., on) to a second wireless state (e.g., different from the first wireless state) (e.g., off) (e.g., an input directed to 658B initiates a process to transition the computer system from a first wireless state (e.g., on) to a second wireless state (e.g., different from the first wireless state) (e.g., off)). In some embodiments, a respective system setting corresponds to brightness setting and modifying the respective system setting corresponding to the brightness setting includes transitioning the computer system from a first brightness setting (e.g., high, med, or low) to a second brightness setting (e.g., different from the first brightness state) (e.g., high, medium, or low) (e.g., an input directed to a respective graphical object displayed in 658 a initiates a process to transition the computer system from a first brightness setting (e.g., high, med, or low) to a second brightness setting (e.g., different from the first brightness state) (e.g., high, medium, or low). Displaying a user interface with system level controls (e.g., different from the application launcher user interface and does not include the set of one or more widget, different from the first system user interface) in response to button press while displaying the time user interface provides for a quick and easy way to display the user interface with system level controls and, as a result, reduces the number of inputs needed to perform an operation.

In some embodiments, while displaying the application launcher user interface (e.g., 622), computer system (e.g., 600) detects, via the physical button (e.g., 605), a fourth press input (e.g., 612AW) (e.g., a single press or a double press of the physical button). In some embodiments, in response to detecting the fourth press input (e.g., 612AW), computer system (e.g., 600) displays, via the display generation component (e.g., 602), the second system user interface (e.g., 658). Displaying a user interface with system-level controls in response to button press while displaying an application launcher provides for a quick and easy way to display the user interface with system level controls and, as a result, reduces the number of inputs needed to perform an operation.

In some embodiments, the set of one or more widgets (e.g., 614A-614E) includes a widget (e.g., 614E) that includes one or more complications (e.g., 638A and/or 638E) of a set of complications. In some embodiments, a complication refers to any clock/watch face feature other than those used to indicate the hours and minutes of a time (e.g., clock hands or hour/minute. In some embodiments, complications provide different types of information to a user, such as data obtained from an application, and the information conveyed to a user by a complication. In some embodiments, a complication corresponds to one of the widgets in the set of one or more widgets. In some embodiments, a complication does not correspond to any of the widgets in the set of one or more widgets. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left). In some embodiments, a respective complication from the one or more complications includes a user interface element representing an application and displays information obtained from the application. In some embodiments, the one or more complications are user-customizable (e.g., the user can configure one or more aspects of the complication). Selecting widgets from a set of complications used for watch faces provides the user with a quick and easy way to select which widgets will be included in the set of widgets, as a result, reduces the number of inputs needed to perform an operation.

Note that details of the processes described above with respect to method 800 (e.g., FIG. 8) are also applicable in an analogous manner to the methods described below/above. For example, method 800 optionally includes one or more of the characteristics of the various methods described above/below with reference to methods 700, 900, and 1000. For example, methods 700, 800, 900, and 1000 are used to display and/or edit widgets. For brevity, these details are not repeated below.

FIG. 9 is a flow diagram illustrating a method for 900 using a computer system in accordance with some embodiments. Method 900 is performed at a computer system (e.g., 100, 300, 500 and/or 600) (e.g., a smart phone, a smart watch, a laptop, a desktop computer, TV, and/or a tablet) that is in communication with a display generation component (e.g., 602) (e.g., a display controller, a touch-sensitive display system, and/or a display (e.g., integrated and/or connected)) and a rotatable input mechanism (e.g., 604) (e.g., watch crown, watch dial, and/or wheel). In some embodiments, the rotatable input mechanism is positioned along an edge (e.g., side, boundary, and/or border) of a housing of the computer system. In some embodiments, an axis of rotation of the rotatable input mechanism is parallel to a surface (e.g., top surface and/or top of the display) of the display generation component. In some embodiments, the rotatable input mechanism rotates around the axis of rotation that is parallel to a surface of the display generation component.

Some operations in method 900 are, optionally, combined, the orders of some operations are, optionally, changed, and some operations are, optionally, omitted.

As described below, method 900 provides an intuitive way for displaying and/or editing widgets. The method reduces the cognitive burden on a user for displaying and editing widgets, thereby creating a more efficient human-machine interface. For battery-operated computing devices, enabling a user to display and edit various widgets faster and more efficiently conserves power and increases the time between battery charges.

While displaying, via the display generation component (e.g., 602), a time user interface (e.g., any one of 606D-606H) (e.g., a watch user interface that includes an indication of a current time, a watch face, and/or a lock screen), the computer system (e.g., 600) detects (902), via the rotatable input mechanism (e.g., 604), a rotational input (e.g., e.g., 612BW, 612BH, 612BL, 612BP, and/or 612BU) (e.g., clockwise and/or counterclockwise rotational input). In response to detecting the rotational input (e.g., 612BW, 612BH, 612BL, 612BP, and/or 612BU) and in accordance with a determination that a respective type of input (e.g., 612BF, 612BJ, 612BN, 612BQ, and/or 612BT) (e.g., a touch input(s), press input(s), swipe input(s), rotational input, an input using a mouse/cursor, and/or air gesture(s)s or other input directed toward the user interface) was detected by the computer system (e.g., 600) within a time threshold (e.g., 0.001, 01, 0.1, 1, 2, 5, or 10, seconds) of detecting the rotational input (e.g., 612BW, 612BH, 612BL, 612BP, and/or 612BU), the computer system (e.g., 600) performs (904) a first operation (e.g., as depicted in FIGS. 6AW, 6BA, 6BE, 6BI, and/or 6BM) corresponding to the time user interface (e.g., any one of 606D-606H). In some embodiments, performing an operation corresponding to the time user interface includes changing the content that the time user interface displays, changing the way the time user interface operates, and/or changing how content is displayed as part of the time user interface. In some embodiments, performing an operation corresponding to the time user interface includes ceasing to display the current time user interface and displaying a different time user interface. In response to detecting the rotational input (e.g., 612BW, 612BH, 612BL, 612BP, and/or 612BU) and in accordance with a determination that the respective type of input (e.g., 612BF, 612BJ, 612BN, 612BQ, and/or 612BT) was not detected within the time threshold of detecting the rotational input (e.g., 612BW, 612BH, 612BL, 612BP, and/or 612BU), the computer system (e.g., 600) performs (906) a second operation, different from the first operation, that includes displaying, via the display generation component, a system user interface (e.g., any one of 618D-618H). In some embodiments, displaying the system user interface includes displaying a set of one or more widgets (e.g., stack of widgets). In some embodiments, the set of one or more widgets includes a widget that includes a user interface element that includes content and/or information from a respective application (e.g., a first widget of the stack of widgets displays information from a first application (without displaying information from a second application) and a second widget of the set of one or more widgets includes information from the second application (e.g., with or without displaying information from the first application)). In some embodiments, the one or more widgets includes a widget that includes information that is updated over time in response to the computer system receiving updated or additional information from a respective application. In some embodiments, in response to detecting selection of (e.g., via a tap input on or a non-tap input, an input using a mouse/cursor, and/or air gesture) a widget of the one or more widgets, the computer system displays a user interface of a respective application associated with (e.g., corresponding to) the selected widget (e.g., an application from which received information is displayed by the selected widget). In some embodiments, the size, position, appearance, and/or content displayed by a widget is user-configured and/or user-configurable (e.g., via user input and/or selection). In some embodiments, the one or more widgets is a stack of widget that represent a set of two or more widgets through which the computer system can scroll (e.g., in response to receiving a user scroll input and/or rotation of the rotatable input mechanism). In some embodiments, the set of one or more widgets includes content from a subset (e.g., one, two, and/or less than all) of widgets of the computer system at a time (e.g., the stack of widgets displays content from a single widget of available widgets without displaying content from any other available widgets while optionally displaying at least a portion of a second widget). In some embodiments, the widgets of the set of one or more widgets are arranged in a sequence, and in response to input (e.g., user input and/or system input), the computer system changes the sequence in which the widgets of the set of one or more widgets are arranged based on the input (e.g., changes which widget is on top or first in the sequence). While displaying a time user interface, performing either a first operation or a second operation in response to a rotational input based on whether an input (e.g., different than the rotational input) was detected within a threshold of time of detecting the rotational input provides the user with addition control options without cluttering the UI with additional displayed controls.

In some embodiments, the system user interface (e.g., 618A and/or any one of 618D-618H) includes a set of widgets (e.g., any permutation of 614A-614C). In some embodiments, the set of widgets includes a widget that includes a user interface element that includes content and/or information from a respective application (e.g., a first widget of the set of widgets displays information from a first application (e.g., with or without displaying information from a second application) and a second widget of the set of widgets displays information from the second application (without displaying information from the first application)). In some embodiments, the set of widgets includes a widget that includes information that is updated over time in response to the computer system receiving updated or additional information from a respective application. In some embodiments, in response to detecting selection (e.g., via a tap input on or a non-tap input, an input using a mouse/cursor, and/or air gesture) of a widget of the set of widgets, the computer system displays a user interface of a respective application associated with (e.g., corresponding to) the selected widget (e.g., an application from which received information is displayed by the selected widget). In some embodiments, the size, position, appearance, and/or content displayed by a widget is user-configured and/or user-configurable (e.g., via user input). In some embodiments, the set of widgets is a representation of a set of two or more widgets through which the computer system can scroll (e.g., in response to receiving a user scroll input and/or rotation of the rotatable input mechanism). In some embodiments, the set of widgets includes content from a subset (e.g., one, two, and/or less than all) of widgets at a time (e.g., the set of widgets displays content from a single widget of available widgets without displaying content from any other available widgets while optionally displaying at least a portion of a second widget). In some embodiments, the set of widgets is arranged in a sequence, and in response to input (e.g., user input and/or system input), the computer system changes the sequence in which the set of widgets are arranged based on the input (e.g., changes which widget is on top or first in the sequence). In some embodiments, the widget is a graphical object that allows a user to interact with an application or website. In some embodiments, a widget represents a specific function or piece of information. In some embodiments, a widget includes a combination of at least one graphical object (e.g., button, and/or icon) that, when activated, perform an action, and a graphical object (e.g., text box, and/or notification) that includes information. In some embodiments, a widget corresponds to a complication displayed in a watch face. Displaying a widget user interface in response to an input from the time user interface allows a user to quickly and easily access the necessary/desired information corresponding to an application and, as a result, reduces the number of inputs needed to perform the operation.

In some embodiments, performing a first operation corresponding to the time user interface (e.g., 606E) includes modifying (e.g., changing a background of a watch face, changing a numeral typeface of a watch face, adjusting a control setting for watch face, adjusting a simulated time of day, and/or navigating through contextually relevant information that is different from the set of widgets) the time user interface (e.g., as depicted in FIG. 6BA via the changed appearance of the numerals and/or as depicted in FIG. 6BI via the changed position of the sun). Adjusting the time user interface directly from time user interface without needing to go into a different user interface allows a user to quickly and easily make modifications to the time user interface in a singular user interface and, as a result, reduces the number of inputs needed to perform the operation.

In some embodiments, modifying the time user interface (e.g., 606D) includes changing a characteristic (e.g., color, hue, translucency, one or more animated visual elements, and/or image) of a background of the time user interface (e.g., as depicted in FIG. 6AW via the changed appearance of 606D1 and 606D2). Adjusting the background of the time user interface directly from time user interface without needing to go into a different user interface allows a user to quickly and easily make modifications to the time user interface in a singular user interface and, as a result, reduces the number of inputs needed to perform the operation.

In some embodiments, the time user interface (e.g., 606E) includes a set of one or more numerals (e.g., depicted in 608K) and wherein modifying the time user interface includes changing a characteristic (e.g., size, position, color, hue, translucency, one or more animated visual elements, and/or image) of a numeral (e.g., as depicted in 608K in FIG. 6BA) (e.g., a plurality of numerals) of set of one or more numerals (e.g., as depicted in FIG. 6BA, the numerals change size). In some embodiments, changing a characteristic (e.g., color, hue, translucence, font, and/or typeface) of a numeral includes changing the characteristic (e.g., color, hue, translucence, font, and/or typeface) of multiple numerals of the watch face. Adjusting the numerals of the time user interface directly from time user interface without needing to go into a different user interface allows a user to quickly and easily make modifications to the time user interface in a singular user interface and, as a result, reduces the number of inputs needed to perform the operation.

In some embodiments, time user interface (e.g., 606F) includes a control setting (e.g., a value that changes how the watch face operates) and wherein modifying the time user interface includes changing the control setting (e.g., as depicted in 608M in FIG. 6BE) (e.g., selecting a value from a list of scrollable (e.g., vertically, horizontally, or around a watch face) values and/or changing the position of the representation of the control setting). Adjusting a control setting of the time user interface directly from time user interface without needing to go into a different user interface allows a user to quickly and easily make modifications to the time user interface in a singular user interface and, as a result, reduces the number of inputs needed to perform the operation.

In some embodiments, the time user interface (e.g., 606G) includes a representation of a simulated time of day (e.g., as depicted in FIG. 6BH in 608O) and wherein modifying the time user interface includes changing the representation (e.g., selecting a value from a list of scrollable (e.g., vertically, horizontally, or around a watch face) values, changing the position of the representation of the simulated time of day, and/or changing the value corresponding to the representation of the simulated time of day) of the simulated time of day (e.g., as depicted in FIG. 6BI in 608O). Adjusting a simulated time of day of the time user interface directly from time user interface without needing to go into a different user interface allows a user to quickly and easily make modifications to the time user interface in a singular user interface and, as a result, reduces the number of inputs needed to perform the operation.

In some embodiments, time user interface (e.g., 606Q) includes a set of one or more graphical objects (e.g., 606H1 and 606H2) that are selected for display based on contextual information (e.g., location of the computer system, current time, network connectivity status, and/or battery charge) corresponding to the computer system and wherein modifying the time user interface includes navigating (e.g., scrolling, such as vertically, horizontally, and/or diagonally) the set of the one or more graphical objects (e.g., as depicted in FIG. 6BM). Navigating through contextually relevant information that is different from the widgets directly from time user interface without needing to go into a different user interface allows a user to quickly and easily access contextually relevant information in a singular user interface and, as a result, reduces the number of inputs needed to perform the operation.

In some embodiments, the respective type of input is a tap input (e.g., 612BF, 612BJ, 612BN, 612BQ, and/or 612BT) (e.g., using a mouse/cursor, touch, and/or air gesture). While displaying a time user interface, performing either a first operation or a second operation in response to a rotational input based on whether a tap was detected within a threshold of time of detecting the rotational input provides the user with addition control options without cluttering the UI with additional displayed controls.

In some embodiments, the respective type of input is a swipe input (e.g., (a swipe input at a location corresponding to 612BF, 612BJ, 612BN, 612BQ, 612BT), 612BE, and/or 612BR) (e.g., using a mouse/cursor, touch, and/or air gesture). While displaying a time user interface, performing either a first operation or a second operation in response to a rotational input based on whether a swipe was detected within a threshold of time of detecting the rotational input provides the user with addition control options without cluttering the UI with additional displayed controls.

In some embodiments, the respective type of input (e.g., 612BF) is detected prior to detecting the rotational input (e.g., 612BW). In some embodiments, in response to detecting the respective type of input (612BF), the computer system (e.g., 600) changes a visual element (e.g., 606D3 in FIG. 6AW) (e.g., font, typeface, color, animation style, character properties (e.g., hands, face, body, and/or clothes), and/or size) of the time user interface. While displaying a time user interface, in response to detecting a respective input, adjusting the time user interface provides the user with an additional and easy way of modifying the time user interface without needing to display an additional user interface.

In some embodiments, the rotational input (e.g., 612BH) includes a respective magnitude. In some embodiments, in accordance with a determination that the respective magnitude (e.g., corresponding to 612BH) is a first magnitude (e.g., an amount of rotation that is greater than (e.g., greater than or equal to) a first threshold amount of rotation (e.g., degree(s) and/or angle of rotation between 1 and 360 (e.g., 1, 10, 45, 90, 180, or 360)) and is less than a second threshold amount of rotation (e.g., degree(s) and/or angle of rotation between 2 and 360 (e.g., 2, 10, 45, 90, 180, or 360)) and/or a first rotational speed of the first rotational input that is greater than speed threshold (e.g., zero or any speed above zero), the first operation is a third operation and the second operation is a fourth operation. In some embodiments, in accordance with a determination that the respective magnitude (e.g., corresponding to 612BH) is a second magnitude that is different from the first magnitude, the first operation is a fifth operation that is different from the third operation and the second operation is a sixth operation that is different from the fourth operation. In some embodiments, the rotational input includes a respective magnitude, wherein the first operation is performed in accordance with a determination that the respective magnitude is a first magnitude (e.g., an amount of rotation that is greater than (e.g., greater than or equal to) a first threshold amount of rotation (e.g., degree(s) and/or angle of rotation between 1 and 360 (e.g., 1, 10, 45, 90, 180, or 360)) and is less than a second threshold amount of rotation (e.g., degree(s) and/or angle of rotation between 2 and 360 (e.g., 2, 10, 45, 90, 180, or 360)) and/or a first rotational speed of the first rotational input that is greater than speed threshold (e.g., zero or any speed above zero), and wherein the second operation is performed in accordance with a determination that the respective magnitude is the first magnitude. In some embodiment, in accordance with the determination the respective type of input (e.g., a touch input(s), press input(s), swipe input(s), an input using a mouse/cursor, and/or air gesture(s), or other input directed toward the user interface) was detected by the computer system within a time threshold (e.g., 0.001, 01, 0.1, 1, 2, 5, or 10 seconds) of detecting the rotational input and in accordance with a determination that the respective magnitude is a second magnitude different (e.g., slower speed of rotation, faster speed of rotation, greater amount of rotation, and/or lesser amount of rotation) from the first magnitude, performing a third operation corresponding to the time user interface different from the first operation. In some embodiments, in accordance with the determination the respective type of input (e.g., touch input(s), rotational input(s), press input(s), swipe input(s), an input using a mouse/cursor, and/or air gesture(s)s, or other input directed toward the user interface) was not detected by the computer system within the time threshold (e.g., 0.001, 01, 0.1, 1, 2, 5, or 10 seconds) of detecting the rotational input and in accordance with the determination that the respective magnitude is the second magnitude (e.g., slower speed of rotation, faster speed of rotation, greater amount of rotation, and/or lesser amount of rotation) different from the first magnitude, performing a fourth operation, different from the second operation. In some embodiments, performing the third operation corresponding to the time user interface (e.g., 606D in FIG. 6AV, 606E in FIG. 6AZ, 606F in FIG. 6BD, 606G in FIG. 6BH, and/or 606H in FIG. 6BL) includes changing the content that the time user interface displays (e.g., as depicted in 606D in FIG. 6AV, 606E in FIG. 6AZ, 606F in FIG. 6BD, 606G in FIG. 6BH, and/or 606 in FIG. 6BL), changing the way the time user interface operates (e.g., as depicted in 606D in FIG. 6AV, 606E in FIG. 6AZ, 606F in FIG. 6BD, 606G in FIG. 6BH, and/or 606 in FIG. 6BL), and/or changing how content is displayed as part of the time user interface (e.g., as depicted in 606D in FIG. 6AV, 606E in FIG. 6AZ, 606F in FIG. 6BD, 606G in FIG. 6BH, and/or 606 in FIG. 6BL). In some embodiments, performing the fourth operation includes scrolling the set of widgets (e.g., as depicted in FIGS. 6AD-6AF), displaying an application launcher user interface (e.g., 622) and/or displaying a system control user interface (e.g., 658). In some embodiments, performing the fifth operation corresponding to the time user interface (e.g., 606D in FIG. 6AV, 606E in FIG. 6AZ, 606F in FIG. 6BD, 606G in FIG. 6BH, and/or 606H in FIG. 6BL) includes changing the content that the time user interface displays (e.g., as depicted in 606D in FIG. 6AV, 606E in FIG. 6AZ, 606F in FIG. 6BD, 606G in FIG. 6BH, and/or 606 in FIG. 6BL), changing the way the time user interface operates (e.g., as depicted in 606D in FIG. 6AV, 606E in FIG. 6AZ, 606F in FIG. 6BD, 606G in FIG. 6BH, and/or 606 in FIG. 6BL), and/or changing how content is displayed as part of the time user interface (e.g., as depicted in 606D in FIG. 6AV, 606E in FIG. 6AZ, 606F in FIG. 6BD, 606G in FIG. 6BH, and/or 606 in FIG. 6BL). In some embodiments, performing the sixth operation includes scrolling the set of widgets, displaying an application launcher user interface and/or displaying a system control user interface. While displaying a time user interface, changing the first and second operations based on magnitude of the rotational input provides the user with additional controls without needing to display an addition user interface.

In some embodiments, the rotational input (e.g., 612BH and/or 612AY) includes a respective direction (e.g., clockwise rotational input 612BH and/or counterclockwise directions input 612AY). In some embodiments, in accordance with a determination that the respective direction (e.g., clockwise rotational input 612BH and/or counterclockwise directions input 612AY) is a first direction (e.g., clockwise or counterclockwise), the first operation is a third operation and the second operation is a fourth operation. In some embodiments, in accordance with a determination that the respective direction (e.g., clockwise rotational input 612BH and/or counterclockwise directions input 612AY) is a second direction that is different from the first direction, the first operation is a fifth operation that is different from the third operation and the second operation is a sixth operation that is different from the fourth operation. In some embodiments, the rotational input (e.g., 612BW, 612BH, 6112BL, 612BP, and/or 612BU) includes a respective direction, wherein the first operation is performed in accordance with a determination that the respective direction is a first direction (e.g., clockwise or counterclockwise), and wherein the second operation is performed in accordance with a determination that the respective direction in the first direction. In some embodiments, in accordance with the determination the respective type of input (e.g., 612BF, 612BJ, 612BN, 612BQ, and/or 612BT) (e.g., touch input(s), press input(s), swipe input(s), an input using a mouse/cursor, and/or air gesture(s), or other input directed toward the user interface) was detected by the computer system within a time threshold (e.g., 0.001, 01, 0.1, 1, 2, 5, or 10 seconds) of detecting the rotational input (e.g., 612BW, 612BH, 6112BL, 612BP, and/or 612BU) and in accordance with a determination that the respective direction is a second direction (e.g., clockwise or counterclockwise) different from the first direction, performing a fifth operation corresponding to the time user interface different from the first operation. In some embodiments, in accordance with the determination the respective type of input (e.g., 612BF, 612BJ, 612BN, 612BQ, and/or 612BT) (e.g., touch input(s), rotational input(s), press input(s), swipe input(s), an input using a mouse/cursor, and/or air gesture(s), or other input directed toward the user interface) was not detected by the computer system within the time threshold (e.g., 0.001, 01, 0.1, 1, 2, 5, or 10 seconds) of detecting the rotational input (e.g., 612BW, 612BH, 6112BL, 612BP, and/or 612BU) and in accordance with the determination that the respective direction is the second direction different from the first direction, performing a sixth operation, different from the second operation. In some embodiments, performing the third operation corresponding to the time user interface includes changing the content that the time user interface displays (e.g., as depicted in 606D in FIG. 6AV, 606E in FIG. 6AZ, 606F in FIG. 6BD, 606G in FIG. 6BH, and/or 606 in FIG. 6BL), changing the way the time user interface operates (e.g., as depicted in 606D in FIG. 6AV, 606E in FIG. 6AZ, 606F in FIG. 6BD, 606G in FIG. 6BH, and/or 606 in FIG. 6BL), and/or changing how content is displayed as part of the time user interface (e.g., as depicted in 606D in FIG. 6AV, 606E in FIG. 6AZ, 606F in FIG. 6BD, 606G in FIG. 6BH, and/or 606 in FIG. 6BL). In some embodiments, performing the fourth operation includes scrolling the set of widgets, displaying an application launcher user interface and/or displaying a system control user interface. In some embodiments, performing the fifth operation corresponding to the time user interface includes changing the content that the time user interface displays (e.g., as depicted in 606D in FIG. 6AV, 606E in FIG. 6AZ, 606F in FIG. 6BD, 606G in FIG. 6BH, and/or 606 in FIG. 6BL), changing the way the time user interface operates (e.g., as depicted in 606D in FIG. 6AV, 606E in FIG. 6AZ, 606F in FIG. 6BD, 606G in FIG. 6BH, and/or 606 in FIG. 6BL), and/or changing how content is displayed as part of the time user interface (e.g., as depicted in 606D in FIG. 6AV, 606E in FIG. 6AZ, 606F in FIG. 6BD, 606G in FIG. 6BH, and/or 606 in FIG. 6BL). In some embodiments, performing the sixth operation includes scrolling the set of widgets (e.g., as depicted in FIGS. 6AD-6AF), displaying an application launcher user interface (e.g., 622) and/or displaying a system control user interface (e.g., 658). While displaying a time user interface (e.g., 606D-606H), changing the first and second operations based on the direction of the rotational input provides the user with additional controls without needing to display an addition user interface.

In some embodiments, the rotational input (e.g., 612BW, 612BH, 6112BL, 612BP, and/or 612BU) includes a respective direction (e.g., clockwise or counterclockwise). In some embodiments, while displaying the system user interface (e.g., 616D in FIG. 6AF), the computer system (e.g., 600) detects, via the rotatable input mechanism (e.g., 604), an additional rotational input (e.g., 612AJ) in a direction opposite the respective direction (e.g., clockwise or counterclockwise). In some embodiments, in response to detecting the additional rotational input (e.g., 612AJ) in the direction opposite the respective direction, the computer system (e.g., 600) displays, via the display generation component (e.g., 602), the time user interface (e.g., 606C) (e.g., a watch user interface that includes an indication of a current time, a watch face, and/or a lock screen). In some embodiments, displaying the time user interface (e.g., one of 606A-606H) includes ceasing to display the system user interface (e.g., one of 618A-618H) and/or any one of 616A-616I). In some embodiments, displaying the system user interface includes displaying an animation transition from the system user interface to the time user interface. Displaying a time user interface in response to the rotational input in an opposite direction (e.g., opposite the respective direction) while displaying a set of widgets provides for a quick and easy way to return to the time user interface and, as a result, reduces the number of inputs needed to perform an operation.

Note that details of the processes described above with respect to method 900 (e.g., FIG. 9) are also applicable in an analogous manner to the methods described below/above. For example, method 900 optionally includes one or more of the characteristics of the various methods described above/below with reference to methods 700, 800, and 1000. For example, methods 700, 800, 900, and 1000 are used to display widgets and watch faces and edit widgets. For brevity, these details are not repeated below.

FIG. 10 is a flow diagram illustrating a method for 900 using a computer system in accordance with some embodiments. Method 1000 is performed at a computer system (e.g., 100, 300, 500 and/or 600) (e.g., a smart phone, a smart watch, a laptop, a desktop computer, TV, and/or a tablet) that is in communication with a display generation component (e.g., 602) (e.g., a display controller, a touch-sensitive display system, and/or a display (e.g., integrated and/or connected)) and a one or more input devices (e.g., touch sensitive portion of 602, 604, 605) (e.g., a touch-sensitive surface, a touchscreen, a button, a rotatable input mechanism, a rotatable and depressible input device, and/or a microphone).

Some operations in method 1000 are, optionally, combined, the orders of some operations are, optionally, changed, and some operations are, optionally, omitted.

As described below, method 1000 provides an intuitive way for displaying and/or editing widgets. The method reduces the cognitive burden on a user for displaying and editing widgets, thereby creating a more efficient human-machine interface. For battery-operated computing devices, enabling a user to display and edit various widgets faster and more efficiently conserves power and increases the time between battery charges.

The computer system (e.g., 600) displays (1002), via the display generation component (e.g., 602), a respective user interface (e.g., a wake screen user interface such as a watch face and/or a lock screen); In some embodiments, the wake screen user interface is an initially displayed screen of the computer system when the computer system transitions from a low power state (e.g., an off state, a sleeping state, a low power mode, a battery saver mode, and/or an eco-mode) to a higher power state (e.g., an active state, an on state, and/or a normal (non-low power) mode). While displaying the respective user interface (e.g., 606A and/or 606B in FIG. 6V), the computer system (e.g., 600) detects (1004), via the one or more input devices (e.g., touch sensitive portion of 602, 604, and/or 605), a first input (e.g., 612A and/or 612V) (e.g., touch input(s), rotational input(s), press input(s), swipe input(s), an input using a mouse/cursor, and/or air gesture(s)) of a first type (e.g., rotational input 612A and/or rotational input 612V) (e.g., a swipe input, a clockwise rotational input, and/or a tap input, an input using a mouse/cursor, and/or air gesture(s)). In response to detecting the first input (e.g., 612A and/or 612V) while displaying the respective user interface (e.g., 606A and/or 606B in FIG. 6V), the computer system (e.g., 600) displays (1006), via the display generation component (e.g., 602), a set of widgets (e.g., widgets 614A-614C in FIG. 6C and/or widgets 614G, 614H, 614B 614A, 614F, 614C, and/or 614E in FIG. 6X), including one or more contextually selected widgets (e.g., 614A in FIG. 6C and/or widgets 614G, 614H, and/or 614A in FIG. 6X). In accordance with a determination that a first widget (e.g., 614B, 614C in FIG. 6C and/or 614B, 614F, 614C, and/or 614E in FIG. 6X) was selected (e.g., based on one or more inputs such as user inputs in an editing user interface for the widgets) to be included in the set of widgets, the computer system (e.g., 600) displays (1008) a first widget (e.g., 614B, 614C in FIG. 6C and/or 614B, 614F, 614C, and/or 614E in FIG. 6X) in the set of widgets along with (e.g., displayed concurrently with or displayed sequentially in response to a user input such as a drag input, a swipe input, or a rotational input) the one or more contextually selected widgets (e.g., 614A in FIG. 6C and/or widgets 614G, 614H, and/or 614A in FIG. 6X). In accordance with a determination that a second widget (e.g., 614B, 614C in FIG. 6C and/or 614B, 614F, 614C, and/or 614E in FIG. 6X) was selected (e.g., based on one or more inputs such as user inputs in an editing user interface for the widgets) to be included in the set of widgets, the computer system (e.g., 600) displays (1010) the second widget (e.g., 614B, 614C in FIG. 6C and/or 614B, 614F, 614C, and/or 614E in FIG. 6X) in the set of widgets along with ((e.g., displayed concurrently with or displayed sequentially in response to a user input such as a drag input, a swipe input, or a rotational input) the one or more contextually selected widgets (e.g., 614A in FIG. 6C and/or widgets 614G, 614H, and/or 614A in FIG. 6X). In some embodiments, in accordance with the determination that the first widget (e.g., 614F) was selected (e.g., based on one or more inputs such as user inputs in an editing user interface for the widgets) to be included in the set of widgets and in accordance with the determination that the second widget was selected (e.g., 614B selected via pin input in FIG. 6J), including the first widget and the second widget in the set of widgets along with (e.g., displayed concurrently with or displayed sequentially in response to a user input such as a drag input, a swipe input, or a rotational input) the one or more contextually selected widgets (e.g., as depicted in FIG. 6X that shows contextual widgets 614G and 612W displayed in the same set of widgets as 614F and 614B). In some embodiments, in accordance with a determination that no widget was selected (e.g., based on one or more inputs such as user inputs in an editing user interface for the widgets) to be included in the set of widgets, displaying the set of widgets includes displaying one or more contextually selected widgets (e.g., without displaying any non-contextually selected widgets) (e.g., 616C could 614G and/or 614H without displaying other widgets). Displaying set of widgets that includes a one or more contextually selected widgets and a set (one or more) of user selected widgets allows for quicker selection of relevant widgets without additional user input by performing an operation when a set of conditions has been met without requiring further inputs.

In some embodiments, while displaying a set of widgets (e.g., 614A-614C in FIG. 6I), the computer system (e.g., 600) detects, via the one or more input devices (e.g., touch sensitive portion of 602, 604, and/or 605), a first input (e.g., 612J) (e.g., tap, long press, swipe, rotational input, an input using a mouse/cursor, and/or air gesture(s)). In some embodiments, in response to detecting the first input (e.g., 612J), the computer system (e.g., 600) enters an editing mode (e.g., interface 626 in FIG. 6J) for the set of widgets. In some embodiments, the input (e.g., touch input (e.g., tap and/or long press), using a mouse/cursor, and/or air gesture) is directed to or detected at (e.g., on) an editing mode button (e.g., a button displayed as part of 618B). In some embodiments, the input (e.g., long press) is directed to or detected at (e.g., on) a widget in the set of widgets. In some embodiments, entering an editing mode (e.g., interface 626 in FIG. 6J) for the set of widgets includes displaying an editing user interface (e.g., interface 626) for the set of widgets, wherein the editing user interface (e.g., interface 626 in FIG. 6J) includes graphical objects (e.g., 632A and/or 324A) for editing the set of widgets that were not displayed prior to entering the editing mode. In some embodiments, the set of graphical objects for editing the set of widgets are displayed concurrently with the set of widgets. In some embodiments, the graphical objects for editing the set of widgets are not displayed with the set of widgets. Allowing a user to edit the set of widgets in an edit mode allows for the user to control where and which widgets are displayed and thus provides improved visual feedback.

In some embodiments, while in the editing mode (e.g., interface 626 in FIG. 6J) for the set of widgets, the computer system (e.g., 600) detects, via the one or more input devices (e.g., touch sensitive portion of 602, 604, and/or 605), a second input (e.g., 612K, 612L, 612M, 612P, and/or 612Q1), (e.g., touch (e.g., tap and/or long press), and/or swipe, an input using a mouse/cursor, and air gesture). In some embodiments, in response to detecting the second input (e.g., 612Q1) and in accordance with a determination that the second input (e.g., 612Q1) is directed to a first graphical object (e.g., 628) (e.g., image, icon, and/or button), the computer system (e.g., 600) initiates a process for selecting the first respective widget to be included in the set of widgets (e.g., as depicted in FIG. 6Q). In some embodiments, initiating a process for selecting the respective widget to be included in the set of widgets comprises displaying a widget selection user interface that includes all widgets or all available widgets to be added. In some embodiments, while displaying the user interface that includes all widgets or all available widgets available to be added, a user selects one or a plurality of widgets to add to the set of widgets. In some embodiments, the selected widget is automatically (without additional input) added to the set of widgets in response to the selection. In some embodiments, an additional input is detected at (e.g., on) or directed (e.g., on) to a confirmation graphical object that causes the selected widgets to be added the stack or widgets. In some embodiments, in response to detecting the second input (e.g., 612P) and in accordance with a determination that the second input (e.g., 612P) is directed to a second graphical object (e.g., 632A, 632B, 632C, 632D and/or 632E) that(e.g., the first widget in the set of widgets, the second widget in the set of widgets, and/or a contextual widget from the one or more contextually selected widgets), the computer system (e.g., 600) initiates a process for removing the second widget from the set of widgets (e.g., as depicted in FIGS. 6O and 6P). In some embodiments, initiating a process for removing the second respective widget from the stack of widgets comprises displaying a confirmation user interface to receive user input confirming the removal prior to the computer system removing the second respective widget from the set of widgets. In some embodiments, in response to detecting the second input (e.g., 612K and/or 612L) and in accordance with a determination that the second input (e.g., 612K and/or 612L) is directed to a third graphical object (e.g., 634A, 634B, 634C, 634D, and/or 634E) (e.g., image, icon and/or button), the computer system (e.g., 600) initiates a process for modifying a designation state (e.g., pinned and/or unpinned, selected and/or unselected) of a third respective widget (e.g., as depicted in FIGS. 6J and 6K) (e.g., the first widget in the set of widgets, the second widget in the set of widgets, and/or a contextual widget from the one or more contextually selected widgets). In some embodiments, the widgets in the set of widgets that have a pinned designation state are displayed above the widgets in the set of widgets that have an unpinned designation state. In some embodiments, the process for modifying the designation state of the third respective widget includes pinning the position of the third respective widget within the set of widgets such that the third respective widget is displayed at an end (e.g., top of stack, beginning of stack, bottom of stack, and/or end of stack). In some embodiments, the process for modifying the designation state of the third respective widget includes unpinning the position of the third respective widget within the set of widgets such that the third respective widget is displayed at an end (e.g., top of stack, beginning of stack, bottom of stack, and/or end of stack). In some embodiments, the second input (e.g., 612K and/or 612L) is directed to or detected at the first graphical object (e.g., 634A, 634B, 634C, 634D, and/or 634E) (e.g., image, icon, and/or button) that, when activated, initiates a process for selecting a first respective widget to be included in the set of widgets. In some embodiments, the second input (e.g., 612K and/or 612L) is directed to the second graphical object (e.g., 634A, 634B, 634C, 634D, and/or 634E) that, when activated, initiates a process for removing a second respective widget (e.g., unpinned causes the widget to be removed from the set of widgets) from the set of widgets. In some embodiments, in accordance with the determination that the second input (e.g., 612K and/or 612L) is directed to the third graphical object (e.g., 634A, 634B, 634C, 634D, and/or 634E) that, when activated, initiates a process for modifying a designation state (e.g., pinned and/or unpinned, selected and/or unselected) of the third respective widget (e.g., the first widget in the set of widgets, the second widget in the set of widgets, and/or a contextual widget from the one or more contextually selected widgets), the computer system (e.g., 600), initiates a process for modifying the designation state of the third respective widget. Allowing a user to add, delete, and pin specific widgets in the set of widgets in an edit mode allows for the user to control where and which widgets are displayed and thus provides improved visual feedback.

In some embodiments, the set of widgets (e.g., 614A, 614B, and/or 614C) includes a first subset of widgets (e.g., 614A, 614B, and/or 614C) (e.g., all, or less than all of the set of widgets) with a first designation state (e.g., pinned and/or unpinned). In some embodiments, while in the editing mode (e.g., 626) for the set of widgets, the computer system (e.g., 600) displays, via the display generation component (e.g., 602), the first subset (e.g., 614A, 614B, and/or 614C) (e.g., all or less than all of the set of widgets) of widgets in a first order (e.g., arrangement). In some embodiments, while displaying the first subset (e.g., 614A, 614B, and/or 614C) (e.g., all or less than all of the set of widgets) of widgets in the first order (e.g., arrangement), the computer system (e.g., 600) detects, via the one or more input devices (e.g., touch sensitive portion of 602, 604, and/or 605), a third input (e.g., 612K, 612L, and/or 612M) (e.g., touch (e.g., tap and/or long press), drag, swipe, rotational input, an input using a mouse/cursor, and/or air gesture). In some embodiments, the user third input is an input detected as a result of a user action. In some embodiments, in response to detecting the third input (e.g., 612K, 612L, and/or 612M), the computer system (e.g., 600) displays, via the display generation component (e.g., 602), the first subset (e.g., all or less than all of the set of widgets) of widgets in a second order (e.g., arrangement), different from the first order (e.g., as depicted in FIG. 6K and/or 6L) (e.g., arrangement). In some embodiments, widgets with a second designation state (e.g., unpinned) do not change order in response to a user input (e.g., touch (e.g., tap and/or long press), swipe, rotational input, an input using a mouse/cursor, and air gesture). In some embodiments, the first subset of widgets includes the first widget in the set of widgets, the second widget in the set of widgets, and/or a contextual widget from the one or more contextually selected widgets. Allowing a user to rearrange the order of pined widgets in the set of widgets in an edit mode allows for the user to control where and which widgets are displayed and thus provides improved visual feedback.

In some embodiments, the third input (e.g., 612K, 612L, and/or 612M) includes a touch gesture at a first location (e.g., of a touch-sensitive surface), and the third input (e.g., 612K, 612L, and/or 612M) includes movement (e.g., movement of 612M) (e.g., drag) of the touch gesture to a second location (e.g., of a touch-sensitive surface and/or corresponding to the display generation component). In some embodiments, the movement from a first location to a second location is detected while detecting touch with the display generation component (e.g., without detecting a break in the touch input). In some embodiments, prior to the touch gesture, the third input includes a long press gesture. Allowing a user to rearrange the order of pined widgets in the set of widgets via a touch and drag gesture in an edit mode allows for the user to control where and which widgets are displayed and thus provides improved visual feedback.

In some embodiments, the set of widgets includes a second subset (e.g., all or less than all of the set of widgets) of widgets (e.g., 614A-614C) with a second designation state (e.g., unpinned or pinned) (e.g., different from the first designation state). In some embodiments, in response to detecting the first input (e.g., 612J and/or 612V) while displaying the respective user interface and in accordance with a determination that the computer system (e.g. 600) meets a set of contextual criteria, the computer system (e.g., 600) displays, via the display generation component (e.g., 602), the second subset (e.g., 614G, 614H, 614B, 614A, 614F, 614C, and/or 614E) (e.g., all or less than all of the set of widgets) of widgets in a third order (e.g., as depicted in FIG. 6X)(e.g., arrangement). In some embodiments, in response to detecting the first input (e.g., 612J and/or 612V) while displaying the respective user interface and in accordance with a determination that the computer system (e.g., 600) does not meet the set of contextual criteria, the computer system (e.g., 600) displays, via the display generation component (e.g., 602), the second subset (e.g., all or less than all of the set of widgets) of widgets in a fourth order (e.g., as depicted in FIG. 6AD), different from the third order. In some embodiments, the second subset (e.g., all or less than all of the set of widgets) of widgets includes the first widget (e.g., 614A in FIG. 6X) in the set of widgets, the second widget in the set of widgets (e.g., 614B in FIG. 6X), and/or a contextual widget from the one or more contextually selected widgets (e.g., 614G in FIG. 6X)). Changing the display order of the set of widgets (e.g., pinned and/or unpinned) based on a determined device context (e.g., automatically) allows for quicker rearranging of the widgets so that the more relevant widgets are displayed at the top of set without additional user input by performing an operation when a set of conditions has been met without requiring further inputs.

In some embodiments, the set of contextual criteria includes a first contextual criterion that is based on a current time (e.g., that is met when a current time (e.g., current time of a day) corresponds to a predetermined time). In some embodiments, the current time corresponds to the predetermined time when it is within (e.g., plus or minus) a threshold of time (0 seconds, 1 second, 5 second, 5 minutes, 10, minutes, 1 hour, 8 hours, 1 day or 1 week) of the predetermined time (e.g., computer system determines time to leave for doctor's appointment as shown in FIG. 6X by widget 614H). In some embodiments, the predetermined time corresponds to a time in a calendar entry (e.g., corresponding to widget 614A). In some embodiments, the predetermined time corresponds to a preset alarm. In some embodiments, in accordance with a determination that a time value of the current time corresponds to a first predetermined time value (e.g., current time or future time), displaying, via the display generation component, the respective subset (e.g., all or less than all of the set of widgets) of widgets (e.g., widgets in FIG. 6X) in a first respective order.

In some embodiments, in accordance with a determination that the time value of the current time corresponds to a second predetermined time value (e.g., current time or future time), different from the first predetermined time value, displaying, via the display generation component, the respective subset (e.g., all or less than all of the set of widgets) of widgets (e.g., for example, the computer system displays the same widgets in FIG. 6X in one order in the morning and in a different order in the evening) in a second respective order, different from the second respective order. In some embodiments, the respective subset (e.g., all or less than all of the set of widgets) of widgets in the first respective order incudes more, less, or the same amount (e.g., total number of widgets and/or total number of at least partially/fully visible widgets) of widgets than the respective subset (e.g., all or less than all of the set of widgets) of widgets (e.g., for example, the computer system 600 displays the same widgets in FIG. 6X in one order in the morning and in a different order in the evening) in the second respective order. Changing the display order of the set of widgets (e.g., pinned and/or unpinned) based on a time of day allows for quicker rearranging of the widgets so that the more relevant widgets are displayed at the top of set without additional user input by performing an operation when a set of conditions has been met without requiring further inputs.

In some embodiments, the set of contextual criteria includes a second contextual criterion that is based on a current location of the computer system (e.g., that is met when a location of the computer system corresponds to a predetermined location). In some embodiments, the location of the computer system (e.g., 600) corresponds to the predetermined location (e.g., location of computer system 600) when it is within (e.g., plus or minus) a threshold distance (e.g., 0 inches, 5 inches, 1 foot, 5 feet, 10 feet, 100 feet, 1 mile, or 10 miles) of the predetermined location. In some embodiments, the predetermined location corresponds to a location of a companion device and/or the computer system. In some embodiments, the predetermined location corresponds to a location within a room. In some embodiments, the predetermined location corresponds to a geographical location. In some embodiments, the location of the computer system is detected, via one or more location sensors at the computer system. In some embodiments, in accordance with a determination that a location value of the current location of the computer system (e.g., 600) corresponds to a first predetermined location value, displaying, via the display generation component (e.g., 602), the respective subset (e.g., all or less than all of the set of widgets) of widgets (e.g., widgets in FIG. 6X) in a first respective order.

In some embodiments, in accordance with a determination that the location value of the current location corresponds to a second predetermined location value, different from the first predetermined location value, displaying, via the display generation component, the respective subset (e.g., all or less than all of the set of widgets) of widgets in a second respective order, different from the second respective order (e.g., for example, the computer system 600 displays the same widgets in FIG. 6X in one order when the user is at work and in a different when the user is at home). In some embodiments, the respective subset (e.g., all or less than all of the set of widgets) of widgets in the first respective order incudes more, less, or the same amount (e.g., total number of widgets and/or total number of at least partially/fully visible widgets) of widgets than the respective subset (e.g., all or less than all of the set of widgets) of widgets in the second respective order (e.g., for example, the computer system 600 displays the same widgets in FIG. 6X in one order when the user is at work and in a different when the user is at home). Changing the display order of the set of widgets (e.g., pinned and/or unpinned) based on a location of the device allows for quicker rearranging of the widgets so that the more relevant widgets are displayed at the top of set without additional user input by performing an operation when a set of conditions has been met without requiring further inputs.

In some embodiments, the set of contextual criteria includes a third contextual criterion that is met when a first application running (e.g., executing) on the computer system corresponds to a first predetermined application (e.g., application corresponding to 614G, 614C, and/or 614I). In some embodiments, the application running on the computer system corresponds to an ongoing activity. In some embodiments, the application running on the computer system is one that was previously launched in response to the computer system detecting an input (e.g., an input from a user). In some embodiments, the user interface corresponding to the application running (e.g., executing) on the computer system is displayed on the computer system. In some embodiments, the user interface corresponding to the application running (e.g., executing) on the computer system is not displayed on the computer system. In some embodiments, the first predetermined application corresponds to an application that provides an active timer, active ride sharing information, active call information, active music playback information, live (e.g., near live) sport scores, active directions, active workout, active stopwatch, and/or information about a recent purchase. In some embodiments, in accordance with a determination that a value (e.g., setting and/or preference) of the first predetermined application running on the computer system corresponds to a first predetermined application value (e.g., setting and/or preference), displaying, via the display generation component, the respective subset (e.g., all or less than all of the set of widgets) of widgets in a first respective order. In some embodiments, in accordance with a determination that a value (e.g., setting and/or preference) of the first predetermined application running on the computer system corresponds to a second predetermined application value, different from the first predetermined application value, displaying, via the display generation component, the respective subset (e.g., all or less than all of the set of widgets) of widgets in a second respective order, different from the second respective order. In some embodiments, the respective subset (e.g., all or less than all of the set of widgets) of widgets in the first respective order incudes more, less, or the same amount (e.g., total number of widgets and/or total number of at least partially/fully visible widgets) of widgets than the respective subset (e.g., all or less than all of the set of widgets) of widgets in the second respective order. Changing the display order of the set of widgets (e.g., pinned and/or unpinned) based on ongoing activity (e.g., running application) at the device allows for quicker rearranging of the widgets so that the more relevant widgets are displayed at the top of set without additional user input by performing an operation when a set of conditions has been met without requiring further inputs.

In some embodiments, the set of contextual criteria includes a fourth contextual criterion that is met when a second application running (e.g., executing) on a companion computer (e.g., 601) system corresponds to a second predetermined application (e.g., application corresponding to 648A). In some embodiments, the application running on the computer system is an ongoing activity. In some embodiments, the application running on the computer system is one that was previously launched in response to the companion computer system detecting an input (e.g., an input from a user). In some embodiments, the second application running (e.g., executing) on the companion computer system is also running (e.g., executing) on the computer system. In some embodiments, the second application running (e.g., executing) on the companion computer system is not running (e.g., executing) on the computer system. In some embodiments, the second predetermined application corresponds to an application that provides an active timer, active ride sharing information, active call information, active music playback information, live (e.g., near live) sport scores, active directions, active workout, active stopwatch, and/or information about a recent purchase. In some embodiments, in accordance with a determination that a value (e.g., setting and/or preference) of the second predetermined application running on the companion computer system corresponds to a first predetermined application value (e.g., setting and/or preference), displaying, via the display generation component, the respective subset (e.g., all or less than all of the set of widgets) of widgets in a first respective order. In some embodiments, in accordance with a determination that a value (e.g., setting and/or preference) of the second predetermined application running on the companion computer system corresponds to a second predetermined application value, different from the first predetermined application value, displaying, via the display generation component, the respective subset (e.g., all or less than all of the set of widgets) of widgets in a second respective order, different from the second respective order. In some embodiments, the respective subset (e.g., all or less than all of the set of widgets) of widgets in the first respective order incudes more, less, or the same amount (e.g., total number of widgets and/or total number of at least partially/fully visible widgets) of widgets than the respective subset (e.g., all or less than all of the set of widgets) of widgets in the second respective order. Changing the display order of the set of widgets (e.g., pinned and/or unpinned) based on ongoing activity (e.g., running application) at the companion device allows for quicker rearranging of the widgets so that the more relevant widgets are displayed at the top of set without additional user input by performing an operation when a set of conditions has been met without requiring further inputs.

In some embodiments, the set of widgets includes a particular widget (e.g., 614A and/or 614B in FIG. 6J) with a first position state (e.g., unpinned state). In some embodiments, while concurrently displaying, via the display generation component (e.g., 602), the particular widget and a respective graphical object corresponding to the particular widget (e.g., 634A and/or 643B), the computer system (e.g., 600) detects, via the one or more input devices (e.g., touch sensitive portion of 602, 604, and/or 605), a fourth input (612K and/or 612L) corresponding to the respective graphical object (e.g., 634A and/or 643B). In some embodiments, in response to detecting the fourth input (612K and/or 612L), the computer system (e.g., 600) changes a position state of the particular widget from the first position state (e.g., unpinned state) to a second position state (e.g., as depicted in FIGS. 6K and 6L) (e.g., pinned state). In some embodiments, changing the pin state of the particular widget from the first pin state (e.g., unpinned state) to the second pin state includes changing the visual appearance of the pin graphical object corresponding the unpinned widget. In some embodiments, a pinned state for a widget is a state in which a widget, in the set of widgets, is affixed or anchored to a specific location (e.g., display position or position) within the set of widgets. In some embodiments, the position or order of a widget in a pinned state does not change when the set of widgets are displayed and then redisplayed. In some embodiments, the order of unpinned widgets cannot be changed (e.g., via a detected input). In some embodiments, the computer system can change the (display) order of pined widgets relative to unpinned widgets based on a priority value of other respective unpinned widgets. In some embodiments, the computer system does not change the (display) order of pined widgets relative to unpinned widgets based on the priority value of other respective unpinned widgets. In some embodiments, an unpinned state for a widget is a state in which a widget, in the set of widgets, is not affixed or anchored to a specific location (e.g., display position or position) within the set of widgets. In some embodiments, the position or order of a widget in an unpinned state changes when the set of widgets are displayed and then redisplayed. In some embodiments, the position or order of a widget in an unpinned state does not change when the set of widgets are displayed and then redisplayed. In some embodiments, the order of unpinned widgets can be changed (e.g., via a detected input). In some embodiments, the computer system can change the (display) order of unpinned widgets relative to other displayed (e.g., pinned and/or unpinned) widgets. Allowing a user to pin specific widgets in the set of widgets by selecting a pin graphical object allows for the user to control where and which widgets are displayed and thus provides improved visual feedback.

In some embodiments, the first input (e.g., 612J) includes a long press (e.g., using a mouse/cursor, touch input, and/or air gesture) input. In some embodiments, the long press includes a touch input that includes contact with the display generation component for a time that exceeds a non-zero threshold. Displaying an edit mode user interface in response a long press input provides for a quick and easy way to enter the editing mode for the set of widgets and, as a result, reduces the number of inputs needed to perform an operation.

In some embodiments, while in the editing mode (e.g., 626) for the set of widgets, the computer system (e.g., 600) displays, via the display generation component (e.g., 602), a third subset (e.g., all or less than all of the set of widgets) of widgets (e.g., 614A and 614B) from the set of widgets. In some embodiments, while displaying the third subset (e.g., all or less than all of the set of widgets) of widgets, the computer system (e.g., 600) detects, via the one or more input devices (e.g., touch sensitive portion of 602, 604, and/or 605), a drag gesture (e.g., 612M and/or 612O). In some embodiments, the user third input is an input detected as a result of a user action. In some embodiments, in response to detecting the drag gesture (e.g., 612M and/or 612O), the computer system (e.g., 600) displays, via the display generation component (e.g., 602), a fourth subset (e.g., all or less than all of the set of widgets) of widgets from the set of widgets different from the third subset (e.g., all or less than all of the set of widgets) of widgets (e.g., as depicted in FIG. 6N and/or 6O). In some embodiments, displaying the fourth subset (e.g., all or less than all of the set of widgets) of widgets from the set of widgets different from the third subset (e.g., all or less than all of the set of widgets) of widgets includes scrolling the set of widgets. Navigating the set of widgets via a drag input while in the edit mode provides for a quick and easy way to navigate the set of widgets and, as a result, reduces the number of inputs needed to perform an operation.

In some embodiments, the one or more input devices (e.g., touch sensitive portion of 602, 604, and/or 605) includes a rotatable input mechanism (e.g., 604). In some embodiments, while in the editing mode (e.g., 626) for the set of widgets, the computer system (e.g., 600) displays, via the display generation component (e.g., 602), a fifth subset (e.g., all or less than all of the set of widgets) of widgets (e.g., widgets in FIG. 6N) from the set of widgets. In some embodiments, while displaying the fifth subset (e.g., widgets in FIG. 6N) (e.g., all or less than all of the set of widgets) of widgets, the computer system (e.g., 600) detects, via the rotatable input mechanism (e.g., 604), a rotational input (e.g., 612N). In some embodiments, in response to detecting the rotational input (e.g., 612N), the computer system (e.g., 600) displays, via the display generation component (e.g., 602), a sixth subset (e.g., all or less than all of the set of widgets) of widgets from the set of widgets different from the fifth subset (e.g., all or less than all of the set of widgets) of widgets (e.g., as depicted in FIG. 6O). In some embodiments, displaying the sixth subset (e.g., all or less than all of the set of widgets) of widgets from the set of widgets different from the fifth subset (e.g., all or less than all of the set of widgets) of widgets includes scrolling the set of widgets. Navigating the set of widgets via a rotational input while in the edit mode provides for a quick and easy way to navigate the set of widgets and, as a result, reduces the number of inputs needed to perform the navigation operation.

In some embodiments, the computer system (e.g., 600) displays (e.g., while in the editing mode), via the display generation component (e.g., 602), an add graphical object (e.g., 628). In some embodiments, while displaying the add graphical object (e.g., 628), the computer system (e.g., 600) detects an input (e.g., 612Q1) directed to the add graphical object (e.g., 628). In some embodiments, in response to detecting the input directed to the add graphical object (e.g., 628), computer system (e.g., 600) initiates the process for adding one or more widgets to the set of widgets (e.g., including displaying a user interface for adding one or more widgets to the set of widgets). In some embodiments, the add graphical object (e.g., 628) is displayed while in the editing mode for the set of widgets. In some embodiments, the add graphical object (e.g., 628) is not displayed if the computer system is not in the editing mode for the set of widgets. In some embodiments, the user interface for adding one or more widgets to the set of widgets comprises a widget selection user interface (e.g., 640 in FIG. 6Q) that includes all widgets or all available widgets to be added. In some embodiments, while displaying the user interface that includes all widgets (e.g., 640 in FIG. 6Q) or all available widgets available to be added, a user selects one or a plurality of widgets to add to the set of widgets. In some embodiments, the selected widget (e.g., 614F in FIG. 6Q) is automatically (without additional input) added to the set of widgets in response to the selection. In some embodiments, an additional input is detected at (e.g., on) or directed to (e.g., on) a confirmation graphical object that causes the selected widgets to be added the set of widgets. Allowing a user to add widgets to the set of widgets in response to an input on a button allows for the user to control which widgets are displayed and thus provides improved visual feedback.

In some embodiments, while displaying the set of widgets, the computer system (e.g., 600) detects a set of one or more inputs for adding a first complication widget (e.g., 614E) to the set of widgets, wherein the first complication widget (e.g., 614E) includes a set (e.g., 0, 1, 2, 3, 5, or 10) of (e.g., one or more) complications (e.g., 638A). In some embodiments, in response to detecting the set of one or more inputs for adding the first complication widget (e.g., 614E) to the set of widgets, the computer system (e.g., 600) adds the first complication widget (e.g., 614E) to the set of widgets that includes the set (e.g., 0, 1, 2, 3, 5, or 10) of complications (e.g., 638A illustrates an example of a complication). In some embodiments, a complication refers to any clock/watch face feature other than those used to indicate the hours and minutes of a time (e.g., clock hands that indicate an hour, minute, or second of a current time and/or a digital time that indicates an hour, minute, and/or second of a current time). In some embodiments, complications provide different types of information to a user, such as data obtained from an application, and the information conveyed to a user by a complication. In some embodiments, a complication corresponds to one of the widgets in the set widgets. In some embodiments, a complication does not correspond to any of the widgets in the set of widgets. In some embodiments, the set of widgets includes zero, one, two, five, or unlimited complication widgets. Allowing a user to add a widget group that corresponds to multiple individually selected widgets allows for a greater number of widgets to be concurrently displayed in a singular widget panel and thus provides improved visual feedback. Also, including complications in one widget panel reduces the number of inputs necessary to access each of the complications as multiple complications would be displayed at the same time.

In some embodiments, the set of widgets includes a second complication widget (e.g., 614E) that includes one or more complications (e.g., 638A) of a set of complications. In some embodiments, a complication refers to any clock/watch face feature other than those used to indicate the hours and minutes of a time (e.g., clock hands or hour/minute. In some embodiments, complications provide different types of information to a user, such as data obtained from an application, and the information conveyed to a user by a complication. In some embodiments, a complication corresponds to one of the widgets in the set of widgets. In some embodiments, a complication does not correspond to any of the widgets in the set of widgets. Adding an additional complication widget provides the user with a quick and easy way to select complications from the set of widgets, and, as a result, reduces the number of inputs needed to perform an operation corresponding to an application associated with the complication.

In some embodiments, the one or more contextually selected widgets are included in the set of widgets in accordance with a determination that a live session is available (e.g., a session corresponding to widget 614G, 614H and/or 614I), wherein the live session corresponds to an ongoing activity with periodic updates. (e.g., at the computer system and/or at an external or companion device (e.g., smartphone, tablet, or laptop)) corresponds to a third predetermined application. In some embodiments, the one or more contextually selected widgets corresponds to the third application executing at the device. In some embodiments, the one or more contextually selected widgets correspond to the third application executing at a device. In some embodiments, automatically including widgets that correspond to ongoing activities allows for quicker selection of relevant widgets without additional user input or without needing to access a different device.

In some embodiments, the one or more contextually selected widgets (e.g., widget 614G, 614H and/or 614I) are included in the set of widgets in accordance with a determination that a contextual setting is enabled. In some embodiments, in accordance with a determination that a contextual setting is not enabled (e.g., disabled and/or not operational), the one or more contextually selected widgets are not included in the set of widgets. In some embodiments, a contextual setting is enabled/disabled at the computer system and/or at a companion device (e.g., smartphone, tablet, or laptop). Disabling automatically including widgets that correspond to ongoing activities allows for greater control over what information is presented to the user and improving visual feedback.

In some embodiments, the one or more contextually selected widgets (e.g., widget 614G, 614H and/or 614I) correspond to a respective set of one or more applications that provide at least one of an active timer information, active ride sharing information, active music playback information, active workout information, and active stopwatch information. In some embodiments, at least one widget in the one or more contextually selected widgets includes a set of graphical objects for controlling a respective application. In some embodiments, the set of graphical objects includes a pause, stop, cancel, delete, and/or remove options corresponding to the respective application. In some embodiments, the one or more contextually selected widgets are updated over time. In some embodiments, the first information displayed at a first time via a respective contextual widget selected from the one or more contextually selected widgets is different from the second information displayed at a second time, different (e.g., later/earlier than the first time) from the first time, via the respective contextual widget. Automatically including widgets that correspond to one or more of applications associated with playing music, active timer, workout session, stopwatch allows for quicker selection of relevant widgets without needing additional user input and/or without needing to specifically access the respective application.

In some embodiments, while displaying the respective user interface (e.g., a wake screen user interface such as a watch face and/or a lock screen) and in accordance with the determination that live session (e.g., at the computer system and/or at the external or companion device (e.g., smartphone, tablet, or laptop)) corresponds to a third application, the computer system (e.g., 600) displays, via the display generation component (e.g., 602), a graphical indicator (e.g., 648A, 648B, 648C in FIG. 6AG and/or 648D in FIGS. 6AV, 6AZ, 6BD, 6BH, and/or 6BL) (e.g., badge, icon, text, and/or image) that indicates that the live session associated with (e.g., corresponding to) the third application is ongoing. In some embodiments, the visual appearance of the graphical indicator changes based on the type of third application. In some embodiments, the graphical indicator provides indication about at least one of an active timer information, active ride sharing information, active music playback information, active workout information, and active stopwatch information. In some embodiments, while displaying the respective user interface, the computer system detects an input (e.g., 612BW) (e.g., touch (e.g., tap and/or long press), and/or swipe, rotational input, an input using a mouse/cursor, and/or air gesture) and in response to detecting the input (e.g., 612BW), the computer system (e.g., 600) displays a respective widget (e.g., 614I) (e.g., a live widget and or a widget that is updated in real time) corresponding to the live activity associated with (e.g., corresponding to) the third application. In some embodiments. while displaying the respective user interface (e.g., a wake screen user interface such as a watch face and/or a lock screen) and in accordance with the determination that the live session (e.g., at the computer system and/or at the external or companion device (e.g., smartphone, tablet, or laptop)) corresponds to fourth application (e.g., different than the third application), displaying, via the display generation component, a second graphical indicator (e.g., 648D) (e.g., different that the graphical indicator) (e.g., badge, icon, text, and/or image) that indicates that the live session associated with (e.g., corresponding to) the fourth application is ongoing. In some embodiments, the visual appearance of the second graphical indicator (e.g., 648D) changes based on the type of fourth application. In some embodiments, the second graphical indicator provides indication about at least one of an active timer information, active ride sharing information, active music playback information, active workout information, and active stopwatch information. In some embodiments, computer system 600 concurrently displays multiple graphical indicators for multiple respective live sessions. Displaying a notification badge on watch face (e.g., respective user interface) when widgets are not displayed to indicate currently ongoing activity allows the user to know what is running in the background and improves visual feedback.

In some embodiments, while displaying the set of widgets (and/or while not in the editing mode), the computer system (e.g., 600) detects, via the one or more input devices (e.g., touch sensitive portion of 602, 604, and/or 605), a seventh input (e.g., 612AQ) (e.g., tap, long press, swipe, rotational input, an input using a mouse/cursor, and/or air gesture) corresponding to a third widget (e.g., 614E) from the set of widgets. In some embodiments, the third widget corresponds to any widget from the set of widgets. In some embodiments, in response to detecting the seventh input, the computer system (e.g., 600) initiates a process to set a position of the widget within the set of widgets (e.g., display of 656 and/or input 612AR) (e.g., adding the widget to a top of the set of widgets and/or displaying). In some embodiments, if the pin state of the third widget corresponds to the pinned state, detecting the seventh input would cause the pin state to change to the unpinned state, and vice versa. In some embodiments, the seventh input is detected while not in the editing mode for the set of widgets. Allowing a user to pin specific widgets in the set of widgets while not in an edit mode allows for the user to control where and which widgets are displayed and thus provides improved visual feedback.

In some embodiments, while displaying the set of widgets (and/or while not in the editing mode), the computer system (e.g., 600) detects, via the one or more input devices (e.g., touch sensitive portion of 602, 604, and/or 605), an eighth input (e.g., 612AN) (e.g., touch (e.g., tap and/or long press), swipe, an input using a mouse/cursor, and/or air gesture) corresponding to a fourth widget (e.g., 614B) from the set of widgets. In some embodiments, the fourth widget corresponds to any widget from the set of widgets. In some embodiments, in response to detecting the eighth input (e.g., 612AN), the computer system (e.g., 600) initiates a process to delete the fourth widget from the set of widgets (e.g., display of 654 and/or input 612AO) (e.g., deleting the fourth widget from the set of widgets and/or displaying a delete graphical object, that, when selected, initiates a process for deleting (e.g., removing, eliminating, and/or taking out) the fourth widget from the set of widgets). In some embodiments, while displaying the delete graphical object, the computer system detects a ninth input, and in response to detecting the ninth input, deleting the fourth widget from the set of widgets. In some embodiments, subsequent to deleting the fourth widget from the set of widgets, detecting, via the one or more input devices, a tenth input (e.g., touch input, rotational input, press input, and/or swipe input) of the first type (e.g., any combination of touch inputs, a swipe input, a clockwise rotational input, a tap input, an input using a mouse/cursor, and/or air gesture); and in response to detecting the tenth input while displaying the respective user interface, displaying, via the display generation component, the set of widgets, wherein the set of widgets does not include the fourth widget. In some embodiments, in accordance with a determination that the eight input (e.g., 612AN) corresponds to an input (e.g., swipe input using a mouse/cursor, touch, and/or air gesture(s)) in a first direction (e.g., left, right, up down, or diagonal), the computer system (e.g., 600) displays, via the display generation component (e.g., 602), the delete graphical object (e.g., 654) that, when selected, initiates the process for deleting (e.g., removing, eliminating, and/or taking out) the fourth widget from the set of widgets (and does not display the respective graphical object, that when selected changes the position state of the third widget). In some embodiments, in accordance with a determination that the eight input (e.g., 612AN) corresponds to an input (e.g., swipe input using a mouse/cursor, touch, and/or air gesture(s)) in a second direction (e.g., left, right, up down, or diagonal) that is opposite the first direction, the computer system (e.g., 600) displays, via the display generation component (e.g., 602), the respective graphical object (e.g., 656), that when selected changes the position state of the third widget (and does not display the delete graphical object). In some embodiments, in accordance with a determination that the eight input (e.g., 612AN) corresponds to the input (e.g., swipe input using a mouse/cursor, touch, and/or air gesture(s)) in the first direction (e.g., left, right, up down, or diagonal), the computer system (e.g., 600) displays (e.g., concurrently displays), via the display generation component, the delete graphical object (e.g., 654) that, when selected, initiates the process for deleting (e.g., removing, eliminating, and/or taking out) the fourth widget from the set of widgets and the respective graphical object (e.g., 656), that when selected changes the position state of the third widget. In some embodiments, in accordance with a determination that the eight input (e.g., 612AN) corresponds to the input (e.g., swipe input using a mouse/cursor, touch, and/or air gesture(s)) in the first direction (e.g., left, right, up down, or diagonal), the computer system (e.g., 600) displays (e.g., concurrently displays), via the display generation component, the delete graphical object (e.g., 654) that, when selected, initiates the process for deleting (e.g., removing, eliminating, and/or taking out) the fourth widget from the set of widgets and the respective graphical object (e.g., 656), that when selected changes the position state of the third widget. In some embodiments, in addition to displaying (e.g., concurrently displaying) the delete graphical object and the respective graphical object, the computer system displays (e.g., concurrently displays) additional graphical object(s) (e.g., in addition to 654 and 656), that when activated (e.g., selected) initiate a change to a property/characteristic (e.g., visual and function) of the fourth widget. Allowing a user to delete specific widgets in the set of widgets while not in an edit mode allows for the user to control which widgets are displayed and thus provides improved visual feedback.

Note that details of the processes described above with respect to method 1000 (e.g., FIG. 10) are also applicable in an analogous manner to the methods described above. For example, method 1000 optionally includes one or more of the characteristics of the various methods described above with reference to methods 700, 800, and 900. For example, methods 700, 800, 900, and 1000 are used to display widgets and/or edit widgets.

FIGS. 11A-11V illustrate exemplary user interfaces for navigating user interfaces. The user interfaces in FIGS. 11A-11V are used to illustrate the processes described below, including the processes in FIGS. 12-13.

FIG. 11A illustrates computer system 600 (e.g., a smart watch) with display 602 and crown 604, which is a rotatable input mechanism. Computer system 600 is displaying a first page 1102A of a messaging application, such as an instant messaging application. In some embodiments, when computer system 600 initially starts executing the instant messaging application (e.g., in response to user input) and/or initially displays the instant messaging application (e.g., in response to user input), computer system 600 displays first page 1102A of the instant messaging application, as shown in FIG. 11A. First page 1102A includes an array of contact icons 1104, including first contact icon 1104A and second contact icon 1104B. In some embodiments, array of contact icons 1104 correspond to user-selected (e.g., favorites) contacts (e.g., friends and/or family). For example, first contact icon 1104A corresponds to a first person. When first contact icon 1104A is activated (e.g., via a tap input and/or a tap-and-hold input), computer system 600 displays a message conversation between the first person and the user of computer system 600 (without displaying a second message conversation). Similarly, second contact icon 1104B corresponds to a second person. When second contact icon 1104B is activated (e.g., via a tap input and/or a tap-and-hold input), computer system 600 displays a second message conversation between the second person and the user of computer system 600 (without displaying the first message conversation). When new message option 1106 is activated (e.g., via a tap input and/or a tap-and-hold input), computer system 600 initiates a process for drafting a new message to a recipient (e.g., a third person). Navigation indicator 1110 optionally indicates the number of pages for the messaging application and/or for the current user interface of the messaging application. In some embodiments, navigation indicator 1110 indicates a relative position of the current page (first page 1102A) within the plurality of pages of the messaging application and/or for the current user interface of the messaging application.

Navigation indicator 1110 includes first page indicator 1110A and second page indicator 1110B. First page indicator 1110A has a different size (e.g., is larger) and is a different color (e.g., is brighter) than second page indicator 1110B to indicate that first page indicator 1110A corresponds to the currently displayed page (first page 1102A). In some embodiments, a shape and/or color of a page indicator (e.g., 1110A) corresponding to the currently displayed page (e.g., 1102A) indicates whether the currently displayed page is scrollable or not scrollable. At FIG. 11A, because the contents of first page 1102A are all displayed on display 602, first page 1102A is not scrollable and first page indicator 1110A has a round shape and is a white color. At FIG. 11A, computer system 600 detects an input. In some embodiments, the input is a swipe input (e.g., a swipe up input and/or a swipe touch input) directed to first page 1102A. In some embodiments, the input is rotational input 1150A (e.g., a clockwise rotational input) (e.g., of more than a threshold amount) at crown 604. In response to detecting the input, computer system 600 changes from displaying first page 1102A to displaying second page 1102B by replacing first page 1102A with second page 1102B, as shown in FIG. 11B. In some embodiments, because first page 1102A fits on display 602 without the need to scroll, the magnitude (e.g., speed and/or distance) of replacing first page 1102A with second page 1102B is not based on a magnitude (e.g., speed and/or distance) of the input.

At FIG. 11B, computer system 600 is displaying second page 1102B, which is different from first page 1102A. Second page 1102B includes a plurality of messages from a plurality of recent (e.g., the most recent) conversations of the messaging application. For example, 1108A is a message received as part of a messaging conversation with the first person (e.g., corresponding to first contact icon 1104A) and 1108B is a message received as part of a messaging conversation with a third person.

In response to detecting the input at FIG. 11A, computer system 600 also updates navigation indicator 1110. At FIG. 11B, the size of first page indicator 1110A has changed (has reduced) and the color of first page indicator 1110A has changed (is darker) to indicate that the page (e.g., first page 1102A) corresponding to first page indicator 1110A is not currently being displayed. Similarly, the size of second page indicator 1110B has changed (has increased) and the color of second page indicator 1110B has changed (is darker and/or is green) to indicate that the page (e.g., second page 1102B) corresponding to second page indicator 1110B is currently being displayed on display 602. Because the contents of second page 1102B do not fit on display 602, second page 1102B is scrollable, as indicated by the shape (and/or color) of corresponding second page indicator 1110B. In some embodiments, because second page 1102B is currently displayed and is scrollable, second page indicator 1110B includes an indication of the scroll position of second page 1102B. In some embodiments, second page indicator 1110B is a scroll bar. In some embodiments, second page indicator 1110B includes a track element and a scroll element, wherein the scroll element moves along the track element to indicate which portion of second page 1102B is currently being displayed.

In some embodiments, the respective page indicators (e.g., 1110A and/or 1110B) of the navigation indicator (e.g., 1110) do not visually indicate whether a respective page corresponding to the respective page indicator is scrollable or not scrollable while the respective page is not displayed and/or do indicate whether a respective page corresponding to the respective page indicator is scrollable or not scrollable while the respective page is displayed.

At FIG. 11B, computer system 600 detects an input. In some embodiments, the input is a swipe input (e.g., a swipe up input and/or a swipe touch input) directed to second page 1102B. In some embodiments, the input is rotational input 1150B (e.g., a clockwise rotational input) at crown 604. In response to detecting the input, because second page 1102B does not fit on display 602, computer system 600 scrolls second page 1102B in a direction that is based on the direction of the input and/or with a magnitude (distance and/or speed) that is based on a magnitude (e.g., amount and/or speed) of the input, as shown in FIG. 11C.

At FIG. 11C, second page 1102B has scrolled upwards in response to the input detected at FIG. 11B. Navigation indicator 1110 continues to indicate that second page 1102B corresponding to second page indicator 1110B is currently being displayed on display 602, as indicated by the size, shape, and/or color of page indicator 1110B. As shown in FIG. 11C, because second page 1102B is currently displayed and is scrollable, second page indicator 1110B includes an indication of the scroll position of second page 1102B. At FIG. 11C, computer system 600 detects a third input. In some embodiments, the third input is a swipe input (e.g., a swipe up input and/or a swipe touch input) directed to second page 1102B. In some embodiments, the third input is rotational input 1150C (e.g., a clockwise rotational input) at crown 604. In response to detecting the third input, because second page 1102B is scrollable and the end of the page has not been reached, computer system 600 scrolls second page 1102B in a direction that is based on the direction of the third input and/or with a magnitude (distance and/or speed) that is based on a magnitude (e.g., amount and/or speed) of the third input, as shown in FIG. 11D.

At FIG. 11D, navigation indicator 1110 continues to indicate that second page 1102B corresponding to second page indicator 1110B is currently being displayed on display 602, as indicated by the size, shape, and/or color of page indicator 1110B. As shown in FIG. 11D, because second page 1102B is currently displayed and is scrollable, second page indicator 1110B includes an indication of the scroll position of second page 1102B. At FIG. 11D, the bottom of second page 1102B has been reached, as indicated by second page indicator 1110B. Further, there is no third page, as indicated by a lack of an additional page indicator below second page indicator 1110B in navigation indicator 1110. In some embodiments, computer system 600 receives user input (e.g., a downward swipe input and/or a counterclockwise rotational input at crown 604) to scroll back to the top of second page 1102B, as shown in FIG. 11B. While the top of second page 1102B is displayed, an additional user input (e.g., a downward swipe input and/or a counterclockwise rotational input at crown 604) causes computer system 600 to replace display of second page 1102B with first page 1102A, as shown in FIG. 11A.

Figure 11E:
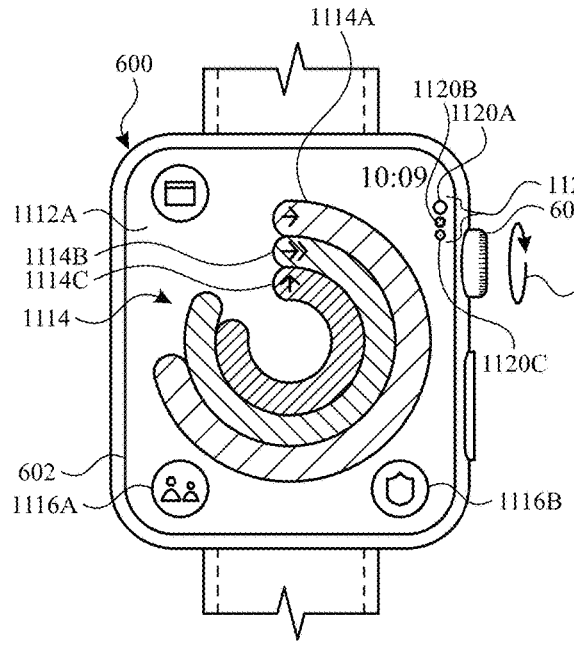
FIGS. 11A-11V illustrate exemplary user interfaces for navigating user interfaces.

At FIG. 11E, computer system 600 is displaying a first page 1112A of an activity (e.g., exercise and/or health) application. In some embodiments, when computer system 600 initially starts executing the activity application (e.g., in response to user input) and/or initially displays the activity application (e.g., in response to user input), computer system 600 displays first page 1112A of the activity application, as shown in FIG. 11E. First page 1112A includes rings 1114, which include move ring 1114A that indicates calories burned during exercise, exercise ring 1114B that indicates minutes of exercise, and stand ring 1114C that indicates the number of times a user of computer system 600 has stood up and moved around for at least a threshold duration (e.g., 1 minute, 2 minutes, or 5 minutes) during different hours of the day. Each of rings 1114A-1114C is a different color. Computer system 600 also displays navigation indicator 1120.

Figure 11F:
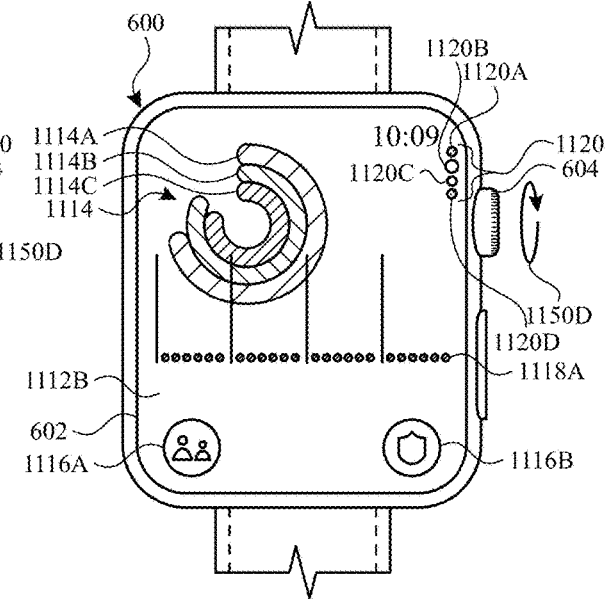
Figure 11G:
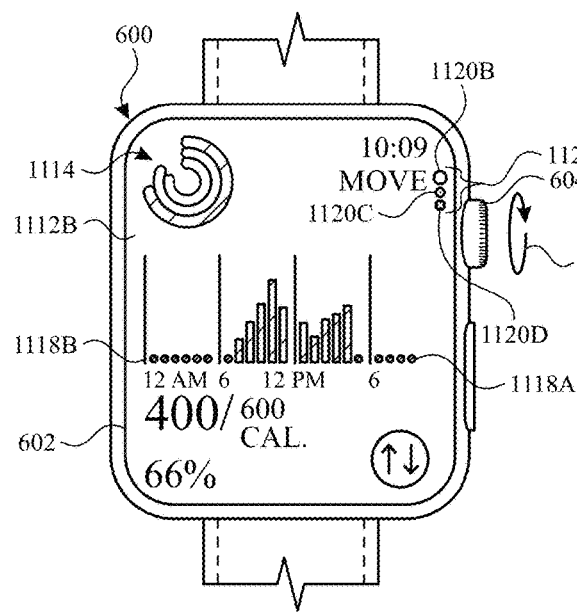

Navigation indicator 1120 includes first page indicator 1120A, second page indicator 1120B, and third page indicator 1120C. First page indicator 1120A has a different size (e.g., is larger) and is a different color (e.g., is brighter) than second page indicator 1120B and third page indicator 1120C to indicate that first page indicator 1120A corresponds to the currently displayed page (first page 1112A). In some embodiments, a shape and/or color of a page indicator (e.g., 1120A) corresponding to the currently displayed page (e.g., 1112A) indicates whether the currently displayed page is scrollable or not scrollable. At FIG. 11E, because the contents of first page 1112A are all displayed on display 602, first page 1112A is not scrollable and first page indicator 1120A has a round shape and is a white color. At FIG. 11E, computer system 600 detects an input. In some embodiments, the input is a swipe input (e.g., a swipe up input and/or a swipe touch input) directed to first page 1112A. In some embodiments, the input is rotational input 1150D (e.g., a clockwise rotational input) (e.g., of more than a threshold amount) at crown 604. In response to detecting the input, computer system 600 changes from displaying first page 1112A to displaying second page 1112B by replacing first page 1112A with second page 1112B, as shown in FIG. 11G. In some embodiments, because first page 1112A fits on display 602 without the need to scroll, the magnitude (e.g., speed and/or distance) of replacing first page 1112A with second page 1112B is not based on a magnitude (e.g., speed and/or distance) of the input. As part of replacing first page 1112A with second page 1112B, computer system 600 displays an animation that moves, resizes, and or morphs some elements of first page 1112A. For example, computer system concurrently reduces the size of rings 1114 and moves rings 1114 upward and to the left, as shown in the transition of FIG. 11F. FIGS. 11F-11G illustrates that additional elements begin to be displayed (e.g., fade in and/or move onto the display) during the transitions from FIG. 11E to FIG. 11G, such as graph 1118A and calories indicator 1118B. Additionally, some elements cease being displayed (e.g., fade out and/or move out of display) during the transitions from FIG. 11E to FIG. 11G, such as options 1116A and 1116B.

As shown in FIGS. 11E-11G, navigation indicator 1120 updates to reflect that first page 1112A is replaced with second page 1112B. In particular, in response to detecting the input at FIG. 11E, computer system 600 shifts up first page indicator 1120A, second page indicator 1120B, and third page indicator 1120C (as shown in FIGS. 11E-11G). In addition (e.g., while shifting up the page indicators), computer system 600 fades out first page indicator 1120A and fades in fourth page indicator 1120D to indicate that there is a fourth page (as shown in FIGS. 11E-11G). In addition (e.g., while shifting and/or fading the page indicators), computer system 600 changes the color (by changing from a darker color to a lighter color, such as white) and/or size (e.g., by increasing the size) of the second page indicator 1120B to indicate that second page 1112B that corresponds to second page indictor 1120B is being displayed by display 602 (as shown in FIGS. 11E-11G). At FIG. 11G, 1114B-1114C of rings 1114 have faded out and/or are white to highlight ring 1114A, since second page 1112B displays additional details related to ring 1114A. In some embodiments, activation of (e.g., a tap input on) rings 1114 at FIG. 11H causes computer system 600 to replace the current page with first page 1112A.

Figure 11H:
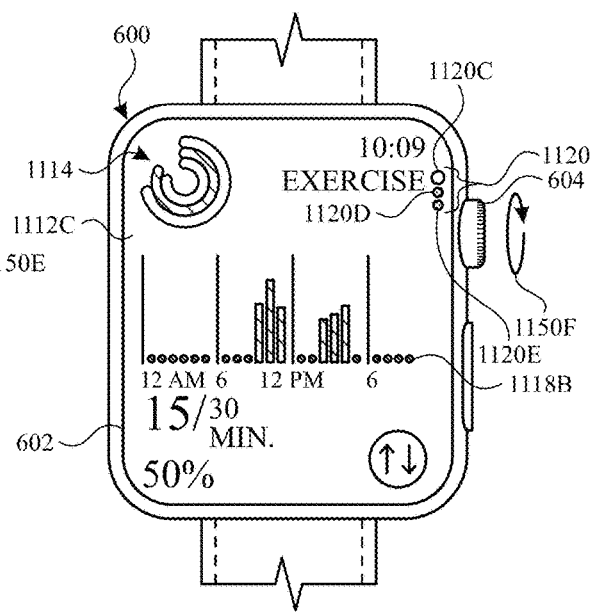

At FIG. 11G, because the contents of second page 1112B are all displayed on display 602, second page 1112B is not scrollable and second page indicator 1120B has a round shape and is a white color. At FIG. 11G, computer system 600 detects an input. In some embodiments, the input is a swipe input (e.g., a swipe up input and/or a swipe touch input) directed to second page 1112B. In some embodiments, the input is rotational input 1150E (e.g., a clockwise rotational input) (e.g., of more than a threshold amount) at crown 604. In response to detecting the input, computer system 600 changes from displaying second page 1112B to displaying third page 1112C by replacing second page 1112b with third page 1112C, as shown in FIG. 11H. In some embodiments, because second page 1112B fits on display 602 without the need to scroll, the magnitude (e.g., speed and/or distance) of replacing second page 1112B with third page 1112C is not based on a magnitude (e.g., speed and/or distance) of the input. As part of replacing second page 1112B with third page 1112C, computer system 600 optionally displays an animation that moves, resizes, and/or morphs some elements of second page 1112B. For example, rings 1114 are updated so that ring 1114A and ring 1114C have faded out and/or are white to highlight ring 1114B, since third page 1112C displays additional details related to ring 1114B. Additionally, graph 1118B has animated to show different information (e.g., from showing calories burned information in FIG. 11G to showing minutes of exercise information in FIG. 11H). In some embodiments, rings 1114 perform a crossfade in the animation between the user interfaces in FIGS. 11G and 11H.

As shown in FIGS. 11G-11H, navigation indicator 1120 updates to reflect that second page 1112B is replaced with third page 1112C. In particular, in response to detecting the input at FIG. 11G, computer system 600 shifts up second page indicator 1120B, third page indicator 1120C, and fourth page indicator 1120D. In addition (e.g., while shifting up the page indicators), computer system 600 fades out second page indicator 1120B and fades in fifth page indicator 1120E to indicate that there is a fifth page. In addition (e.g., while shifting and/or fading the page indicators), computer system 600 changes the color (by changing from a darker color to a lighter color, such as white) and/or size (e.g., by increasing the size) of the third page indicator 1120C to indicate that third page 1112C that corresponds to third page indictor 1120C is being displayed by display 602 (as shown in FIG. 11H). In some embodiments, activation of (e.g., a tap input on) rings 1114 at FIG. 11H causes computer system 600 to replace the current page with first page 1112A.

Figure 11I:
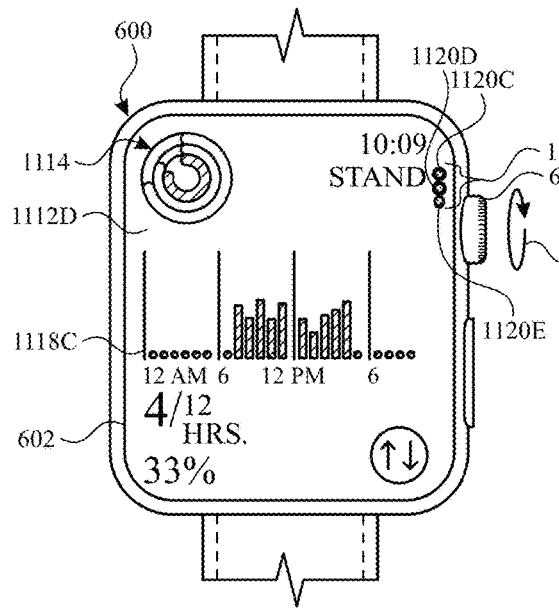

At FIG. 11H, computer system 600 detects an input. In some embodiments, the input is a swipe input (e.g., a swipe up input and/or a swipe touch input) directed to third page 1112C. In some embodiments, the input is rotational input 1150F (e.g., a clockwise rotational input) (e.g., of more than a threshold amount) at crown 604. In response to detecting the input, computer system 600 changes from displaying third page 1112C to displaying fourth page 1112D, similar to the transition between second page 1112B to third page 1112C. Additionally, navigation indicator 1120 updates to reflect that third page 1112C is replaced with fourth page 1112D. In particular, in response to detecting the input at FIG. 11H, computer system 600 does not shift up the page indicators because there is no sixth page. Computer system 600 changes the color (by changing from a darker color to a lighter color, such as white) and/or size (e.g., by increasing the size) of the fourth page indicator 1120D to indicate that fourth page 1112D that corresponds to fourth page indictor 1120D is being displayed by display 602 (as shown in FIG. 11I). Computer system 600 also reverts the color, size, and/or shape of third page indicator 1140C to indicate that the page corresponding to that indicator is no longer displayed. In some embodiments, activation of (e.g., a tap input on) rings 1114 at FIG. 11I causes computer system 600 to replace the current page with first page 1112A. In some embodiments, rings 1114 perform a crossfade in the animation between the user interfaces in FIG. 11H and 11I.

Figure 11J:
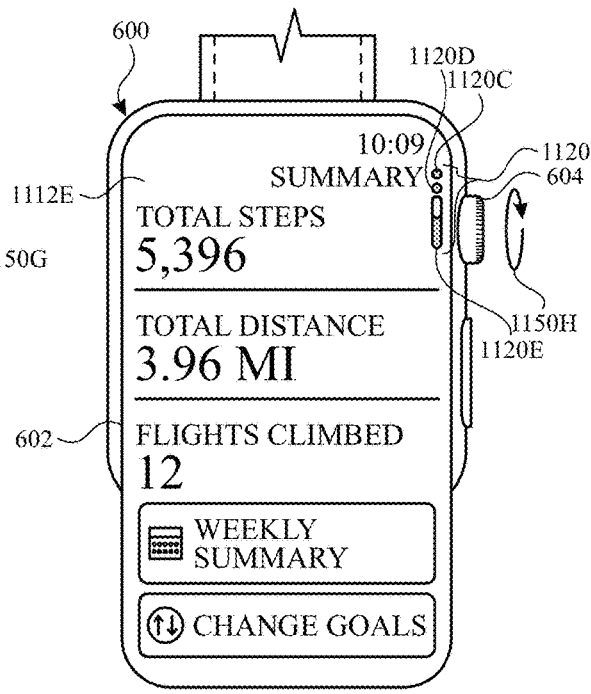

At FIG. 11I, computer system 600 detects an input. In some embodiments, the input is a swipe input (e.g., a swipe up input and/or a swipe touch input) directed to fourth page 1112D. In some embodiments, the input is rotational input 1150G (e.g., a clockwise rotational input) (e.g., of more than a threshold amount) at crown 604. In response to detecting the input, computer system 600 changes from displaying fourth page 1114D to displaying fifth page 1112E. Additionally, navigation indicator 1120 updates to reflect that fourth page 1112D is replaced with fifth page 1112E. In particular, in response to detecting the input at FIG. 11I, computer system 600 does not shift up the page indicators because there is no sixth page. Computer system 600 changes the color (by changing from a darker color to a lighter color, such as white) and/or size (e.g., by increasing the size) of the fifth page indicator 1120E to indicate that fifth page 1112E that corresponds to fifth page indictor 1120E is being displayed by display 602 (as shown in FIG. 11J). Computer system 600 also reverts the color, size, and/or shape of fourth page indicator 1140D to indicate that the page corresponding to that indicator is no longer displayed. Because the contents of fifth page 1112E do not fit on display 602, fifth page 1112E is scrollable, as indicated by the shape (and/or color) of corresponding fifth page indicator 1120E. In some embodiments, because fifth page 1112E is currently displayed and is scrollable, fifth page indicator 1120B includes an indication of the scroll position of fifth page 1112E. In some embodiments, fifth page indicator 1120E is a scroll bar. In some embodiments, fifth page indicator 1120E includes a track element and a scroll element, wherein the scroll element moves along the track element to indicate which portion of fifth page 1112E is currently being displayed. In some embodiments, fifth page 1112E includes summary activity information.

At FIG. 11J, computer system 600 detects an input. In some embodiments, the input is a swipe input (e.g., a swipe up input and/or a swipe touch input) directed to fifth page 1112E. In some embodiments, the input is rotational input 1150H (e.g., a clockwise rotational input) at crown 604. In response to detecting the input, because fifth page 1112E does not fit on display 602, computer system 600 scrolls fifth page 1112E in a direction that is based on the direction of the input and/or with a magnitude (distance and/or speed) that is based on a magnitude (e.g., amount and/or speed) of the input and updates fifth page indicator 1120E to indicate the scroll position of fifth page 1112E.

In some embodiments, after scrolling down fifth page 1112E, computer system 600 receives user inputs (e.g., a downward swipe input and/or counterclockwise rotational inputs at crown 604) to scroll back to the top of fifth page 1112E. While the top of fifth page 1112E is displayed, an additional user input (e.g., a downward swipe input and/or a counterclockwise rotational input at crown 604) causes computer system 600 to replace display of fifth page 1112E with fourth page 1112D, as shown in FIG. 11I. While fourth page 1112D is displayed, an additional user input (e.g., a downward swipe input and/or a counterclockwise rotational input at crown 604) causes computer system 600 to replace display of fourth page 1112D with third page 1112C, as shown in FIG. 11H. While third page 1112C is displayed, an additional user input (e.g., a downward swipe input and/or a counterclockwise rotational input at crown 604) causes computer system 600 to replace display of third page 1112C with second page 1112B, as shown in FIG. 11G. While second page 1112B is displayed, an additional user input (e.g., a downward swipe input and/or a counterclockwise rotational input at crown 604) causes computer system 600 to replace display of second page 1112B with first page 1112A, as shown in FIG. 11E, including reversing the animation described with respect to FIGS. 11E-11G.

Figure 11K:
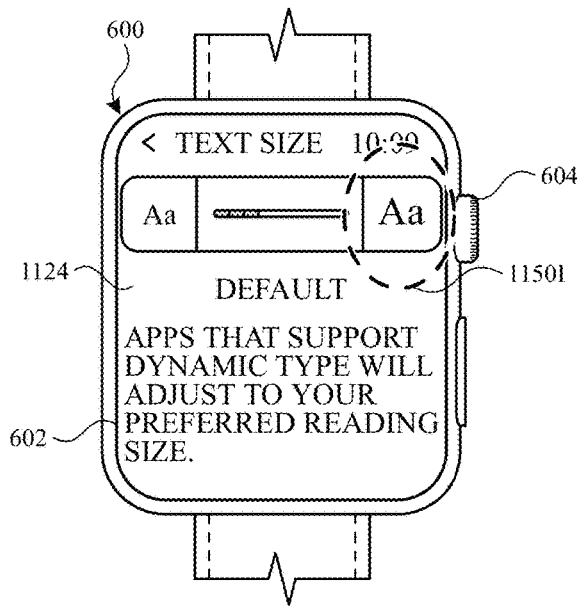
Figure 11L:
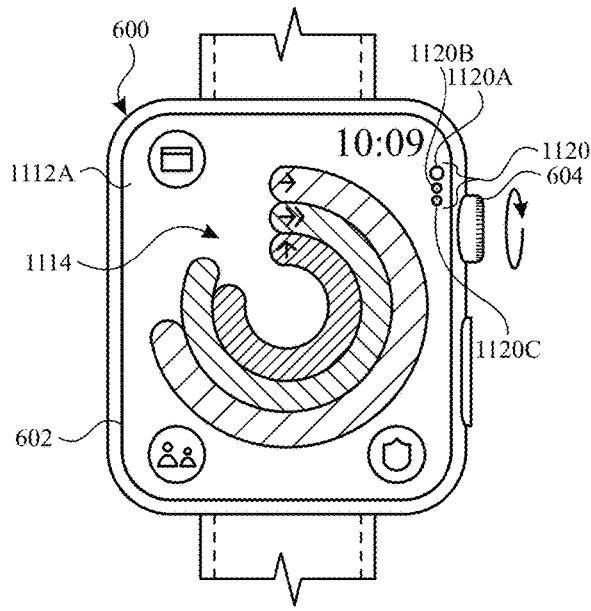

At FIG. 11K, computer system 600 detects input 1150I at user interface 1124 and, in response, computer system 600 increases the size of text (e.g., changes a default system text size). As shown in FIGS. 11L-11P, the size of text has increase as compared to FIGS. 11E-11I. As a result, the content of pages 1112B-1112D no longer fit on the display.

Accordingly, each of pages 1112B-1112D is scrollable and the corresponding page indicators (e.g., 1120B-1120D) for pages 1112B-1112D indicate that the respective page is scrollable (e.g., the page indictor indicates a scroll position of the respective page and/or is a scroll bar) when the respective page is displayed. For example, at FIG. 11M, computer system displays second page 1112B. While displaying second page 1112B, computer system 600 detects an input. In some embodiments, the input is a swipe input (e.g., a swipe up input and/or a swipe touch input) directed to second page 1112B. In some embodiments, the input is rotational input 1150J (e.g., a clockwise rotational input) at crown 604. In response to detecting the input, because second page 1112B does not fit on display 602, computer system 600 scrolls second page 1112B in a direction that is based on the direction of the input and/or with a magnitude (distance and/or speed) that is based on a magnitude (e.g., amount and/or speed) of the input and updates second page indicator 1120B to indicate the scroll position of second page 1112B, as shown in FIG. 11N.

Figure 11M:
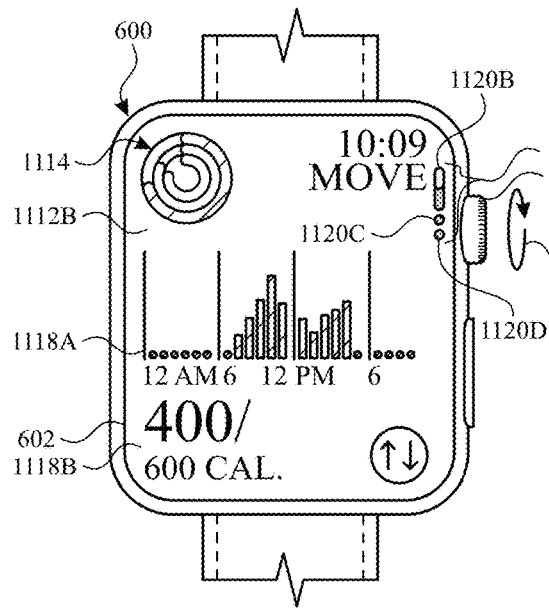
Figure 11N:
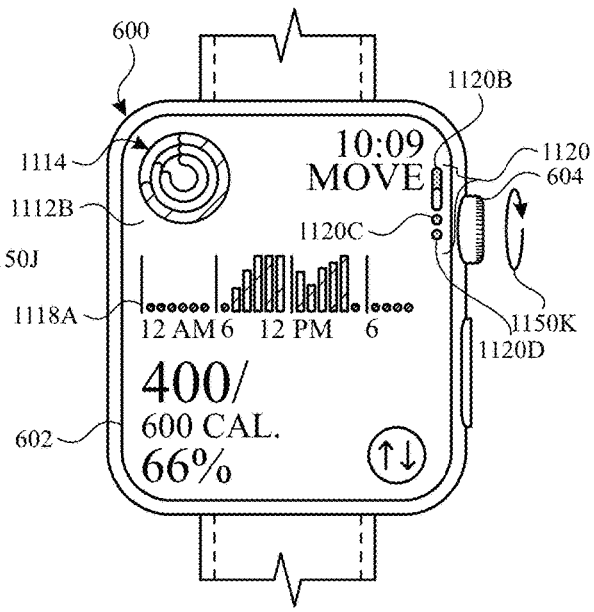
Figure 11O:
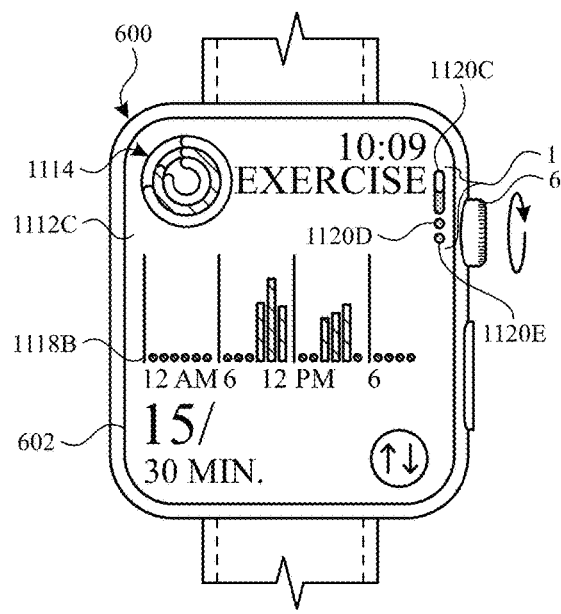
Figure 11P:
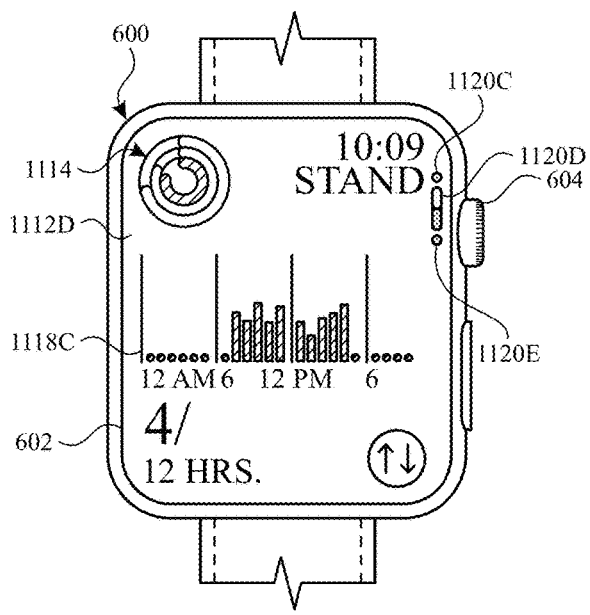

At FIG. 11N, after scrolling to the bottom of second page 1112B (e.g., now the "66%" is displayed and the top of graph 1118A is no longer displayed), computer system 600 detects an input. In some embodiments, the input is a swipe input (e.g., a swipe up input and/or a swipe touch input) directed to second page 1112B. In some embodiments, the input is rotational input 1150K (e.g., a clockwise rotational input) at crown 604. In response to detecting the input, because the bottom of second page 1112B has been reached, computer system 600 replaces second page 1112B with third page 1112C, which is also scrollable, as indicated by third scroll indicator 1120C at FIG. 11O. In some embodiments, because the bottom of second page 1112B was reached when input 1150K was received, the magnitude (e.g., speed and/or distance) of replacing second page 1112B with third page 1112C is not based on a magnitude (e.g., speed and/or distance) of input 1150K. Further, while the top of third page 1112C is displayed as shown in FIG. 11O, an additional user input (e.g., a downward swipe input and/or a counterclockwise rotational input at crown 604) causes computer system 600 to replace display of third page 1112C with second page 1112B (bottom of the page, as shown in FIG. 11N or top of the page, as shown in FIG. 11M). Thus, the computer system receives various inputs to navigate through the various user interfaces, providing the user with the ability to scroll a page if the page is scrollable and, when the page is not scrollable, paging through the various pages without scrolling the pages.

Figure 11Q:
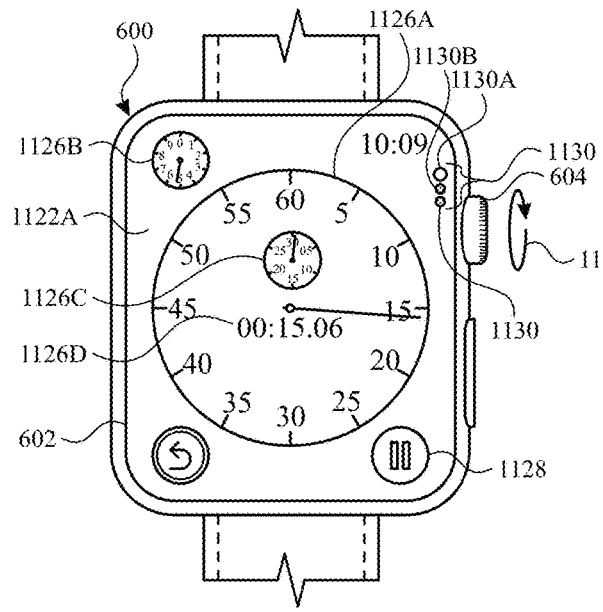

At FIG. 11Q, computer system 600 is displaying a first page 1122A of a stopwatch application. In some embodiments, when computer system 600 initially starts executing the stopwatch application (e.g., in response to user input) and/or initially displays the stopwatch application (e.g., in response to user input), computer system 600 displays first page 1122A of the stopwatch application, as shown in FIG. 11Q. First page 1112A includes first time counter 1126A, second time counter 1126B, third time counter 1126C, and fourth time counter 1126D. In some embodiments, time counters 1126A-1126C count time with varying resolutions. In some embodiments, time counters 1126A-1126C are analog displays of time. In some embodiments, fourth time counter 1126D is a digital display of time. Third time counter 1126C and fourth time counter 1126D are contained withing first time counter 1126A, as shown in FIG. 11Q. Computer system 600 also displays navigation indicator 1130.

Figure 11R:
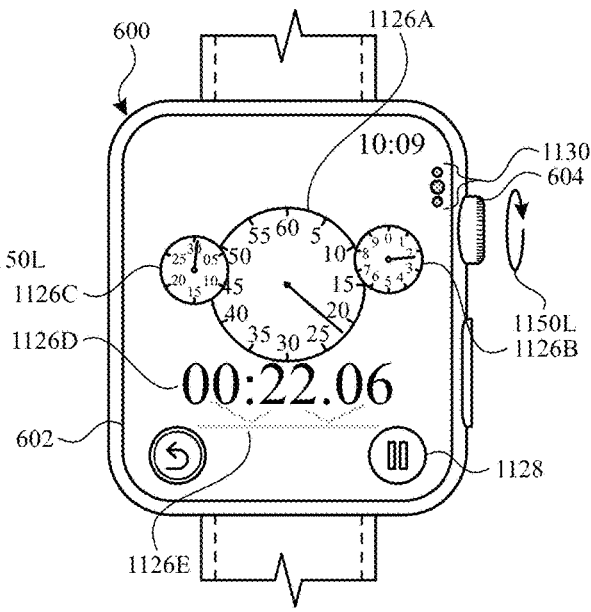

Navigation indicator 1120 includes first page indicator 1130A, second page indicator 1130B, and third page indicator 1130C. First page indicator 1130A has a different size (e.g., is larger) and is a different color (e.g., is brighter) than second page indicator 1130B and third page indicator 1130C to indicate that first page indicator 1130A corresponds to the currently displayed page (first page 1122A). In some embodiments, a shape and/or color of a page indicator (e.g., 1130A) corresponding to the currently displayed page (e.g., 1122A) indicates whether the currently displayed page is scrollable or not scrollable. At FIG. 11Q, because the contents of first page 1122A are all displayed on display 602, first page 1122A is not scrollable and first page indicator 1130A has a round shape and is a white color. At FIG. 11Q, computer system 600 detects an input. In some embodiments, the input is a swipe input (e.g., a swipe up input and/or a swipe touch input) directed to first page 1122A. In some embodiments, the input is rotational input 1150L (e.g., a clockwise rotational input) (e.g., of more than a threshold amount) at crown 604. In response to detecting the input, computer system 600 changes from displaying first page 1122A to displaying second page 1122B by animating a transition between first page 1122A to second page 1122B, as shown in FIGS. 11Q-11S.

As part of replacing first page 1122A with second page 1122B, computer system 600 displays an animation that moves, resizes, and or morphs some elements of first page 1122A. For example, as shown in FIGS. 11Q-11S, first time counter 1126A reduces in size and moves up, second time counter 1126B increases in size and moves down and to the right, third time counter 1126C increases in size and moves out of first time counter 1126A by moving to the left, and fourth time counter 1126D increases in size and moves out of first time counter 1126A by moving down. Additionally, graph 1126E fades in, as shown in FIGS. 11Q-11S. While computer system animates the transition between first page 1122A to second page 1122B, the various elements of the user interface (e.g., first time counter 1126A, second time counter 1126B, third time counter 1126C, and fourth time counter 1126D) continue to update. At FIG. 11S, navigation indicator 1130 has been updated to reflect that first page 1122A is replaced with display of second page 1122B. In particular, in response to detecting the input at FIG. 11Q, computer system 600 changes the color (by changing from a darker color to a lighter color, such as white) and/or size (e.g., by increasing the size) of the second page indicator 1130B to indicate that second page 1122B that corresponds to second page indictor 1130B is being displayed by display 602 (as shown in FIG. 11S). Computer system 600 also reverts the color, size, and/or shape of first page indicator 1130A to indicate that the page corresponding to that indicator is no longer displayed, as shown in FIG. 11S.

Figure 11S:
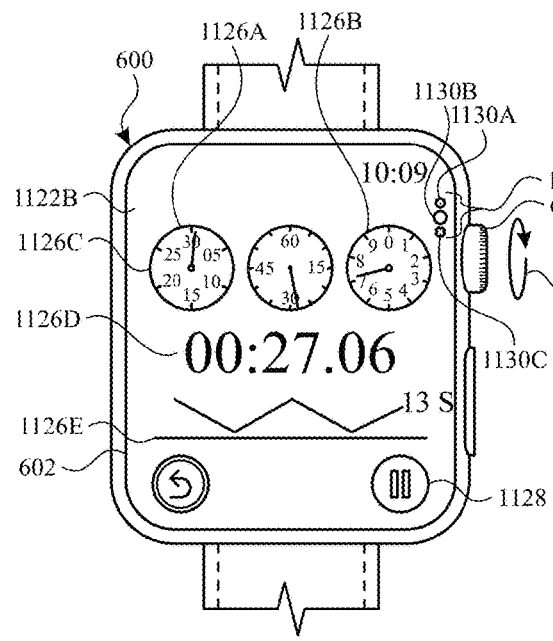
Figure 11T:
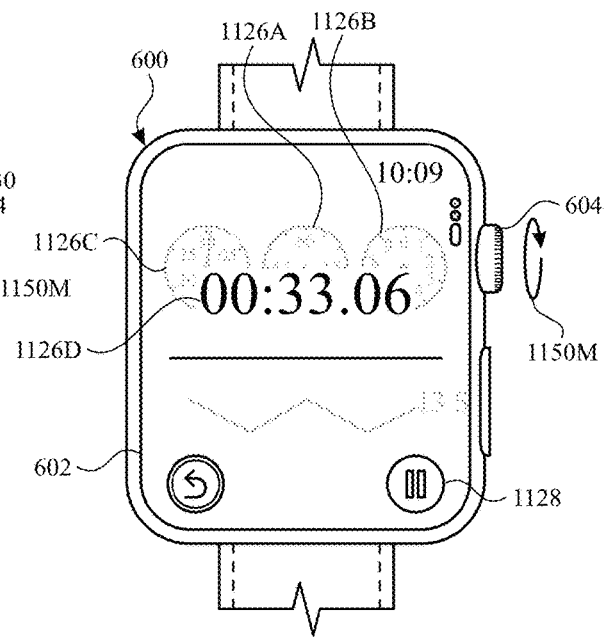

At FIG. 11S, computer system 600 detects an input. In some embodiments, the input is a swipe input (e.g., a swipe up input and/or a swipe touch input) directed to second page 1122B. In some embodiments, the input is rotational input 1150M (e.g., a clockwise rotational input) (e.g., of more than a threshold amount) at crown 604. In response to detecting the input, computer system 600 changes from displaying second page 1122B to displaying third page 1122C by animating a transition between second page 1122B to third page 1122C, as shown in FIGS. 11S-11U.

As part of replacing second page 1122B with third page 1122C, computer system 600 displays an animation that moves, resizes, and or morphs some elements of second page 1122A. For example, as shown in FIGS. 11S-11U, first time counter 1126A, second time counter 1126B, third time counter 1126C, and graph 1126E fade out. Fourth time counter 1126D moves up and lap times 1126F fade in. While computer system animates the transition between second page 1122B to third page 1122C, the various elements of the user interface (e.g., fourth time counter 1126D) continue to update. At FIG. 11U, navigation indicator 1130 has been updated to reflect that display of second page 1122B is replaced with display of third page 1122C. In particular, in response to detecting the input at FIG. 11S, computer system 600 changes the color (by changing from a darker color to a lighter color, such as white), size (e.g., by increasing the size), and/or shape of the third page indicator 1130C to indicate that third page 1122C that corresponds to third page indictor 1130C is being displayed by display 602 (as shown in FIG. 11U). Computer system 600 also reverts the color, size, and/or shape of second page indicator 1130B to indicate that the page corresponding to that indicator is no longer displayed, as shown in FIG. 11U.

At FIG. 11U, computer system 600 detects an input. In some embodiments, the input is a swipe input (e.g., a swipe up input and/or a swipe touch input) directed to third page 1122C. In some embodiments, the input is rotational input 1150N (e.g., a clockwise rotational input) at crown 604. In response to detecting the input, because third page 1122C does not fit on display 602, computer system 600 scrolls third page 1122C in a direction that is based on the direction of the input and/or with a magnitude (distance and/or speed) that is based on a magnitude (e.g., amount and/or speed) of the input and updates third page indicator 1130C to indicate the scroll position of third page 1122C, as shown in FIG. 11V. As shown in FIG. 11V, fourth time counter 1126D has scrolled off of the top display and additional lap times 1126F have scrolled onto the display from the bottom of the display.

In some embodiments, after scrolling to the bottom of third page 1122C, computer system 600 receives user inputs (e.g., a downward swipe input and/or counterclockwise rotational inputs at crown 604) to scroll back to the top of third page 1122C. While the top of third page 1122C is displayed, an additional user input (e.g., a downward swipe input and/or a counterclockwise rotational input at crown 604) causes computer system 600 to replace display of third page 1122C with second page 1122B, including a reversing of the animation from FIG. 11U to FIG. 11T to FIG. 11S. While second page 1122B is displayed, an additional user input (e.g., a downward swipe input and/or a counterclockwise rotational input at crown 604) causes computer system 600 to replace display of second page 1122B with first page 1122A, including a reversing of the animation from FIG. 11S to FIG. 11R to FIG. 11Q. In some embodiments, one or more elements of the user interfaces is maintained while transitioning among various pages, such as pause button 1128 being maintained throughout FIGS. 11Q-11V. In some embodiments, the play/pause state of the stopwatch application (e.g., based on user inputs on pause button 1128) is synchronized among the various pages of the stopwatch application (e.g., if paused on one page, the stopwatch will remain paused after transitioning to another page).

FIG. 12 is a flow diagram of a method for navigating among different pages, in accordance with some embodiments. Method 1200 is performed at a computer system (e.g., 100, 300, 500 and/or 600) (e.g., a smart phone, a smart watch, a laptop, a desktop computer, TV, and/or a tablet) that is in communication with a display generation component (e.g., 602) (e.g., a display controller, a touch-sensitive display system, and/or a display (e.g., integrated and/or connected)) and a rotatable input mechanism (e.g., 604)

(e.g., a rotatable crown and/or a rotatable knob). Some operations in method 1200 are, optionally, combined, the orders of some operations are, optionally, changed, and some operations are, optionally, omitted.

As described below, method 1200 provides an intuitive way for navigating among different pages. The method reduces the cognitive burden on a user for navigating among different pages, thereby creating a more efficient human-machine interface. For battery-operated computing devices, enabling a user to navigate among different pages faster and more efficiently conserves power and increases the time between battery charges.

The computer system (e.g., 600) displays (1202), via the display generation component (e.g., 602), a first page (e.g., 1102A, 1112D, and/or 1122B) (e.g., concurrently displaying the top of the first page and the bottom of the first page and/or displaying the whole/complete first page) of a plurality of pages (e.g., without displaying a second page of the plurality of pages and/or without displaying any portion of the second page of the plurality of pages).

While displaying the first page (e.g., 1102A, 1112D, and/or 1122B) (e.g., concurrently displaying the top of the first page and the bottom of the first page and/or displaying the whole/complete first page) of the plurality of pages, the computer system (e.g., 600) detects (1204), via the rotatable input mechanism (e.g., 602), a first rotational input (e.g., 1150A, 1150G, and/or 1150*m*).

In response to detecting the first rotational input (e.g., 1150A, 1150G, and/or 1150*m*), the computer system replaces (1206) display, via the display generation component, of the first page (e.g., 1102A, 1112D, and/or 1122B) of the plurality of pages with a second page (e.g., 1102B, 1112E, and/or 1122C) (e.g., a portion of the second page, not the whole second page, and/or displaying the top of the second page without displaying the bottom of the second page) of the plurality of pages without scrolling the first page (e.g., 1102A, 1112D, and/or 1122B) of the plurality of pages, wherein the second page is displayed at a first scroll position (e.g., 1102B at FIG. 11B, 1112E at FIG. 11J, and/or 1122C at FIG. 11U).

While displaying the second page at the first scroll position, the computer system (e.g., 600) detects (1208), via the rotatable input mechanism (e.g., 602), a second rotational input (e.g., 1150B, 1150C, and/or 1150N) (e.g., in the same direction as the first rotational input).

In response to detecting the second rotational input (e.g., 1150B and/or 1150N), the computer system scrolls (1210), via the display generation component (e.g., 602), the second page of the plurality of pages from the first scroll position to a second scroll position (e.g., 1102B at FIG. 11C and/or 1122C at FIG. 11V) that is different from the first scroll position (e.g., without replacing display of the second page with a third page (e.g., next page) of the plurality of pages and/or without displaying any portion of a third page (e.g., next page) of the plurality of pages).

In some embodiments, the scrolling of the second page from the first scroll position (e.g., 1102B at FIG. 11B and/or 1122C at FIG. 11U) to the second scroll position (e.g., 1102B at FIG. 11C and/or 1122C at FIG. 11V) includes a magnitude (e.g., a speed and/or a distance) that is based on a magnitude (e.g., speed and/or distance) of the second rotational input (e.g., 1150B and/or 1150N). In some embodiments, the magnitude of the second rotational input determines the magnitude of the scrolling of the second page. In some embodiments, the scrolling of the second page is in a direction that is based on a direction of the first rotational input. Scrolling the second page with a magnitude that is based on a magnitude of the second rotational input provides the user with feedback about the detected second rotational input and enables the computer system to control the speed/position of the second document using the input provided by the user.

In some embodiments, replacing display of the first page (e.g., 1102A, 1112D, and/or 1122B) with the second page (e.g., 1102B at FIG. 11B, 1112E at FIG. 11J, and/or 1122C at FIG. 11U) does not have a magnitude (e.g., speed and/or distance) that is based on a magnitude of the first rotational input (e.g., 1150A, 1150G, and/or 1150*m*). In some embodiments, changing pages (e.g., replacing one page with another page) does not have a magnitude that is based on a magnitude of the input that cause the page change. In some embodiments, changing pages is performed by moving a page (e.g., the first page or the second page) by a discrete amount once a threshold (e.g., an edge of the first page) is reached while the input that causes the page change is detected. In some embodiments, replacing the first page with the second page does not include scrolling the first page off the display and/or scrolling the second page off the display. Changing pages from the first page to the second page without a magnitude that is based on a magnitude of the first rotational input enables the computer system to display the second page more quickly (e.g., without being limited by the speed of the user's input), thereby improving the man-machine interface.

In some embodiments, while displaying the second page at the second scroll position, the computer system (e.g., 600) detects, via the rotatable input mechanism (e.g., 604), a third rotational input. In response to detecting the third rotational input: the computer system replaces display, via the display generation component, of the second page (e.g., 1150A, 1150G, and/or 1150*m*) of the plurality of pages with a third page (e.g., 1112C) (e.g., displaying the full third page or displaying a portion of the third page) of the plurality of pages (e.g., without scrolling the second page). After replacing the second page with the third page (e.g., 1112C), replacing display, via the display generation component, of the third page of the plurality of pages with a fourth page (e.g., 1112D) (e.g., displaying the full fourth page or displaying a portion of the fourth page) of the plurality of pages (e.g., without scrolling the third page). In some embodiments, the third rotational input causes the computer system to switch between multiple pages (e.g., without scrolling any of the pages). In some embodiments, the speed at which the pages are replaced/switched is not based on a magnitude (e.g., speed/distance) of the input (e.g., the third rotational input) that causes the replacing/switching. In some embodiments, one or more additionally displayed pages are each displayed in full in response to the third rotational input (e.g., a third page is displayed in full and/or a fourth page is displayed in full). Switching between multiple pages in response to a single rotational input enables the computer system to quickly display a page that the user is trying to access, thereby reducing the number of inputs required and presenting the content quickly and efficiently.

In some embodiments, the compute system (e.g., 600) displays, concurrently with the first page (and, optionally, concurrently with display of the second, third, and/or fourth pages), a navigation indicator (e.g., 1110, 1120, and/or 1130) that includes a first element (e.g., 1110A) corresponding to the first page and a second element (e.g., 1110B) corresponding to the second page, wherein the navigation indicator (e.g., 1110, 1120, and/or 1130) indicates which page of the plurality of pages is currently displayed (and/or more prominently displayed). In some embodiments, the navigation indictor includes paging dots (e.g., one per page) that change color, size, highlighting, and/or position based on which page of the plurality of pages is selected. Displaying a navigation indicator provides the user with visual feedback about which page of the plurality of pages is currently displayed, thereby providing improved visual feedback.

In some embodiments, in response to detecting the first rotational input, the computer system (e.g., 600) changes a color of the second element (e.g., 1110B) from a first color (e.g., white or yellow) to a second color (e.g., green or blue). In some embodiments, the first element is the first color while the first page is displayed (e.g., because the first page is a page that is not scrollable) and the second element is the second color while the second page is displayed (e.g., because the second page is a page that is scrollable). In some embodiments, in response to displaying a page and in accordance with the displayed page not being a scrollable page, the indicator corresponding to the displayed page is the first color and in accordance with the displayed page being a scrollable page, the indicator corresponding to the displayed page is the second color. Indicating whether a page (e.g., a displayed page) is scrollable or not based on the color of the respective element in the navigation indicator provides the user with improved visual feedback.

In some embodiments, in response to detecting the first rotational input, the computer system (e.g., 600) changes (e.g., increasing or decreasing) a size of the second element (e.g., 1110B) from a first size (e.g., smaller size) to a second size (e.g., bigger size). In some embodiments, the first element is the first size (and a first shape) while the first page is displayed (e.g., because the first page is a page that is not scrollable) and the second element is the second size (and a second shape) while the second page is displayed (e.g., because the second page is a page that is scrollable). In some embodiments, in response to displaying a page and in accordance with the displayed page not being a scrollable page, the indicator corresponding to the displayed page is the first size (and first shape) and in accordance with the displayed page being a scrollable page, the indicator corresponding to the displayed page is the second size (and second shape). Indicating whether a page (e.g., a displayed page) is scrollable or not based on the size of the respective element in the navigation indicator provides the user with improved visual feedback.

In some embodiments, in response to detecting the first rotational input, the computer system (e.g., 600) expands the second element (e.g., 1110B) from a first shape (e.g., 1110B at FIG. 11A) (e.g., a circle) that does not include an indication of a scroll position of the second page to a second shape (e.g., 1110B at FIG. 111B) (e.g., an oval that includes a scroll indictor) that includes an indication of the scroll position of the second page. In some embodiments, the first element is the first shape while the first page is displayed (e.g., because the first page is a page that is not scrollable) and the second element is the second shape while the second page is displayed (e.g., because the second page is a page that is scrollable). In some embodiments, in response to displaying a page and in accordance with the displayed page not being a scrollable page, the indicator corresponding to the displayed page is the first shape and in accordance with the displayed page being a scrollable page, the indicator corresponding to the displayed page is the second shape. Indicating whether a page (e.g., a displayed page) is scrollable or not based on the shape of the respective element in the navigation indicator provides the user with improved visual feedback.

In some embodiments, expanding the second element (e.g., 1110B) from the first shape to the second shape is in response to detecting the first rotational input (e.g., 1150A). In some embodiments, the first rotational input causes both the second page to be displayed and for the second element of the navigation indictor to expand. Expanding the second element when the first rotational input is detected provides the user with visual feedback that the second page is a scrollable page.

In some embodiments, the first page (e.g., 1102A, 1112D, and/or 1122B) and the second page (e.g., 1102B, 1112E, and/or 1122C) are different pages of the same application. In some embodiments, the first page and the second page are consecutive pages. In some embodiments, the first page and the second page contain different information. The first page and second page being pages of the same application enables the computer system to sequentially display different types (e.g., scrollable and non-scrollable) pages and indicate to the user the type of the page, thereby providing improved visual feedback.

In some embodiments, while displaying the second page (e.g., 1102B at FIG. 11C) of the plurality of pages at the second scroll position, the computer system (e.g., 600) detects a fourth rotational input (e.g., 1150C). In response to detecting the fourth rotational input, the computer system scrolls, via the display generation component (e.g., 602), the second page (e.g., 1102B) to a third scroll position (e.g., 1102B in FIG. 11D) that includes display of a first edge (e.g., a bottom edge and/or end) of the second page and subsequent to scrolling the second page to the third scroll position, the computer system replacing, via the display generation component, the second page with a third page of the plurality of pages. In some embodiments, the third page is part of the same application as the second page. In some embodiments, the scrolling of the second page has a magnitude (e.g., a distance and/or speed) that is based on a magnitude (e.g., amount or speed) of the fourth rotational input. In some embodiments, the scrolling of the second page is in a direction that is based on a direction of the fourth rotational input. Scrolling to an edge of the second page before switching to the third page provides the user with visual feedback about the contents of the second page and that the second page will be replaced by the third page, thereby providing improved visual feedback.

In some embodiments, displaying the second page at the first scroll position (e.g., in response to detecting the first rotational input) includes displaying a second edge (e.g., a top edge and/or beginning) of the second page without displaying the first edge (e.g., a bottom edge and/or end) of the second page (e.g., as in FIG. 11B). Displaying the second edge of the second page without displaying the second edge provides feedback to the user that the second page is scrollable, thereby providing improved visual feedback.

In some embodiments, the computer system (e.g., 600) displays, via the display generation component (e.g., 600), a watch face with one or more complications that includes data received from a live session application (e.g., an application that is configured to provide/display real-time or near real-time information, such as a timer, alarm, scores, directions, and/or stocks). While displaying the watch face, the computer system (e.g., 600) detects, via one or more input devices (e.g., a touch-sensitive surface and/or a keyboard), user input activating a complication of the one or more complications, wherein the first page of the plurality of pages is displayed in response to detecting the user input activating the complication of the one or more complications. Displaying a watch face with complications that display live data provides the user with visual feedback about the live data.

In some embodiments, the computer system (e.g., 600) displays, concurrently with the first page (e.g., 1112A at FIG. 11E) (and, optionally, concurrently with display of the second, third, and/or fourth pages), a navigation indicator (e.g., 1120) that includes a first element (e.g., 1120A) corresponding to the first page and a second element (e.g., 1120B) corresponding to the second page. In response to detecting the first rotational input (e.g., 1150D), the computer system (e.g., 600) shifts (e.g., upward or downward), via the display generation component, the first element and the second element (e.g., as in FIGS. 11F-11G). In some embodiments, as the user interface scrolls between pages, the elements of the navigation indicator shift to indicate that the page has changed. In some embodiments, the navigation indicator indicates which page of the plurality of pages is currently displayed (and/or more prominently displayed). In some embodiments, the navigation indictor includes paging dots (e.g., one per page) that change color, size, highlighting, and/or position based on which page of the plurality of pages is selected. Displaying a navigation indicator with elements that shift provides the user with visual feedback about page changes as they happen, thereby providing improved visual feedback.

In some embodiments, replacing display, via the display generation component, of the first page (e.g., 1102A) of the plurality of pages with the second page (e.g., 1102B) of the plurality of pages includes an animation that shifts (e.g., upward or downward) the second page onto the display (and, optionally without shifting the first page). Shifting the second page onto the display provides the user with visual feedback about the order of the pages, thereby providing improved visual feedback.

In some embodiments, the computer system (e.g., 600) displays, via the display generation component (e.g., 602) and concurrently with the first page (e.g., 1112A) (or a second page), a navigational element (e.g., 1114) with a visual appearance that corresponds to the first page without corresponding to the second page (or second page without corresponding to a third page). In response to detecting the first rotational input (e.g., 1150D or 1150E), the computer system updates, via the display generation component, the visual appearance of the navigational element (e.g., 1114) (e.g., while maintaining a display location of the navigational element) to correspond to the second page without corresponding to the first page (or to the third page without corresponding to the second page). In some embodiments, the visual appearance of the navigational element changes to indicate the currently displayed page from within the plurality of pages. Displaying a navigational element that changes to correspond to the currently displayed page provides the user with visual feedback about which page is currently being displayed, thereby providing improved visual feedback.

In some embodiments, the first page (e.g., 1112B) indicates an amount of a first exercise metric (e.g., calories burned) and the visual appearance of the navigational element while the first page is displayed includes an indication of progress towards a goal (e.g., 300 calories) for the first exercise metric and the second page (e.g., 1112C or 1112D) indicates an amount of a second exercise metric (e.g., minutes of exercise performed) and the visual appearance of the navigational element while the second page is displayed includes an indication of progress towards a goal (e.g., 30 minutes) for the second exercise metric. In some embodiments, a third page, different from the first page and that second page, indicates an amount of a third exercise metric (e.g., number of times the user has stood up and moved around for at least a threshold duration (e.g., 1 minute, 2 minutes, or 5 minutes) during different hours of the day) and a visual appearance of the navigational element while the third page is displayed includes an indication of progress towards a goal (e.g., 8 hours or 12 hours) for the third exercise. Displaying a navigational element that indicates progress towards a goal and changes to correspond to the currently displayed page provides the user with visual feedback about which page is currently being displayed, thereby providing improved visual feedback.

In some embodiments, the first page and the second page are part of a hierarchy. While displaying the navigational element concurrently with a respective page of the plurality of pages, the computer system (e.g., 600) detects, via one or more input devices (e.g., a touch-sensitive surface and/or a microphone), activation of (e.g., a tap input on) the navigational element (e.g., 1114 at FIG. 11H). In response to detecting activation of the navigational element (e.g., 1114), the computer system displays (e.g., by replacing the currently displayed page), via the display generation component, a parent (e.g., 1112A) of the respective page in the hierarchy. Displaying a parent of the current page when the navigational element is displayed enables access to the parent with a single input, thereby reducing the number of inputs required.

In some embodiments, while displaying the second page (e.g., 1102B at FIG. 11C) of the plurality of pages at the second scroll position, the computer system (e.g., 600) detects a fifth rotational input (e.g., 1150C). In response to detecting the fifth rotational input: the computer system scrolls (e.g., as in FIGS. 11C-11D), via the display generation component, the second page to an end of the second page and subsequent to scrolling the second page to the end of the second page, the computer system replaces, via the display generation component, the second page with a third page of the plurality of pages. In some embodiments, the scrolling of the second page has a magnitude (e.g., a distance and/or speed) that is based on a magnitude (e.g., amount or speed) of the fifth rotational input. In some embodiments, the scrolling of the second page is in a direction that is based on a direction of the fifth rotational input. In some embodiments, the third page is part of the same application as the second page. Scrolling to an edge of the second page before switching to the third page provides the user with visual feedback about the contents of the second page and that the second page will be replaced by the third page, thereby providing improved visual feedback.

In some embodiments, while displaying the third page, the computer system (e.g., 600) detects a sixth rotational input and in response to detecting the sixth rotational input, the computer system (e.g., 600) replaces, via the display generation component (e.g., 602), the third page with a fourth page of the plurality of pages. Displaying a subsequent page in response to rotational input enables the user to access additional pages, thereby improving the man-machine interface.

In some embodiments, while displaying the third page, the computer system (e.g., 600) detects a sixth rotational input. In response to detecting the sixth rotational input, the computer system (e.g., 600) scrolls, via the display generation component (e.g., 602), the third page (e.g., without replacing the third page with a fourth page). Scrolling the third page in response to rotational input enables the user to access additional portions of the third page, thereby improving the man-machine interface.

In some embodiments, while displaying the third page, the computer system (e.g., 600) detects a sixth rotational input. In response detecting the sixth rotational input: in accordance with a determination that a user-configurable setting (e.g., 1124 in FIG. 11K) (e.g., text localization and/or font size) is configured for a first setting (e.g., disabled and/or font size of 10 or 12), the computer system (e.g., 600) replaces, via the display generation component, the third page with a fourth page of the plurality of pages (e.g., as in FIGS. 11G-11I) and in accordance with a determination that the user-configurable setting (e.g., text localization and/or font size) is configured for a second setting (e.g., enables and/or font size of 14 or 16), different from the first setting, the computer system (e.g., 600) scrolls, via the display generation component, the third page (e.g., as in FIGS. 11M-11P) (e.g., without replacing the third page with a fourth page). In some embodiments, the scrolling of the third page has a magnitude (e.g., a distance and/or speed) that is based on a magnitude (e.g., amount or speed) of the sixth rotational input. In some embodiments, the scrolling of the third page is in a direction that is based on a direction of the sixth rotational input. In some embodiments, a page is scrollable or not-scrollable based on user customizations. Displaying a page as scrollable or not scrollable based on user customizations enables the computer system to display the contents of the page using the user customizations while still enabling access to the full contents of the page, thereby providing an improved man-machine interface.

In some embodiments, the user-configurable setting is a text localization setting (e.g., as in FIG. 11K, but for language selection), the first setting is a first language, and the second setting is a second language that is different from the first language. In some embodiments, the text localization setting changes the language of the text and therefore changes how much space the text takes up. In some embodiments, the amount of space the text takes up can determine whether the page fits on the display (and is therefore not scrollable) or the page does not all fit on the display (and is therefore scrollable). Enabling users to select different languages (e.g., based on the location of computer system and/or based on user selections) enables the computer system to provide content that the user can more readily access, thereby improving the man-machine interface.

In some embodiments, the user-configurable setting is a system font size setting (e.g., as in FIG. 11K), the first setting is a first font size, and the second setting is a second font size that is larger than the first font size. In some embodiments, different fonts and/or different font sizes take up different amounts of space in a page, which can determine whether the page fits on the display (and is therefore not scrollable) or the page does not all fit on the display (and is therefore scrollable). Enabling users to select different system font size enables the computer system to provide content with a size that allows users to more readily access the content, thereby improving the man-machine interface.

In some embodiments, the first page (e.g., 1102A) includes a plurality of selectable options (e.g., arranged in a row and/or arranged in a grid), including a first selectable option (e.g., 1104A) corresponding to a first messaging contact (e.g., a first friend) and a second selectable option (e.g., 1104B) corresponding to a second messaging contact (e.g., a second friend). In some embodiments, the plurality of selectable options are user-selected options corresponding to favorite messaging contacts. In some embodiments, activation of a respective selectable option displays a messaging conversation with a respective contact. In some embodiments, the second page (e.g., 1102B) includes one or more messages (e.g., 1108A and/or 1108B) (e.g., most recently received messages) from one or more messaging conversations (e.g., not based on being favorite messaging contacts). In some embodiments, activation of a respective message causes display of a respective conversation that the message is a part of. Displaying selectable options corresponding to messaging contents on a first page and switching to displaying messages of conversations on the second page enables the computer system to provide the user with quick access to the contacts the user is most likely to converse with and quick access to recent conversations that the user is participating in, thereby reducing the number of inputs required and improving the man-machine interface.

Note that details of the processes described above with respect to method 1200 (e.g., FIG. 12) are also applicable in an analogous manner to the methods described below/above. For example, method 1200 optionally includes one or more of the characteristics of the various methods described above/below with reference to methods 700, 800, 900, 1000, 1300, and 1500. For example, the computer system is the same computer system in the various methods. For brevity, these details are not repeated below.

FIG. 13 is a flow diagram of a method for navigating among different views, in accordance with some embodiments. Method 1300 is performed at a computer system (e.g., 100, 300, 500 and/or 600) (e.g., a smart phone, a smart watch, a laptop, a desktop computer, TV, and/or a tablet) that is in communication with a display generation component (e.g., 602) (e.g., a display controller, a touch-sensitive display system, and/or a display (e.g., integrated and/or connected)). Some operations in method 1300 are, optionally, combined, the orders of some operations are, optionally, changed, and some operations are, optionally, omitted.

As described below, method 1300 provides an intuitive way for navigating among different views. The method reduces the cognitive burden on a user for navigating among different views, thereby creating a more efficient human-machine interface. For battery-operated computing devices, enabling a user to navigate among different views faster and more efficiently conserves power and increases the time between battery charges.

The computer system (e.g., 600) displays (1302), via the display generation component (e.g., 602), a first view (e.g., 1122A) of an application (e.g., of a user interface and/or of a first application) that includes a plurality of user interface objects (e.g., 1126A-1126D), including a first user interface object (e.g., 1126A or 1126C) displayed at a first location and with a first size and a second user interface object (e.g., 1126B or 1126D) displayed at a second location and with a second size. The first user interface object (e.g., 1126A or 1126C) includes first information that updates over time based on changing data associated with the application and the second user interface object (e.g., 1126B or 1126D) includes second information that updates over time based on changing data associated with the application. The second information is different from the first information.

While displaying the first view (e.g., at FIG. 11Q) with the first user interface object (e.g., 1126A or 1126C) displayed at the first location and with the first size and the second user interface object (e.g., 1126B or 1126D) displayed at the second location and with the second size, the computer system (e.g., 600) receives (1304) a request (e.g., 1150L) (e.g., via user input) to transition from the first view to a second view (e.g., 1122B) (e.g., of the user interface and/or of the first application) that is different from the first view (e.g., 1122A).

In response to receiving the request (e.g., 1150L) to transition from the first view (e.g., 1122A) to the second view (e.g., 1122B), the computer system (e.g., 600) displays (1306), via the display generation component, the second view (e.g., 1122B), including: shifting (1308) (as shown in FIGS. 11Q-11S) (e.g., moving and/or translating) the first user interface object (e.g., 1126A or 1126C) relative to one or more user interface objects (e.g., the second user interface object and/or a third user interface object) of the plurality of user interface objects including the second user interface object (e.g., 1126B or 1126D) and resizing (1310) (as shown in FIGS. 11Q-11S) (e.g., increasing in size and/or decreasing in size) the first user interface object (e.g., 1126A or 1126C) relative to one or more user interface objects (e.g., the second user interface object and/or a third user interface object) of the plurality of user interface objects including the second user interface object (e.g., 1126B or 1126D), wherein after shifting and resizing the first user interface object, the first user interface object (e.g., 1126A or 1126C) includes the first information, and the second user interface object (e.g., 1126B or 1126D) includes the second information. In some embodiments, the first user interface object concurrently shifts and resizes (relative to the one or more user interface objects) while transitioning display from the first view to the second view. Shifting and resizing the first user interface element provides the user with visual feedback that the request was received and that the display is transitioning to the second view, thereby providing improved visual feedback.

In some embodiments, the first information updates over time while shifting the first user interface object and while resizing the first user interface object (e.g., as in FIGS. 11Q-11S). In some embodiments, the first information of the first user interface object continues updating as the first user interface object shifts and/or resizes. Updating the first information as the first user interface object shifts/resizes enables the computer system to provide the user with visual feedback about the changing first information as the first user interface object shifts and/or resizes, thereby providing improved visual feedback.

In some embodiments, shifting the first user interface object includes shifting (e.g., moving and/or translating) the first user interface object (e.g., 1126C) within a container user interface object (e.g., 1126A). In some embodiments, shifting the first user interface object within the container user interface object includes maintaining a location of the container user interface object while shifting the first user interface object. In some embodiments, the container user interface object also shifts (e.g., in a different or same direction and/or with the same or different magnitude) as the first user interface object shifts. Moving the first user interface object within another user interface object provides the user with visual feedback that that first user interface object is moving, thereby providing improved visual feedback.

In some embodiments, shifting the first user interface object includes shifting (e.g., moving and/or translating) the first user interface object (e.g., 1126C) from within a container user interface object (e.g., 1126A) to outside the container user interface object. Moving the first user interface object from inside to outside another user interface object provides the user with visual feedback that that first user interface object is moving, thereby providing improved visual feedback.

In some embodiments, resizing the first user interface object (e.g., 1126C) includes enlarging the first user interface object (e.g., 1126C) from the first size (e.g., at FIG. 11Q) to a third size (e.g., at FIG. 11S) that is larger than a size of the container user interface object (e.g., the size of the container user interface when the first user interface object begins to resize). In some embodiments, the size of the container user interface remains static while the first user interface object resizes. In some embodiments, the size of the container user interface changes as the first user interface object resizes. Enlarging the first user interface object to become larger than the user interface object that was containing the first user interface object provides the user with visual feedback that that first user interface object is changing in size, thereby providing improved visual feedback.

In some embodiments, displaying the second view (e.g., 1122B) in response to receiving the request to transition from the first view to the second view includes fading out (e.g., partially or fully) display of the container user interface object (e.g., as in FIGS. 11S-11U) (e.g., concurrently with shifting and/or resizing the first user interface object). Fading out the containing user interface element provides the user with visual feedback that the request was received and that the display is transitioning to the second view, thereby providing improved visual feedback.

In some embodiments, displaying the second view (e.g., 1122B) in response to receiving the request to transition from the first view to the second view includes: shifting (e.g., moving and/or translating) a third user interface object (e.g., 1126D) relative to one or more user interface objects (e.g., the first, the second, and/or a fourth user interface object) of the plurality of user interface objects and/or resizing (e.g., increasing in size and/or decreasing in size) the third user interface object (e.g., 1126D) relative to one or more user interface objects (e.g., the first, the second, and/or a fourth user interface object) of the plurality of user interface objects. Shifting and/or resizing other user interface objects in relation to the first user interface object provides the user with visual feedback that the request was received and that the display is transitioning to the second view, thereby providing improved visual feedback.

In some embodiments, displaying the second view (e.g., 1122C) in response to receiving the request to transition from the first view to the second view includes fading out (e.g., partially or fully) display of a user interface object (e.g., 1126E) (e.g., concurrently with shifting and/or resizing the first user interface object), different from the first user interface object (and, optionally, different from the container user interface object), of the plurality of user interface objects (as in FIGS. 11S-11U). Fading out some user interface objects provides the user with visual feedback that the request was received and that the display is transitioning to the second view, thereby providing improved visual feedback.

In some embodiments, while displaying the second view (e.g., 1122B) with the first user interface object, the computer system (e.g., 600) receives a request (e.g., 1150M) (e.g., via user input) to transition from the second view (e.g., 1122B) to a third view (e.g., 1122C) (e.g., of the user interface and/or of the first application) that is different from the second view (and, optionally, different from the first view). In some embodiments, the first view and the third view are the same view. In response to receiving the request (e.g., 1150M) to transition from the second view to the third view, the computer system (e.g., 600) displays, via the display generation component, the third view (e.g., 1122C), including: shifting (e.g., moving and/or translating) the first user interface object relative to one or more user interface objects (e.g., the second user interface object and/or a third user interface object) of the plurality of user interface objects (e.g., optionally including the second user interface object) and resizing (e.g., increasing in size and/or decreasing in size) the first user interface object relative to one or more user interface objects (e.g., the second user interface object and/or a third user interface object) of the plurality of user interface objects (e.g., optionally including the second user interface object) (e.g., as in FIGS. 11S-11U), wherein after shifting and resizing the first user interface object, the first user interface object includes the first information (and, optionally, the second user interface object includes the second information). In some embodiments, the first user interface object concurrently shifts and resizes (relative to the one or more user interface objects) while transitioning display from the second view to the third view. Shifting and resizing the first user interface element provides the user with visual feedback that the request to transition to the third view was received and that the display is transitioning to the third view, thereby providing improved visual feedback.

In some embodiments, the computer system (e.g., 600) is configured to communicate with a rotatable input mechanism (e.g., 604) (e.g., a rotatable crown, a rotatable knob, and/or a rotatable component that rotates with respect to a body of the computer system) and wherein receiving the request to transition from the first view to the second view includes detecting, via the rotatable input mechanism (e.g., 604), a first rotational input (e.g., 1150L). In some embodiments, the movement has a magnitude (e.g., a distance and/or speed) that is based on a magnitude (e.g., amount or speed) of the first rotational input. In some embodiments, the movement is in a direction that is based on a direction of the first rotational input. Transitioning to the second view based on rotational input received at a rotatable input mechanism provides the user with visual feedback that the request was received and that the display is transitioning to the second view, thereby providing improved visual feedback.

In some embodiments, the transition from displaying the first view (e.g., 1122A) to displaying the second view (e.g., 1122B) gradually progresses as input of the request to transition from the first view to the second view is received (e.g., as in FIGS. 11Q-11S). In some embodiments, the input requesting to transition from the first view to the second view is a first rotational input of a rotatable input mechanism (e.g., a rotatable crown and/or a rotatable knob) and the transition from displaying the first view to displaying the second view gradually progress as the rotatable input mechanism is rotated (e.g., in a direction (clockwise or counterclockwise)). In some embodiments, as more rotation of the rotatable input mechanism is detected, more transition from displaying the view to displaying the second view occurs. In some embodiments, when the input is reversed (e.g., rotation in a first direction changes to rotation in a second direction that is the opposite of the first direction), the animation of the transition is also reverse (e.g., the transition from displaying the second view to displaying the first view gradually progress as the rotatable input mechanism is rotated in the reversed direction and/or the transition from displaying the first view to displaying the second view is gradually reversed). Gradually transitioning from the first display to the second display as the input (e.g., rotational input received at a rotatable input mechanism) is received provides the user with visual feedback that the input is being received and that the input is transitioning the display to the second view, thereby providing improved visual feedback.

In some embodiments, the application is a time (e.g., time interval) measuring application (e.g., a stopwatch application) (as in FIGS. 11Q-11U), the first information is a representation of a first time metric (e.g., elapsed seconds without including elapsed minutes) and the second information is a representation of a second time metric (e.g., elapsed minutes and, optionally, seconds) that is different from the first time metric. Measuring time using different time metrics (e.g., seconds, minutes, and/or hours) and resizing/moving the first user interface object that includes the first time metric provides the user with visual feedback that the request was received and that the display is transitioning to the second view, thereby providing improved visual feedback.

In some embodiments, the application is a weather application (e.g., providing local weather information, a weather map, and/or forecasts for weather) (e.g., that is displayed on display 602) and the first information is a representation of a current temperature (e.g., at the current location and/or at a user-selected location). In some embodiments, the second information is a representation of a location corresponding to the current temperature. In some embodiments, the second information is a representation of a weather metric (e.g., high temperature for the day, low temperature for the day, sky conditions (e.g., cloud level and/or sunny), and/or expected precipitation. Resizing and moving the representation of the current temperature provides the user with visual feedback that the request was received and that the display is transitioning to the second view, thereby providing improved visual feedback.

In some embodiments, the application is a compass application (e.g., to show current direction, current location, and/or current elevation) (e.g., that is displayed on display 602), the first information is a representation of a first compass element (e.g., a compass dial, one or more cardinal direction indicators, and a bearing indicator (e.g., an indicator that can be positioned relative to the compass dial based on user input to indicate an offset from true north)), and the second information is a representation of a second compass element (e.g., a compass dial, one or more cardinal direction indicators, and a bearing indicator (e.g., an indicator that can be positioned relative to the compass dial based on user input to indicate an offset from true north)) that is different from the first compass element. Displaying compass information and resizing/moving the first user interface object that includes the first compass element provides the user with visual feedback that the request was received and that the display is transitioning to the second view, thereby providing improved visual feedback.

In some embodiments, the application is a health application (e.g., that is displayed on display 602) (e.g., a health tracking application, an application that tracks and/or displays active calories burned, minutes of activity completed, and/or number of hours for which hours in which the user has stood and moved for at least a minute), and the first information is a representation of a first health tracking indicator (e.g., an indication of active calories burned). In some embodiments, the first health tracking indicator is larger in the first view as compared to the second view. In some embodiments, activation of the first health tracking indicator in the second view causes display of the first view. In some embodiments, the second information is a representation of a second health tracking indicator (e.g., minutes of activity completed, and/or number of hours for which hours in which the user has stood and moved for at least a minute) that is different from the first health tracking indicator. In some embodiments, the second information is a representation of the number of pages available for viewing (e.g., paging dots) in the health application. In some embodiments, the second information is a representation of one or more users with which health information and/or health goal information is currently shared. Displaying health information and resizing/moving the first user interface object that includes the first health tracking indicator provides the user with visual feedback that the request was received and that the display is transitioning to the second view, thereby providing improved visual feedback.

In some embodiments, resizing, in response to receiving the request (e.g., 1150L) to transition from the first view to the second view, the first user interface object relative to one or more user interface objects including the second user interface object includes decreasing a size of the first user interface object (e.g., 1126A) (and, optionally, one or more other object) and (e.g., concurrently) increasing the size of the second user interface object (e.g., 1126C) (and, optionally, one or more other objects). In some embodiments, one or multiple user interface objects decrease in size, one or multiple user interface objects increase in size, and (e.g., concurrently) one or multiple user interface elements remain the same size. Reducing the size of one user interface object while increasing the size of another user interface object provides the user with visual feedback that the request was received and that the display is transitioning to the second view, thereby providing improved visual feedback.

In some embodiments, in response to receiving the request to transition from the first view to the second view increasing a size of a first element (e.g., 1126D) (e.g., digital indication of time (minutes, seconds, and/or milliseconds) and/or an analog indication of time (e.g., minutes)) of a respective user interface object of the plurality of user interface objects and (e.g., concurrently) decreasing a size of a second element (e.g., 1126A) (e.g., an analog indication of seconds without indicating minutes), different from the first element, of the respective user interface object. In some embodiments, the respective user interface object is the first user interface object or the second user interface object. Changing the sizes of different parts of the same user interface object provides the user with visual feedback that the request was received and that the display is transitioning to the second view, thereby providing improved visual feedback.

In some embodiments, the computer system includes a rotatable input mechanism (e.g., 604) (e.g., a crown and/or a digital crown). Receiving the request (e.g., 1150L) to transition from the first view to the second view includes: in accordance with a determination that the request includes rotation of the rotatable input mechanism in a first direction, displaying the second view includes animating a transition from the first view to the second view, wherein the animated transition (e.g., a magnitude, a speed, and/or amount of the animation) from the first view to the second view is based on a magnitude (e.g., speed and/or amount) of the rotation of the rotatable input mechanism in the first direction. In some embodiments, the animation proceeds in conjunction with detecting the rotation of the rotatable input mechanism and, optionally, the animation stops in conjunction with detecting that the rotation of the rotatable input mechanism has stopped. Advancing through the animation from the first view to the second view based on amount crown rotation provides the user with visual feedback about the amount of crown rotation detected (and/or whether the rotation continues to be detected), thereby providing improved visual feedback.

In some embodiments, while displaying the second view (e.g., 11S), the computer system (e.g., 600) detects a portion of a second rotation of the rotatable input mechanism in a second direction that is different from (e.g., opposite of) the first direction. In response to detecting the second rotation of the rotatable input mechanism in the second direction, the computer system (e.g., 600) animates a transition from the second view (e.g., 11S) to the first view (e.g., 11Q). In some embodiments, the animation of the transition from the second view to the first view is a reversing at least a portion of the animation of the transition from the first view to the second view. In some embodiments, the animated transition (e.g., a magnitude, a speed, and/or amount of the animation) from the second view to the first view is based on a magnitude (e.g., speed and/or amount) of the second rotation of the rotatable input mechanism in the second direction. In some embodiments, the animation proceeds in conjunction with detecting the second rotation of the rotatable input mechanism and, optionally, the animation stops in conjunction with detecting that the second rotation of the rotatable input mechanism has stopped. Reversing the progress of the animation when the direction of the input changes provides the user with feedback that the detected direction of the input has changed, thereby providing improved visual feedback.

In some embodiments, receiving the request to transition from the first view to the second view includes: in accordance with a determination that the request includes a touch gesture (e.g., a finger gesture and/or a swipe input on a touch-sensitive surface in a first touch direction), displaying the second view includes animating a transition from the first view (e.g., 1122A) to the second view (e.g., 1122B). In some embodiments, the animated transition (e.g., a magnitude, a speed, and/or amount of the animation) from the first view to the second view is not based on a magnitude (e.g., speed and/or amount) of the touch gesture in the first touch direction. In some embodiments, the animation proceeds independent of the progress of the touch gesture (e.g., the animation does not stop in conjunction with detecting that the touch gesture has stopped). In some embodiments, while displaying the second view, the computer system detects a portion of a second touch gesture in a second touch direction that is different from (e.g., opposite of) the first touch direction. In response to detecting the second touch gesture in the second touch direction, the computer system animates a transition from the second view to the first view (e.g., the animation proceeding independent of the progress of the second touch gesture). In some embodiments, after displaying the second view, the computer system receives the request to transition from the first view to the second view includes, in accordance with a determination that the request includes a touch gesture (e.g., a finger gesture and/or a swipe input on a touch-sensitive surface in a second touch direction), displaying the second view includes animating a transition from the second view back to the first view (e.g., by reversing at least a portion of the transition from the first view to the second view). Advancing through the animation from the first view to the second view in response to detecting the touch gesture (and independent of the progress of the touch gesture) provides the user with feedback that the touch gesture has been detected, thereby providing improved visual feedback.

Note that details of the processes described above with respect to method 1300 (e.g., FIG. 13) are also applicable in an analogous manner to the methods described below/above. For example, method 1300 optionally includes one or more of the characteristics of the various methods described above/below with reference to methods 700, 800, 900, 1000,

1200, and 1500. For example, the computer system is the same computer system in the various methods. For brevity, these details are not repeated below.

FIGS. 14A-14H illustrate exemplary user interfaces for navigating through data. FIG. 15 is a flow diagram for a method of navigating through data, in accordance with some embodiments.

Figure 14A:
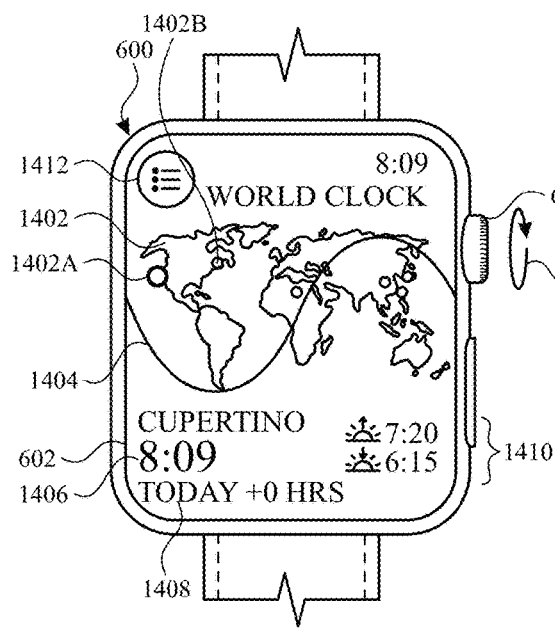
FIGS. 14A-14H illustrate exemplary user interfaces for navigating through data.

FIG. 14A illustrates computer system 600 (e.g., a smart watch) with display 602 and crown 604, which is a rotatable input mechanism. Computer system 600 is displaying a first view of a world clock application. In some embodiments, when computer system 600 initially starts executing the world clock application (e.g., in response to user input) and/or initially displays the world clock application (e.g., in response to user input), computer system 600 displays first view of the world clock application, as shown in FIG. 14A.

At FIG. 14A, computer system 600 displays world map 1402 with one or more indications of locations on the map, such as first location indication 1402A of Cupertino and second location indication 1402B of New York City. Computer system 600 also displays curved line 1404 that indicates which portions of world map 1402 are in daytime (e.g., after sunrise and before sunset) and which portions of world map 1402 are in nighttime (e.g., after sunset and before sunrise). At FIG. 14A, first location indication 1402A is bolded, indicating that Cupertino is currently selected. As a result, computer system 600 displays time 1406, which corresponds to the location of line 1404, and sunrise/sunset times 1410 for Cupertino. Time change indicator 1408 indicates how much time (e.g., how many minutes and/or how many hours) the current view deviates from the current time. At FIG. 14A, computer system 600 detects rotational input 1450A at crown 604.

Figure 14B:
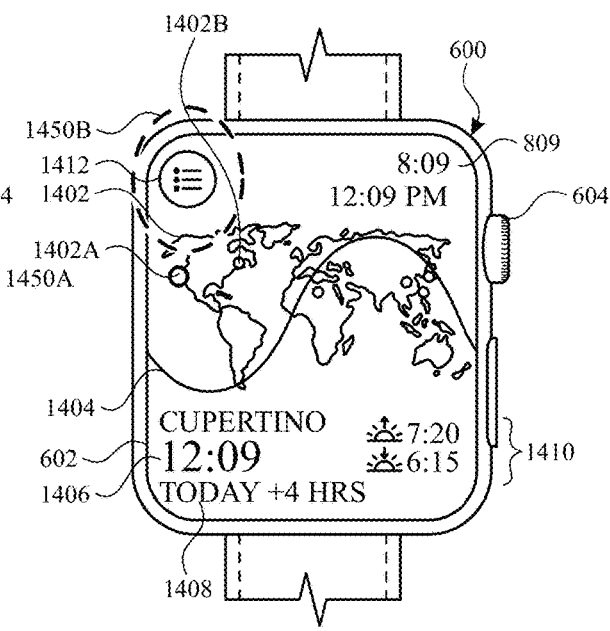
Figure 14C:
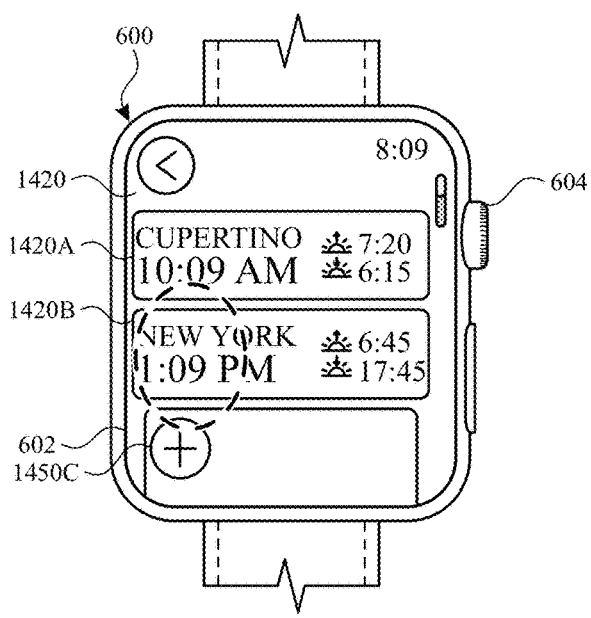

At FIG. 14B, in response to detecting rotational input 1450A, computer system 600 advances through various times to an updated time that is shown as time 1406 (e.g., to 12:09) and advances line 1404 (e.g., by moving and/or reshaping line 1404) to show which portions of world map 1402 are in daytime (e.g., after sunrise and before sunset) and which portions of world map 1402 are in nighttime (e.g., after sunset and before sunrise) at the updated time. Time change indicator 1408 also advances to indicate how much time (e.g., how many minutes and/or how many hours) the current view deviates from the current time. Additional rotational inputs cause the time to move forward (e.g., when rotation is in a first direction) and move backward (e.g., when rotation is in a second direction, different from the first direction). Throughout FIGS. 14A-14B, computer system 600 maintains a consistent view (e.g., the same first view) of the world clock application, including (for example) maintaining the location of 1406, 1408, and 1410.

At FIG. 14B, computer system 600 detects tap input 1450B on selectable option 1412. In response to detecting tap input 1450B on selectable option 1412, computer system 600 displays city selection interface 1420, which includes first option 1420A that corresponds to Cupertino and second option 1420B that corresponds to New York City. At FIG. 14C, computer system 600 detects tap input 1450C on second option 1420B that corresponds to New York City. In response to detecting tap input 1450C, computer system 600 displays world map 1402, as shown in FIG. 14D.

Figure 14D:
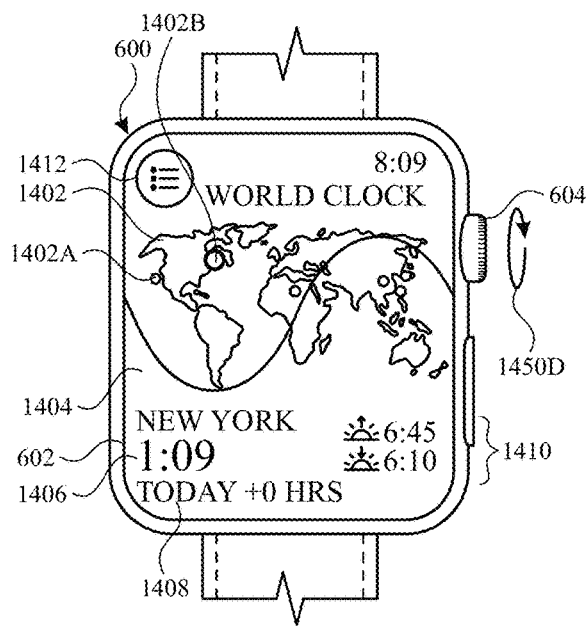

At FIG. 14D, map 1402 includes one or more indications of locations on the map, such as first location indication 1402A of Cupertino and second location indication 1402B of New York City. Computer system 600 also displays curved line 1404 that indicates which portions of world map 1402 are in daytime (e.g., after sunrise and before sunset) and which portions of world map 1402 are in nighttime (e.g., after sunset and before sunrise) for the selected time. At FIG. 14D, first location indication 1402A is not bolded, indicating that Cupertino is no longer selected, and second location indication 1402B is bolded, indicating that New York City is selected. As a result, at FIG. 14D, computer system 600 displays time 1406 (based on New York City), which corresponds to the location of line 1404, and sunrise/sunset times 1410 for New York City. Time change indicator 1408 indicates how much time (e.g., how many minutes and/or how many hours) the current view deviates from the current time (e.g., no deviation (0 HRS) at FIG. 14D. At FIG. 14D, computer system 600 detects rotational input 1450D at crown 604.

Figure 14E:
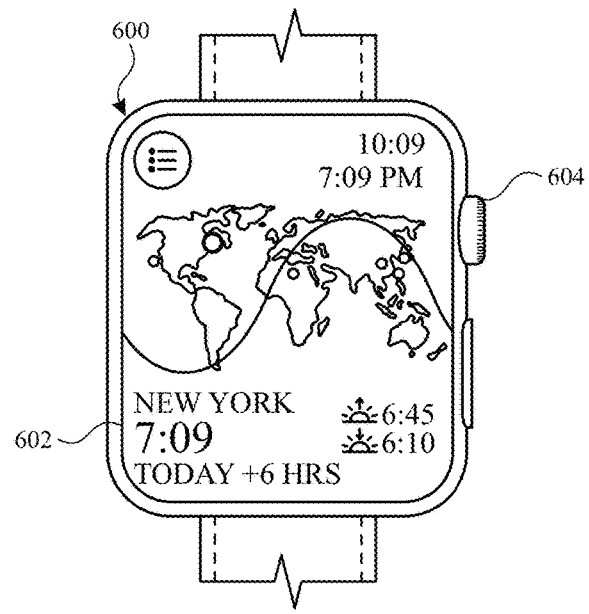

At FIG. 14E, in response to detecting rotational input 1450D, computer system 600 advances through various times to an updated time that is shown as time 1406 (e.g., to 7:09) and advances line 1404 (e.g., by moving and/or reshaping line 1404) to show which portions of world map 1402 are in daytime (e.g., after sunrise and before sunset) and which portions of world map 1402 are in nighttime (e.g., after sunset and before sunrise) at the updated time. Time change indicator 1408 also advances to indicate how much time (e.g., how many minutes and/or how many hours) the current view deviates from the current time. Additional rotational inputs cause the time to move forward (e.g., when rotation is in a first direction) and move backward (e.g., when rotation is in a second direction, different from the first direction). Throughout FIGS. 14D-14E, computer system 600 maintains a consistent view of the world clock application, including (for example) maintaining the location of 1406, 1408, and 1410.

Figure 14F:
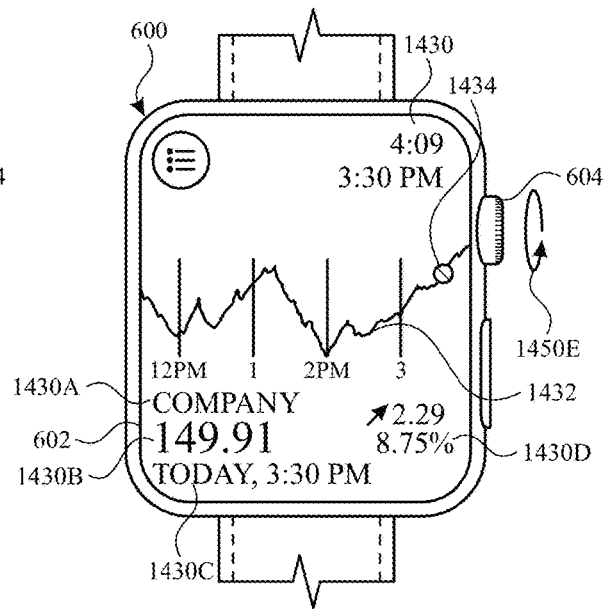

At FIG. 14F, computer system 600 is displaying a view of a performance application (e.g., performance of a stock and/or number of website visitors). In some embodiments, when computer system 600 initially starts executing the performance application (e.g., in response to user input) and/or initially displays the performance application (e.g., in response to user input), computer system 600 displays the view of the performance application, as shown in FIG. 14F. At FIG. 14F, user interface 1430 includes graph 1432 displayed with a first time scale. In some embodiments, graph 1432 illustrates performance of a company indicated by 1430A (or of a stock of the company) for various times. The performance for a particular time is identified by performance indictor 1430B for time 1430C. Selector 1434 indicates the time (e.g., via horizontal position) and the performance (e.g., via vertical position) for the selected time (e.g., time 1430C). Change indicator 1430D indicates an amount of change (e.g., an absolute amount, such as 2.29, and/or a relative amount, such as 8.75%) as compared to a different time (e.g., performance at the end of the previous day).

At FIG. 14F, computer system 600 detects rotational input 1450E at crown 604. At FIG. 14G, in response to detecting rotational input 1450E, computer system 600 advances through various times to an updated time that is shown as time 1430C (e.g., to 1:30 pm) and updates performance indicator 1430B to reflect performance at the updated time (e.g., 1:30 pm) and updates change indicator 1430D to reflect an amount of change at the updated time (e.g., 1:30 pm). As the time advances based on rotational input 1450E, selector 1434 moves along graph 1432 to indicate the updated time and the performance at the updated time. Throughout FIGS. 14F-14G, computer system 600 maintains a consistent view of the performance application, including (for example) maintaining the locations of elements 1430A, 1430B, 1430C, and 1430D.

Figure 14G:
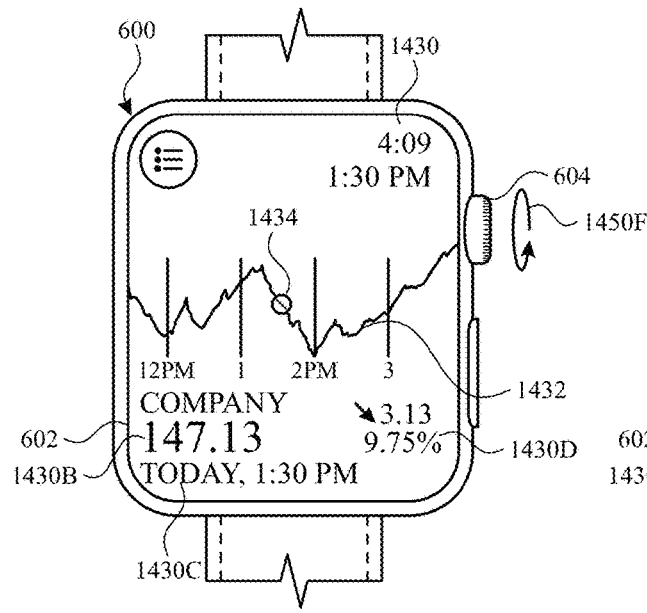
Figure 14H:
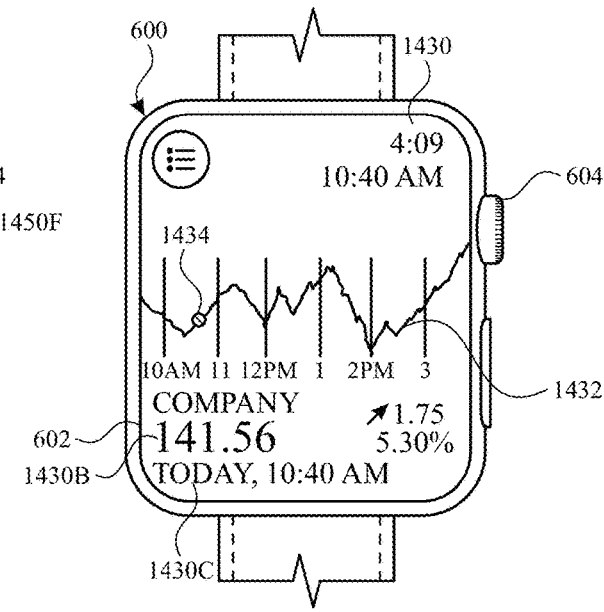

At FIG. 14G, computer system 600 detects rotational input 1450F at crown 604. At FIG. 14H, in response to detecting rotational input 1450E, computer system 600 advances through various times to an updated time that is shown as time 1430C (e.g., to 10:40 am) and updates performance indicator 1430B to reflect performance at the updated time (e.g., 10:40 am) and updates change indicator 1430D to reflect an amount of change at the updated time (e.g., 10:40 am). As the time advances based on rotational input 1450F, selector 1434 moves along graph 1432 to indicate the updated time and the performance at the updated time. As selector 1434 approaches an edge (e.g., the left edge) of graph 1432, computer system 600 changes the scale of graph 1432 (e.g., from the first scale to a different scale, from a first time scale to a second time scale) to show more data corresponding to additional times in graph 1432, as shown in FIG. 14H. At FIG. 14E, when computer system 600 detects rotational input (e.g., counterclockwise) to transition back to later times (e.g., to 2:00 pm), computer system 600 again changes the scale of graph 1432, thereby displaying additional detail for the portions of the graph that are illustrated (e.g., as shown in FIG. 14G). The rotational input (e.g., counterclockwise) also causes the location of selector 1434 to be updated along graph 1432, and computer system 600 advances through the various times and their respective performance and change values as the rotational input is received. In some embodiments, throughout FIGS. 14F-14H, computer system 600 maintains a consistent view of the performance application, including (for example) maintaining the locations of elements 1430A, 1430B, 1430C, and 1430D.

FIG. 15 is a flow diagram of a method for navigating through data, in accordance with some embodiments. Method 1500 is performed at a computer system (e.g., 100, 300, 500 and/or 600) (e.g., a smart phone, a smart watch, a laptop, a desktop computer, TV, and/or a tablet) that is in communication with a display generation component (e.g., 602) (e.g., a display controller, a touch-sensitive display system, and/or a display (e.g., integrated and/or connected)) and a rotatable input mechanism (e.g., 604) (e.g., a rotatable crown and/or a rotatable knob). Some operations in method 1500 are, optionally, combined, the orders of some operations are, optionally, changed, and some operations are, optionally, omitted.

As described below, method 1500 provides an intuitive way for navigating through data. The method reduces the cognitive burden on a user for navigating through data, thereby creating a more efficient human-machine interface. For battery-operated computing devices, enabling a user to navigate through data faster and more efficiently conserves power and increases the time between battery charges.

While displaying, via the display generation component (e.g., 602), a respective user interface (e.g., as in FIG. 14A and/or 14F), the computer system (e.g., 600) detects (e.g., 1502), via the rotatable input mechanism (e.g., 604), a first rotational input (e.g., 1450A and/or 1450E).

In response (1504) to detecting the first rotational input (e.g., 1450A) and in accordance with a determination that the respective user interface is a user interface of a first application (e.g., a world clock application), the computer system (e.g., 600) performs (1506) a first operation (e.g., that displays information corresponding to a displayed user interface object of the user interface of the first application) that advances through a first set of data based on a direction and/or magnitude (e.g., speed and/or distance) of the first rotational input (as in FIGS. 14A-14B and 14C-14D), while maintaining a consistent view of the user interface of the first application (e.g., without scrolling and/or without zooming the user interface of the first application) (e.g., displaying time information for a different location or different locations, such as regions or cities).

In response (1504) to detecting the first rotational input (e.g., 1450A) and in accordance with a determination that the respective user interface is a user interface of a second application (e.g., a stock market application), the computer system (e.g., 600) performs (1508) a second operation (e.g., that displays information corresponding to a displayed user interface object of the user interface of the second application), different from the first operation, that advances through a second set of data, that is different from the first set of data based on a direction and/or magnitude (e.g., speed and/or distance) of the first rotational input (e.g., as in FIGS. 14F-14H), while maintaining a consistent view of the user interface of the second application (e.g., without scrolling and/or without zooming the user interface of the second application) (e.g., displaying stock information (e.g., price and/or volume) for a different time/day or for different times/days). Performing operations that advance through various sets of data based on a direction and/or magnitude of rotational input while maintaining a consistent view of the respective user interface enables the computer system to provide the user with feedback about the data, thereby providing improved visual feedback. Maintaining the consistent views of respective user interfaces enables the computer system to provide a stable interface that provides the user with desired information, making it easier to access the information and improving the man-machine interface.

In some embodiments, performing the first operation that advances through the first set of data based includes: in accordance with a first section (e.g., first city and/or first time zone) (e.g., as in FIGS. 14A-14B) of the first application being active, performing the first operation for the first section of the first application (e.g., for a first city selected from a plurality of cities and/or for a first time zone selected from a plurality of time zones) without performing the first operation for a second section of the first application; and in accordance with the second section (e.g., second city and/or second time zone) (e.g., as in FIGS. 14D-14E) of the first application being active, performing the first operation for the second section of the first application (e.g., for a second city selected from a plurality of cities and/or for a second time zone selected from a plurality of time zones) without performing the first operation for the first section. Performing the same operations for different sections of an application while maintaining a consistent view of the user interface of the application enables the computer system to provide the user with feedback about the data for that section of the application, thereby providing improved visual feedback.

In some embodiments, the first operation changes a first displayed information (e.g., 1406 and/or 1430C) (e.g., a complication that displays information from a first application) to correspond to an updated time (and, optionally, changes additional displayed information (e.g., a complication that displays information from another application) to correspond to the first updated time). In some embodiments, the first operation also changes a respective displayed time (e.g., to be a future time or a time in the past) to the updated time. In some embodiments, the second operation changes a second respective displayed time (e.g., to be a future time or a time in the past) to a second updated time and changes a second displayed information (e.g., a complication that displays information from a different application) to correspond to the second updated time (and, optionally, changes different displayed information (e.g., a complication that displays information from a different application) to correspond to the second updated time). Displaying information that corresponds to a time set based on the input enables users to quickly access information corresponding to different times by changing the respective displayed time and corresponding information, thereby reducing the number of inputs required to access the information and providing the user with improved visual feedback.

In some embodiments, the user interface of the first application is a watch face user interface (e.g., displayed on display 602) (e.g., that indicates a current time and optionally includes one or more complications corresponding to one or more respective applications) and the first operation comprises displaying, via the display generation component (e.g., 602), one or more widgets (e.g., in a stack of widgets and/or a platter) that include data received from one or more live session applications (e.g., applications that are configured to provide/display real-time or near real-time information, such as a timer, alarm, scores, directions, and/or stocks). In some embodiments, the first operation comprises ceasing to display the one or more widgets that include data received from one or more live session applications. Displaying widgets that include data received from live session applications provides the user with visual feedback about the state of the live session applications, thereby providing improved visual feedback.

In some embodiments the first operation advances through one or more (e.g., one, two, or three) pages of the first application (e.g., without scrolling the one or more pages and/or by flipping through the pages) (e.g., as described in relation to FIGS. 11A-11V and/or FIG. 12). In some embodiments, the second operation advances through one or more pages of the second application (e.g., with or without scrolling the one or more pages). Advancing through one or more pages of the first application enables the computer system to progress through the pages as the user provides the user input, thereby allowing the user to quickly access the page the user desires while reducing the number of required inputs.

In some embodiments, the second operation advances through at least a portion of one or more pages of the second application by scrolling through at least the portion of the one or more pages (e.g., as described in relation to FIGS. 11A-11V and/or FIG. 12). In some embodiments, the first operation advances through at least a portion of the one or more pages of the first application by scrolling. Advancing through a portion of one or more pages of the second application by scrolling through the portions enables the computer system to progress through portions of the pages as the user provides the user input, thereby allowing the user to quickly access the desired portion of the page the user desires while reducing the number of required inputs.

In some embodiments, the first operation that advances through the first set of data (e.g., as in FIGS. 14A-14B and/or 14F-14H) advances based on simulated inertial behavior (e.g., is based on physics models and/or inertia models) and/or the second operation that advances through the second set of data advances based on simulated inertial behavior (e.g., is based on physics models and/or inertia models). In some embodiments, the operation that advances through the set of data exhibits inertial scrolling behavior and/or kinetic scrolling behavior, whereby advancing continues to move after the computer system has stopped receiving the input that initiated the advancing. In some embodiments, instead of abruptly stopping, the speed of advancing slows down until the advancing completely stops. In some embodiments, the operation that advances through the set of data exhibits momentum, thereby continuing to advance through the set of data after the computer system ceases to detect the first rotational input. In some embodiments, the computer system applies dampening, a force of friction, and/or resistance to the operation that advances through the set of data, thereby causing the advancement through the set of data to gradually slow down after the computer system ceases to detect the first rotational input. Advancing through data using inertial behavior enables the computer system to continue a scrolling operation and/or an operation that changes the focus of a respective user interface after the computer system has ceased detecting the user input that initiated the scrolling operation and/or change in focus, thereby allowing the computer system to display additional content with reduced input.

In some embodiments, advancing through the first set of data includes visually snapping to first data (e.g., a first object, a first image, and/or a top of a page) of the first set of data (and, optionally, subsequently snapping to additional displayed data). In some embodiments, advancing through the second set of data includes visually snapping to second data (e.g., a second object, a second image, and/or a top of a page) of the second set of data (e.g., as in FIGS. 14A-14B and/or 14F-14H). In some embodiments, snapping behavior is a spring-like behavior whose initial motion is damped over time so that the object settles at a specific point. In some embodiments, as a user interface element approaches a snap location (e.g., comes to within a threshold distance of the snap location), the computer system moves (e.g., accelerates or maintains speed of) the user interface element to the snap location (and optionally stops the user interface element at the snap location), regardless of whether the user interface element's inertia would have otherwise caused the user interface element to reach and/or stop at the snap location. In some embodiments, as the computer system receives user input to move a user interface element away from a snap location (e.g., when the user interface element is within a threshold distance of the snap location), the computer system applies resistance and/or dampening to the movement and/or reverts the user interface element to the snap location (e.g., except when a threshold magnitude, such as a speed and/or velocity of input is exceeded) (e.g., whether or not the user interface element previously snapped to that snap location). In some embodiments, a snap location that is not within a threshold distance of the user interface element does not affect the motion and/or movement of the user interface element. In some embodiments, a user interface element does not snap to a snap location (e.g., even when the user interface element is within the threshold distance of the snap location) when a motion characteristic (e.g., a speed and/or acceleration) of the user interface element and/or the user input that initiates movement of the user interface element meets first criteria (e.g., exceeds a threshold speed and/or value). In some embodiments, when the first criteria are met, the movement of the user interface element is not affected (e.g., resisted and/or accelerated) based on the snap location, even as the user interface element moves past the snap location. Visually snapping to displayed data provides the user with visual feedback about which data is currently in focus and enables the computer system to focus on relevant data using imprecise user input, thereby providing improved feedback, reducing the number of required inputs, and improving the accuracy of user inputs.

In some embodiments, advancing through the first set of data includes: in accordance with the first rotational input (e.g., 1450A) having a first speed of rotation (e.g., a speed of rotation below a threshold speed or a speed of rotation above the threshold speed), advancing through the first set of data includes displaying first data (e.g., a first object, a first image, and/or a top of a page) of the first set of data including visually snapping to the first data (e.g., as in FIGS. 14A-14B) and in accordance with the first rotational input (e.g., 1450A) having a second speed of rotation (e.g., a speed of rotation above the threshold speed or a speed of rotation below the threshold speed), advancing through the first set of data includes displaying first data (e.g., a first object, a first image, and/or a top of a page) of the first set of data without visually snapping to the first data (e.g., as in FIGS. 14A-14B). When the computer system does not apply snapping behavior to a user interface element (such as based on a location or a snap location), the computer system does not apply acceleration, deceleration, damping, and/or resistance to movement of the user interface element based on the location (and/or based on proximity to the location) (e.g., even as the user interface element is within a threshold distance of the location and/or as the user interface element passes through the location). Snapping to data for some speeds of rotational input received and not snapping to data for other speeds of rotational input received allows for quickly snap to different data to enable fast navigation while also allowing for incremental navigation to enable high precision navigation, thereby improving the man-machine interface.

In some embodiments, the first application (or the second application) is a clock application (e.g., as in FIGS. 14A-14E) and performing the first operation (or the second operation) includes advancing through various respective times (e.g., hours and/or minutes) to graphically indicate (e.g., via 1404) (e.g., by moving a (curved or straight) line in relation to a map) whether it is daytime or nighttime in a city (e.g., a user-selected city or an automatically selected city) at a respective time (e.g., 1406) (e.g., a time at a current location of the computer system, where the current location of the computer system is different from a location of the city). Advancing through various times to see whether a city is in daytime or nighttime enables the computer system to provide the user with improved visual feedback.

In some embodiments, the second application (or the first application) is an application for monitoring a parameter (e.g., as in FIGS. 14F-14H) (e.g., a parameter corresponding to health data, available computer memory, equities, stocks, products, and/or services prices) and performing the second operation (or the first operation) includes advancing through various respective times (e.g., hours, days, or weeks) to graphically indicate (e.g., by moving an indicator along a (curved or straight) line) a value (e.g., via 1434) of the parameter (e.g., of health data, available computer memory, an equity, stock, product, and/or service) at different corresponding times (e.g., 1430C). In some embodiments, the parameter is a health parameter, such as an amount of exercise performed per day, calories burned per day, or heart rate over time. In some embodiments, the computer system uses a sensor to capture the parameter and stores the information for subsequent review. In some embodiments, the parameter is amount of available computer memory. In some embodiments, the computer system monitors available memory and makes the information available to the user to better understand the computer's usage of the resource. Advancing through various times to see the values of the parameters at those times enables the computer system to provide the user with improved visual feedback about historical information.

In some embodiments, the first operation and/or the second operation includes changing a time scale (e.g., as in FIGS. 14G-14H) (e.g., changing an X-axis of a graph from one inch representing one hour to one inch representing 12 hours and/or changing a scale such that the width of the screen (or window) displays graphed information for a first duration (e.g., a 6-hour period) to the width of the screen (or same-sized window) displays graphed information for a second duration that is different from the first duration (e.g., a 12-hour period). In some embodiments, the operation changes a time scale of various respective times for displaying information relating to values of a parameter (e.g., of health data, available computer memory, an equity, stock, product, and/or service) at different corresponding times. For example, a user can navigate among different heart rates detected throughout the current day without the computer system changing a time scale of the information, but as the indicator controlled by the user approaches (e.g., comes within the adjacent 3, 5, or 6 hours) the boundary of the day, the time scale of the graph showing the heart rates changes to reduce the space used to display the information for the current day and reveals additional information for the adjacent day. In some embodiments, the second operation changes a time scale of various respective times that correspond to prices (e.g., of an equity, stock, product, and/or service). In some embodiments, the first operation and/or second operation includes increasing the range of time (that correspond to prices) displayed. Changing a time scale of displayed information enables the computer system to provide the user with information about a longer duration of time and/or more details about a shorter duration of time, thereby providing improved visual feedback.

Note that details of the processes described above with respect to method 1500 (e.g., FIG. 15) are also applicable in an analogous manner to the methods described below/above. For example, method 1500 optionally includes one or more of the characteristics of the various methods described above/below with reference to methods 700, 800, 900, 1000, 1200, and 1300. For example, the computer system is the same computer system in the various methods. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of targeted content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying and/or managing widgets, the present technology can be configured to allow users to select to "opt in" or "opt out" of displaying widgets that include personal information. In another example, users can select to withhold certain personal information for display in the widget(s). In yet another example, users can select to limit the length of time a widget with personal information is displayed. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, widgets can be displayed to users by inferring preferences based on non-personal information data or a bare minimum amount of personal information, such as the content being requested by the device associated with a user, other non-personal information available to the applications installed/available on the computer system, or publicly available information.

What is claimed is:

1. A computer system configured to communicate with a display generation component and a rotatable input mechanism, comprising:
   one or more processors; and
   memory storing one or more programs configured to be executed by the one or more processors, the one or more programs including instructions for:
   displaying, via the display generation component, a time user interface;
   while displaying the time user interface, detecting, via the rotatable input mechanism, a first rotational input with a respective magnitude; and
   in response to detecting the first rotational input:
   in accordance with a determination that the respective magnitude of the first rotational input is a first magnitude, displaying, via the display generation component a set of one or more widgets; and
   in accordance with a determination that the respective magnitude of the first rotational input is a second magnitude that is different from the first magnitude, displaying, via the display generation component, an application launcher user interface that includes one or more graphical objects for launching one or more applications.

2. The computer system of claim 1, the one or more programs further including instructions for:
   in response to detecting the first rotational input:
   in accordance with the determination that the respective magnitude of the first rotational input is the second magnitude and prior to displaying the application launcher user interface, displaying, via the display generation component, the set of one or more widgets.

3. The computer system of claim 1, wherein the computer system is in communication with one or more input devices and wherein the application launcher user interface includes a first set of one or more graphical objects corresponding to a set of one or more applications, the one or more programs further including instructions for:
  detecting, via the one or more input devices, an input corresponding to a respective graphical object of the first set of one or more graphical objects; and
  in response to detecting the input corresponding to the respective graphical object of the first set of one or more graphical objects, displaying, via the display generation component, a user interface for a respective application corresponding to the respective graphical object.

4. The computer system of claim 3, the one or more programs further including instructions for:
  while displaying the application launcher user interface that includes the first set of one or more graphical objects, detecting, via the rotatable input mechanism, a second rotational input; and
  in response to detecting the second rotational input, scrolling the application launcher user interface, wherein scrolling the application launcher user interface includes displaying a second set of one or more graphical objects different from the first set of one or more graphical objects.

5. The computer system of claim 1, the one or more programs further including instructions for:
  while displaying the time user interface, detecting, via the rotatable input mechanism, a first press input; and
  in response to detecting the first press input, displaying, via the display generation component, the application launcher user interface.

6. The computer system of claim 1, wherein the first rotational input is in a first direction, the one or more programs further including instructions for:
  while displaying the time user interface, detecting, via the rotatable input mechanism, a third rotational input in a direction that is opposite the first direction; and
  in response to detecting the third rotational input, displaying, via the display generation component, a first system user interface, wherein the first system user interface is different from the application launcher user interface and does not include the set of one or more widgets.

7. The computer system of claim 6, wherein the first system user interface includes a set of one or more received notifications.

8. The computer system of claim 6, the one or more programs further including instructions for:
  while displaying the application launcher user interface, detecting, via the rotatable input mechanism, a second press input; and
  in response to detecting the second press input, displaying, via the display generation component, the first system user interface.

9. The computer system of claim 6, wherein the computer system includes a physical button, the one or more programs further including instructions for:
  while displaying the time user interface, detecting, via the physical button, a third press input; and
  in response to detecting the third press input, displaying, via the display generation component, a second system user interface, wherein the second system user interface is different from the application launcher user interface, does not include the set of one or more widgets, and is different from the first system user interface.

10. The computer system of claim 9, wherein the second system user interface includes a set of one or more graphical objects that, when activated, initiate a process to modify a setting of the computer system, the one or more programs further including instructions for:
  while displaying the second system user interface, detecting activation of a respective graphical object of the set of one or more graphical objects; and
  in response to detecting activation of the respective graphical object, initiating a process to modify a respective system setting corresponding to the respective graphical object.

11. The computer system of claim 9, the one or more programs further including instructions for:
  while displaying the application launcher user interface, detecting, via the physical button, a fourth press input; and
  in response to detecting the fourth press input, displaying, via the display generation component, the second system user interface.

12. The computer system of claim 1, wherein the set of one or more widgets includes a widget that includes one or more complications of a set of complications.

13. A non-transitory computer-readable storage medium storing one or more programs configured to be executed by one or more processors of a computer system that is in communication with a display generation component and a rotatable input mechanism, the one or more programs including instructions for:
  displaying, via the display generation component, a time user interface
  while displaying the time user interface, detecting, via the rotatable input mechanism, a first rotational input with a respective magnitude; and
  in response to detecting the first rotational input:
    in accordance with a determination that the respective magnitude of the first rotational input is a first magnitude, displaying, via the display generation component a set of one or more widgets; and
    in accordance with a determination that the respective magnitude of the first rotational input is a second magnitude that is different from the first magnitude, displaying, via the display generation component, an application launcher user interface that includes one or more graphical objects for launching one or more applications.

14. A method, comprising:
  at a computer system that is in communication with a display generation component and a rotatable input mechanism:
    displaying, via the display generation component, a time user interface;
    while displaying the time user interface, detecting, via the rotatable input mechanism, a first rotational input with a respective magnitude; and
    in response to detecting the first rotational input:
      in accordance with a determination that the respective magnitude of the first rotational input is a first magnitude, displaying, via the display generation component a set of one or more widgets; and in accordance with a determination that the respective magnitude of the first rotational input is a second magnitude that is different from the first magnitude, displaying, via the display generation component, an application launcher user interface that includes one or more graphical objects for launching one or more applications.

15. The non-transitory computer-readable storage medium of claim 13, the one or more programs further including instructions for:
in response to detecting the first rotational input:
in accordance with the determination that the respective magnitude of the first rotational input is the second magnitude and prior to displaying the application launcher user interface, displaying, via the display generation component, the set of one or more widgets.

16. The non-transitory computer-readable storage medium of claim 13, wherein the computer system is in communication with one or more input devices and wherein the application launcher user interface includes a first set of one or more graphical objects corresponding to a set of one or more applications, the one or more programs further including instructions for:
detecting, via the one or more input devices, an input corresponding to a respective graphical object of the first set of one or more graphical objects; and
in response to detecting the input corresponding to the respective graphical object of the first set of one or more graphical objects, displaying, via the display generation component, a user interface for a respective application corresponding to the respective graphical object.

17. The non-transitory computer-readable storage medium of claim 16, the one or more programs further including instructions for:
while displaying the application launcher user interface that includes the first set of one or more graphical objects, detecting, via the rotatable input mechanism, a second rotational input; and
in response to detecting the second rotational input, scrolling the application launcher user interface, wherein scrolling the application launcher user interface includes displaying a second set of one or more graphical objects different from the first set of one or more graphical objects.

18. The non-transitory computer-readable storage medium of claim 13, the one or more programs further including instructions for:
while displaying the time user interface, detecting, via the rotatable input mechanism, a first press input; and
in response to detecting the first press input, displaying, via the display generation component, the application launcher user interface.

19. The non-transitory computer-readable storage medium of claim 13, wherein the first rotational input is in a first direction, the one or more programs further including instructions for:
while displaying the time user interface, detecting, via the rotatable input mechanism, a third rotational input in a direction that is opposite the first direction; and
in response to detecting the third rotational input, displaying, via the display generation component, a first system user interface, wherein the first system user interface is different from the application launcher user interface and does not include the set of one or more widgets.

20. The non-transitory computer-readable storage medium of claim 19, wherein the first system user interface includes a set of one or more received notifications.

21. The non-transitory computer-readable storage medium of claim 19, the one or more programs further including instructions for:
while displaying the application launcher user interface, detecting, via the rotatable input mechanism, a second press input; and
in response to detecting the second press input, displaying, via the display generation component, the first system user interface.

22. The non-transitory computer-readable storage medium of claim 19, wherein the computer system includes a physical button, the one or more programs further including instructions for:
while displaying the time user interface, detecting, via the physical button, a third press input; and
in response to detecting the third press input, displaying, via the display generation component, a second system user interface, wherein the second system user interface is different from the application launcher user interface, does not include the set of one or more widgets, and is different from the first system user interface.

23. The non-transitory computer-readable storage medium of claim 22, wherein the second system user interface includes a set of one or more graphical objects that, when activated, initiate a process to modify a setting of the computer system, the one or more programs further including instructions for:
while displaying the second system user interface, detecting activation of a respective graphical object of the set of one or more graphical objects; and
in response to detecting activation of the respective graphical object, initiating a process to modify a respective system setting corresponding to the respective graphical object.

24. The non-transitory computer-readable storage medium of claim 22, the one or more programs further including instructions for:
while displaying the application launcher user interface, detecting, via the physical button, a fourth press input; and
in response to detecting the fourth press input, displaying, via the display generation component, the second system user interface.

25. The non-transitory computer-readable storage medium of claim 13, wherein the set of one or more widgets includes a widget that includes one or more complications of a set of complications.

26. The method of claim 14, further comprising:
in response to detecting the first rotational input:
in accordance with the determination that the respective magnitude of the first rotational input is the second magnitude and prior to displaying the application launcher user interface, displaying, via the display generation component, the set of one or more widgets.

27. The method of claim 14, wherein the computer system is in communication with one or more input devices and wherein the application launcher user interface includes a first set of one or more graphical objects corresponding to a set of one or more applications, the method further comprising:
detecting, via the one or more input devices, an input corresponding to a respective graphical object of the first set of one or more graphical objects; and in response to detecting the input corresponding to the respective graphical object of the first set of one or more graphical objects, displaying, via the display generation component, a user interface for a respective application corresponding to the respective graphical object.

28. The method of claim 27, further comprising:
while displaying the application launcher user interface that includes the first set of one or more graphical objects, detecting, via the rotatable input mechanism, a second rotational input; and
in response to detecting the second rotational input, scrolling the application launcher user interface, wherein scrolling the application launcher user interface includes displaying a second set of one or more graphical objects different from the first set of one or more graphical objects.

29. The method of claim 14, further comprising:
while displaying the time user interface, detecting, via the rotatable input mechanism, a first press input; and
in response to detecting the first press input, displaying, via the display generation component, the application launcher user interface.

30. The method of claim 14, wherein the first rotational input is in a first direction, the method further comprising:
while displaying the time user interface, detecting, via the rotatable input mechanism, a third rotational input in a direction that is opposite the first direction; and
in response to detecting the third rotational input, displaying, via the display generation component, a first system user interface, wherein the first system user interface is different from the application launcher user interface and does not include the set of one or more widgets.

31. The method of claim 30, wherein the first system user interface includes a set of one or more received notifications.

32. The method of claim 30, further comprising:
while displaying the application launcher user interface, detecting, via the rotatable input mechanism, a second press input; and
in response to detecting the second press input, displaying, via the display generation component, the first system user interface.

33. The method of claim 30, wherein the computer system includes a physical button, the method further comprising:
while displaying the time user interface, detecting, via the physical button, a third press input; and
in response to detecting the third press input, displaying, via the display generation component, a second system user interface, wherein the second system user interface is different from the application launcher user interface, does not include the set of one or more widgets, and is different from the first system user interface.

34. The method of claim 33, wherein the second system user interface includes a set of one or more graphical objects that, when activated, initiate a process to modify a setting of the computer system, the method further comprising:
while displaying the second system user interface, detecting activation of a respective graphical object of the set of one or more graphical objects; and
in response to detecting activation of the respective graphical object, initiating a process to modify a respective system setting corresponding to the respective graphical object.

35. The method of claim 33, further comprising:
while displaying the application launcher user interface, detecting, via the physical button, a fourth press input; and
in response to detecting the fourth press input, displaying, via the display generation component, the second system user interface.

36. The method of claim 14, wherein the set of one or more widgets includes a widget that includes one or more complications of a set of complications.

* * * * *